(12) United States Patent
Hirota

(10) Patent No.: US 7,768,612 B2
(45) Date of Patent: Aug. 3, 2010

(54) HIGH QUALITY AND ULTRA LARGE SCREEN LIQUID CRYSTAL DISPLAY DEVICE AND PRODUCTION METHOD THEREOF

(75) Inventor: Naoto Hirota, Toyokawa (JP)

(73) Assignee: Obayashiseikou Co., Ltd., Aichi (JP)

( * ) Notice: Subject to any disclaimer, the term of this patent is extended or adjusted under 35 U.S.C. 154(b) by 532 days.

(21) Appl. No.: 10/843,109

(22) Filed: May 11, 2004

(65) Prior Publication Data

US 2004/0227891 A1    Nov. 18, 2004

(30) Foreign Application Priority Data

May 14, 2003    (JP)    ............................. 2003-185823

(51) Int. Cl.
*G02F 1/1343*    (2006.01)
(52) U.S. Cl. ..................................... 349/141
(58) Field of Classification Search ................ 349/141, 349/156
See application file for complete search history.

(56) References Cited

U.S. PATENT DOCUMENTS

| | | | |
|---|---|---|---|
| 6,028,653 A | 2/2000 | Nishida | |
| 6,266,122 B1 * | 7/2001 | Kishimoto et al. | .......... 349/156 |
| 6,330,049 B1 | 12/2001 | Kume et al. | |
| 6,433,852 B1 | 8/2002 | Sonoda et al. | |
| 6,515,719 B2 | 2/2003 | Yamaguchi et al. | |
| 6,577,374 B1 | 6/2003 | Nakata et al. | |
| 6,583,846 B1 | 6/2003 | Yanagawa et al. | |
| 6,642,988 B2 | 11/2003 | Matsuyama et al. | |
| 6,650,389 B1 | 11/2003 | Sakamoto | |
| 6,762,802 B2 | 7/2004 | Ono et al. | |
| 6,774,965 B2 | 8/2004 | Nakashima et al. | |
| 6,774,967 B2 | 8/2004 | Kim et al. | |
| 6,774,975 B2 | 8/2004 | Ahn | |
| 6,788,372 B1 | 9/2004 | Kaise et al. | |
| 7,057,695 B2 | 6/2006 | Mun et al. | |
| 7,136,129 B2 | 11/2006 | Hsieh et al. | |
| 2001/0022569 A1 | 9/2001 | Ohta et al. | |
| 2002/0018166 A1 | 2/2002 | Matsumoto et al. | |
| 2002/0033922 A1 | 3/2002 | Hidehira et al. | |
| 2002/0149729 A1 | 10/2002 | Nishimura et al. | |
| 2002/0158994 A1 | 10/2002 | Hashimoto et al. | |
| 2002/0159016 A1 | 10/2002 | Nishida et al. | |

FOREIGN PATENT DOCUMENTS

| | | |
|---|---|---|
| EP | 1 087 255 A2 | 3/2001 |
| EP | 1091236 A2 | 4/2001 |
| JP | 10-55000 | 2/1998 |

(Continued)

*Primary Examiner*—James A Dudek
(74) *Attorney, Agent, or Firm*—Muramatsu & Associates

(57) ABSTRACT

A large screen liquid crystal display device using a transverse electric field system which is capable of dramatically improving an aperture ratio, a transmittance ratio, brightness, and contrast with low cost and high production yield. For example, the width of the common electrodes that shield the electric fields of the video signal lines can be decreased dramatically and the aperture ratio can be improved dramatically. Especially, the bumps covering the video signal lines can be used along with the spacers, and with the use of halftone exposure method, the bumps covering the video signal lines and the spacers can be constructed at the same time, which dramatically shortens the time required for the production process.

21 Claims, 119 Drawing Sheets

FOREIGN PATENT DOCUMENTS

| | | |
|---|---|---|
| JP | 10-55001 | 2/1998 |
| JP | 10-170939 | 6/1998 |
| JP | 10-325961 | 12/1998 |
| JP | 11-24104 | 1/1999 |
| JP | 11-52420 | 2/1999 |
| JP | 11-267861 | 10/1999 |
| JP | 2000-19527 | 1/2000 |
| JP | 2000-89240 | 3/2000 |
| JP | 2000-089240 | 3/2000 |
| JP | 2000-199904 | 7/2000 |
| JP | 2001-209053 | 8/2001 |
| JP | 2002-258321 | 9/2002 |
| JP | 2002-323706 | 11/2002 |

* cited by examiner

FIG. 5(A) 1st Exposure
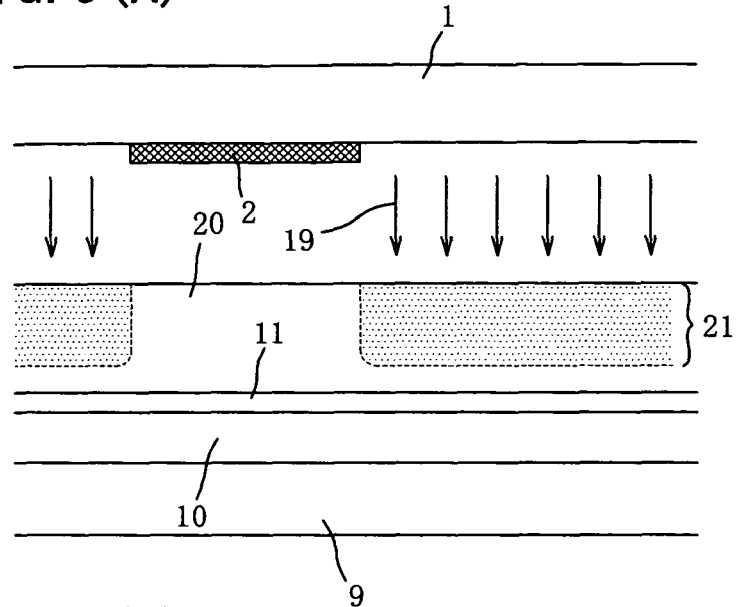
FIG. 5(B) 2nd Exposure
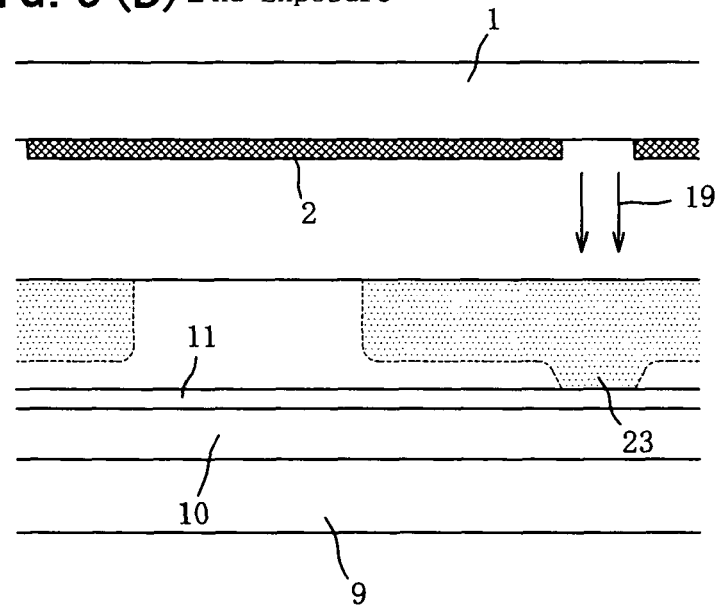
FIG. 5(C)
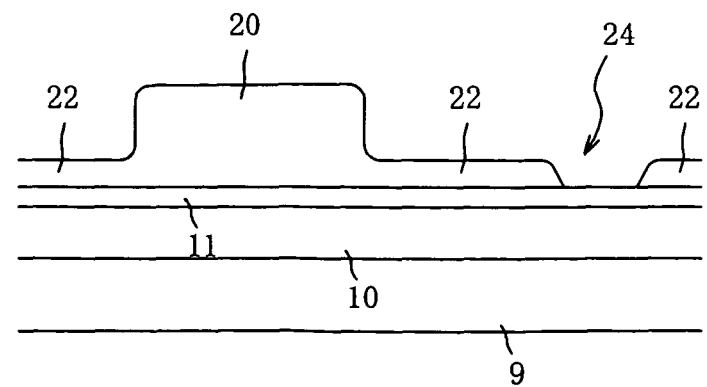

FIG. 6(A) 1st Exposure
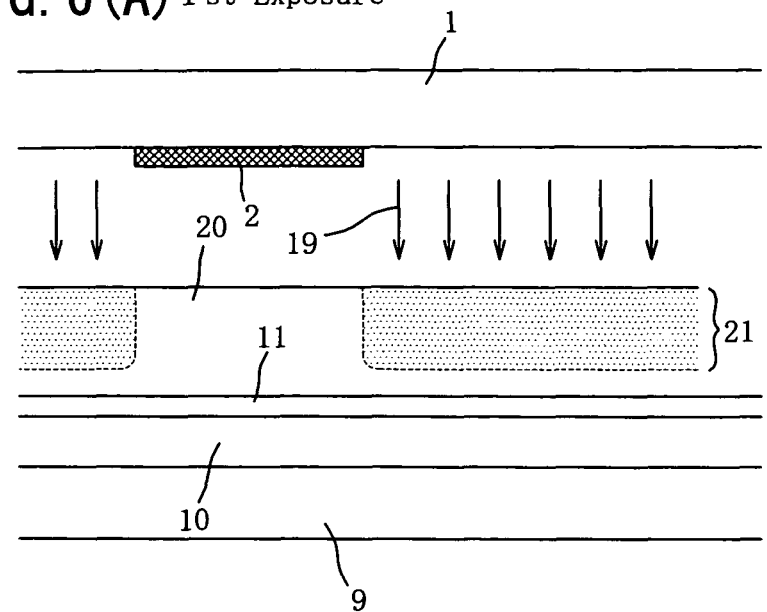
FIG. 6(B) 2nd Exposure
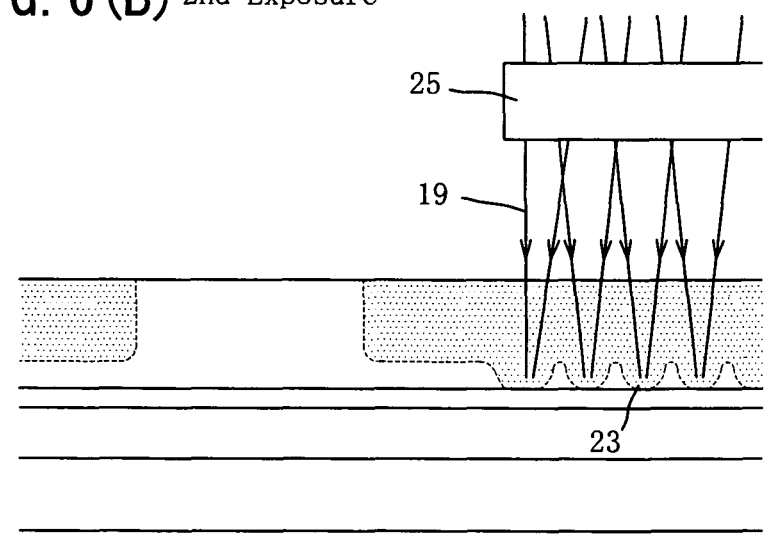
FIG. 6(C)
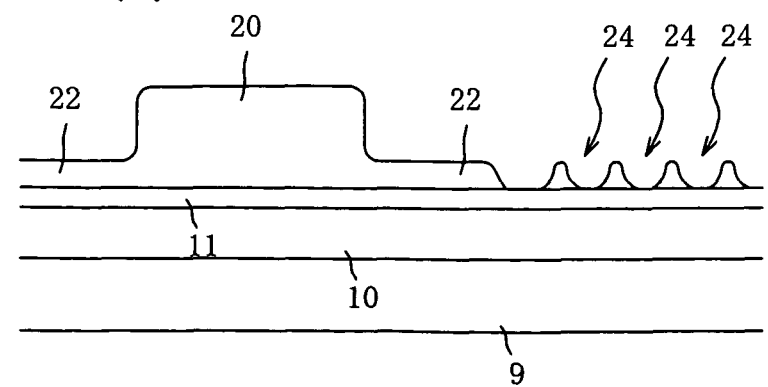

1st Exposure

2nd Exposure

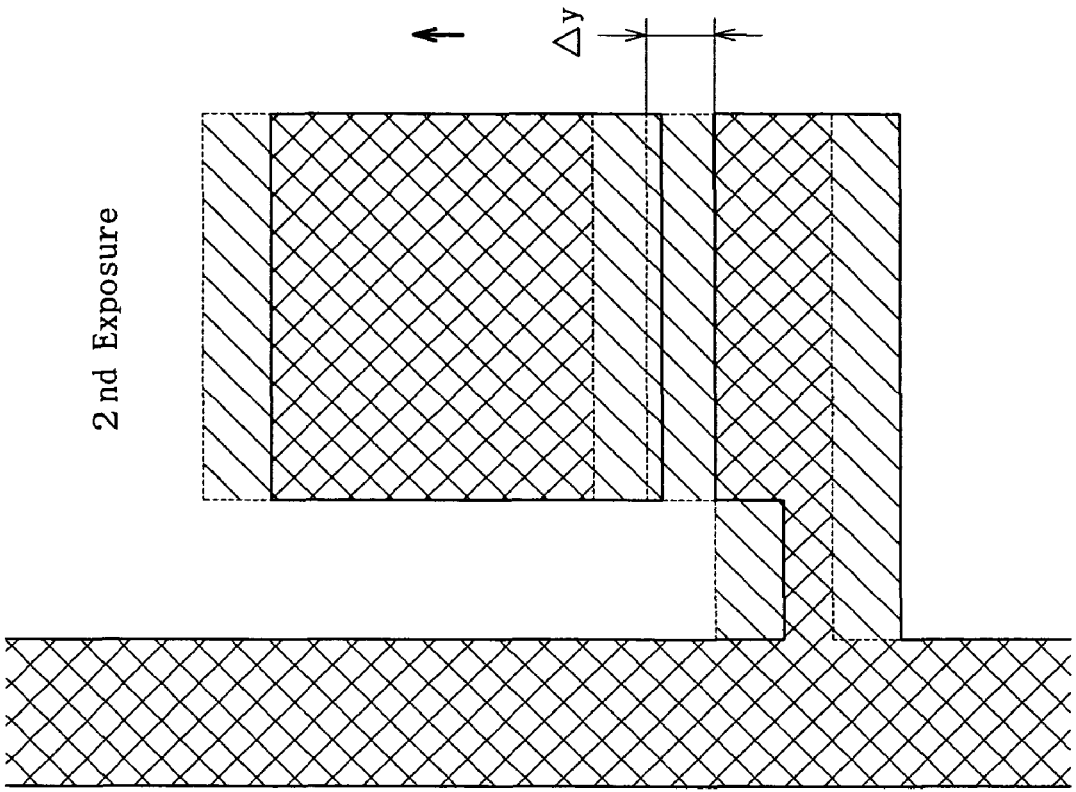
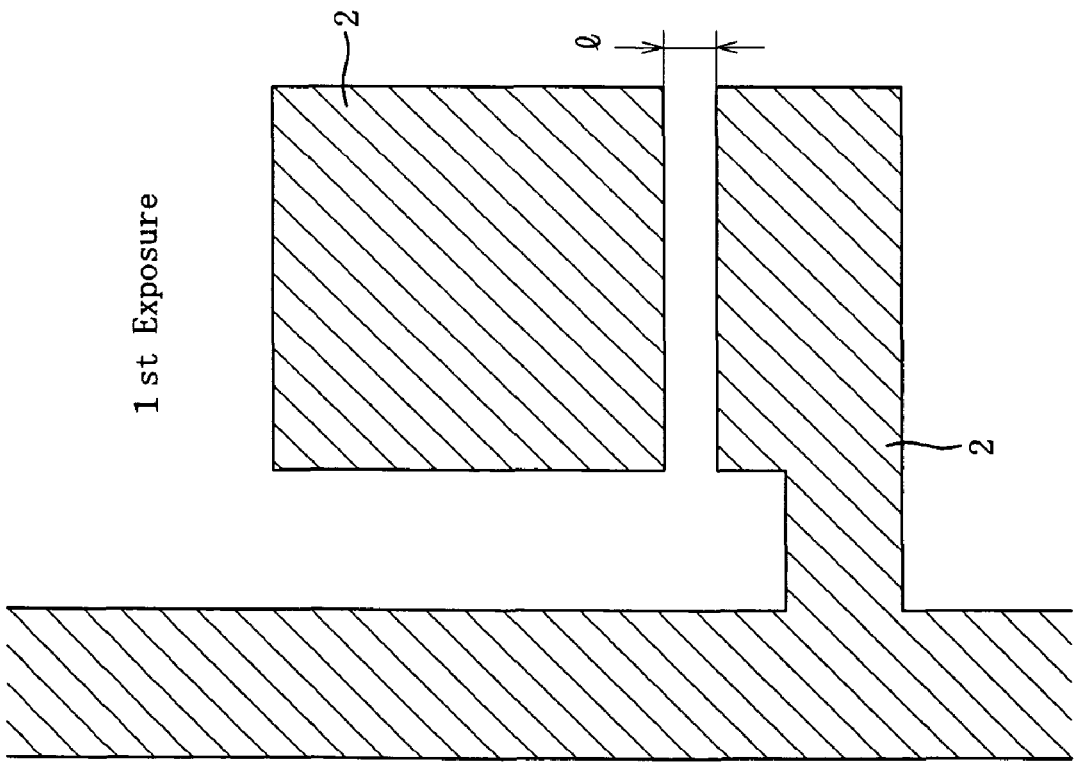

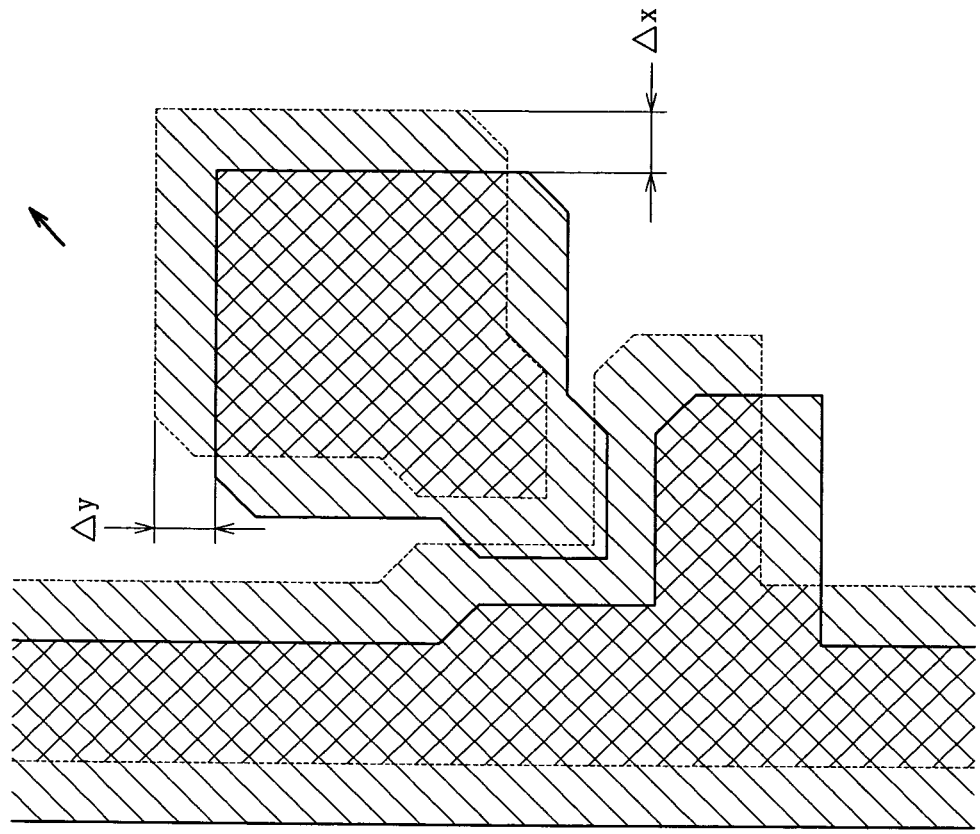
FIG. 34(B) 2nd Exposure
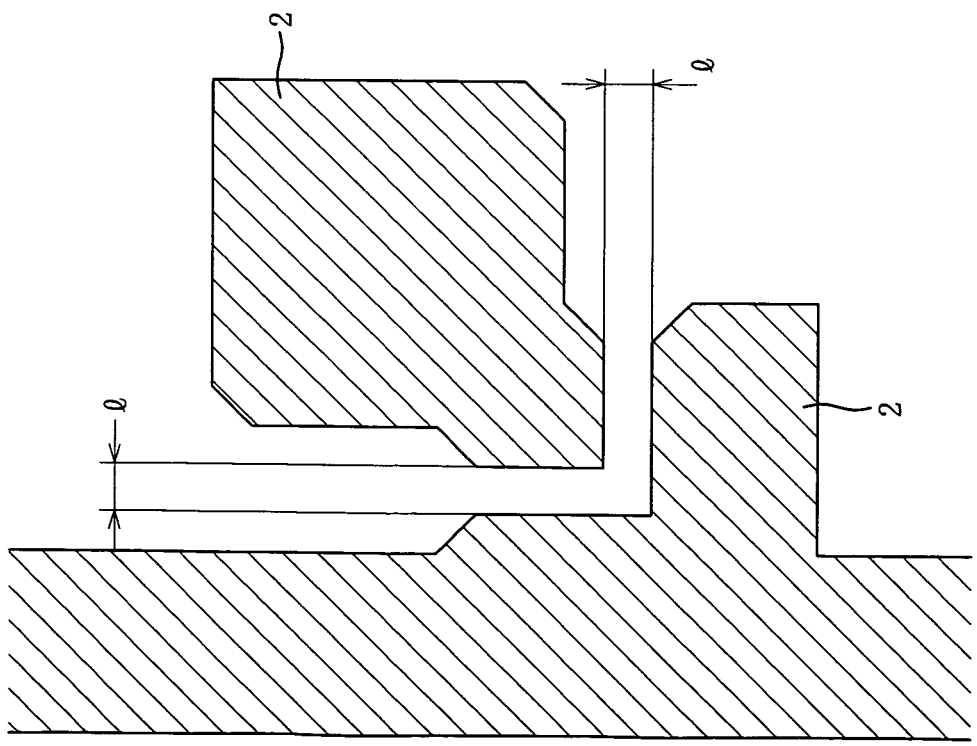
FIG. 34(A) 1st Exposure

FIG. 35 (A) 1st Exposure
FIG. 35 (C) 2nd Exposure
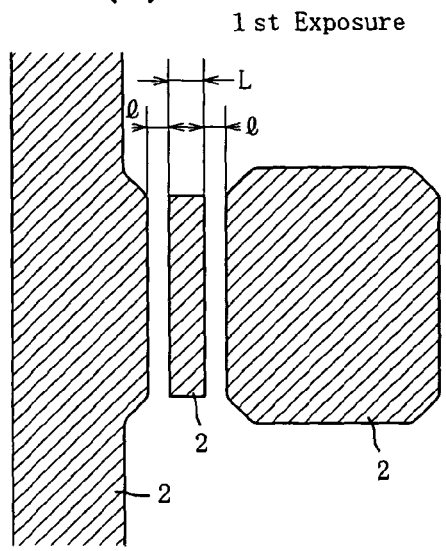
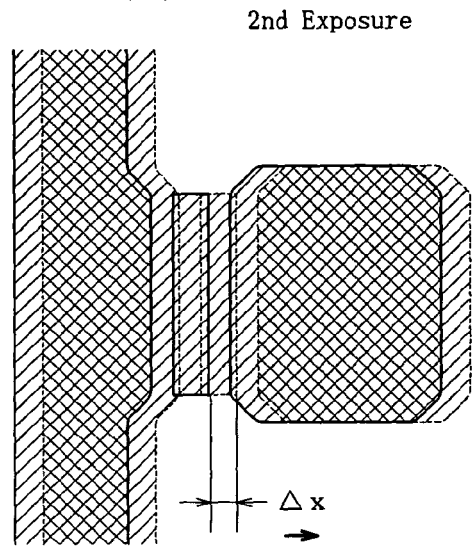
FIG. 35 (B)
FIG. 35 (D)
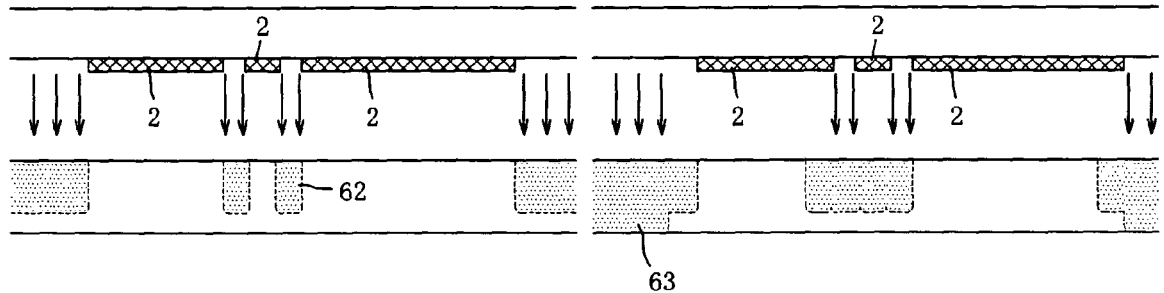
FIG. 35 (E)
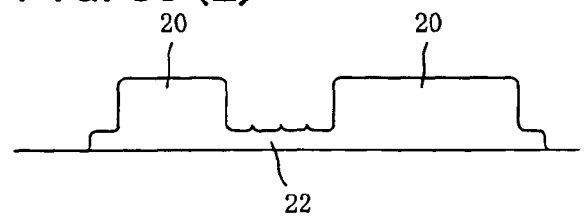

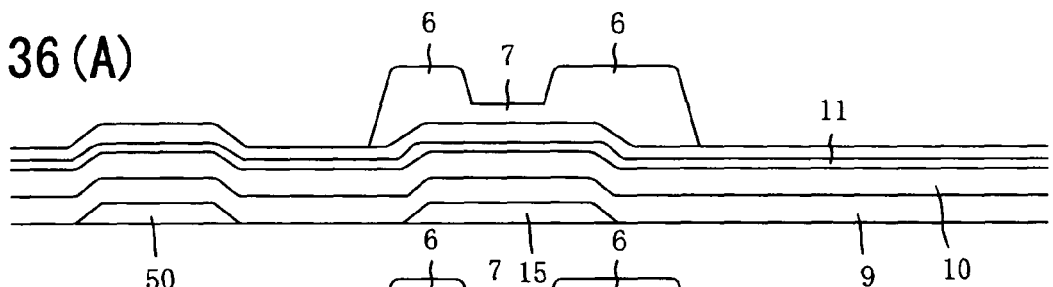
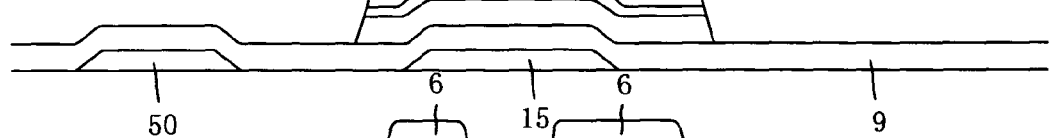
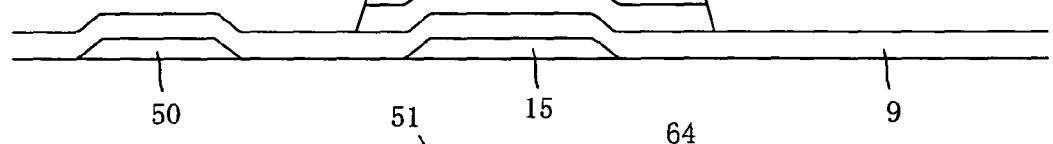
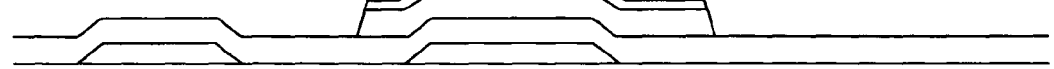
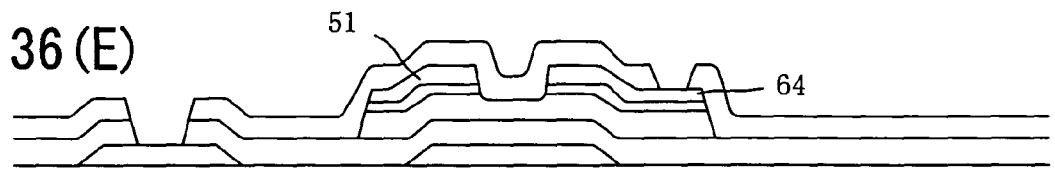
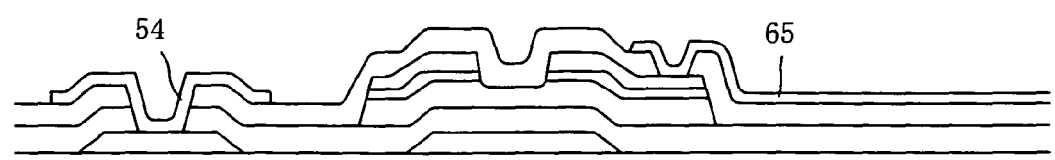

FIG. 37(A) 1st Exposure
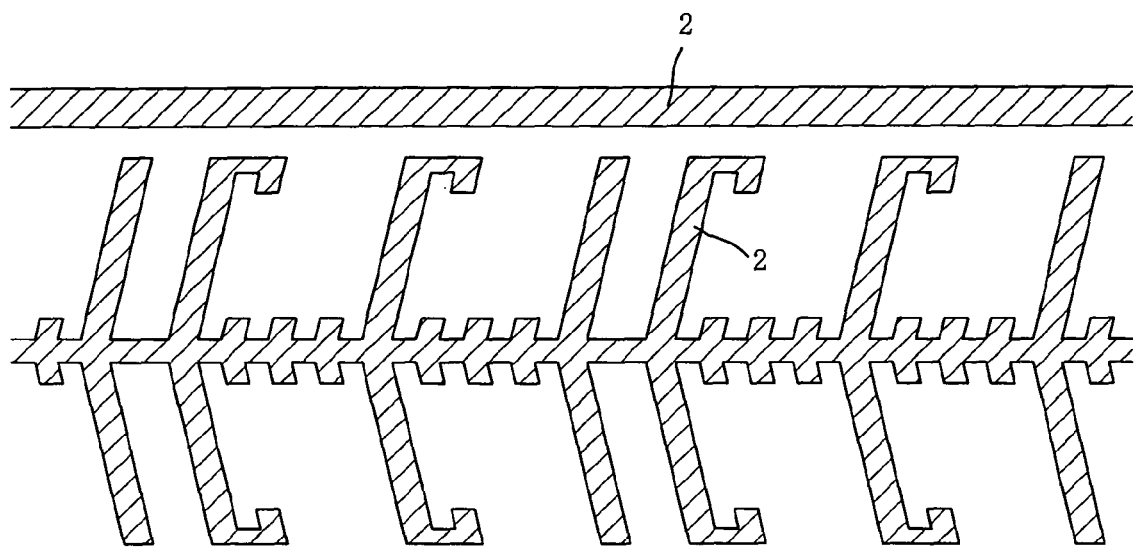
FIG. 37(B) 2nd Exposure
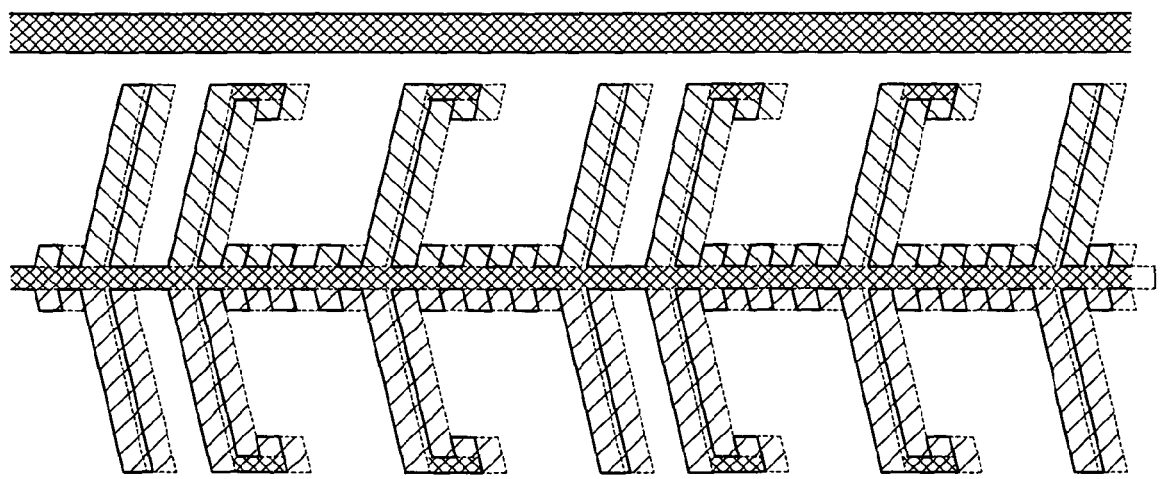

FIG. 38 (A) 1st Exposure
FIG. 38 (B) 2nd Exposure
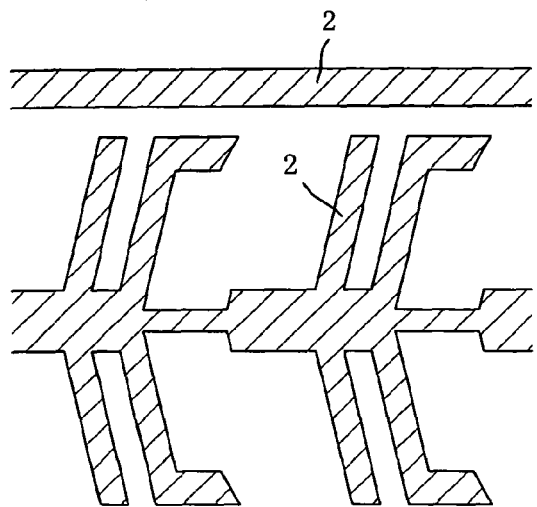
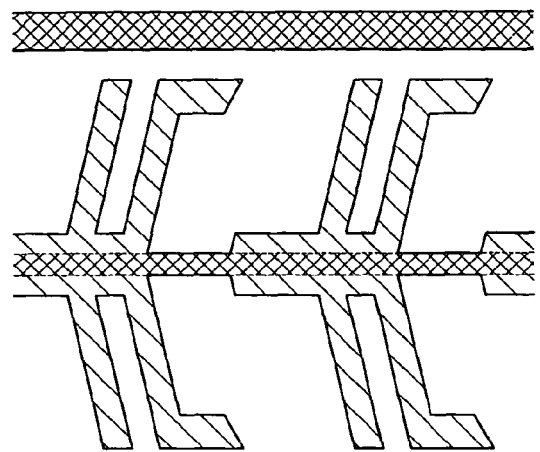
FIG. 39 (A) 1st Exposure
FIG. 39 (B) 2nd Exposure
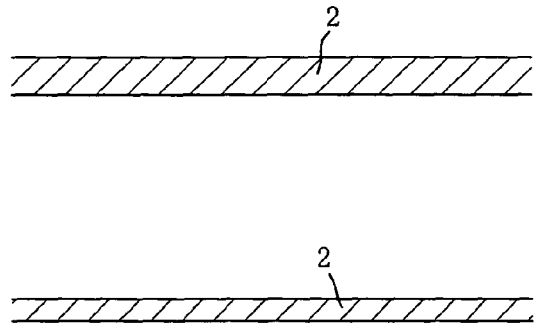
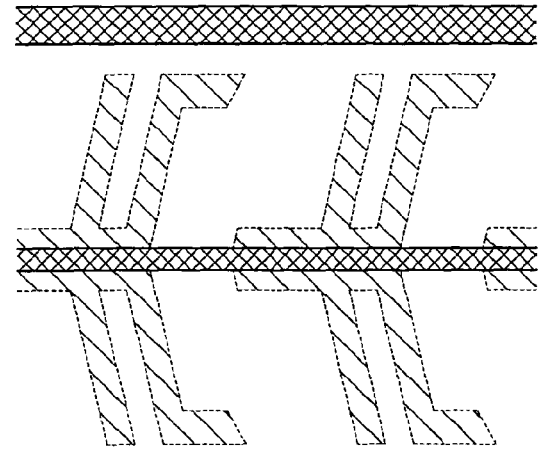

FIG. 40 (A) 1st Exposure
FIG. 40 (B) 2nd Exposure
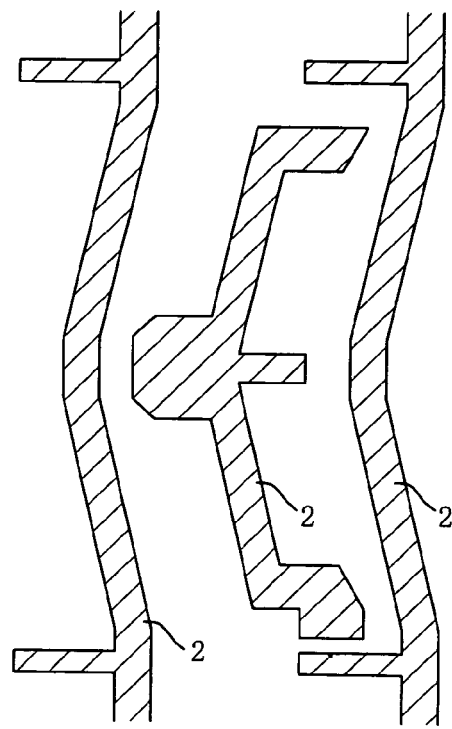
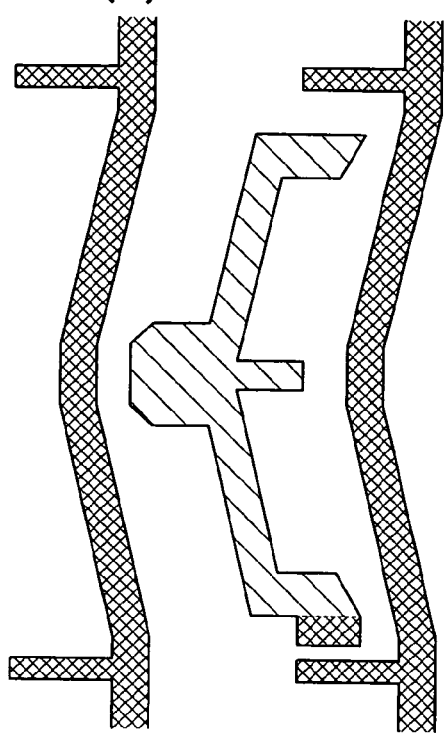
FIG. 41 (A) 1st Exposure
FIG. 41 (B) 2nd Exposure
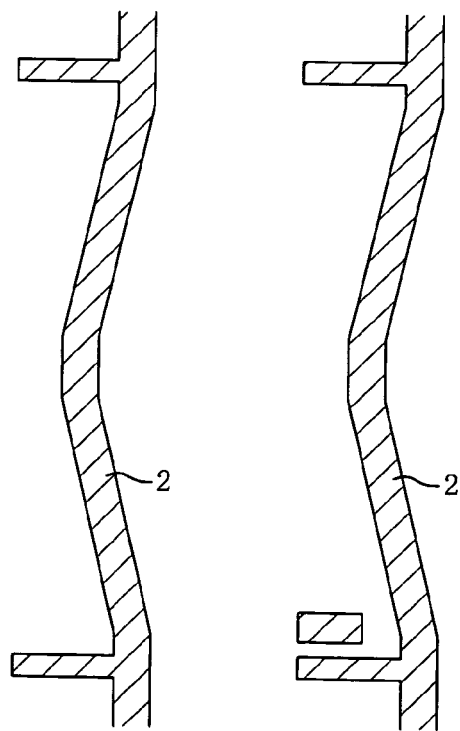
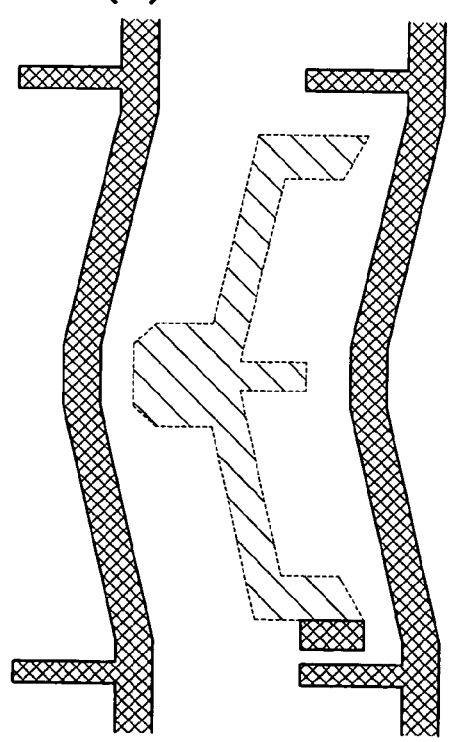

FIG. 43(A) 1st Exposure
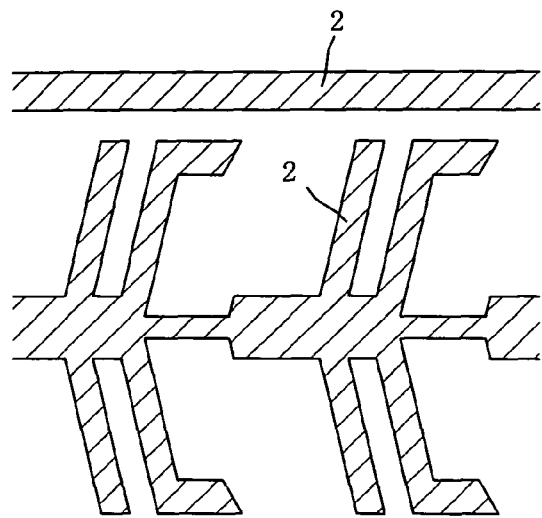
FIG. 43(B) 2nd Exposure
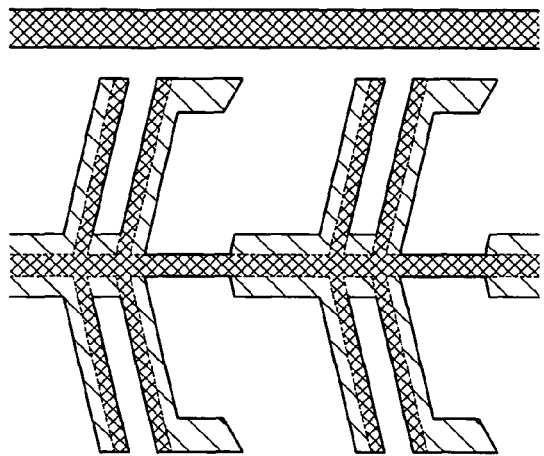
FIG. 44(A) 1st Exposure
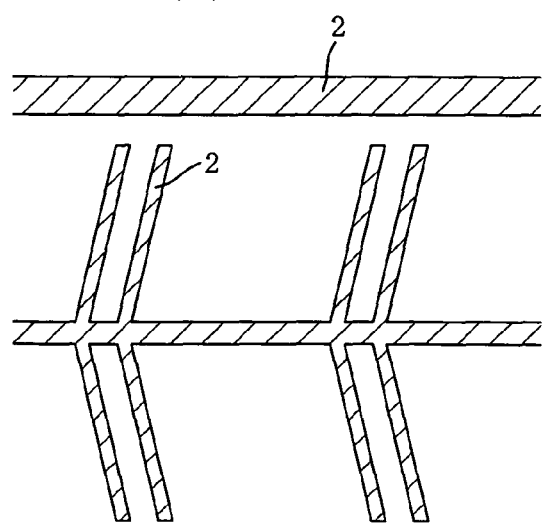
FIG. 44(B) 2nd Exposure
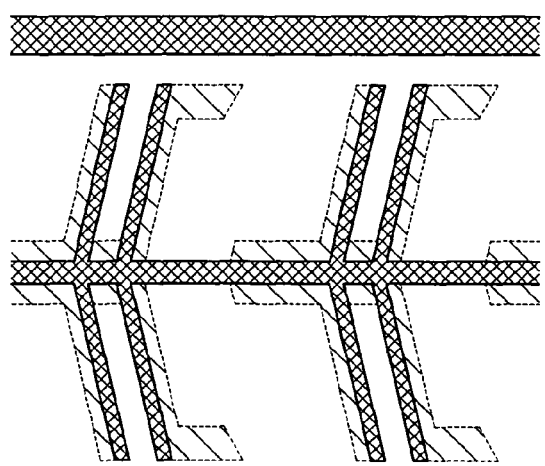

FIG. 102(A) 1st Exposure
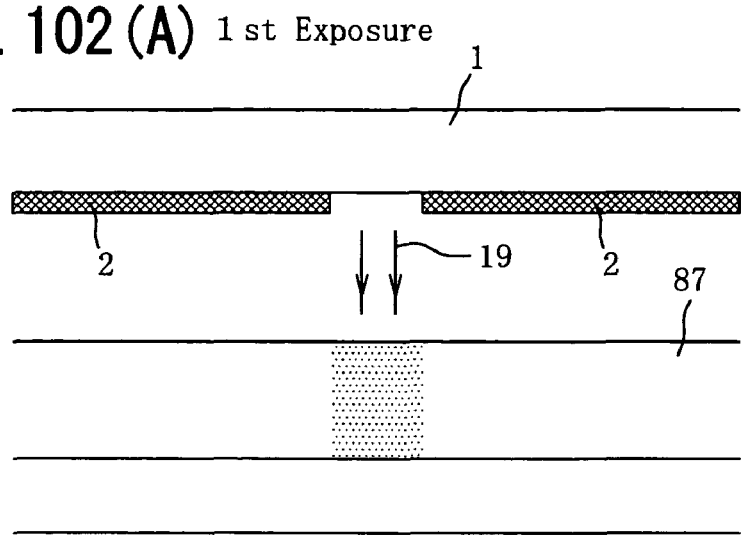
FIG. 102(B) 2nd Exposure
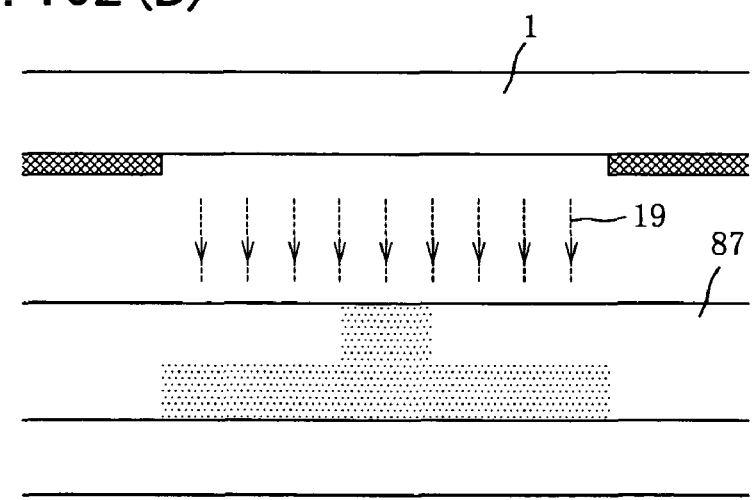
FIG. 102(C)
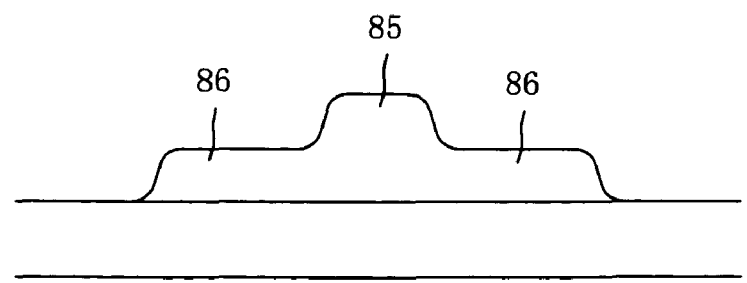

FIG. 103 (A) 1st Exposure
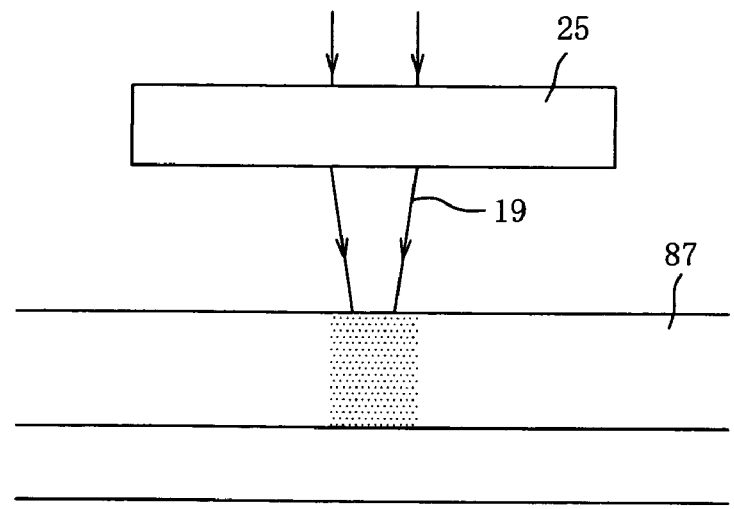
FIG. 103 (B) 2nd Exposure
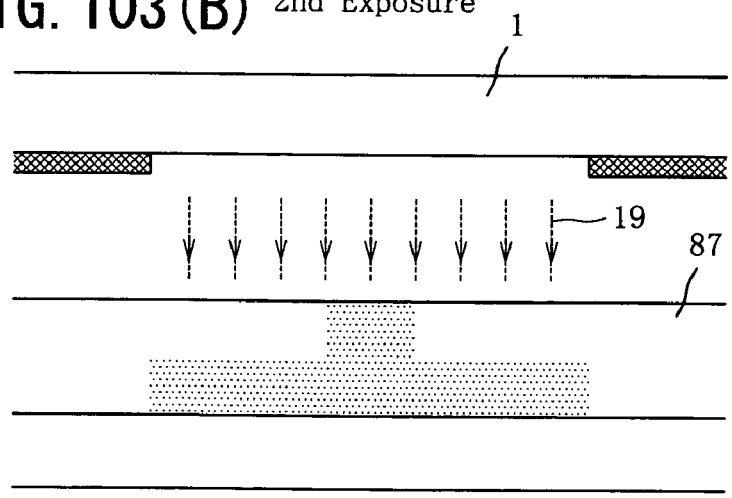
FIG. 103 (C)
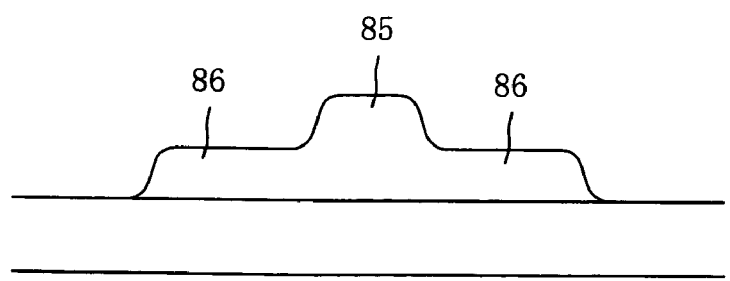

FIG. 106 (A)
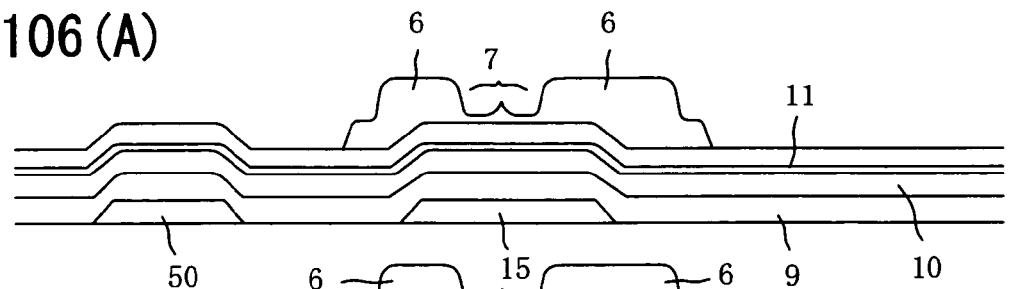
FIG. 106 (B)
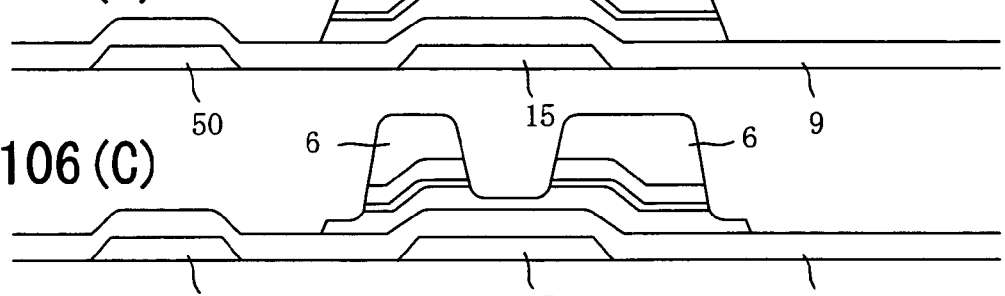
FIG. 106 (C)
FIG. 106 (D)
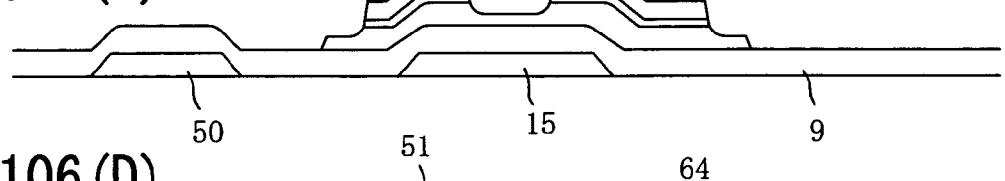
FIG. 106 (E)
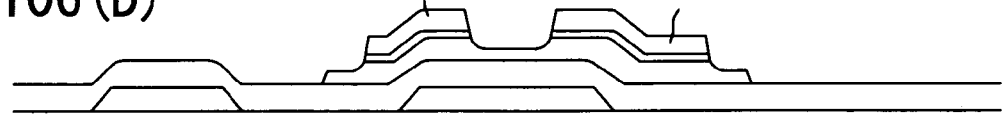
FIG. 106 (F)
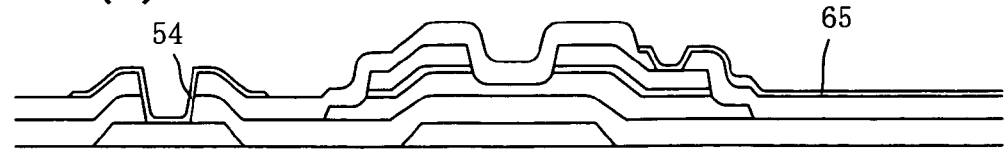

HIGH QUALITY AND ULTRA LARGE SCREEN LIQUID CRYSTAL DISPLAY DEVICE AND PRODUCTION METHOD THEREOF

FIELD OF THE INVENTION

This invention relates to a liquid crystal display device using a transverse electric field system, and more particularly, to an ultra large screen liquid crystal display device which is capable of dramatically improving an aperture ratio, a transmittance ratio, brightness, and contrast with low cost and high production yield.

BACKGROUND OF THE INVENTION

A liquid crystal display device utilizing a transverse electric field system which applies an electric field to a liquid crystal in a parallel direction with a substrate has a wide viewing angle and is the standard for a large screen liquid crystal display. Such technologies have been proposed, for example, by Japanese patent laid-open publication Nos. 10-55000, 10-325961, 11-24104, 10-55001, 10-170939, and 11-52420, and have been improved to solve problems such as vertical crosstalk.

Numerous technologies have been proposed by liquid crystal makers including a technology in which a photolithography spacer is utilized to improve the contrast of a transverse electric field type liquid crystal display system. For example, such a technology has been proposed by Japanese patent laid-open publication Nos. 2000-199904 and 2000-19527. The majority of them utilize a photolithography technology to establish a spacer on a color filter substrate. The Japanese patent laid-open publication Nos. 2000-19527 and 2000-199904 show an idea of producing an electric field of a video signal line in a vertical direction of a substrate rather than a horizontal direction in order to suppress the vertical crosstalk. This requires the dielectric constant of the photolithography spacer to be larger than the dielectric constant of the liquid crystal. The Japanese patent laid-open publication No. 2000-19526 also proposed a photolithography spacer in which the dielectric constant is larger than that of the liquid crystal.

The Japanese patent laid-open publication No. 2001-209053 proposes a photolithography spacer in a vertical electric field system utilizing dielectric material with a smaller dielectric constant than that of the liquid crystal along a video signal line to cover the video signal line in order to lower the waveform distortion. According to this patent publication, the liquid crystal cell is constructed by creating a vacuum space inside the liquid crystal cell, then injecting the liquid crystal in the space through an injection opening using the atmospheric pressure. In this liquid crystal injection method, a batch process is used in which several hundred cells are processed at the same time to produce a large liquid crystal panel.

Japanese patent laid-open publication Nos. 2002-258321 and 2002-323706 teach a structure using a dielectric material of a smaller dielectric constant than that of the liquid crystal along the video signal line to cover the video signal line and placing a transparent conductive material along the video signal line to improve the pixel aperture ratio as well as to prevent signal delay.

FIG. 3 is a flow chart showing a typical production process in the conventional technology for producing a TFT (thin film transistor) array substrate (active matrix substrate) of the transverse electric field type liquid crystal panel. This production process includes four-step photomasking processes using the conventional halftone exposure technology. FIGS. 36A-36F are cross sectional views showing the structural developments in accordance with the production flow of FIG. 3 using the four-step photomasking technology.

In the conventional production process of FIG. 3, gate electrodes of thin film transistors and common electrodes are formed at the same time in step S11. Then, at step S12, thin film transistors are separated from a semiconductor layer and source electrodes and drain electrodes of the thin film transistors are formed using the halftone photomask exposure. In step S13, contact holes for gate terminals, data terminals, pixel drain portions, and transistor circuits for electrostatic protection are created. Then, at step S14, gate terminals, data terminals, transparent conductive pixel electrodes are formed.

In the cross sectional views of FIGS. 36A-36F, a numeral 6 denotes an area on a positive photoresist layer after development where UV exposure is blocked, a numeral 7 denotes an area on the positive photoresist layer after development where the UV exposure is made through the halftone (translucent) photomask, a numeral 9 denotes a gate insulation film, a numeral 10 denotes a thin film semiconductor layer (non-doped layer), a numeral 11 denotes a thin film semiconductor layer (doped layer, i.e., ohmic contact layer), a numeral 15 denotes a scanning line, a numeral 50 denotes a scanning line terminal, a numeral 51 denotes a video signal line, a numeral 54 denotes a scanning line drive circuit contact electrode, a numeral 64 denotes a drain electrode of the thin film transistor, and a numeral 65 denotes a transparent pixel electrode.

Prior to the start of the processes of FIGS. 36A-36F, the scanning lines 15 and the scanning terminals 50 are formed on a glass substrate (not shown). In FIG. 36A, the gate insulation film 9, the thin film semiconductor layer (non-doped layer) 10 and the thin film transistor ohmic contact layer 11 are respectively deposited by, for example, a CVD plasma device. The positive photoresist 6 is coated and the halftone exposure is conducted so that the thicker positive photoresist 6 and the thinner positive photoresist 7 are created. In FIGS. 36B and 36C, through a dry etching process, the thin film transistors are separated from the semiconductor layer. In FIG. 36D, the drain electrode 64 of the thin film transistor and the video signal line 51 are formed by further conducting the etching process. In FIG. 36E, through the dry etching, contact holes are created over the scanning line terminals 50. In FIG. 36F, the scanning line drive circuit electrodes 54 and the transparent pixel electrodes 65 are formed.

The conventional transverse electric field type liquid crystal panel utilizes common electrodes placed at both sides of the video signal line to shield the electric field caused by the signal video line. In order for this construction to completely solve the problem involved with the vertical crosstalk, it is necessary to design the width of the common electrodes to be at least 1.5 times larger than that of the video signal line, hence resulted in a reduction of the pixel aperture ratio.

It is possible to reduce the vertical crosstalk by collecting the electric force lines of the electric field produced by the video signal line to the photolithography spacer. This can be done by placing a black mask made of thin film conductive material (chromium oxide layer and chromium metal thin film layer) at the side of color filter and setting the electric potential of the black mask to that of the common electrodes, and creating a photolithography spacer that is placed in an elongated fashion at the same direction as the video signal line by an insulation material that has a dielectric constant larger than that of the liquid crystal. However, in this method, because the material of large dielectric constant is used, the capacitance between the black mask and the video signal line is increased, hence the video signal waveform is delayed and distorted, which is not appropriate for a large screen liquid crystal panel.

As disclosed in Japanese patent laid-open publication No. 11-24104, it is possible to almost completely shield the video signal line by constructing a passivation layer on the video signal line and placing a shielding electrode thereon along the video signal line. However, because this construction utilizes a very thin passivation layer with a thickness in the range between 0.3 micrometer and 1 micrometer, and the passivation layer made of silicon oxide or silicon nitride has a relatively large dielectric constant of 4-6, the capacitance between the shielding electrode and the video signal line increases. This causes the signal waveform to be delayed and distorted and is not appropriate for a large screen liquid crystal display panel.

Japanese patent laid-open publication No. 2001-209053 discloses a photolithography spacer constructed in a very thin manner that surround the video signal line using a dielectric material of a small dielectric constant so that the capacitance between the common electrodes on the side of the color filter and the video signal line can be decreased. This technology, however, utilizes a conventional method of injecting the liquid crystal through an injection opening. Thus, the thin and long photolithography spacers cause the liquid crystal to be injected at a very slow speed, which severely decreases the production efficiency.

Japanese patent laid-open publication Nos. 2002-258321 and 2002-323706 disclose a structure which utilizes a dielectric material that has a smaller dielectric constant than that of the liquid crystal to cover the video signal line and places a transparent conductive material along the video signal line so that the pixel aperture ratio can be improved and the video signal line delay can be prevented. However, with this construction, it is not possible to produce the liquid crystal cell and the spacer at the same time. Therefore, an additional photolithography process has to be performed to produce the photolithography spacers. This causes the production processes to be more complicated and costly.

The implementation of the technology disclosed in Japanese patent laid-open publication No. 2002-258321 is not enough to produce a transverse electric field type liquid crystal panel with high contrast and low light leakage. When an angle of the bumps of the dielectric material with a small dielectric constant that cover the video signal lines along the video signal lines is larger than 40 degrees, the conventional technology of rubbing treatment using rubbing cloth causes areas with alignment defects due to the sideways slip caused at the tapered portions of the bumps in the direction of the movement at the tips of hairs of the rubbing cloth or areas on the inclined surfaces of the bumps where the hair tips of the rubbing cloth cannot reach.

SUMMARY OF THE INVENTION

The present invention has been made to solve the above mentioned problems involved in the conventional technology, and it is an object of the present invention to provide a large screen color liquid crystal display device which is capable of achieving an improved aperture ratio, a transmittance ratio, high brightness and high contrast while promoting low cost and high production yield.

In order to achieve the above objectives, in the first aspect of the present invention, a thin and long bump made of insulation material is placed on a video signal line formed on a transverse electric field type active matrix substrate in a manner to cover the video signal line. Then, a common electrode is formed along the video signal line in a manner to cover the thin and long insulation bump and the video signal line, thereby shielding an electric field generated by the video signal line.

In the second aspect of the present invention, a thin and long bump made of insulation material is placed on a video signal line formed on a transverse electric field type active matrix substrate in a manner to cover the video signal line. Then, a common electrode is formed on both side walls of the thin and long insulation bump in a manner to sandwich the video signal line, thereby shielding an electric field generated by the video signal line.

In the third aspect of the present invention, the thin and long insulation bump formed in the manner to cover the video signal line, in the first and the second aspects of the present invention noted above, is used as a spacer to define a liquid crystal cell gap when assembling the liquid crystal cells.

In the fourth aspect of the present invention, a thin and long bump made of insulation material for covering the video signal line on the transverse electric field type active matrix substrate and a spacer to define a liquid crystal cell gap are formed at the same time through a halftone exposure process. Then, a common electrode is formed on the thin and long insulation bump in a manner to cover the video signal line, thereby shielding an electric field generated by the video signal line.

In the fifth aspect of the present invention, a thin and long bump made of insulation material for covering the video signal line on the transverse electric field type active matrix substrate and a spacer to define a liquid crystal cell gap are formed at the same time through a halftone exposure process. Then, a common electrode is formed on both side walls of the thin and long insulation bump in a manner to sandwich the video signal line, thereby shielding an electric field generated by the video signal.

In the sixth aspect of the present invention, the common electrode for shielding the video signal line, in the first, second, third, fourth and fifth aspects of the present invention noted above, is made of a thin-film transparent conductive material that allows the light to transmit in a degree greater than 20% such as titanium metal compound including titanium nitride (TiNx), titanium oxide nitride (TiOxNy), titanium silicide nitride (TiSixNy), and titanium silicide (TiSix), or a metal oxide transparent conductive material such as indium oxide (In2O3) or zinc oxide (ZnO).

In the seventh aspect of the present invention, the thin and long insulation bump formed in the manner to cover the video signal line, in the first, second, third, fourth and fifth aspects of the present invention noted above, has a cross sectional shape of circular, semi-circular, hyperbolic, or parabolic shape and a taper angle θ of the insulation bump is 30 degrees or less.

In the eighth aspect of the present invention, the thin and long insulation bump formed in the manner to cover the video signal line, in the first, second, third, fourth and fifth aspects of the present invention noted above, is not formed around an area at which the video signal line and the scanning line intersect with one another.

In the ninth aspect of the present invention, the spacer that is constructed at the same time as the thin and long insulation bump using the halftone exposure process, in the fourth and fifth aspects of the present invention noted above, is not covered by the common electrode at an area around the top thereof so as to expose the dielectric material that forming the spacer.

In the tenth aspect of the present invention, the spacer that defines a height of the thin and long insulation bump and the gap of the liquid crystal cell, in the fourth and fifth aspects of the present invention noted above, has a height difference h2 within a range between 0.2 micrometers and 2.0 micrometers.

In the eleventh aspect of the present invention, a density of the spacers that are constructed at the same time with the thin and long insulation bumps through the halftone exposure process, in the fourth and fifth aspects of the present invention noted above, is in a range between one (1) and seventy five (75) per square millimeter and the spacers are distributed evenly throughout the substrate.

In the twelfth aspect of the present invention, an area of the spacer that is constructed at the same time with the thin and long insulation bump through the halftone exposure process, in the fourth and fifth aspects of the present invention noted above, is in a range between 200 square micrometers and 2000 square micrometers per one square millimeter.

In the thirteenth aspect of the present invention, a thin and long bump made of insulation material is formed on a video signal line formed on a transverse electric field type active matrix substrate in a manner to cover the video signal line. Then, a common electrode is formed along the video signal line in a manner to cover the thin and long insulation bump and the video signal line, thereby shielding the electric field generated by the video signal line. Further, a thin and long insulation bump is similarly formed on a scanning line in a manner to cover the scanning line. Then, a common electrode is formed on side walls of the scanning line in a manner to sandwich the scanning line, thereby shielding the electric field generated by the scanning line.

In the fourteenth aspect of the present invention, a thin and long bump made of insulation material is formed on a video signal line formed on a transverse electric field type active matrix substrate in a manner to cover the video signal line. Then, a common electrode is formed on both side walls of the thin and long insulation bump in a manner to sandwich the video signal line, thereby shielding the electric field generated by the video signal line. Further, a thin and long insulation bump is similarly formed on a scanning line in a manner to cover the scanning line. Then, a common electrode is formed on both side walls of the scanning line in a manner to sandwich the scanning line, thereby shielding the electric field generated by the scanning line.

In the fifteenth aspect of the present invention, the thin and long insulation bumps formed in the manner to cover around the video signal line and the scanning line, in the thirteenth and fourteenth aspects of the present invention noted above, are used as a spacer to define a liquid crystal cell gap when assembling the liquid crystal cells.

In the sixteenth aspect of the present invention, a thin and long bump made of insulation material for covering the video signal line on the transverse electric field type active matrix substrate and a spacer to define a liquid crystal cell gap are formed at the same time through a halftone exposure process. Then, a common electrode is formed on the thin and long insulation bump in a manner to cover the video signal line, thereby shielding the electric field generated by the video signal line. Further, a thin and long insulation bump is similarly formed on a scanning line through a halftone exposure process in a manner to cover the scanning line. Then, a common electrode is formed on both side walls of the scanning line in a manner to sandwich the scanning line, thereby shielding the electric field generated by the scanning line.

In the seventeenth aspect of the present invention, a thin and long bump made of insulation material for covering the video signal line on the transverse electric field type active matrix substrate and a spacer to define a liquid crystal cell gap are formed at the same time through a halftone exposure process. Then, a common electrode is formed on both side walls of the thin and long insulation bump in a manner to sandwich the video signal line, thereby shielding the electric field generated by the video signal. Further, a thin and long insulation bump is similarly formed on a scanning line through a halftone exposure process in a manner to cover the scanning line. Then, a common electrode is formed on both side walls of the scanning line in a manner to sandwich the scanning line, thereby shielding the electric field generated by the scanning line.

In the eighteenth aspect of the present invention, the common electrodes for shielding the video signal line and the scanning line, in the thirteenth, fourteenth, fifteenth, sixteenth and seventeenth aspects of the present invention noted above, are made of thin-film transparent conductive material that allows the light transmit in a degree greater than 20% such as titanium metal compound including titanium nitride (TiNx), titanium oxide nitride (TiOxNy), titanium silicide nitride (TiSixNy), and titanium silicide (TiSix), or a metal oxide transparent conductive material such as indium oxide (In 2O3) or zinc oxide (ZnO).

In the nineteenth aspect of the present invention, the thin and long insulation bumps formed in the manner to cover the video signal line and the scanning line, in the thirteenth, fourteenth, fifteenth, sixteenth and seventeenth aspects of the present invention noted above have, have a cross sectional shape of circular, semi-circular, hyperbolic, or parabolic shape and a taper angle θ of the insulation bump is 30 degrees or less.

In the twentieth aspect of the present invention, the thin and long insulation bumps formed in the manner to cover the video signal line and the scanning line, in the thirteenth, fourteenth, fifteenth, sixteenth and seventeenth aspects of the present invention noted above, are not formed around an area at which the video signal line and the scanning line intersect with one another.

In the twenty first aspect of the present invention, the spacer that is constructed at the same time as the thin and long insulation bump through the halftone exposure process, in the sixteenth and seventeenth aspects of the present invention noted above, is not covered by the common electrode at an area around the top thereof so as to expose the dielectric material that forming the spacer.

In the twenty second aspect of the present invention, the spacer that defines a height of the thin and long insulation bump and a gap of the liquid crystal cell, in the sixteenth and seventeenth aspects of the present invention noted above, has a height difference h2 within a range between 0.2 micrometers and 2.0 micrometers.

In the twenty third aspect of the present invention, a density of the spacers that are constructed at the same time with the thin and long insulation bump through the halftone exposure process, in the sixteenth and seventeenth aspects of the present invention noted above, is in a range between one (1) and seventy five (75) per square millimeter and the spacers are distributed evenly throughout the substrate.

In the twenty fourth aspect of the present invention, an area of the spacer that is constructed at the same time with the thin and long insulation bump through the halftone exposure process, in the sixteenth and seventeenth aspects of the present invention noted above, is in a range between 200 square micrometers and 2000 square micrometer per one square millimeter.

In the twenty fifth aspect of the present invention, the common electrodes, in the first, second, third, fourth, fifth, thirteenth, fourteenth, fifteenth, sixteenth and seventeenth aspects of the present invention noted above, are provided in an upper layer and a lower layer through a gate insulating film and a passivation film therebetween in a manner to sandwich the video signal line in up/down directions and right/left directions wherein the common electrode on the lower layer is made of a metal electrode which prohibits the light to pass there through whereas the common electrode in the upper layer is a transparent electrode that allows the light to pass there through. The common electrode at the upper layer has an electrode width wider than that of the common electrode in the lower layer and is projected towards the side of the liquid crystal drive electrode.

In the twenty sixth aspect of the present invention, the video signal line, the thin and long insulation bump formed in the manner to cover the video signal line, and the common electrode formed along the video signal line for shielding the video signal line, in the first, second, third, fourth, fifth, thirteenth, fourteenth, fifteenth, sixteenth and seventeenth aspects of the present invention noted above, are aligned in a manner of straight line wherein the liquid crystal drive electrode within the pixel and the common electrode within the pixel are bent within the pixel at least once at an angle within a range between 0-30 degrees (except 0 degree) relative to an alignment direction of the liquid crystal molecule.

In the twenty seventh aspect of the present invention, the video signal line and the thin and long insulation bump formed in the manner to cover the video signal line, in the first, second, third, fourth, fifth, thirteenth, fourteenth, fifteenth, sixteenth and seventeenth aspects of the present invention noted above, are aligned in a manner of straight line wherein the common electrode formed along the video signal line for shielding the video signal line, the liquid crystal drive electrode within the pixel, and the common electrode within the pixel are bent within the pixel at least once at an angle within a range between 0-30 degrees (except 0 degree) relative to an alignment direction of the liquid crystal molecule.

In the twenty eighth aspect of the present invention, the video signal line, the thin and long insulation bump formed in the manner to cover the video signal line, the common electrode formed along the video signal line for shielding the video signal line, and the common electrode within the pixel, in the first, second, third, fourth, fifth, thirteenth, fourteenth, fifteenth, sixteenth and seventeenth aspects of the present invention noted above, are aligned in a manner of straight line wherein only the liquid crystal drive electrode within the pixel is bent within the pixel at least once at an angle within a range between 0-30 degrees (except 0 degree) relative to an alignment direction of the liquid crystal molecule.

In the twenty ninth aspect of the present invention, the video signal line, the thin and long insulation bump formed in the manner to cover the video signal line, the common electrode formed along the video signal line for shielding the video signal line, the common electrode within a pixel, and the liquid crystal drive electrode within the pixel, in the first, second, third, fourth, fifth, thirteenth, fourteenth, fifteenth, sixteenth and seventeenth aspects of the present invention noted above, are bent within the pixel at least once at an angle within a range between 0-30 degrees (except 0 degree) relative to an alignment direction of the liquid crystal molecule.

In the thirtieth aspect of the present invention, the video signal line, the thin and long insulation bump formed in the manner to cover the video signal line, the common electrode formed along the video signal line for shielding the video signal line, the common electrode within the pixel, and the liquid crystal drive electrode within the pixel, in the first, second, third, fourth, fifth, thirteenth, fourteenth, fifteenth, sixteenth and seventeenth aspects of the present invention noted above, are bent within the pixel at least once at an angle within a range between 0-30 degrees (except 0 degree) relative to an alignment direction of the liquid crystal molecule, and similarly, the color filter layer and the light shielding film (black mask) on the side of the color filter substrate which is opposite to the active matrix substrate are bent within the pixel at least once at an angle within a range between 0-30 degrees (except 0 degree) relative to an alignment direction of the liquid crystal molecule.

In the thirty first aspect of the present invention, the video signal line, the thin and long insulation bump formed in the manner to cover the video signal line, and the common electrode formed along the video signal line for shielding the video signal line, in the first, second, third, fourth, fifth, thirteenth, fourteenth, fifteenth, sixteenth and seventeenth aspects of the present invention noted above, are aligned in a manner of straight line wherein the liquid crystal drive electrode within the pixel and the common electrode within the pixel are bent within the pixel at least once at an angle within a range between 60-120 degrees (except 90 degrees) relative to an alignment direction of the liquid crystal molecule.

In the thirty second aspect of the present invention, the video signal line and the thin and long insulation bump formed in the manner to cover the video signal line, in the first, second, third, fourth, fifth, thirteenth, fourteenth, fifteenth, sixteenth and seventeenth aspects of the present invention noted above, are aligned in a manner of straight line wherein the common electrode formed along the video signal line for shielding the video signal line, the liquid crystal drive electrode within the pixel, and the common electrode within the pixel are bent within the pixel at least once at an angle within a range between 60-120 degrees (except 90 degrees) relative to an alignment direction of the liquid crystal molecule.

In the thirty third aspect of the present invention, the video signal line, the thin and long insulation bump formed in the manner to cover the video signal line, the common electrode formed along the video signal line for shielding the video signal line, and the common electrode within the pixel, in the first, second, third, fourth, fifth, thirteenth, fourteenth, fifteenth, sixteenth and seventeenth aspects of the present invention noted above, are aligned in a manner of straight line wherein only the liquid crystal drive electrode within the pixel is bent within the pixel at least once at an angle within a range between 60-120 degrees (except 90 degrees) relative to an alignment direction of the liquid crystal molecule.

In the thirty fourth aspect of the present invention, the video signal line, the thin and long insulation bump formed in the manner to cover the video signal line, the common electrode formed along the video signal line for shielding the video signal line, the common electrode within the pixel, and the liquid crystal drive electrode within the pixel, in the first, second, third, fourth, fifth, thirteenth, fourteenth, fifteenth, sixteenth and seventeenth aspects of the present invention noted above, are bent within the pixel at least once at an angle within a range between 60-120 degrees (except 90 degrees) relative to an alignment direction of the liquid crystal molecule.

In the thirty fifth aspect of the present invention, the video signal line, the thin and long insulation bump formed in the manner to cover the video signal line, the common electrode formed along the video signal line for shielding the video signal line, the common electrode within the pixel, and the liquid crystal drive electrode within the pixel, in the first, second, third, fourth, fifth, thirteenth, fourteenth, fifteenth, sixteenth and seventeenth aspects of the present invention noted above, are bent within the pixel at least once at an angle within a range between 60-120 degrees (except 90 degrees) relative to an alignment direction of the liquid crystal molecule, and similarly, the color filter layer and the light shielding film (black mask) on the side of the color filter substrate which is opposite to the active matrix substrate are bent within the pixel at least once at an angle within a range between 60-120 degrees (except 90 degrees) relative to an alignment direction of the liquid crystal molecule.

In the thirty sixth aspect of the present invention, the thin and long insulation bump formed along the video signal line to cover the video signal line, in the first, second, third, fourth, fifth, thirteenth, fourteenth, fifteenth, sixteenth and seventeenth aspects of the present invention noted above, has a dielectric constant of less than 3.3, and a height h1 is in a range between 1.5 micrometers and 5.0 micrometers. A distance L1 between an edge of the video signal line and an edge of the insulation bump is in a range between 3.0 micrometers and 6.0 micrometers.

In the thirty seventh aspect of the present invention, a distance L2 between an edge of the insulation bump covering the video signal line and an edge of the shielding common electrode covering the insulation bump, in the first, second, third, fourth, fifth, thirteenth, fourteenth, fifteenth, sixteenth and seventeenth aspects of the present invention noted above, is in a range between 0.5 micrometers and 10.0 micrometers.

In the thirty eighth aspect of the present invention, monomer or oligomer used as a material for fabricating the insulation bump covering the video signal line, in the first, second, third, fourth, fifth, thirteenth, fourteenth, fifteenth, sixteenth and seventeenth aspects of the present invention noted above, has at least one benzo-cyclobutene structure or its dielectric form or has at least one fluorene skeleton or its dielectric form.

In the thirty ninth aspect of the present invention, when forming the thin and long insulation bump covering the video signal line, in the first, second, third, fourth, fifth, thirteenth, fourteenth, fifteenth, sixteenth and seventeenth aspects of the present invention noted above, at least one barrier bump spacer in a closed loop structure is formed at the same time for preventing the breakage of a main seal due to an atmospheric pressure or a pressure from liquid crystals at a location identical to an area on which the main seal of the liquid crystal cell that surrounds an entire effective pixel area is formed.

In the fortieth aspect of the present invention, a process of producing an active matrix substrate of a transverse electric field type active matrix liquid crystal display device is conducted in the following steps:
(1) forming patterns for scanning lines (scanning line patterning step);
(2) separating the silicon elements for the thin film transistors from the semiconductor layer (silicon island step);
(3) forming the video signal lines and the liquid crystal drive electrodes at the same time;
(4) forming the spacer bumps that cover the video signal lines, or simultaneously forming the spacers and the insulation bumps that cover the video signal lines at the same time (halftone exposure process);
(5) forming the contact holes for terminal portions and for the static electricity protection circuits; and
(6) forming the transparent common electrodes for shielding the video signal line and the transparent common electrodes within the pixel at the same time.

In the forty first aspect of the present invention, a process of producing an active matrix substrate of a transverse electric field type active matrix liquid crystal display device is conducted in the following steps:
(1) forming the scanning lines, common electrodes within the pixels, and lower layer common electrodes for shielding the video signal lines at the same time;
(2) separating the silicon elements for the thin film transistors from the semiconductor layer (silicon island step);
(3) forming the video signal lines and the liquid crystal drive electrodes at the same time;
(4) forming the spacer bumps that cover the video signal lines, or simultaneously forming the spacers and the insulation bumps that cover the video signal lines at the same time (halftone exposure process);
(5) forming the contact holes for terminal portions and for the static electricity protection circuits; and
(6) forming the transparent common electrodes for shielding the video signal lines.

In the forty second aspect of the present invention, a process of producing an active matrix substrate of a transverse electric field type active matrix liquid crystal display device is conducted in the following steps:
(1) forming patterns for the scanning lines;
(2) forming the patterns of etching stopper channels for the thin film transistors;
(3) forming the video signal lines and the liquid crystal drive electrode at the same time;
(4) forming the spacer bumps that cover the video signal line, or simultaneously forming the spacers and the insulation bumps that cover the video signal lines at the same time (halftone exposure process);
(5) forming the contact holes for terminal portions and for the static electricity protection circuits; and
(6) forming the transparent common electrodes for shielding the video signal lines and the transparent common electrodes within the pixels at the same time.

In the forty third aspect of the present invention, a process of producing an active matrix substrate of a transverse electric field type active matrix liquid crystal display device is conducted in the following steps:
(1) forming the scanning lines, common electrodes within the pixels, and the lower layer common electrodes for shielding the video signal lines at the same time;
(2) forming the patterns of etching stopper channels for the thin film transistors;
(3) forming the video signal lines and the liquid crystal drive electrodes at the same time;
(4) forming the spacer bumps that cover the video signal lines, or simultaneously forming the spacers and the insulation bumps that cover the video signal lines at the same time (halftone exposure process);
(5) forming the contact holes for terminal portions and for the static electricity protection circuits; and
(6) forming the transparent common electrodes for shielding the video signal lines.

In the forty fourth aspect of the present invention, a process of producing an active matrix substrate of a transverse electric field type active matrix liquid crystal display device is conducted in the following steps:
(1) forming the patterns for the scanning lines;
(2) forming the video signal lines and the liquid crystal drive electrodes, and separating silicon elements for the thin film transistors from the semiconductor layer at the same time (halftone exposure process);
(3) forming the spacer bumps that cover the video signal lines, or simultaneously forming the spacers and the insulation bumps that cover the video signal lines at the same time (halftone exposure process);
(4) forming the contact holes for terminal portions and for the static electricity protection circuits; and (5) forming the transparent common electrodes for shielding the video signal lines and the transparent common electrodes within the pixels at the same time.

In the forty fifth aspect of the present invention, a process of producing an active matrix substrate of a transverse electric field type active matrix liquid crystal display device is conducted in the following steps:
(1) forming the scanning lines, the common electrodes within the pixels, and the lower layer common electrodes for shielding the video signal lines at the same time;
(2) forming the video signal lines and the liquid crystal drive electrodes, and separating silicon elements for the thin film transistors from the semiconductor layer at the same time (halftone exposure process);
(3) forming the spacer bumps that cover the video signal lines, or simultaneously forming the spacers and the insulation bumps that cover the video signal lines at the same time (halftone exposure process);
(4) forming the contact holes for terminal portions and for the static electricity protection circuits; and
(5) forming the transparent common electrodes for shielding the video signal lines.

In the forty sixth aspect of the present invention, the common electrodes formed along the thin and long insulation bumps in the manner to surround the video signal lines for shielding, in the first, second, third, fourth, fifth, thirteenth, fourteenth, fifteenth, sixteenth and seventeenth aspects of the present invention noted above, are connected with each other throughout the entire effective pixel display area and are set to an electric potential close to a center voltage of the video signal voltage.

In the forty seventh aspect of the present invention, the electrode for one pixel for driving the liquid crystal molecule, in the first, second, third, fourth, fifth, thirteenth, fourteenth, fifteenth, sixteenth and seventeenth aspects of the present invention noted above, is configured by three different electrodes including a single electrode connected to the thin film transistor for driving the liquid crystal, a lower layer common electrode formed both right and left sides of the pixel for shielding the video signal line, and an upper layer shielding common electrode formed along the thin and long insulation bump surrounding the video signal line, so that there exist no common electrodes within the pixel.

In the transverse electric field type active matrix liquid crystal display device in the forty eighth aspect of the present invention, processes for planarizing (leveling) the active matrix substrate and construction of the photolithography spacers are conducted at the same time by first applying negative photoresist with a thickness which is a sum of a liquid crystal cell gap and the largest thickness among the common electrode within the pixel made of non-transparent metal material or metal silicide or metal nitride, the lower layer common electrode for shielding the video signal line, and the liquid crystal drive electrode, then exposing the ultraviolet light to the entire effective pixel area from the back surface of the active matrix substrate, and then completely exposing the ultraviolet light to the portions where the spacers are formed using the photomask for the photolithography spacers, and lastly developing the active matrix substrate.

In the forty ninth aspect of the present invention, a process of producing an active matrix substrate of a transverse electric field type active matrix liquid crystal display device is conducted in the following steps:
(1) forming the scanning lines (gate electrodes of the thin film transistors), common electrodes within the pixels, and lower layer common electrodes for shielding the video signal lines at the same time;
(2) separating the silicon elements for the thin film transistors from the semiconductor layer (silicon island);
(3) forming the video signal lines and the liquid crystal drive electrodes at the same time;
(4) forming the contact holes for terminal portions and for the static electricity protection circuits;
(5) forming the scanning line terminal portions, the video signal line terminal portions, and the static electricity protection circuits at the same time; and
(6) forming the photolithography spacers and leveling the effective pixel area (halftone back surface exposure process).

In the fiftieth aspect of the present invention, a process of producing an active matrix substrate of a transverse electric field type active matrix liquid crystal display device is conducted in the following steps:
(1) forming the scanning lines (gate electrodes of the thin film transistors), the common electrodes within the pixels, and the lower layer common electrodes for shielding the video signal lines at the same time;
(2) forming the patterns of etching stopper channels for the thin film transistors;
(3) forming the video signal lines and the liquid crystal drive electrodes at the same time;
(4) forming the contact holes for the terminal portions and for the static electricity protection circuits;
(5) forming the scanning line terminal portions, the video signal line terminal portions, and the static electricity protection circuits at the same time; and
(6) forming the photolithography spacers and leveling the effective pixel area (halftone back surface exposure process).

In the fifty first aspect of the present invention, a process of producing an active matrix substrate of a transverse electric field type active matrix liquid crystal display device is conducted in the following steps:
(1) forming the scanning lines (gate electrodes of the thin film transistors), the common electrodes within the pixels, and the lower layer common electrodes for shielding the video signal lines at the same time;
(2) separating the silicon elements for the thin film transistors from the semiconductor layer (silicon island);
(3) forming the contact holes for the terminal portions and for the static electricity protection circuits;
(4) forming the video signal lines, the liquid crystal drive electrodes, the scanning line terminal portions, the video signal line terminal portions, and the static electricity protection circuits at the same time; and
(5) forming the photolithography spacers and leveling the effective pixel area (halftone back surface exposure process).

In the fifty second aspect of the present invention, a process of producing an active matrix substrate of a transverse electric field type active matrix liquid crystal display device is conducted in the following steps:
(1) forming the scanning lines (gate electrodes of the thin film transistors), the common electrodes within the pixels, and the lower layer common electrodes for shielding the video signal lines at the same time; and
(2) separating the silicon elements for the thin film transistors from the semiconductor layer (silicon island) and forming the contact holes for the terminal portions and for the static electricity protection circuits (first and second halftone exposure processes).

In the fifty third aspect of the present invention, a process of producing an active matrix substrate of a transverse electric field type active matrix liquid crystal display device is conducted in the following steps:

(1) forming the scanning lines (gate electrodes of the thin film transistors), the common electrodes within the pixels, and the lower layer common electrodes for shielding the video signal lines at the same time;

(2) forming the video signal lines and the liquid crystal drive electrodes and separating the silicon elements for the thin film transistors from the semiconductor layer at the same time (halftone exposure process);

(3) forming the contact holes for the terminal portions and for the static electricity protection circuits;

(4) forming the scanning line terminal portions, the video signal line terminal portions, and the static electricity protection circuits at the same time; and (5) forming the photolithography spacers and leveling the effective pixel area (halftone back surface exposure process).

In the fifty fourth aspect of the present invention, a process of producing an active matrix substrate of a transverse electric field type active matrix liquid crystal display device is conducted in the following steps:

(1) forming the scanning lines (gate electrodes of the thin film transistors), the common electrodes within the pixels, and the lower layer common electrodes for shielding the video signal lines at the same time (using a masking deposition process incorporating a shadow frame for a structure of P—SiNx\a-Si i layer\n+a-Si layer);

(2) forming the video signal lines, the liquid crystal drive electrodes, the static electricity protection circuits, and the scanning line terminal portions, and separating the silicon elements for the thin film transistors from a semiconductor layer at the same time (halftone exposure process); and (3) forming the photolithography spacers and leveling the effective pixel area (halftone back surface exposure process).

In the fifty fifth aspect of the present invention, with respect to the halftone back surface exposure apparatus that is used in the leveling (planarization) process for the effective pixel area of the active matrix substrate of the transverse electric field type liquid crystal display device, silica optical fiber cables for ultraviolet light or ultraviolet light LED are bundled in an in-line form in such a way that the ultraviolet rays can expose only the effective pixel area of the active matrix substrate of the transverse electric field type liquid crystal display device from the back side of the substrate.

In the fifty sixth aspect of the present invention, with respect to the halftone back surface exposure process, in the forty eighth, forty ninth, fiftieth, fifty first, fifty second, fifty third and fifty fourth aspects of the present invention noted above, the entire effective pixel area is exposed by the ultraviolet light from the back surface of the active matrix substrate before completely exposing the ultraviolet light on the portions where the spacers are to be constructed by using a photomask for photolithography spacer construction. Then, after the development of the substrate, degrees of irregularity of the substrate surface within the effective pixel area at side of the active matrix substrate and the heights of the spacers are measured with use of a white light interferometer so that the coating thickness of the photoresist and the amount of light for the halftone back surface exposure are controlled in response to the measured data from the white light interferometer through a feedback control process.

In the fifty seventh aspect of the present invention, the process of producing an active matrix substrate of a transverse electric field type active matrix liquid crystal display device is conducted in the following steps:

(1) forming the alignment marks inside of a glass substrate with use of a laser beam;

(2) depositing two or more layers of different kinds of metals or metal compounds or alloys (portions where the alignment marks are created by the laser beam are not deposited);

(3) exposing the gate bus lines and the common bus lines after the application of positive photoresist through the first halftone exposure process of an under exposure method that utilizes an ordinary photomask, then, the gate bus line, the common bus line, the common electrodes for shielding the video signal lines, and the common electrodes within the pixels are exposed through the second exposure process;

(4) after the development, the deposited metals are etched away with use of a first wet etching or dry etching process, then, removing the positive photoresist at the areas of the halftone exposure by an oxygen plasma ashing method, and then removing the metal layers at the halftone exposed area that are unnecessary through a second dry etching or wet etching process, and forming the gate bus, common bus, common electrodes for shielding the video signal lines, and the common electrodes within the pixels by using the first and second etching processes;

(5) depositing the gate insulation film, a non-doped thin film semiconductor layer (a-Si i layer), and a n+a-Si layer (ohmic contact layer) and coating the positive photoresist thereon, then exposing the a-Si silicon islands through a first halftone exposure process of an under exposure method with use of a normal photomask, and then exposing the contact holes for gate terminal connection portions and for the static electricity protection circuits through a second exposure process;

(6) after the development, forming the contact holes for the gate terminal connection portions and the static electricity protection circuits by etching away the gate insulation film, non-doped thin film semiconductor layer (a-Si i layer), and the n+a-Si layer (ohmic contact layer) through a first dry etching process, then, after removing the positive photoresist at the area of the halftone exposure with use of an oxygen plasma ashing method, removing the non-doped thin film semiconductor layer (a-Si i layer) and the n+a-Si layer (ohmic contact layer) that are unnecessary at the halftone exposed area with use of a second dry etching process, and then, constructing the a-Si silicon islands, the gate terminal connection portions, and the static electricity protection circuit with use of the first and second etching processes; and (7) constructing the video signal lines, the liquid crystal drive electrodes, the static electricity protection circuits, and the gate terminals at the same time (through the halftone exposure process using the normal photomask).

In the fifty eighth aspect of the present invention, an exposure device used in the production process for producing the thin film transistors of the active matrix display device of the present invention has a function of performing a second halftone exposure (complete exposure) process after shifting the active matrix substrate in a horizontal direction for the length of about a half of the channel length of the thin film transistor after performing a first halftone exposure (incomplete exposure) process using a normal photomask to construct the source electrodes and the drain electrodes of a channel length of about a half of the channel length of the thin film transistor.

In the fifty ninth aspect of the present invention, the process of producing the thin film transistors of the active matrix liquid crystal display device is conducted by, first performing the first halftone exposure (incomplete exposure; under exposure) with use of a normal photomask to construct the source electrodes and the drain electrodes of the thin film transistors with the channel length of about a half of the channel length of the thin film transistor, then, shifting the active matrix substrate in a horizontal direction for the length of about a half of the target channel length of the thin film transistor, and then developing the positive photoresist after performing the second halftone exposure (incomplete exposure; under exposure), thereby reducing the thickness of the positive photoresist of the channel portion of the thin film transistor by an amount corresponding to the target channel length.

In the sixtieth aspect of the present invention, the halftone shift exposure technology in the fifty ninth aspect of the present invention noted above is used for performing the silicon element separation for the thin film transistors, and the formation of the video signal lines (source electrodes) and the drain electrodes (electrodes connected to the liquid crystal drive electrodes or the transparent pixel electrodes) at the same time.

In the sixty first aspect of the present invention, the process of producing the active matrix substrate is conducted with use of the halftone shift exposure technology in the fifty ninth aspect of the present invention noted above by the following steps:
  (1) forming the scanning lines (gate electrodes of the thin film transistors) and the common electrodes at the same time;
  (2) forming the video signal lines (source electrodes of the thin film transistors) and the drain electrodes, and separating the silicon element for the thin film transistors from a semiconductor layer at the same time (halftone exposure process);
  (3) forming the contact holes for the scanning line terminal portions, the video signal line terminal portions, and for the static electricity protection circuits; and
  (4) forming the scanning line terminal portions, the video signal line terminal portions, the static electricity protection circuits, and transparent electrodes at the same time.

In the sixty second aspect of the present invention, the process of producing an active matrix substrate of a transverse electric field type active matrix liquid crystal display device is conducted with use of the halftone shift exposure technology in the fifty ninth aspect of the present invention noted above by the following steps:
  (1) forming the scanning lines (gate electrodes), the common electrodes within the pixels, and the lower layer common electrodes for shielding the video signal lines at the same time (using a masking deposition process incorporating a shadow frame in the case of using the structure of P—SiNx\a-Si i layer\n+a-Si layer);
  (2) forming the video signal lines, the liquid crystal drive electrodes, the static electricity protection circuits, and the scanning line terminal portions, and separating the silicon elements for the thin film transistors from the semiconductor layer at the same time (halftone exposure process); and
  (3) forming the photolithography spacers and leveling the effective pixel area (halftone back surface exposure process).

In the sixty third aspect of the present invention, the spacer bumps, in the third, fourth, fifth, fifteenth, sixteenth, and seventeenth aspects of the present invention noted above, have a characteristic of elastically and evenly deforming along the entire effective pixel area in a range between 0.1 micrometers and 0.5 micrometers in response to the atmospheric pressure during the construction of the liquid crystal cell by superposing the active matrix substrate and the color filter substrate with one another under a vacuum atmosphere.

In the sixty fourth aspect of the present invention, the process of producing an active matrix substrate of a transverse electric field type active matrix liquid crystal display device is conducted by the following steps:
  (1) forming the scanning lines;
  (2) separating the silicon elements for the thin film transistors from the semiconductor layer (silicon island step);
  (3) forming the video signal lines (source electrodes) and the drain electrodes at the same time;
  (4) forming the spacer bumps that cover the video signal lines, or simultaneously forming the spacers and the bumps that cover the video signal lines (halftone exposure process);
  (5) forming the contact holes for the terminal portions, the drain electrodes, and the static electricity protection circuits; and
  (6) forming the transparent common electrodes for shielding the video signal line, the transparent common electrodes within the pixels, and the liquid crystal drive electrodes at the same time.

In the sixty fifth aspect of the present invention, the process of producing an active matrix substrate of a transverse electric field type active matrix liquid crystal display device is conducted by the following steps:
  (1) forming the scanning lines and the lower layer common electrodes for shielding the video signal lines at the same time;
  (2) separating the silicon elements for the thin film transistors from the semiconductor layer (silicon island step);
  (3) forming the video signal lines (source electrodes) and the drain electrodes at the same time;
  (4) forming the spacer bumps that cover the video signal lines, or simultaneously forming the spacers and the bumps that cover the video signal lines (halftone exposure process);
  (5) forming the contact holes for the terminal portions, the drain electrodes, and the static electricity protection circuits; and
  (6) forming the transparent common electrodes for shielding the video signal lines, the transparent common electrodes within the pixels, and the liquid crystal drive electrodes at the same time.

In the sixty sixth aspect of the present invention, the process of producing an active matrix substrate of a transverse electric field type active matrix liquid crystal display device is conducted by the following steps:
  (1) forming the scanning lines;
  (2) forming the patterns of etching stopper channels for the thin film transistors;
  (3) forming the video signal lines (source electrodes) and the drain electrodes at the same time;
  (4) forming the spacer bumps that cover the video signal lines, or simultaneously forming the spacers and the bumps that cover the video signal lines (halftone exposure process);
  (5) forming the contact holes for terminal portions, drain electrodes, and static electricity protection circuits; and (6) forming the transparent common electrodes for shielding the video signal lines, the transparent common electrodes within the pixels, and the liquid crystal drive electrodes at the same time.

In the sixty seventh aspect of the present invention, the process of producing an active matrix substrate of a transverse electric field type active matrix liquid crystal display device is conducted by the following steps:

(1) forming the scanning lines and the lower layer common electrodes for shielding the video signal lines at the same time;
(2) forming the patterns of etching stopper channels for the thin film transistors;
(3) forming the video signal lines (source electrodes) and the drain electrodes at the same time;
(4) forming the spacer bumps that cover the video signal lines, or simultaneously forming the spacers and the bumps that cover the video signal lines (halftone exposure process);
(5) forming the contact holes for the terminal portions, the drain electrodes, and the static electricity protection circuits; and
(6) forming the transparent common electrodes for shielding the video signal lines, the transparent common electrodes within the pixels, and the liquid crystal drive electrodes at the same time.

In the sixty eighth aspect of the present invention, the process of producing an active matrix substrate of a transverse electric field type active matrix liquid crystal display device is conducted by the following steps:

(1) forming the scanning lines;
(2) forming the video signal lines (source electrodes) and the drain electrodes, and separating the silicon elements for the thin film transistors from the semiconductor layer at the same time (halftone exposure process);
(3) forming the spacer bumps that cover the video signal lines, or simultaneously forming the spacers and the bumps that cover the video signal lines (halftone exposure process);
(4) forming the contact holes for the terminal portions, the drain electrodes, and the static electricity protection circuits; and
(5) forming the transparent common electrodes for shielding the video signal lines, the transparent common electrodes within the pixels, and the liquid crystal drive electrodes at the same time.

In the sixty ninth aspect of the present invention, the process of producing an active matrix substrate of a transverse electric field type active matrix liquid crystal display device is conducted by the following steps:

(1) forming the scanning lines and the lower layer common electrodes for shielding the video signal lines at the same time;
(2) forming the video signal lines (source electrodes) and the drain electrodes, and separating silicon elements for the thin film transistors from the semiconductor layer at the same time (halftone exposure process);
(3) forming the spacer bumps that cover the video signal lines, or simultaneously forming the spacers and the bumps that cover the video signal lines (halftone exposure process);
(4) forming the contact holes for the terminal portions, the drain electrodes, and the static electricity protection circuits; and
(5) forming the transparent common electrodes for shielding the video signal lines, the transparent common electrodes within the pixels, and the liquid crystal drive electrodes at the same time.

In the seventieth aspect of the present invention, the video signal line, the thin and long insulation bumps formed in the manner to cover the video signal lines, the upper layer common electrodes for shielding the electric fields caused by the video signal lines, the lower layer common electrodes for shielding, and the liquid crystal drive electrodes within the pixels in the forty seventh aspect of the present invention noted above are bent within the pixel at least once at an angle within a range between 0-30 degrees (except 0 degree) relative to an alignment direction of the liquid crystal molecule, and similarly, the color filter layer and the light shielding film (black mask) on the side of the color filter substrate which is opposite to the active matrix substrate are bent within the pixel at least once at an angle within a range between 0-30 degrees (except 0 degree) relative to the alignment direction of the liquid crystal molecule.

In the seventy first aspect of the present invention, the video signal line, the thin and long insulation bumps formed in the manner to cover the video signal lines, the upper layer common electrodes for shielding the electric fields caused by the video signal lines, the lower layer common electrodes for shielding, and the liquid crystal drive electrodes within the pixels in the forty seventh aspect of the present invention noted above are bent within the pixel at least once at an angle within a range between 60-120 degrees (except 90 degrees) relative to an alignment direction of the liquid crystal molecule, and similarly, the color filter layer and the light shielding film (black mask) on the side of the color filter substrate which is opposite to the active matrix substrate are bent within the pixel at least once at an angle within a range between 60-120 degrees (except 90 degrees) relative to the alignment direction of the liquid crystal molecule.

According to the first, second, third, fourth and fifth aspects of the present invention noted above, the width of the common electrodes that shield the electric fields of the video signal lines can be decreased dramatically and the aperture ratio can be improved dramatically. Especially, by utilizing the third, fourth and fifth aspects of the present invention, the bumps covering the video signal lines can be used along with the spacers. Further, with the use of halftone exposure method, the bumps covering the video signal lines and the spacers can be constructed at the same time, which dramatically shortens the time required for the production process. In the conventional technologies disclosed by Japanese patent laid-open publication NOs. 2002-258321 and 2002-323706 require to construct the photo spacers on the color filter substrate which requires an additional production process. The use of both the bumps surrounding the video signal lines and the spacers in the present invention can simplify the production process especially when the liquid crystal cell gap is smaller than 3 micrometers, thereby enabling to dramatically reduce the production cost.

According to the second and fifth aspects of the present invention noted above, the capacitance between the video signal line and the shielding common electrode can be minimized, thus, it is possible to maximize the aperture ratio while minimizing the distortion of the video signal waveforms even when the size of the liquid crystal display system is increased to forty (40) inches or more. Especially, the second and fifth aspects of the present invention are useful to decrease the distortion of the video signal waveforms especially when the liquid crystal cell gap is smaller than 2.5 micrometers.

According to the sixth and eighteenth aspects of the present invention noted above, the adhesion strength between the insulation bumps covering the video signal lines and the shielding common electrodes is improved and the problem of film peeling can be prevented, thereby improving the production yield. Furthermore, by using the transparent material for the shielding common electrodes, it is possible to allow the light to pass through the areas around the shielding common electrodes when the liquid crystal is driven so that the effective transmittance ratio can be improved, thereby achieving a liquid crystal display device with high brightness and high contrast.

According to the seventh and nineteenth aspects of the present invention noted above, the movement of the hair tips of the rubbing cloth during the rubbing alignment treatment can be done smoothly so that it can prevent the occurrence of alignment defects. The conventional technologies disclosed in Japanese patent laid-open Nos. 2002-258321 and 2002-323706 do not utilize the taper angle of less than 30 degrees at the edges of the bumps on the active matrix substrate. As a result, the smooth movements of the hair tips of the rubbing cloth at edge portions of bumps of the conventional technology cannot be attained, which causes the poor alignment. Therefore, it causes the light to leak during the black display at the portions with the poor alignment and thus significantly decreases the contrast. According to the present invention, the taper angle of the bumps covering the video signal lines is controlled to be less than 30 degrees so that no light leak can occur during the black display, which makes it possible to attain a high picture quality with high contrast.

According to the fourth, fifth, eighth, tenth, eleventh, twelfth, sixteenth, seventeenth, twentieth, twenty third and twenty fourth aspects of the present invention noted above, with use of the liquid crystal drop-feed vacuum attachment alignment device, the liquid crystals spread smoothly inside the liquid crystal cells during liquid crystal cell construction, therefore problems associated with residual air bubbles can be decreased. The conventional technology which creates the liquid crystal cells in the normal atmosphere, and then cuts them into the individual cell for injecting the liquid crystals in the vacuum atmosphere is not suitable for the liquid crystal cell construction of the present invention. The conventional injection technology takes too much time, which significantly decreases the production efficiency. Since the liquid crystal drop-feed vacuum attachment alignment device is beginning to be used in the mass production line today, the structure of the present invention can be easily implemented in the actual application.

According to the ninth and twenty first aspects of the present invention noted above, the problem of film peeling of the shielding common electrodes can be avoided when the active matrix substrate and the color filter substrate contact each other in the attachment alignment movement during the liquid crystal drop-feed vacuum attachment process, thereby enabling to minimize the damage to the alignment film.

According to the thirteenth, fourteenth, fifteenth, sixteenth and seventeenth aspects of the present invention noted above, it is possible to reduce the capacitance created between the shielding common electrodes and the scanning lines. Therefore, the aperture ratio can be maximized while the distortion of the scanning signal waveforms on the scanning lines can be minimized even for the liquid crystal display device of an ultra large size such as forty (40) inches or more. Especially, with use of the fourteenth and seventeenth aspects, it is possible to maximize the aperture ratio while minimizing the distortion of the signal waveforms both on the video signal lines and the scanning lines.

According to the twenty fifth aspect of the present invention noted above, the shielding effect can be improved because of the use of the upper layer and lower layer shielding common electrodes that cover the video signal lines through the insulation films. Accordingly, the vertical crosstalk can be eliminated even when the width of the shielding common electrodes is decreased and the aperture ratio can be increased to the maximum level. Because the upper layer shielding common electrode has a shielding effect higher than that of the lower layer common electrode, the highest shielding effect and high aperture ratio can be achieved by forming the width of the upper layer shielding common electrodes larger than that of the lower layer shielding common electrodes.

According to the twenty sixth, twenty seventh, twenty eighth, twenty ninth and thirtieth aspects of the present invention noted above, it is possible to rotate the positive dielectric constant anisotropic liquid crystal molecules in two different directions (right rotation and left rotation) within a single pixel, thereby enabling to achieve a wider viewing angle. Furthermore, it is possible to significantly decrease the color shift phenomenon so that a picture quality suitable for a liquid crystal display television is achieved. With use of the structure of the present invention, the transverse electric field type liquid crystal display device is able to achieve the wider viewing angle, high aperture ratio, low cost, high contrast, and high response speed.

According to the thirty first, thirty second, thirty third, thirty fourth and thirty fifth aspects of the present invention noted above, it is possible to rotate the negative dielectric constant anisotropic liquid crystal molecules in two different directions (right rotation and left rotation) within a single pixel, thereby enabling to achieve a wider viewing angle.

According to the thirty sixth, thirty seventh and thirty eighth aspects of the present invention noted above, it is possible to prevent the capacitance created between the shielding common electrodes and the video signal line from increasing even when the cell gap of the transverse electric field type liquid crystal display device becomes less than 3.0 micrometers, thereby decreasing the distortion of the signal waveforms on the video signal lines. Furthermore, it is possible to concentrate the electric fields created between the liquid crystal drive electrodes and the shielding common electrodes to the edge of each electrode so that it is possible to drive the liquid crystal molecules without increasing the liquid crystal drive voltage even when the cell gap is less than 3.0 micrometers.

According to the thirty ninth aspect of the present invention noted above, it is possible to prevent damage to the main seal that would typically arise during the liquid crystal drop-feed vacuum attachment alignment process. When the spacer bumps are located around the application area of the main seal, the spacer bumps function as a protection wall against the piercing of the liquid crystal. By increasing the width of the spacer bumps provided around the application area of the main seal in a closed loop fashion so that it is larger than the width of the spacer bumps of the effective pixel area, the effect of the protection wall will further increase. Furthermore, because the liquid crystal display device of the present invention does not need to mix the main seal material with glass fibers to determine the cell gaps, it completely eliminates the breakage of wiring due to the pressure of the glass fibers mixed in the main seal that would arise when aluminum or aluminum alloy are used as the scanning lines and the video signal lines.

According to the fortieth, forty first, forty second, forty third, forty fourth and forty fifth aspects of the present invention noted above, since it is possible to produce the insulation bump covering the video signal lines or to produce both the bumps covering the video signal lines and the spacer at the same time with use of the halftone exposure technique, thus it is possible to reduce the production steps and cost. According to the conventional technologies shown in Japanese patent laid-open publication Nos. 2002-258321 and 2002-323706, a separate process is required for producing the photolithography spacers, which inevitably increases the production cost.

According to the forty sixth aspect of the present invention noted above, because the shielding common electrodes are connected in the form of flat surface, it is possible to reduce the impedance. With this construction, it is possible to reduce the thickness of the shielding common electrodes to be as thin as possible. In the case of a dot inversion drive method, the thickness of 300-500 angstroms is sufficient for the shielding common electrodes. By utilizing this aspect and the seventh and nineteenth aspects of the present invention, the movement of the tips of the rubbing cloth hair can be done smoothly during the rubbing alignment treatment, which is able to avoid alignment defects and to completely eliminate the light leakage in the black screen, thereby achieving an image with excellent contrast and a uniform halftone image display. Furthermore, in the structure in which the shielding common electrodes are connected not only at the right and left sides of the pixel but also at the top and bottom sides of the pixel as in the present invention, breakage of a portion of the shielding electrodes will not cause a line defect on a screen, therefore will not significantly affect the image. Therefore, the yield in the production process will be dramatically improved.

According to the forty seventh, seventieth and seventy first aspects of the present invention noted above, it is possible to provide a transverse electric field type liquid crystal display device with high picture quality, high aperture ratio, high response speed, and a wider viewing angle. With the structure of the present invention, it is possible to rotate the liquid crystal molecules in the two opposite directions (right rotation and left rotation) without lowering the aperture ratio even when the pitch of the video signal is as small as 50 micrometers. The structure of the present invention does not always require a black mask corresponding to the video signal line, however, by providing conductivity to the black mask and to the over coating layer, it is possible to prevent the color filter layer from charging the static electricity.

According to the forty eighth aspect of the present invention noted above, it is possible to simplify the production process by conducting the processes for leveling the transverse type electric field type active matrix substrate and constructing the photolithography spacers at the same time. The leveling method of the present invention, where the substrate is exposed by the ultraviolet ray from the back surface, does not leave a leveling layer on the upper layer of the liquid crystal drive electrodes and the common electrodes. Therefore, the voltage for driving the liquid crystal does not increase. Because the leveling layer is not left on the upper layer of the liquid crystal drive electrodes and the common electrodes, a polarization effect or a charge trap effect of the organic leveling layer will not occur, which can avoid the problem of residual image. The movement of the tips of the rubbing cloth hair can be done smoothly during the rubbing alignment treatment since there are no unevenness on the surface of the active matrix substrate, hence alignment defects will not occur. Thus, an ideal black display can be achieved since the alignment defects will not occur. Accordingly, it is possible to achieve a display device with high contrast without irregularity in displaying the halftone image.

According to the forty ninth, fifty, fifty first, fifty second, fifty third and fifty fourth aspects of the present invention noted above, it is possible to simplify the production process by performing the leveling of the active matrix substrate and the construction of the photolithography spacers at the same time during the production of the transverse electric field type liquid crystal display device. Especially with the use of the fifty fourth aspect, significant decrease in the cost can be achieved because the overall process for constructing the active matrix substrate can be completed with three (3) photomasking steps.

By utilizing the back surface exposure leveling (flattening or planarization) method of the present invention, there remains no leveling layer on the liquid crystal drive electrodes and the common electrodes, therefore there is no increase in the liquid crystal drive voltage. Further, because the leveling layer does not exist on the liquid crystal drive electrodes and the common electrodes, the polarization effect or the charge trap effect will not occur, thereby eliminating residual images. The movement of the tips of the rubbing cloth hair can be done smoothly during the rubbing alignment treatment since there are no uneven areas on the surface of the active matrix substrate, hence the alignment defects will not occur.

According to the fifty fifth and fifty sixth aspects of the present invention noted above, an optical system for conducting the back surface exposure can be constructed easily even when the active matrix substrate is as large as two (2) meters or more. The optical system of the present invention is able to easily adjust the degree of light exposure and to expose uniformly throughout the entire area of the substrate even when the size of the substrate is increased. The transverse electric field type liquid crystal display system is highly susceptible to the liquid cell gap, therefore, not only the height of the photolithography spacers but the degree of flatness around the leveled (planarized) area must be carefully controlled to prevent the unevenness in the halftone image display. By utilizing the production system of the present invention in combination with a feedback loop, it is possible to produce an active matrix substrate without irregularity in the cell gap.

According to the fifty seventh aspect of the present invention noted above, by utilizing an ordinary photomask during the halftone exposure process, it is possible to form very thin films of the lower layer common electrodes for shielding the video signal lines and of the common electrodes within the pixels as well as to separate the silicon elements for the thin film transistors (silicon island) and to create the contact holes at the same time. Further, it is possible to produce the active matrix substrate with high performance without increasing the photomasking process. Furthermore, by utilizing the ordinary photomask in the halftone exposure process during the construction of the video signal lines and the liquid crystal drive electrodes, it is possible to produce the liquid crystal drive electrodes with a thickness of less than 300-500 angstroms, which eliminates the need for the leveling process which needs to form the leveling layer, thereby enabling to greatly decrease the production cost.

According to the fifty eighth, fifty ninth, sixtieth, sixty first and sixty second aspects of the present invention noted above, it is possible to easily reduce the number of steps in the production process of the active matrix substrate without using an expensive light transmission adjustable photomask (halftone photomask) but using the ordinary photomask. The present invention is applicable not only to a transverse electric field type liquid crystal display device but to other modes of liquid crystal devices, and is also applicable to an active matrix type organic EL display device, thus its scope of application is very wide. The production method using the halftone shift exposure apparatus and the halftone shift exposure process of the present invention is useful in decreasing the production cost of a large size display device. The attempt to apply the halftone exposure method using a halftone photomask (light transmission adjustable photomask) to a production of a large substrate, traditionally, was not feasible due to the high cost of the halftone photomask. However, by utilizing the method of the present invention, it is possible to easily produce the large substrate with use of the inexpensive ordinary photomask in the halftone shift exposure, therefore, the limitation to the application of halftone exposure process for a large substrate is eliminated.

According to the sixty third aspect of the present invention noted above, it is possible to prevent occurrences of air bubbles from being trapped within the cells since the height of the spacer bumps will change with the changes of the volume of the liquid crystal even when the volume of the liquid crystal within the liquid crystal cell decreases because of low temperature. Especially, by increasing the range of plastic deformation, the volume inside the liquid crystal cell can easily change in response to the amount of drop of the liquid crystal during the pressurizing process under the atmospheric pressure in the liquid crystal injection vacuum attachment alignment process, thereby completely eliminating the residual air bubble problem.

According to the sixty fourth, sixty fifth, sixty sixth, sixty seventh, sixty eighth and sixty ninth aspects of the present invention noted above, it is possible to keep the thickness of all of the electrodes for driving the liquid crystal molecules of the transverse electric field type liquid crystal display device to about 300-500 angstroms. As a result, the production cost can be reduced since the leveling process is no longer necessary. All of the electrodes for driving the liquid crystal molecules can be produced at the same time at the last stage of the production process and thus, the same material can be used for all of the drive electrodes, therefore, the chemical potential energy of the electrodes are identical throughout. This enables the liquid crystal molecules be driven by an alternating current (AC) voltage, which is able to prevent the occurrence of the residual image problem. All of the electrodes needed for driving the liquid crystal molecules can be formed by very thin films (less than 500 angstroms), therefore, the movement at the tips of the rubbing cloth hair during the rubbing alignment treatment can be performed smoothly and the alignment defects can be avoided. Therefore, the light leakage during the black level display can be completely eliminated, thereby achieving the display with high contrast.

BRIEF DESCRIPTION OF THE DRAWINGS

FIGS. 5A-5C are cross sectional views showing an example of the separate two-step exposure method and the structure of the positive photoresist after development in the present invention.

FIGS. 6A-6C are cross sectional views showing another example of the separate two-step exposure method and the structure of the positive photoresist after development in the present invention.

FIGS. 33A-33B are schematic diagrams showing an example of principle of the halftone shift exposure method of the present invention.

FIGS. 34A-34B are schematic diagrams showing another example of principle of the halftone shift exposure method of the present invention.

FIGS. 35A-35E are schematic diagrams showing the principle of the halftone shift exposure method of the present invention and a cross sectional structure of the photoresist after the development.

FIGS. 36A-36F are cross sectional views showing an example of the production flow involved in the four-step photomasking process in the conventional technology.

FIGS. 37A-37B are schematic diagrams showing a further example of principle of the halftone shift exposure method of the present invention.

FIGS. 38A-38B are schematic diagrams showing an example of principle of the separate two-step exposure method of the present invention.

FIGS. 39A-39B are schematic diagrams showing another example of principle of the separate two-step exposure method of the present invention.

FIGS. 40A-40B are schematic diagrams showing a further example of principle of the separate two-step exposure method of the present invention.

FIGS. 41A-41B are schematic diagrams showing a further example of principle of the separate two-step exposure method of the present invention.

FIGS. 43A-43B are schematic diagrams showing a further example of principle of the separate two-step exposure method of the present invention.

FIGS. 44A-44B are schematic diagrams showing a further example of principle of the separate two-step exposure method of the present invention.

FIGS. 102A-102C are cross sectional views showing an example of separate two-step exposure method of the present invention and the cross sectional structure of the negative photoresist after the development.

FIGS. 103A-103C are cross sectional views showing another example of separate two-step exposure method of the present invention and the cross sectional structure of the negative photoresist after the development.

FIGS. 106A-106F are cross sectional views showing the active matrix substrate production flow involved in the four-step photomasking process using the halftone shift exposure method of the present invention.

FIG. 120 is a schematic diagram showing the relationship between the alignment direction and the rotation direction of the liquid crystal molecules of the positive anisotropic dielectric material used in the transverse electric field type liquid crystal panel of the present invention.

FIG. 121 is a schematic diagram showing the relationship between the alignment direction and the rotation direction of the liquid crystal molecules of the negative anisotropic dielectric material used in the transverse electric field type liquid crystal panel of the present invention.

FIG. 122 is a plan view showing an example of structure of the color filter used in the transverse electric field type liquid crystal display panel of the present invention.

FIG. 123 is a plan view showing another example of structure of the color filter used in the transverse electric field type liquid crystal display panel of the present invention.

FIG. 124 is a flow chart showing an example of production flow involved in the three-step photomasking process of the present invention.

FIG. 125 is a flow chart showing an example of production flow involved in the five-step photomasking process of the present invention.

FIG. 126 is a flow chart showing an example of production flow involved in the four-step photomasking process of the present invention.

FIG. 127 is a flow chart showing an example of production flow involved in the three-step photomasking process of the present invention.

FIG. 128 is a flow chart showing an example of production flow involved in the five-step photomasking process of the present invention.

FIG. 129 is a flow chart showing an example of production flow involved in the six-step photomasking process of the present invention.

FIGS. 130A-130C are cross sectional views showing the process for planarizing the active matrix substrate and forming the photolithography spacers at the same time with use of the halftone back surface exposure method of the present invention.

FIG. 131 is a cross sectional view showing an example of structure of the halftone back surface exposure device according to the present invention.

Figure 132:
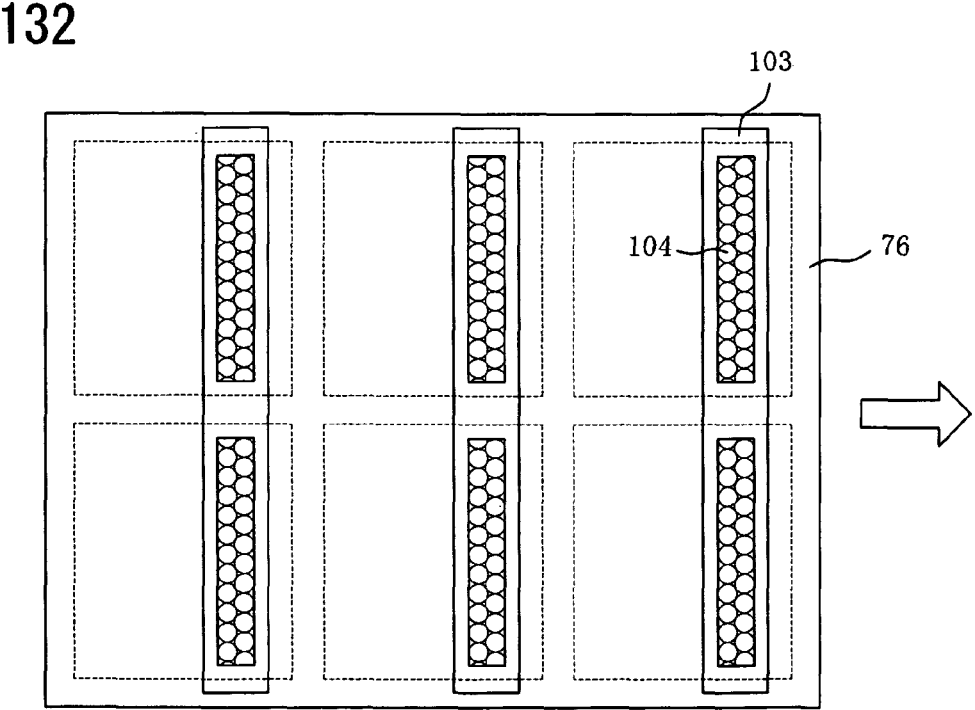

FIG. 132 is a plan view showing an example of structure of the halftone back surface exposure device according to the present invention.

Figure 133:
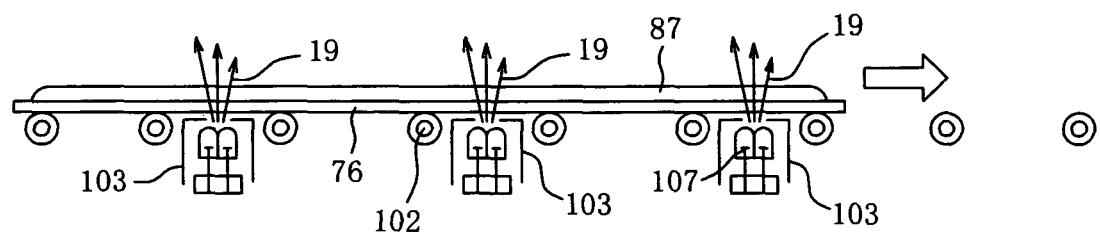

FIG. 133 is a cross sectional view showing another example of structure of the halftone back surface exposure device according to the present invention.

Figure 134:
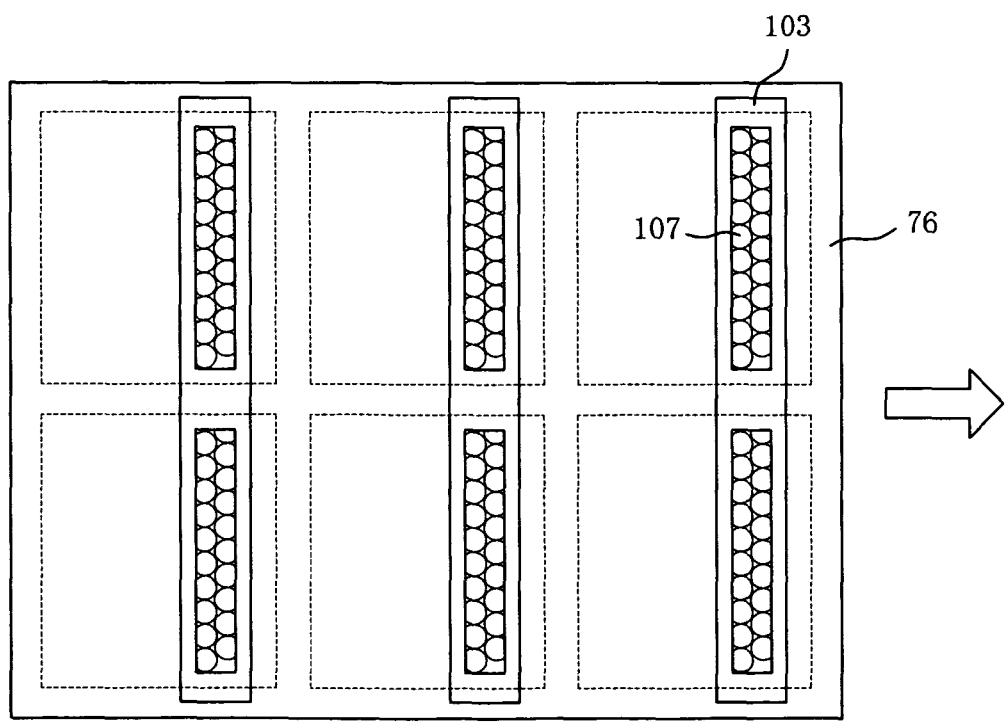

FIG. 134 is a plan view showing another example of structure of the halftone back surface exposure device according to the present invention.

Figure 135:
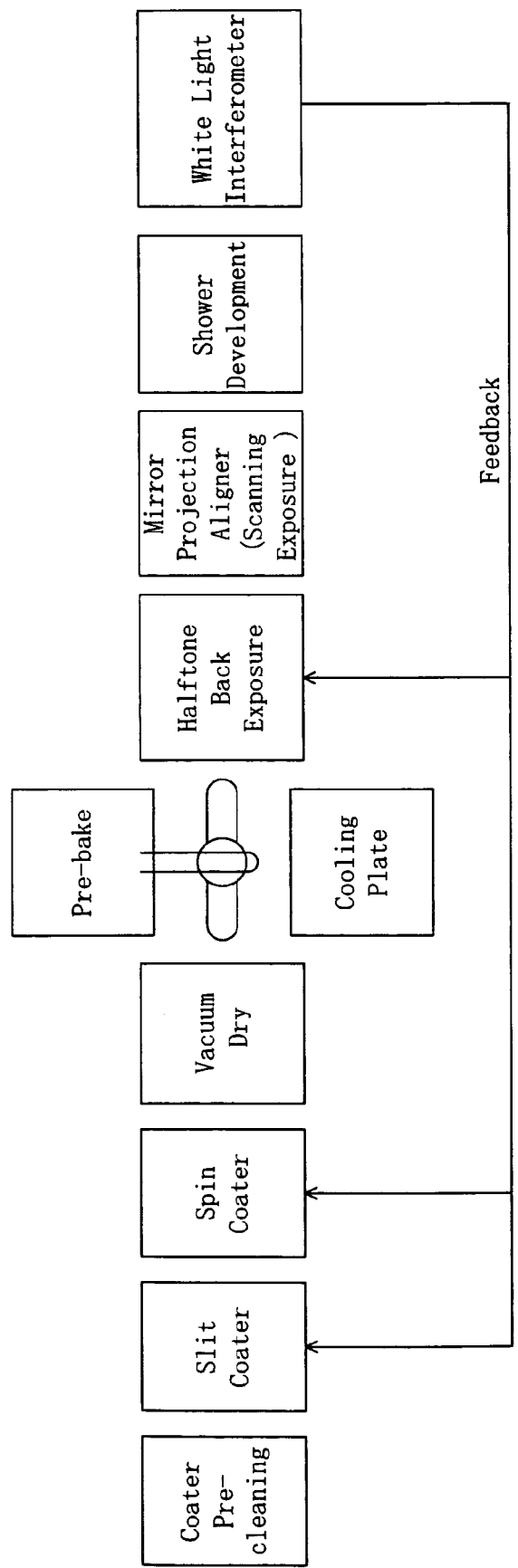

FIG. 135 is a schematic diagram showing an overall system configuration of the halftone back surface exposure device of the present invention.

Figure 136:
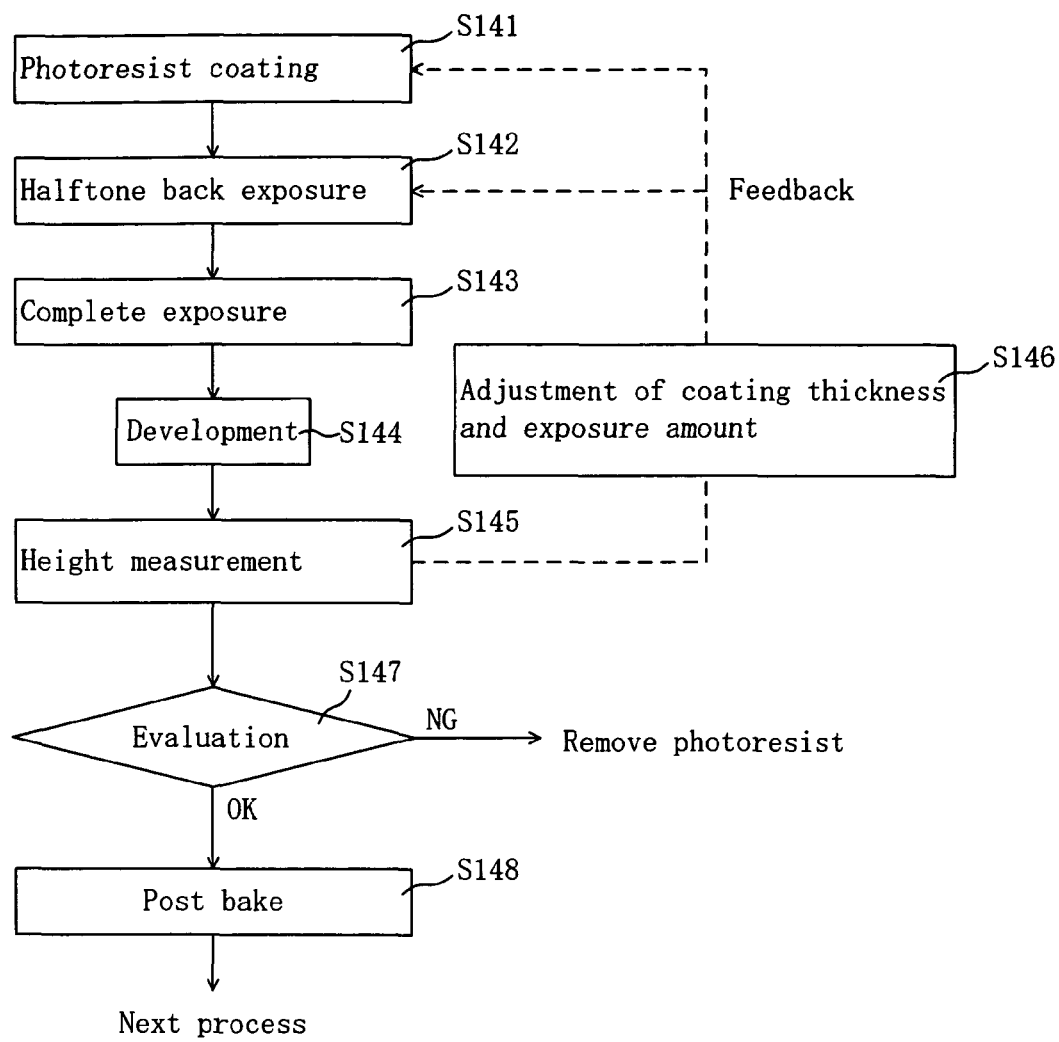

FIG. 136 is a flow chart showing an overall process of the halftone back surface exposure method of the present invention.

Figure 137:
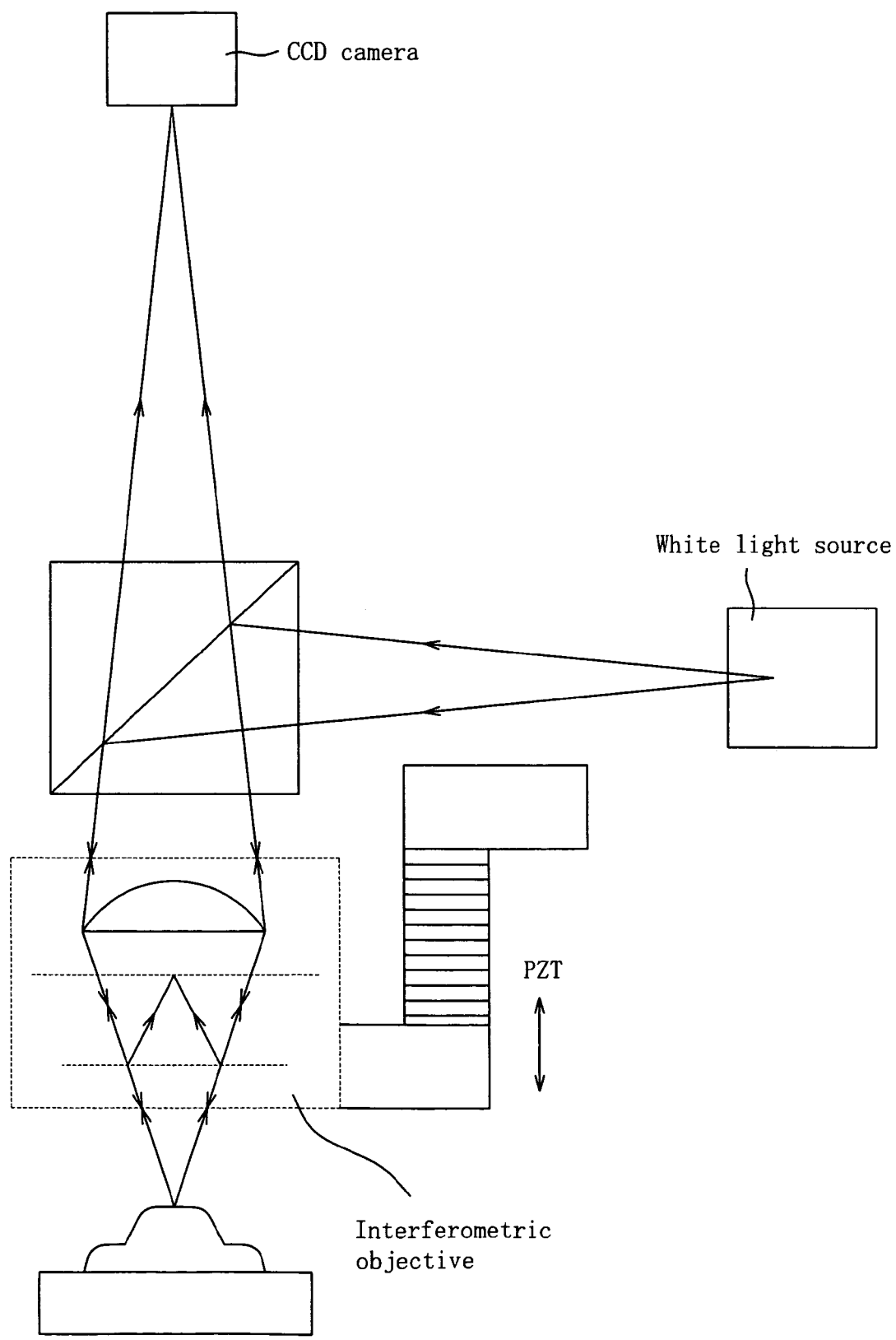

FIG. 137 is a cross sectional view showing an example of optical structure in the white light interferometer used in the present invention.

DETAILED DESCRIPTION OF THE INVENTION

The present invention will now be described in more detail with respect to the preferred embodiments with reference to the accompanying drawings.

First Embodiment

Figure 45:
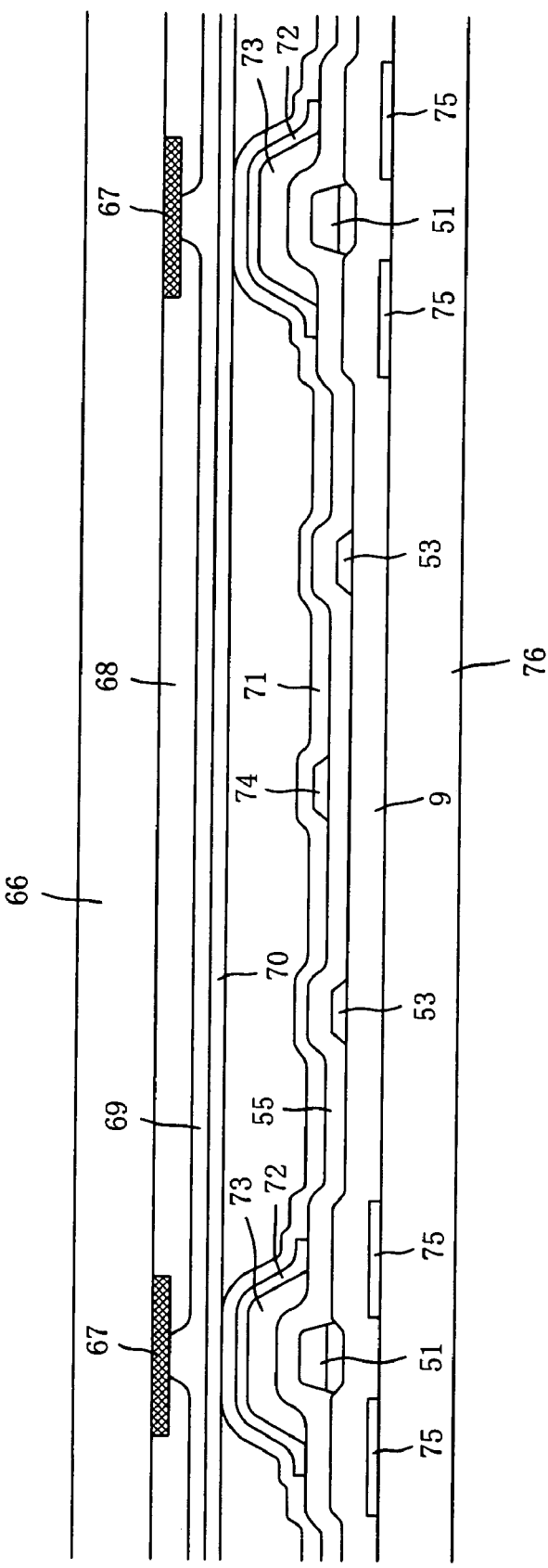
FIG. 45 is a cross sectional view showing an example of structure in the transverse electric field type liquid crystal panel including the spacers covering the video signal lines and the shielding electrodes formed on the spacers according to the present invention.
Figure 46:
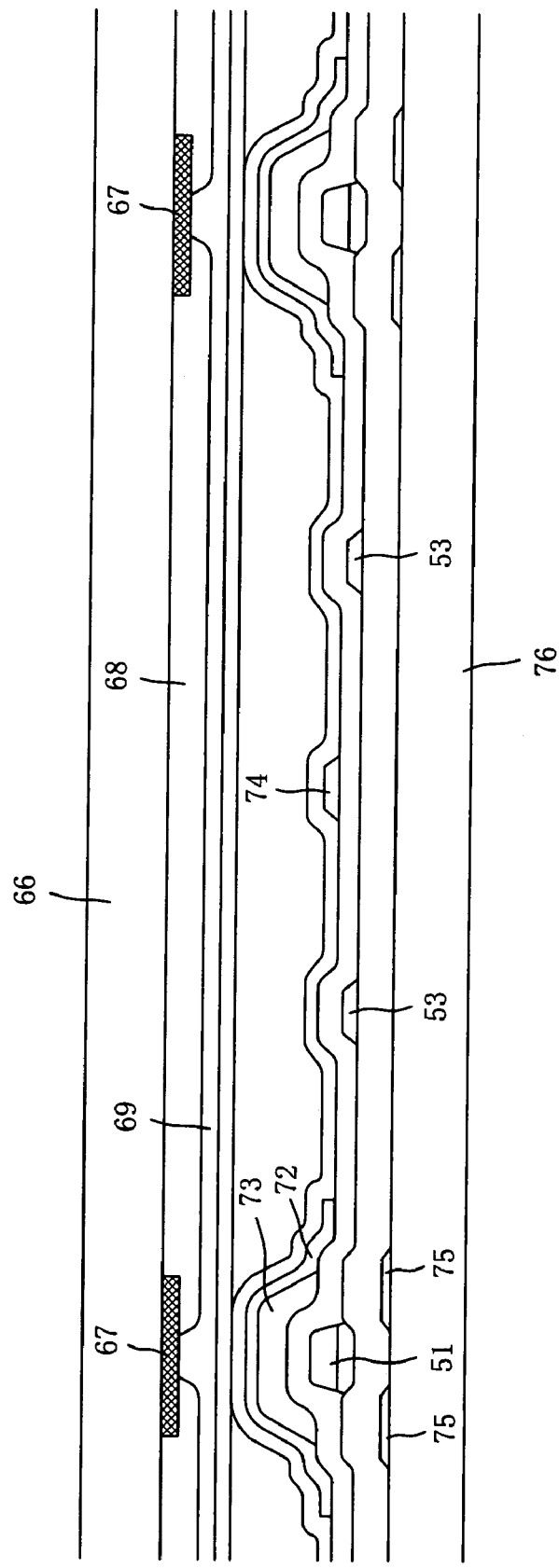
FIG. 46 is a cross sectional view showing another example of structure in the transverse electric field type liquid crystal panel including the spacers covering the video signal lines, and the shielding electrodes formed on the spacers according to the present invention.
Figure 47:
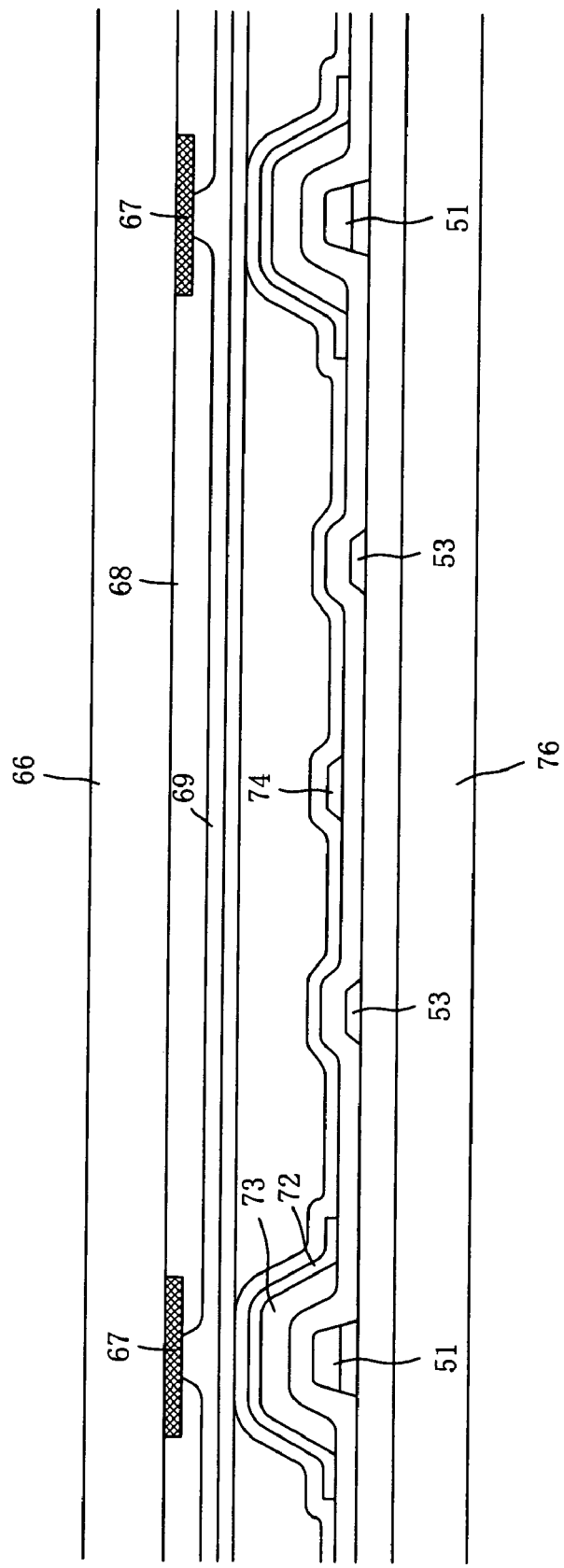
FIG. 47 is a cross sectional view showing an example of structure in the transverse electric field type liquid crystal panel in the present invention.

FIGS. 45, 46, 47, 70, 72, 74, 76, 78 and 80 show the first embodiment of the present invention. FIGS. 45-47 are cross sectional views showing examples of structure in the transverse electric field type liquid crystal panel including spacers covering the video signal lines and the shielding electrodes formed on the spacers according to the present invention. FIGS. 70, 72, 74, 76, 78 and 80 are plan views showing examples of structure in the transverse electric field type liquid crystal display device according to the present invention.

In FIGS. 45-47, a numeral 9 denotes a gate insulation film, a numeral 51 denotes a video signal line, a numeral 53 denotes a liquid crystal drive electrode (pixel electrode), a numeral 55 denotes a passivation film, a numeral 66 denotes a glass substrate in the side of color filter, a numeral 67 denotes a black mask (light shielding film), a numeral 68 denotes a color filter layer, a numeral 69 denotes a leveling layer in the side of color filter, a numeral 70 denotes an alignment film in the side of color filter, a numeral 71 denotes an alignment film in the side of TFT (thin film transistor) array substrate, a numeral 72 denotes a common electrode (upper layer) for shielding the electric field produced by the video signal line, a numeral 73 denotes a spacer bump for covering the video signal line, a numeral 74 denotes a common electrode within the pixel (upper layer), a numeral 75 denotes a common electrode (lower layer) for shielding the electric field produced by the video signal line, and a numeral 76 denotes a glass substrate in the side of the TFT array.

Further in FIGS. 70, 72, 74, 76, 78 and 80, a numeral 15 denotes a scanning line, a numeral 49 denotes a common electrode within the pixel (lower layer), a numeral 79 denotes a shielding electrode formed on both side walls of the spacer bump, a numeral 80 denotes a TFT (thin film transistor) element, a numeral 81 denotes a contact hole for connecting the shielding common electrode and the lower layer common electrode, and a numeral 82 denotes the lower layer electrode.

The lower layer common electrodes 75 for shielding the electric field of the video signal line is constructed at the same time as the scanning lines 51 on the same layer. The video signal line 51 and the liquid crystal drive electrodes 53 are constructed at the same time on the same layer. The upper layer shielding common electrodes 72 for shielding the electric field of the video signal line and the common electrodes 74 within the pixel are constructed at the same time on the same layer. In the example of FIG. 46, as opposed to the example of FIG. 45, the upper layer shielding common electrodes 72 have a wider electrode width than that of the lower layer shield common electrodes 75. The structure shown in FIG. 46 is able to provide a larger aperture ratio than that of the structure shown in FIG. 45.

Figure 70:
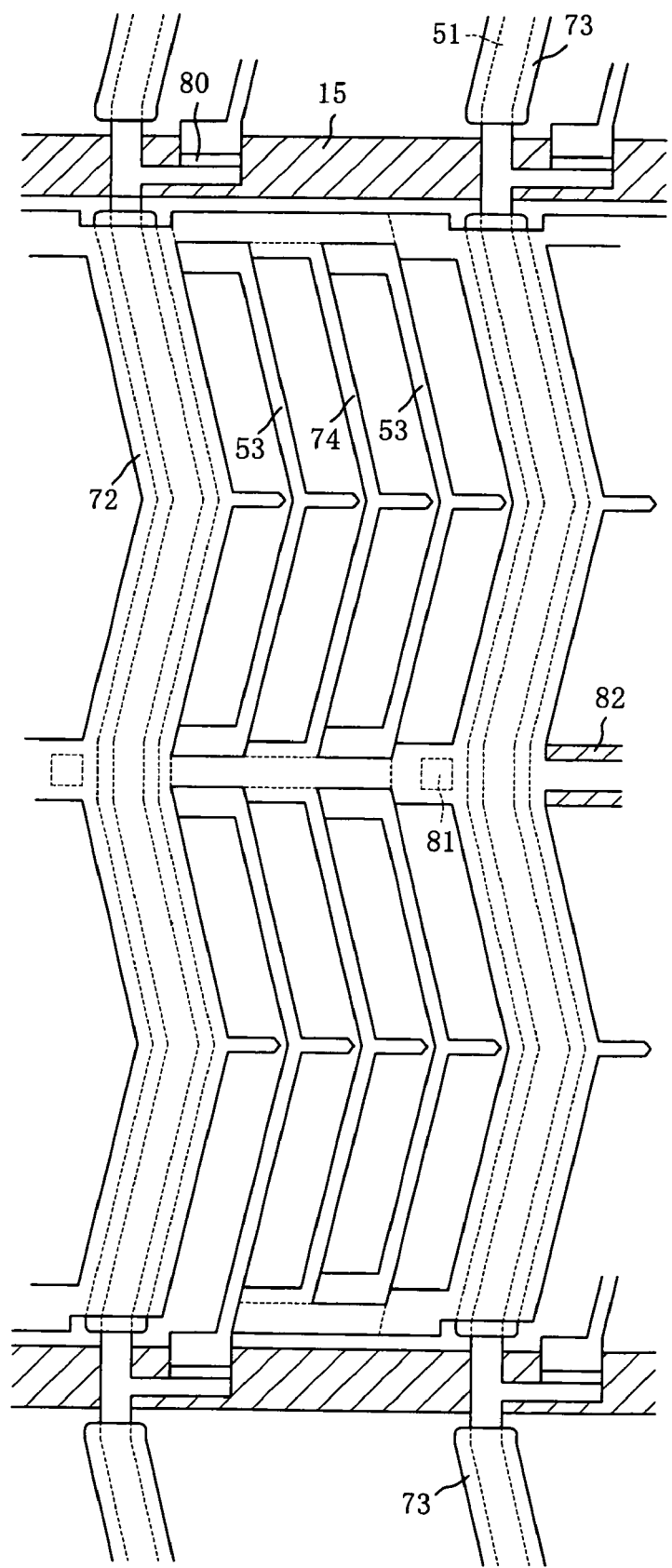
FIG. 70 is a plan view showing another example of structure in the transverse electric field type liquid crystal display device according to the present invention.
Figure 72:
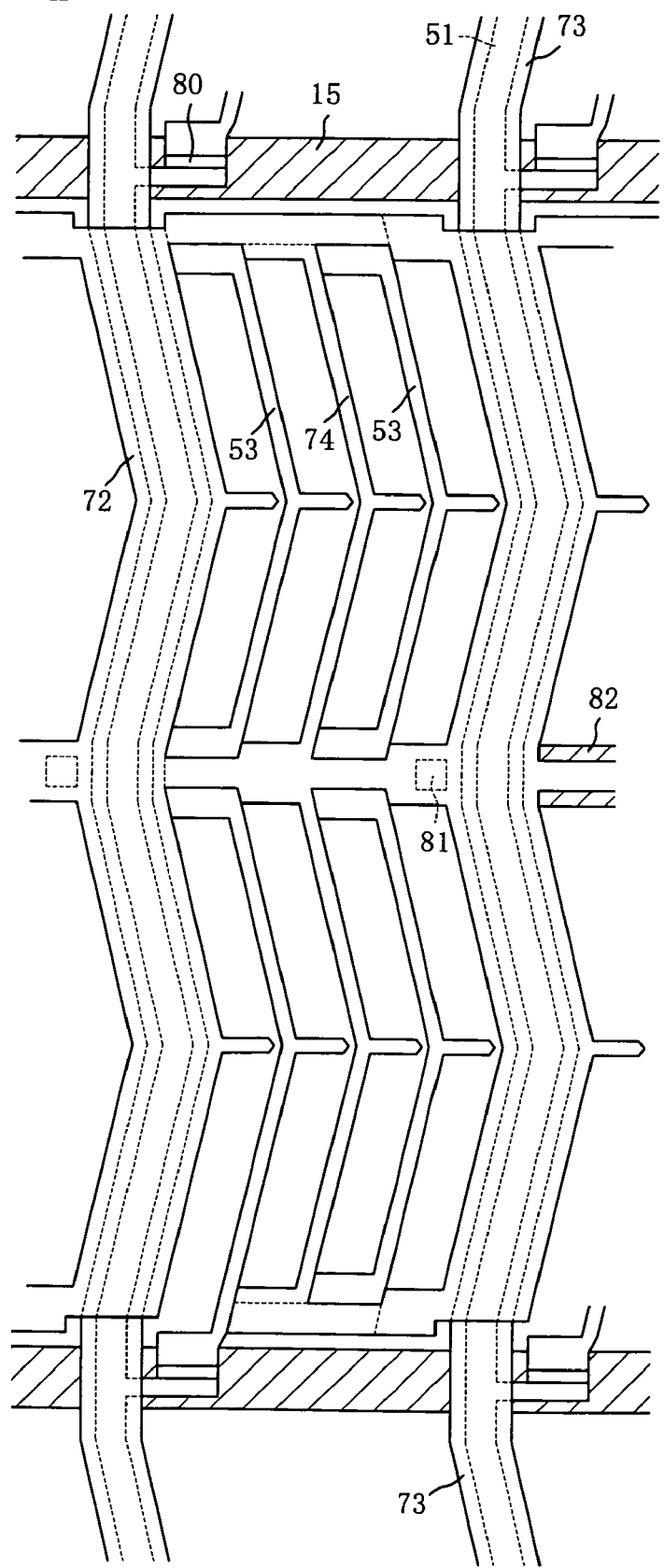
FIG. 72 is a plan view showing a further example of structure in the transverse electric field type liquid crystal display device according to the present invention.
Figure 73:
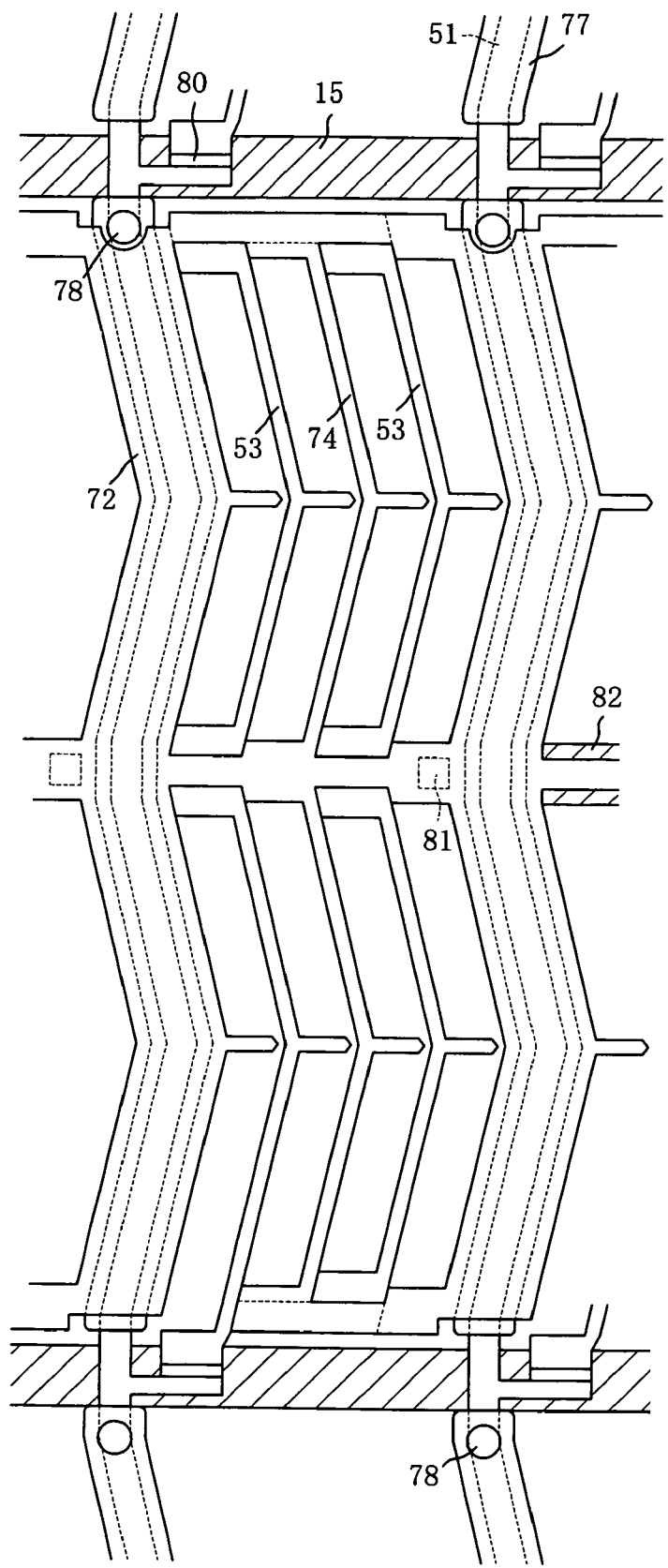
FIG. 73 is a plan view showing a further example of structure in the transverse electric field type liquid crystal display device according to the present invention.
Figure 76:
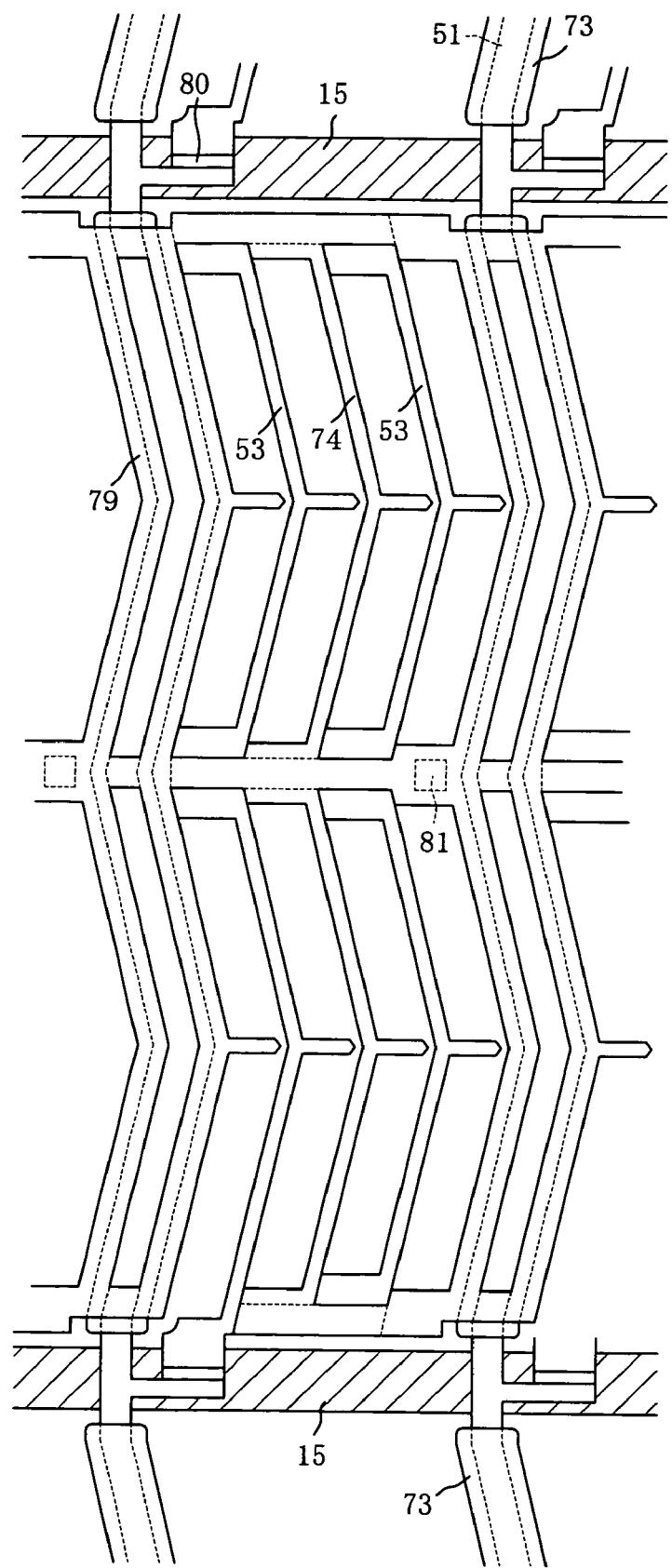
FIG. 76 is a plan view showing a further example of structure in the transverse electric field type liquid crystal display device according to the present invention.
Figure 80:
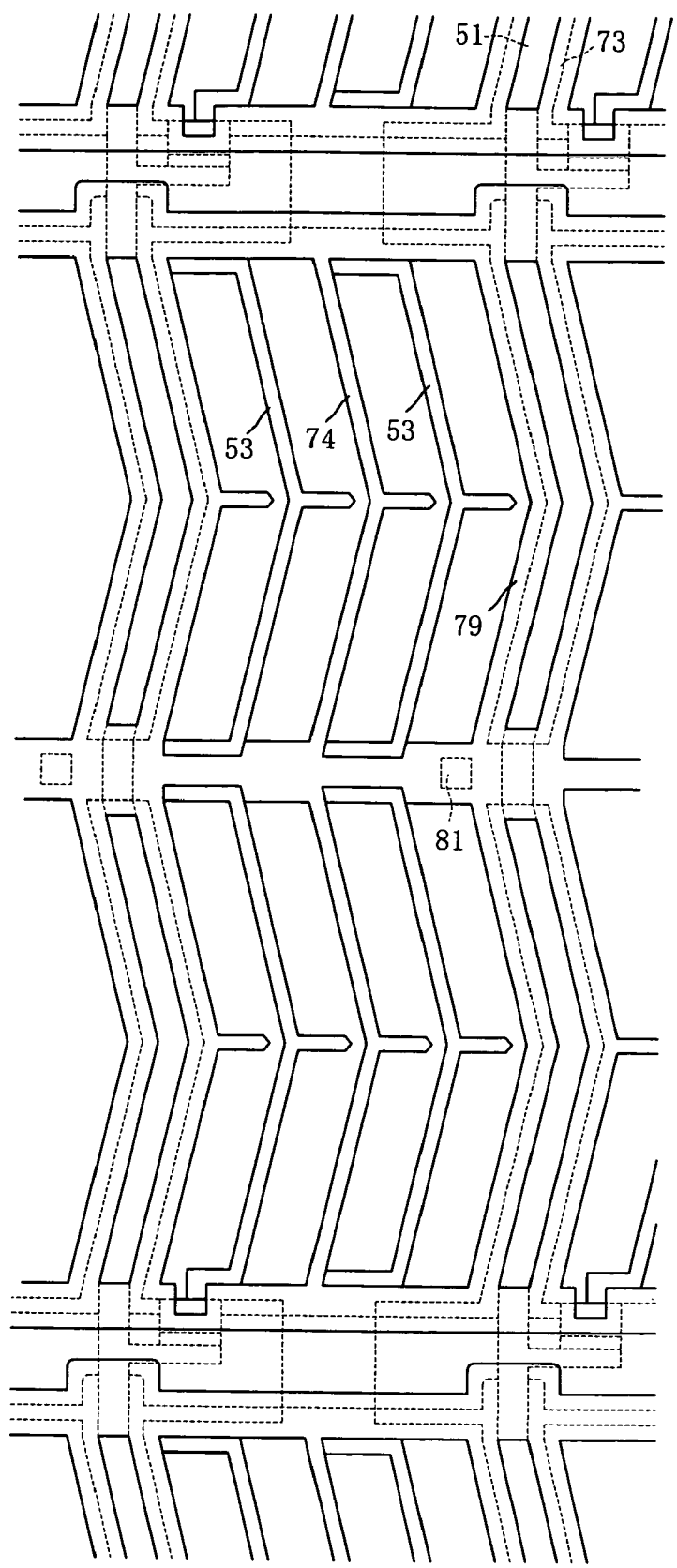
FIG. 80 is a plan view showing a further example of structure in the transverse electric field type liquid crystal display device according to the present invention.

The video signal line 51 and the liquid crystal drive electrodes 53 are covered by the passivation layer 55, and the spacer bumps 73 are constructed in a manner to cover (surround) the video signal lines 51. The upper layer shielding common electrodes 72 can cover the spacer bumps 73 completely as shown in FIGS. 70 and 72, or the upper layer wall shielding common electrodes 79 can be placed at both side walls of the spacer bumps 73 as shown in FIGS. 76 and 80. When the height of the spacer bumps 73 is less than 3.0 micrometers or when the size of the liquid crystal panel is larger than 30 inches, the construction of the active matrix substrate using the upper layer wall shielding common electrodes 79 shown in FIGS. 76 and 80 would be preferable to more effectively prevent distortions in the video signal waveform.

Figure 104:
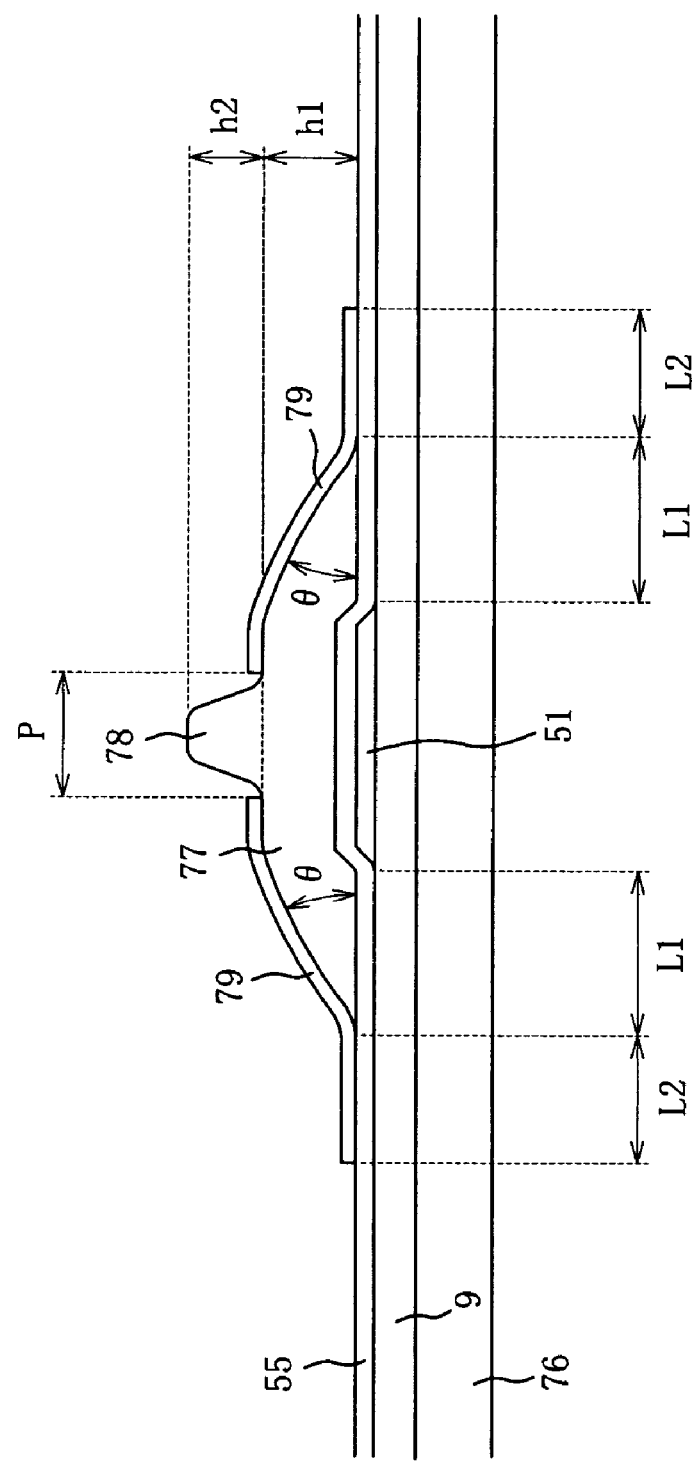
FIG. 104 shows an enlarged cross sectional view of the bump covering the video signal line and the photolithography spacer constructed on the bump in the present invention.

The spacer bumps 73 shown in the cross sectional views of FIGS. 45, 46 and 47 actually have a gentle taper angle θ as shown in the cross sectional view of FIG. 104. A distance L1 from an edge of the spacer bump 73 to an edge of the video signal line 51 is preferably at least 3 micrometers. The taper angle θ of the spacer bump 73 in FIG. 104 is preferably 30 degrees or smaller so that the movement of the tips of rubbing cloth hairs can be performed smoothly during the rubbing alignment treatment, thereby avoiding occurrence of alignment defective areas. It is preferable to make the distance L2 between an edge of the spacer bump 77 and the upper layer shielding common electrodes 79 be larger than 0.5 micrometers. Basically, the larger the distance L2, the better shielding effects will be available. When the lower shielding common electrodes do not exist such as in the example of FIG. 47, the distance L2 of about 10 micrometers is sufficient.

It is imperative for the present invention that the cross sectional shape of the spacer bump 73 has an upward projection such as an oval, half oval, hyperbolic, or parabolic shape. This upward projection allows the spacer bump 73 to easily deform when a pressure caused by an atmospheric pressure is applied during a liquid crystal drop vacuum attachment alignment process. Materials utilized for forming the spacer bump 73 should be a type that allows the height of the spacer bump 73 to uniformly deform in the range between 0.1 micrometers and 0.5 micrometers when the atmospheric pressure is applied thereto, otherwise, a problem of residual air bubble will arise.

Figure 74:
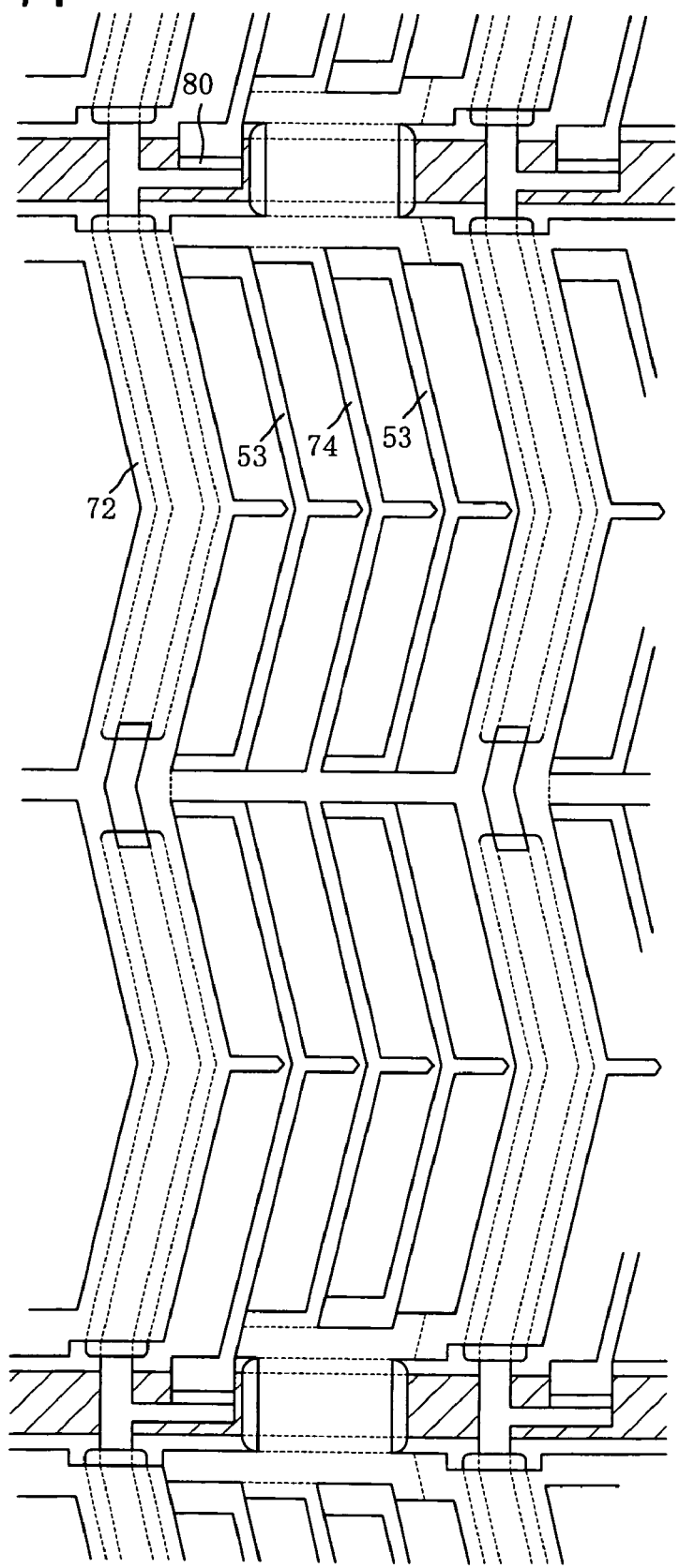
FIG. 74 is a plan view showing a further example of structure in the transverse electric field type liquid crystal display device according to the present invention.
Figure 78:
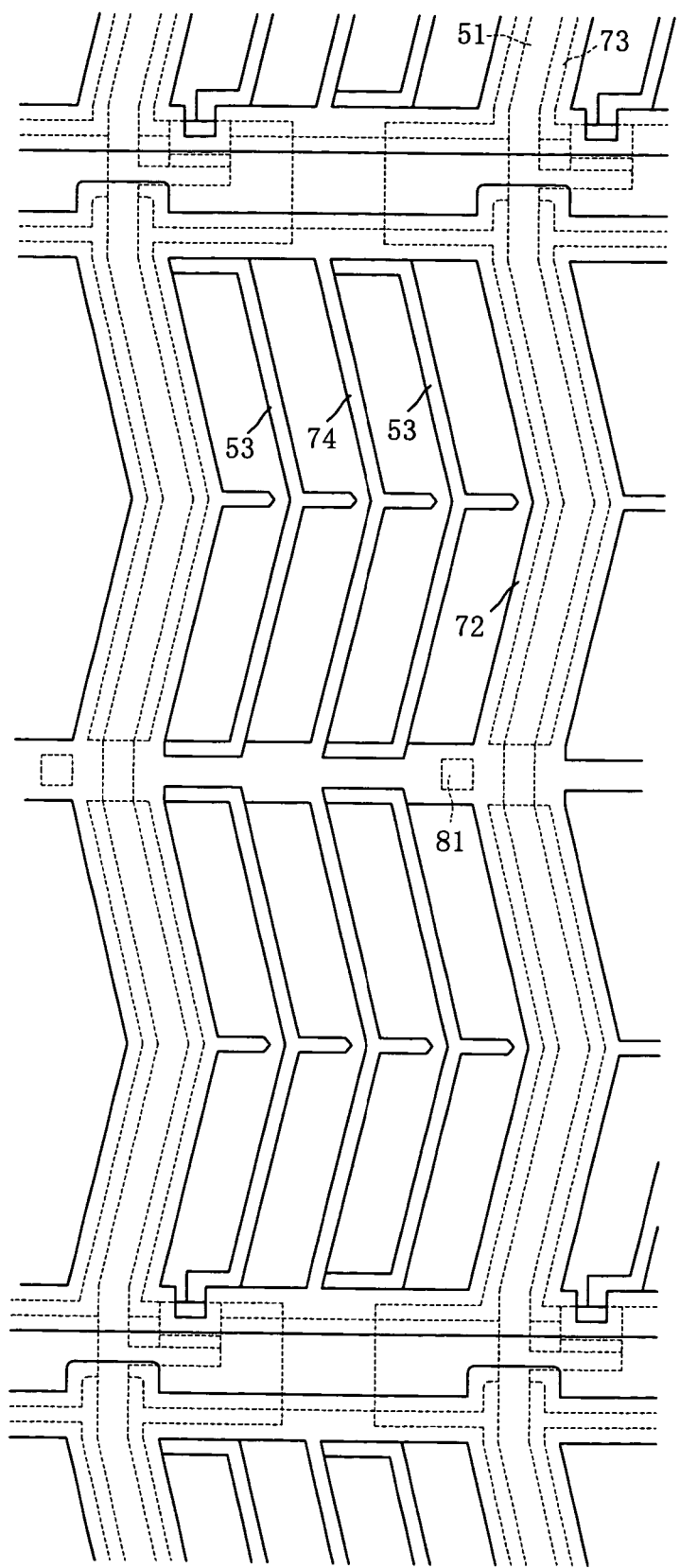
FIG. 78 is a plan view showing a further example of structure in the transverse electric field type liquid crystal display device according to the present invention.

As shown in FIGS. 70, 74, and 76, it is especially important that the spacer bump 73 does not reside around the area of the crossing point between the scanning line 15 and the video signal line 51 because the liquid crystal has to be diffused in this area where the spacer bump 73 does not exist. In the example of FIGS. 78 and 80, an area where the spacer bump 73 does not exist is created at around the center of the pixel. Although the dripped liquid crystal will be diffused in this area, this structure of FIGS. 78 and 80 may not be suitable for a large screen liquid crystal panel, since the capacitance between the upper layer shielding common electrode 72 and the video signal line 51 will increase.

The construction as shown in FIG. 74 in which the spacer bumps are also constructed over the scanning lines 15 and the upper layer common electrodes 72 are connected together between the upper and lower pixels and right and left pixels is suitable for a large screen liquid crystal display device. Since the shielding common electrodes 72 are connected in a mesh like manner, in the liquid crystal display device using this method, even when there is a breakage in the line, the resultant line fault will be negligible in the practical use.

It is preferable that the dielectric constant of the spacer bumps 73 is as small as possible, however, 3.3 or less should be sufficient for an actual implementation. In the case where the monomer or oligomer used as a material for forming the spacer bump 73 includes at least one benzo-cyclobutene structure or its dielectric material, or at least one fluorene skeleton or its dielectric material, then it is possible to composite the dielectric material with the dielectric constant of less than 3.3.

Figure 86:
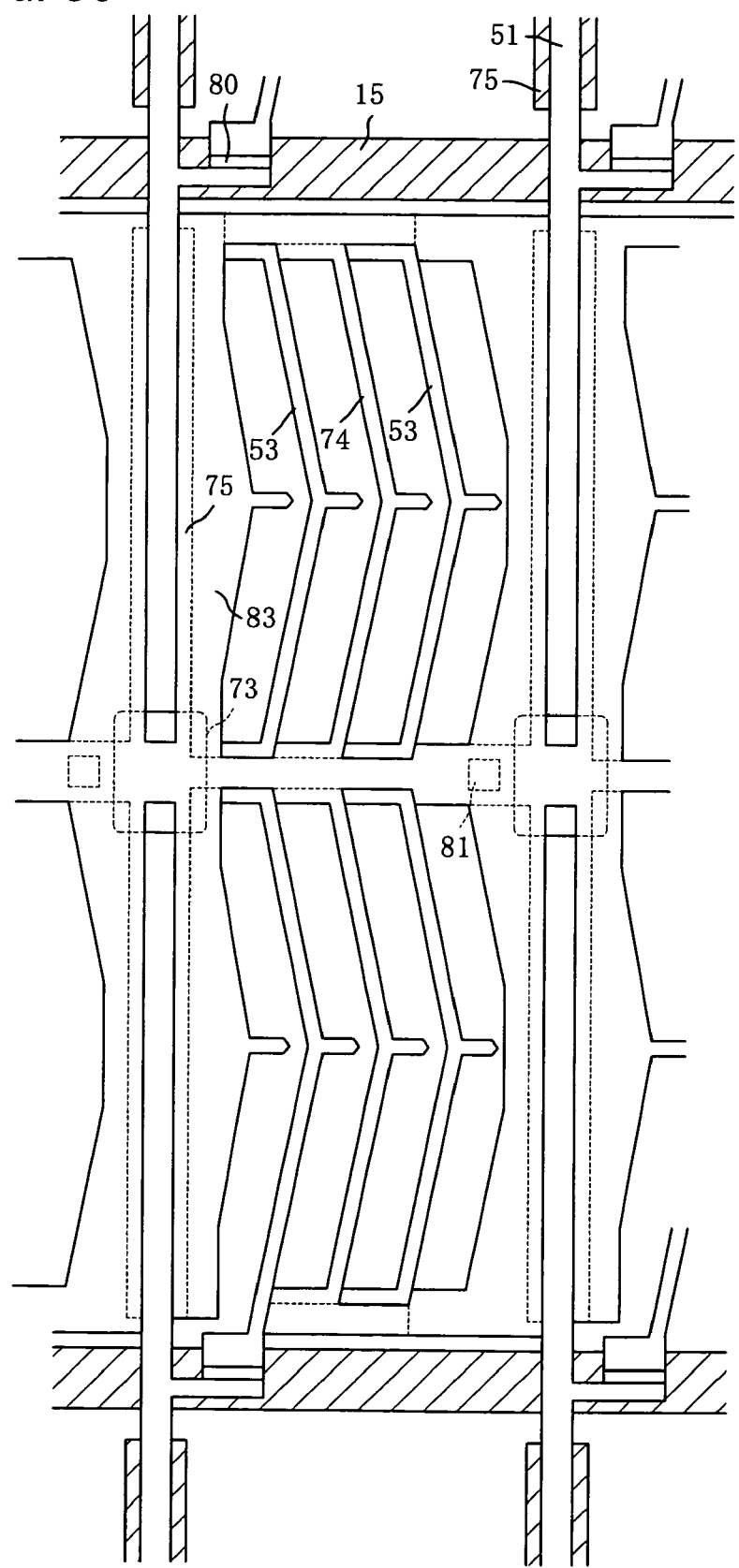
FIG. 86 is a plan view showing a further example of structure in the transverse electric field type liquid crystal display device according to the present invention.
Figure 87:
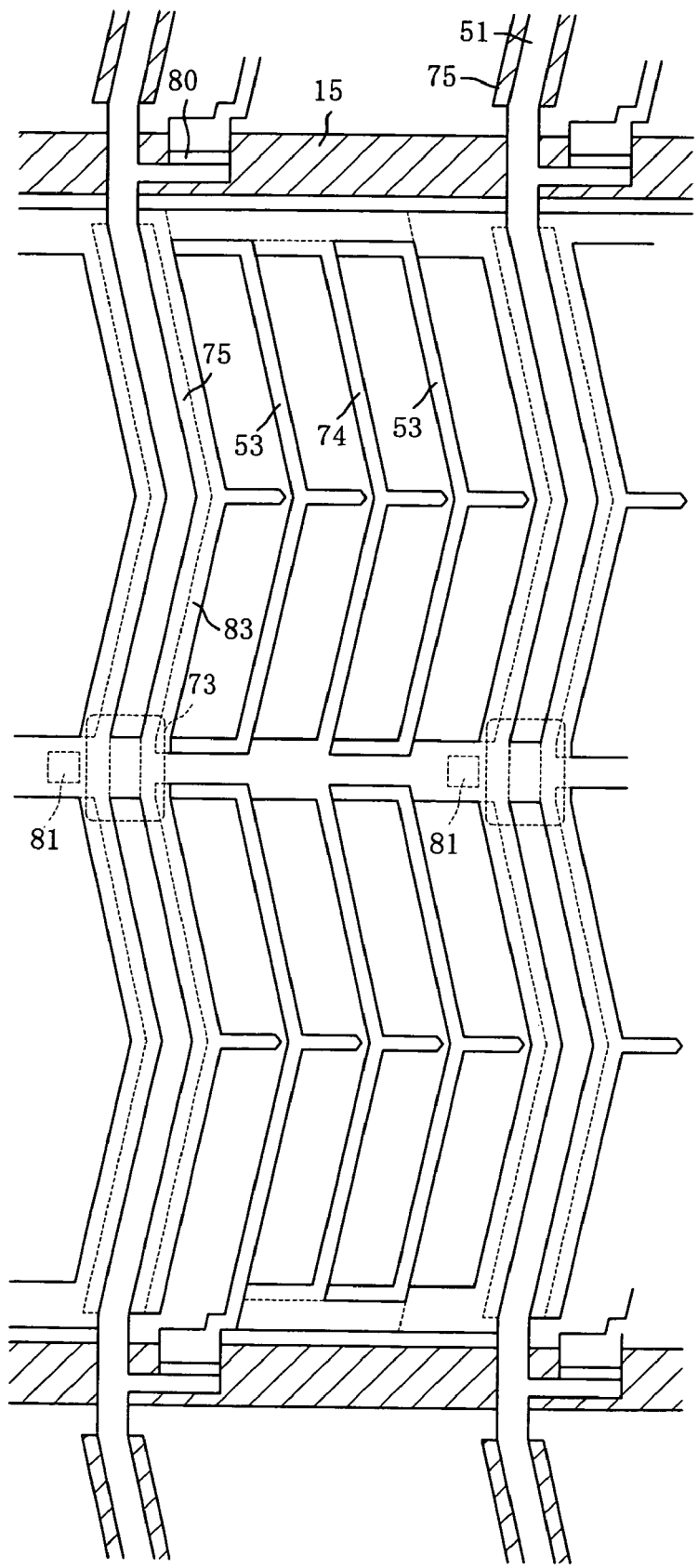
FIG. 87 is a plan view showing a further example of structure in the transverse electric field type liquid crystal display device according to the present invention.
Figure 88:
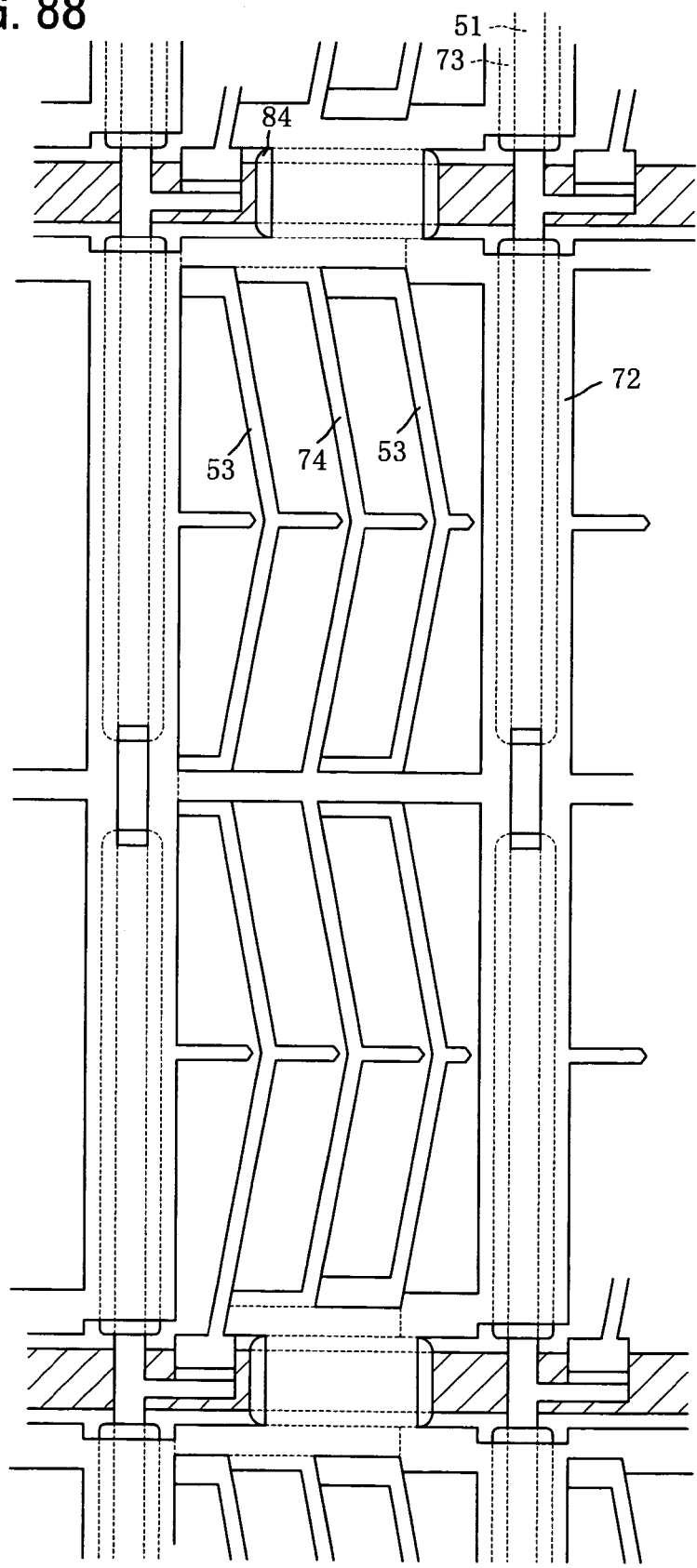
FIG. 88 is a plan view showing a further example of structure in the transverse electric field type liquid crystal display device according to the present invention.
Figure 89:
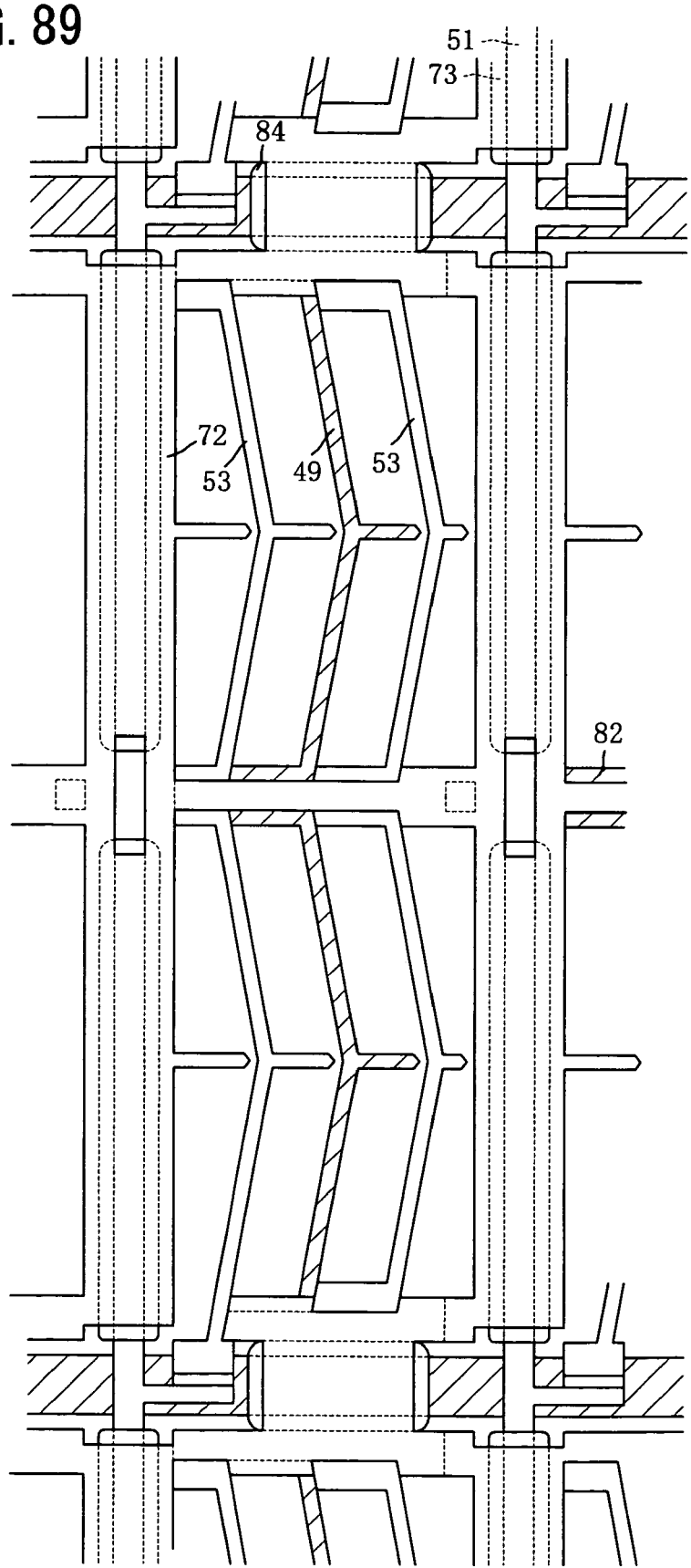
FIG. 89 is a plan view showing a further example of structure in the transverse electric field type liquid crystal display device according to the present invention.
Figure 90:
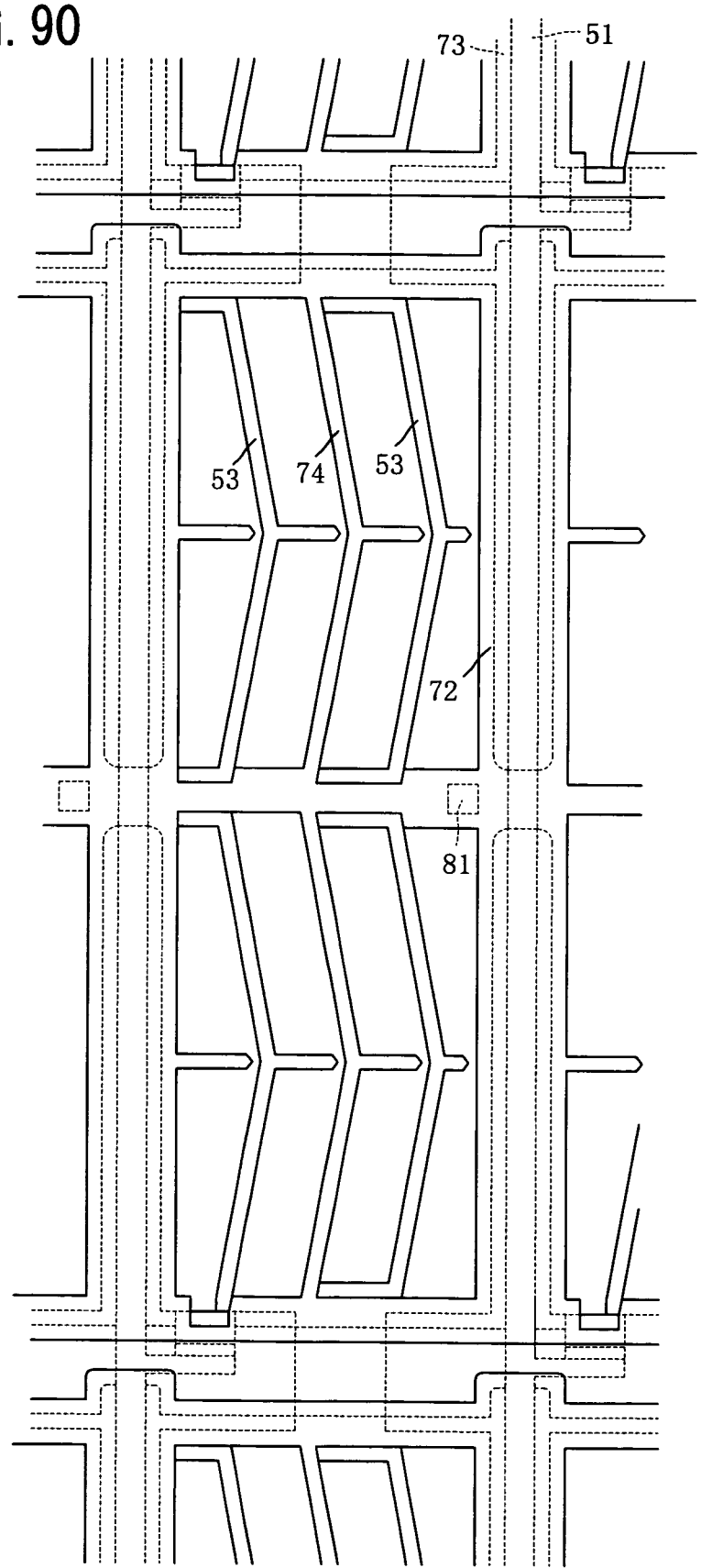
FIG. 90 is a plan view showing a further example of structure in the transverse electric field type liquid crystal display device according to the present invention.
Figure 91:
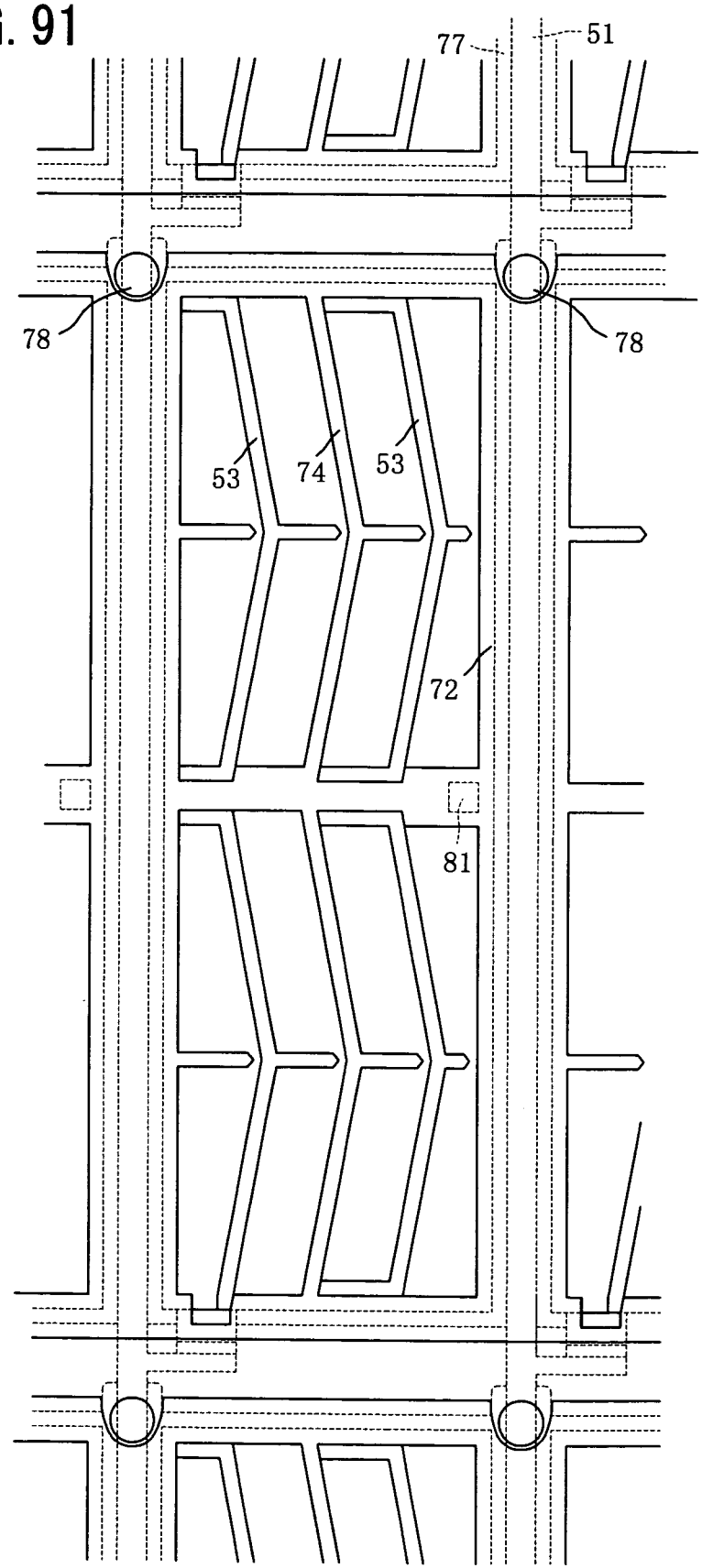
FIG. 91 is a plan view showing a further example of structure in the transverse electric field type liquid crystal display device according to the present invention.

FIGS. 86 and 87 are plan views showing further examples of structure in the transverse electric field type liquid crystal display device of the first embodiment of the present invention. In the example of FIGS. 86 and 87, the size of the spacer bump 73 is minimized. In the drawings, a numeral 83 denotes a common electrode (upper layer) for shielding the electrical field produced by the video signal lines 51. As noted above, the numeral 75 denotes a lower layer shield common electrode. Because the size of the spacer bump 73 is minimized, the dielectric material of large dielectric constant can be used.

Second Preferred Embodiment

Figure 48:
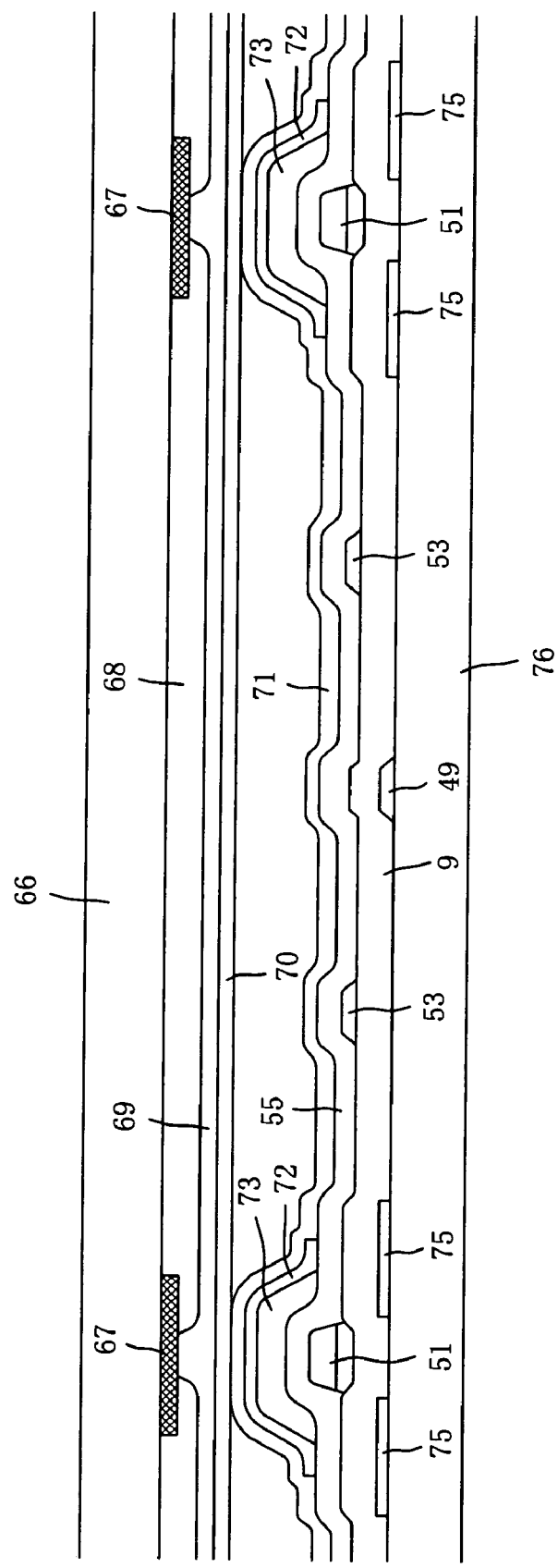
FIG. 48 is a cross sectional view showing another example of structure in the transverse electric field type liquid crystal panel in the present invention.
Figure 49:
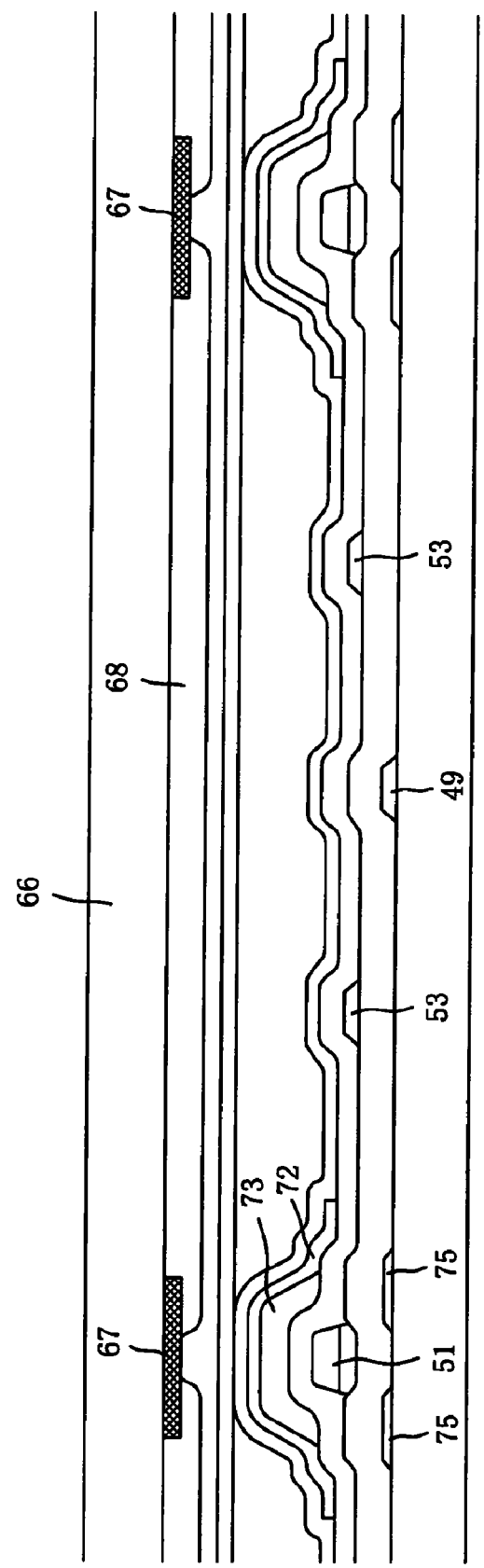
FIG. 49 is a cross sectional view showing a further example of structure in the transverse electric field type liquid crystal panel in the present invention.
Figure 50:
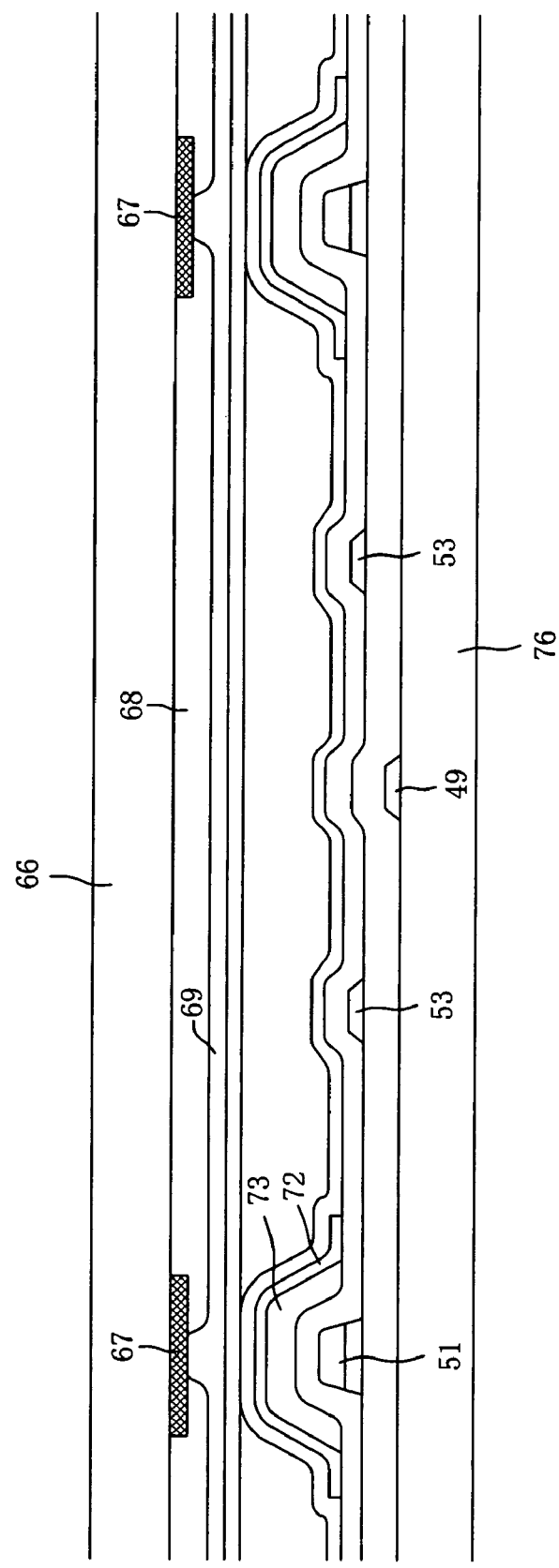
FIG. 50 is a cross sectional view showing a further example of structure in the transverse electric field type liquid crystal panel in the present invention.
Figure 71:
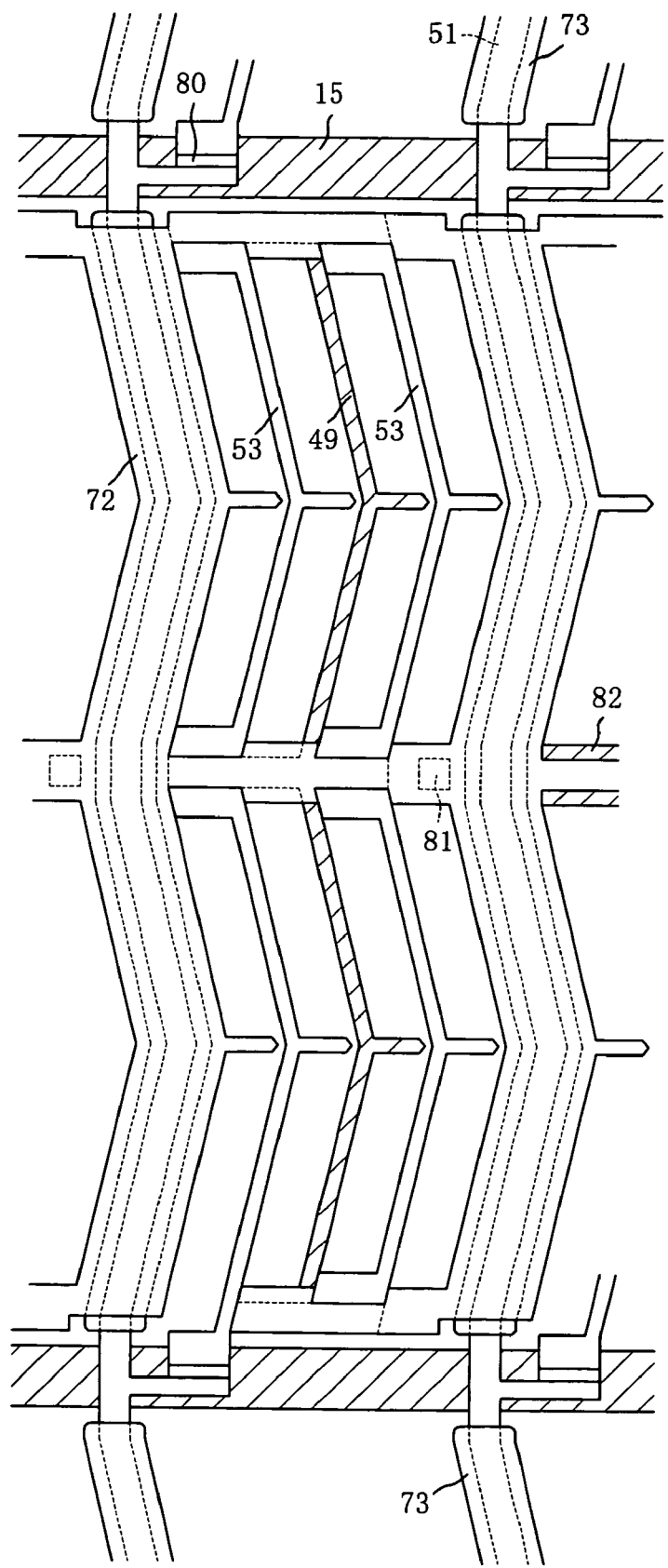
FIG. 71 is a plan view showing a further example of structure in the transverse electric field type liquid crystal display device according to the present invention.
Figure 75:
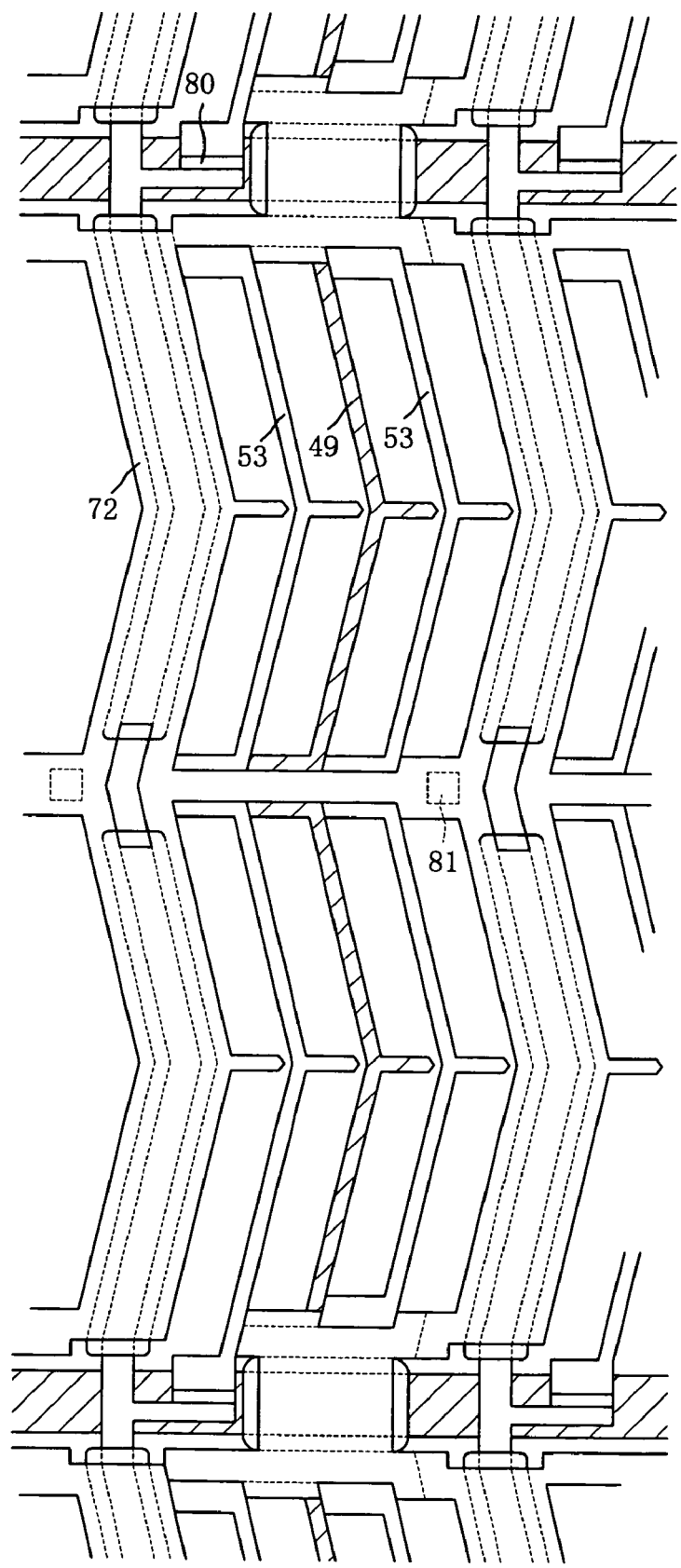
FIG. 75 is a plan view showing a further example of structure in the transverse electric field type liquid crystal display device according to the present invention.

FIGS. 48, 49, 50, 71 and 75 show the transverse electric field type liquid crystal panel of the second embodiment of the present invention. FIGS. 48-50 are cross sectional views thereof and FIGS. 71 and 75 are plan views thereof. In the second embodiment, the common electrode within the pixel is formed under the passivation layer and the gate insulation film. The lower layer common electrodes 75 for shielding the electric field of the video signal lines 51 and the common electrodes 49 within the pixel for driving the liquid crystal element are constructed at the same time on the same layer where the scanning lines are formed. The video signal lines 51 and the liquid crystal drive electrodes 53 are constructed at the same time on the same layer.

In the example of FIG. 49, as opposed to the example of FIG. 48, the upper layer shielding common electrodes 72 have a wider width than that of the lower layer shielding common electrodes 75. Therefore, the structure shown in FIG. 49 is able to achieve a larger aperture ratio than the structure shown in FIG. 48. As shown in FIGS. 48-50, in the second embodiment, since the common electrode 49 within the pixel is constructed on the layer lower than the passivation layer 55 and the gate insulation layer 9, a voltage required to drive the liquid crystal tends to become higher.

With the structure used in the second embodiment of the present invention, as shown in FIGS. 71 and 75, the liquid crystal drive electrode 53 is sandwiched by the lower layer common electrode 82 connected to the common electrode 49 within the pixel and the upper shielding layer common electrode 72 through the gate insulation layer and the passivation layer. With this structure, it is possible to have a large hold capacity in a small area, thereby enabling to achieve a large aperture ratio.

Third Preferred Embodiment

Figure 51:
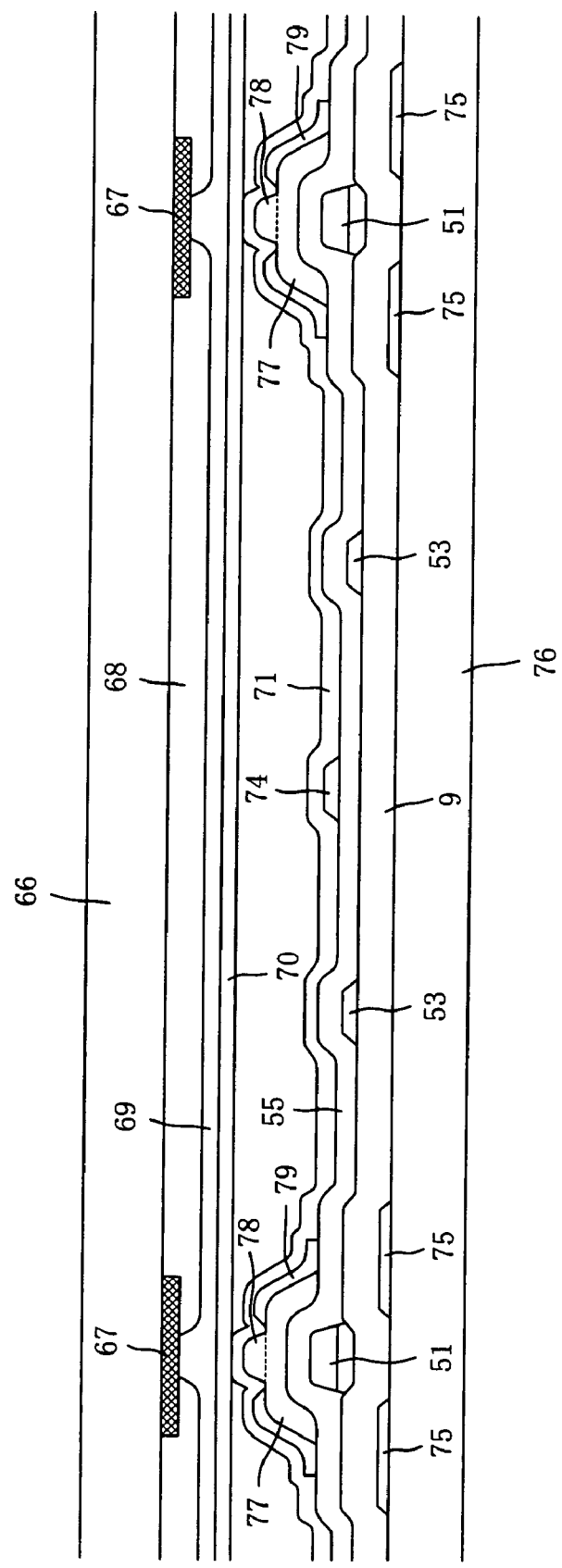
FIG. 51 is a cross sectional view showing a further example of structure in the transverse electric field type liquid crystal panel in the present invention.
Figure 52:
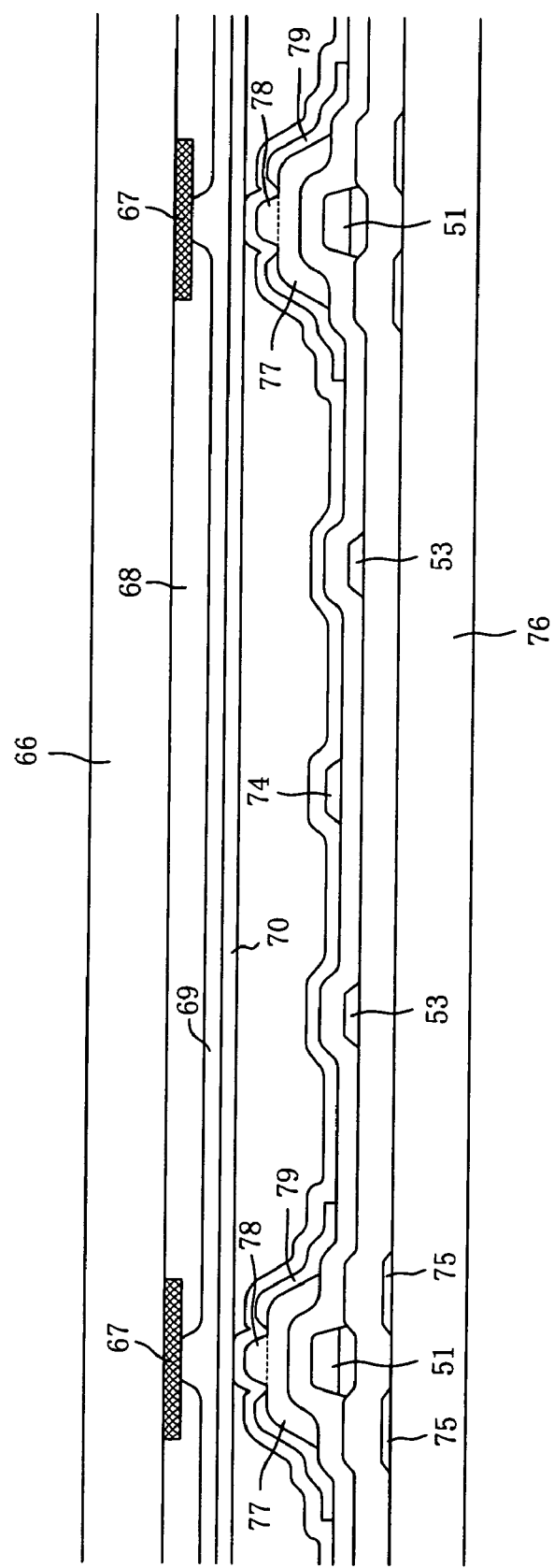
FIG. 52 is a cross sectional view showing a further example of structure in the transverse electric field type liquid crystal panel in the present invention.
Figure 53:
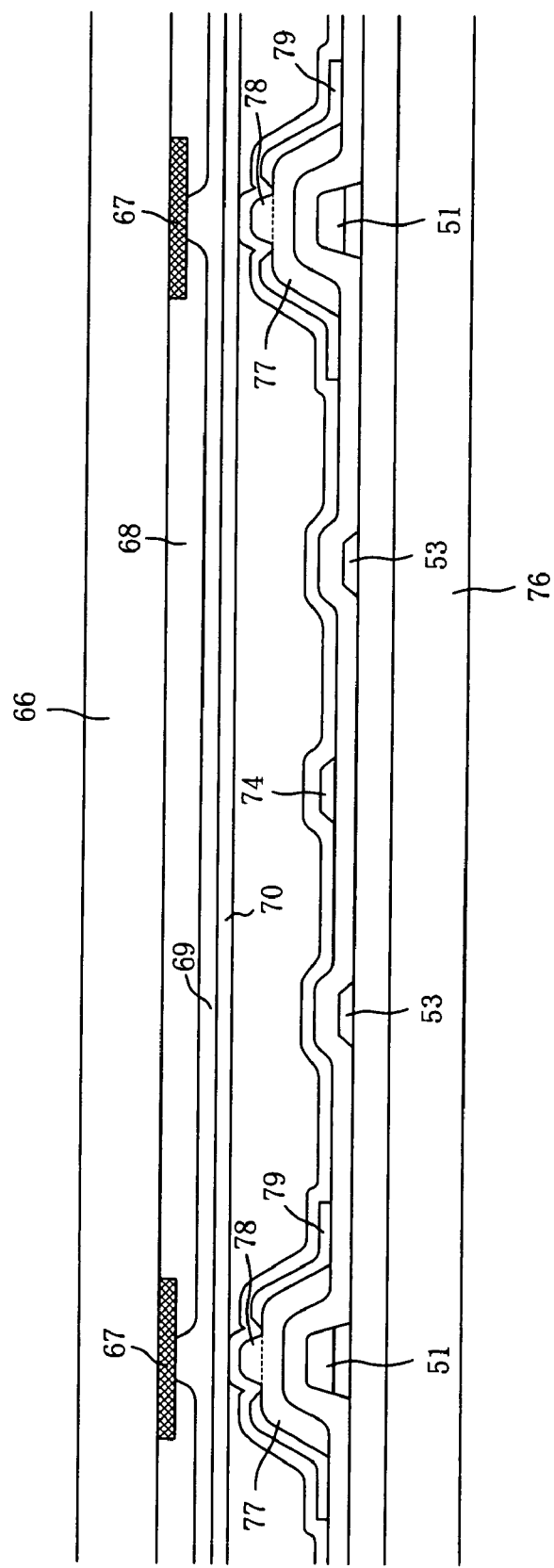
FIG. 53 is a cross sectional view showing a further example of structure in the transverse electric field type liquid crystal panel in the present invention.

FIGS. 51, 52, 53, 69, 73, 77, 79 and 81 show the transverse electric field type liquid crystal panel in the third embodiment of the present invention, FIGS. 51-53 are cross sectional views thereof and FIGS. 69, 73, 77, 79 and 81 are plan views thereof. In the drawings, a numeral 77 denotes an insulation (dielectric) bump covering the video signal line 51, a numeral 78 denotes a spacer formed on the bump 77 covering the video signal line 51, and a numeral 79 denotes a shielding common electrode formed on the side walls of the bump 77. The structure in the third embodiment is basically the same as that of the first embodiment noted above except that the spacer bump 73 in the first embodiment is separated to two structures, one is the insulation bump 77 that covers the video signal line 51 and the other is the spacer 78 that determines the liquid crystal cell gap.

One of the features of the present invention is that the insulation bump 77 that covers the video signal line 51 and the spacer 78 that determines the liquid crystal cell gap can be produced through the same photolithography process. By utilizing a light transmission adjustable photomask (halftone photomask) as shown in FIGS. 1A-1B and 2A-2B and positive photoresist, it is possible to produce the cross sectional shape of the bump 77 and spacer 78 such as the one shown in FIG. 104. It is also possible to produce the cross sectional shape the bump 77 and spacer 78 shown in FIG. 104 by incorporating a two-step exposure technique (half exposure and supplemental exposure) as shown in FIGS. 5A-5C and FIGS. 6A-6C with use of an ordinary photomask and the positive photoresist.

In FIGS. 1A-1B, FIGS. 2A-2B, a numeral 1 denotes a silica glass substrate forming the photomask, a numeral 2 denotes a metal layer (Cr or Mo) on the glass substrate for controlling the amount of light pass therethrough, a numeral 3 denotes a translucent (halftone or gray) area of the photomask formed by slit patterns, a numeral 4 denotes a translucent (halftone or gray) area of the photomask (a-Si, TiSix, MoSix or Ti), a numeral 5 denotes a transparent area of the photomask, a numeral 6 denotes an area on a positive photoresist layer after development where UV exposure is blocked, a numeral 7 denotes an area on the positive photoresist layer after development where the UV exposure is made through the halftone (translucent) area of the photomask, and a numeral 8 denotes an area where the positive photoresist is completely removed after development, a numeral 9 denotes a gate insulation film, a numeral 10 denotes a thin film semiconductor layer (non-doped layer), a numeral 11 denotes a thin film semiconductor layer (doped layer, i.e., ohmic contact layer), a numeral 12 denotes a barrier metal layer, and a numeral 13 denotes a low resistance metal layer.

Figure 1A:
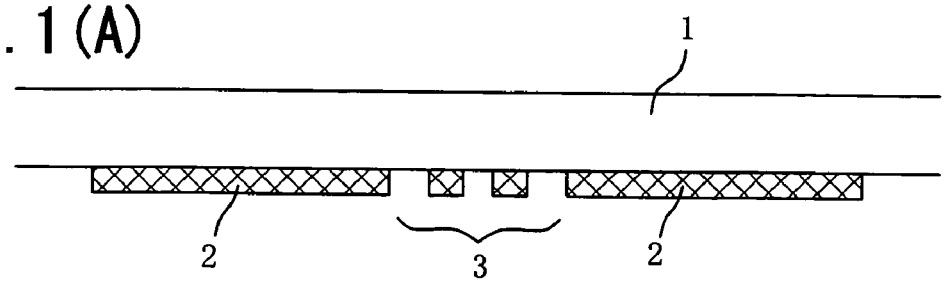
FIGS. 1A-1B are cross sectional views showing the halftone exposure photomask and the positive photoresist after development on the active matrix substrate according to the present invention.
Figure 1B:
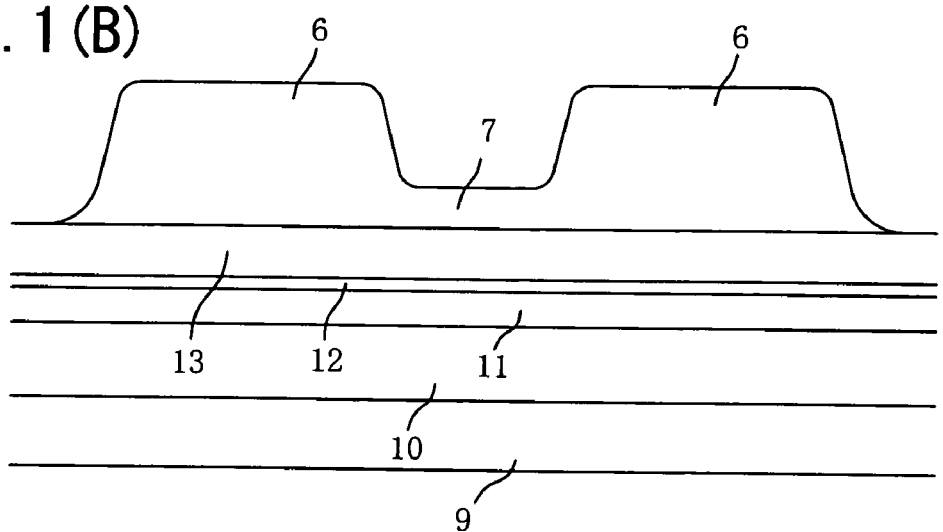
Figure 2A:
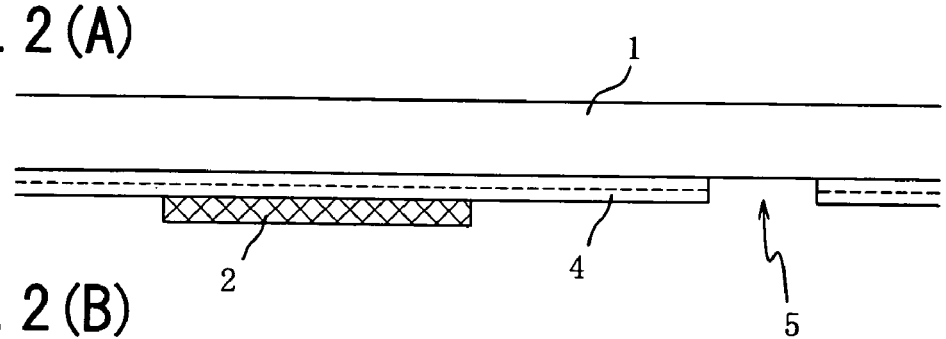
FIGS. 2A-2B are cross sectional views showing the halftone exposure photomask and the positive photoresist after development on the active matrix substrate according to the present invention.
Figure 2B:
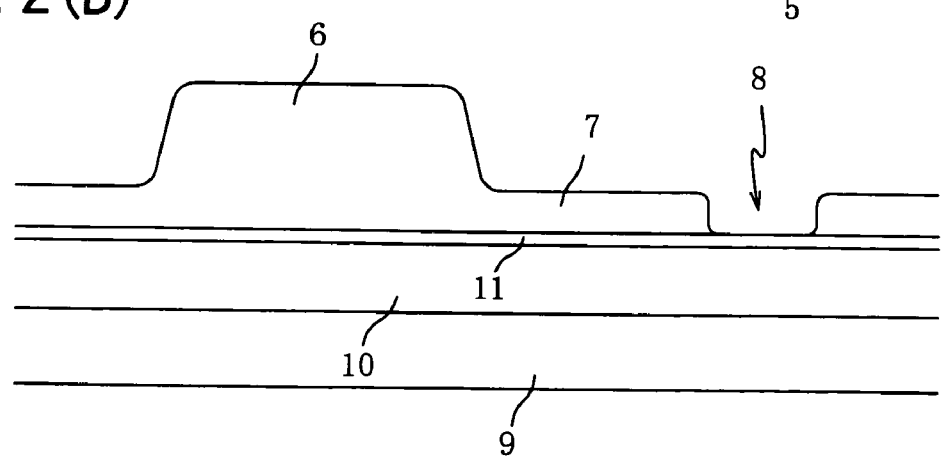
Figure 3:
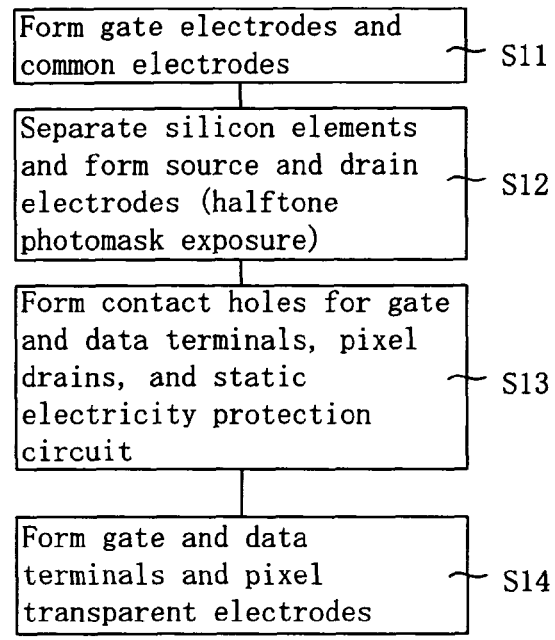
FIG. 3 is a flow chart showing the four operational steps involved in the photomasking process in the conventional technology.

As shown in FIGS. 1A and 1B, unlike the opaque metal area 2 which completely blocks the UV light transmission, the area 3 allows the UV light to pass by a small amount (halftone) depending on the density of the slits. Thus, it is possible to create the area 6 where the photoresist is intact after development as well as the area 7 where the photoresist is removed but still remained (halftone exposed area). As shown in FIGS. 2A and 2B, the photomask includes the opaque area 2 and the translucent layer 4, and the transparent area 5. Thus, the photoresist is completely removed at the area 8 corresponding to the transparent area 5, the photoresist is removed halfway at the area (halftone exposed area) 7 corresponding to the translucent area 4, and the photoresist is unaffected in the area 6 corresponding to the opaque area 2. With use of the light transmission adjustable photomask shown in FIGS. 1A-1B and 2A-2B, the spacer bump 73 having the cross sectional structure shown in FIG. 104 can be created by one photolithography process.

As noted above, the spacer bump 73 having the cross sectional structure shown in FIG. 104 can also be created with use of the normal photomask through the two-step exposure method shown in FIGS. 5A-5C and 6A-6C. The photomask in this example has no halftone area and is configured only by the glass substrate 1 and the opaque metal layer 2. In FIGS. 5A-5C and 6A-6C, a numeral 19 denotes a UV light, a numeral 20 denotes an area on the positive photoresist layer after development where the UV light exposure is completely blocked, a numeral 21 denotes an area where the photoresist is removed after being completely exposed by the UV light 19, a numeral 22 denotes an area on the positive photoresist layer after development where the UV light exposure is made incompletely (under exposure), and a numeral 23 denotes an area where the photoresist is partially exposed by the second step of UV exposure, a numeral 24 denotes an area where the photoresist is completely removed by the first and second steps of UV light exposure, and a numeral 25 denotes an fθ lens used in the second exposure step of FIG. 6B.

In the example of FIGS. 5A-5C, in the first exposure step of FIG. 5A, the photoresist area 20 is not exposed because of the photomask metal (opaque) 2 and the photoresist area 21 is exposed by the UV light 19 in the degree that the photoresist 21 will not be completely removed after exposure (under exposure). In the second exposure step shown in FIG. 5B, the photoresist area 21 that has been exposed in the first step is further exposed at the portion 23 at the position corresponding to the transparent portion of the photomask. Thus, as shown in FIG. 5C, the photoresist is completely removed at the area 24, thereby creating the spacer 78 and bump 77 having the cross sectional structure shown in FIG. 104.

In the example of FIGS. 6A-6C, the first exposure step (under exposure) is the same as that of FIG. 5A. In the second exposure step shown in FIG. 6B, the photoresist area 21 that has been exposed in the first step is further exposed at the portion 23 with use of the fθ lens. It should be noted that the photomask is not used in the second exposure step of FIG. 6B. The fθ lens has a function of producing focus points on the same flat surface of a relatively large area on the substrate. Thus, the relatively large area of the photoresist can be exposed uniformly without using a photomask. Accordingly, as shown in FIG. 6C, the photoresist is completely removed at the area 24, thereby creating the spacer 78 and bump 77 having the cross sectional structure shown in FIG. 104.

However, it is difficult, although not impossible, to produce the bump and spacer with sufficient flexibility when using the positive photoresist. Therefore, one of the features of the present invention is to provide a method to utilize negative photoresist that has a more flexible characteristic to produce the cross sectional shape shown in FIG. 104 with a singe photolithography process. It should be noted that types of negative photoresist that are susceptible to oxygen fault can suffer, when a quantity of exposure light is small, from accelerated photopolymerization by a small amount of ultraviolet light at the areas contacting with the glass substrate while it can suffer from lack of reaction in the photopolymerization by the oxygen in the atmosphere at the areas exposed to the atmosphere.

Figure 98:
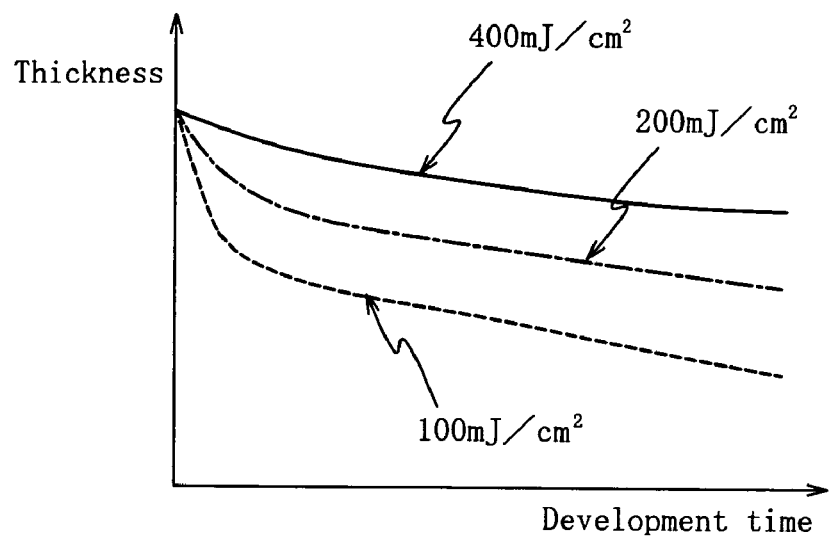
FIG. 98 is a graph showing the characteristics concerning the thickness of the negative photoresist after development used in the halftone process of the present invention.
Figure 99:
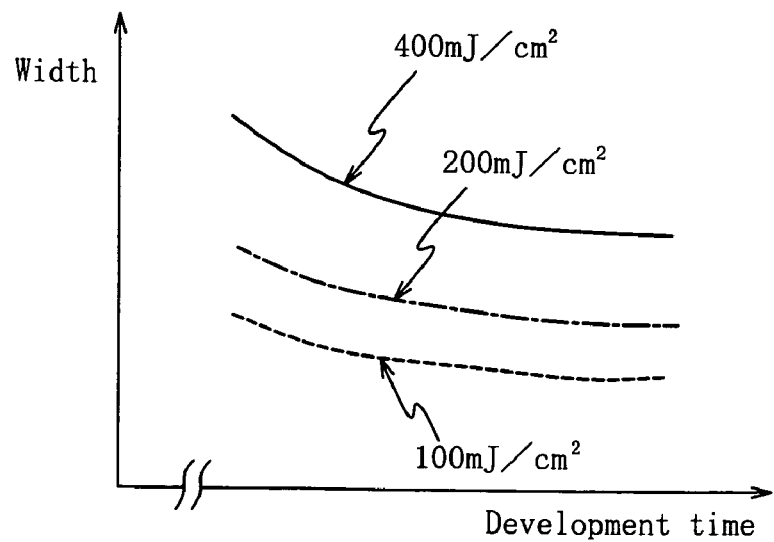
FIG. 99 is a graph showing the characteristics concerning the line width of the negative photoresist after development used in the halftone process of the present invention.
Figure 100:
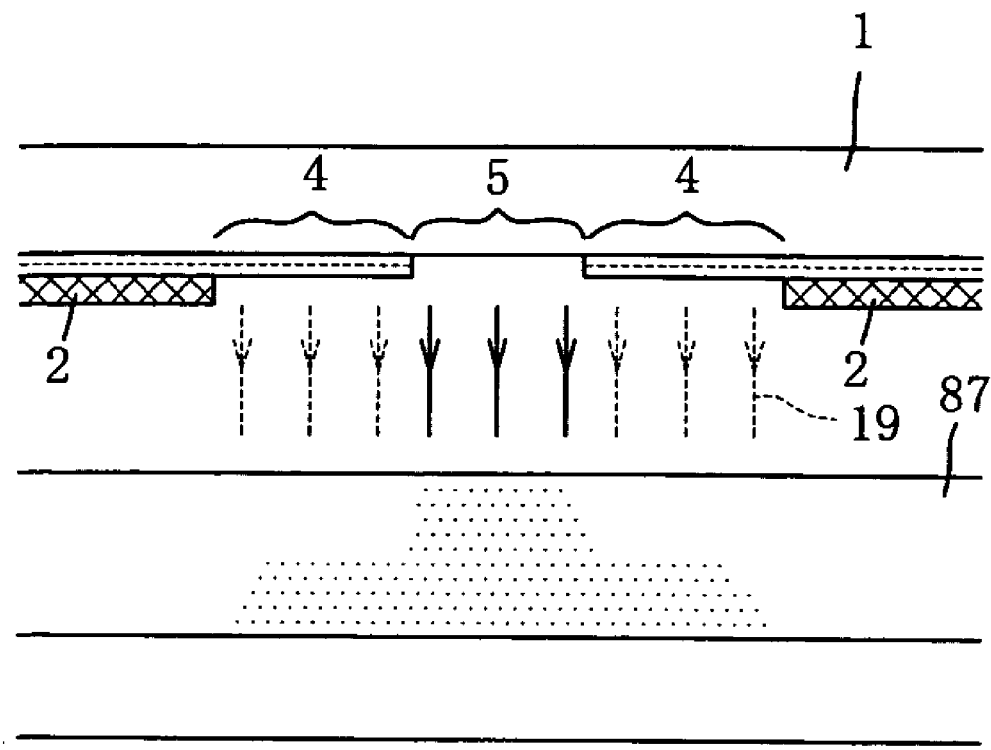
FIGS. 100A-100B are cross sectional views showing an example of cross sectional structures of the photomask used in the halftone exposure of the present invention and the negative photoresist after the development.
Figure 100:
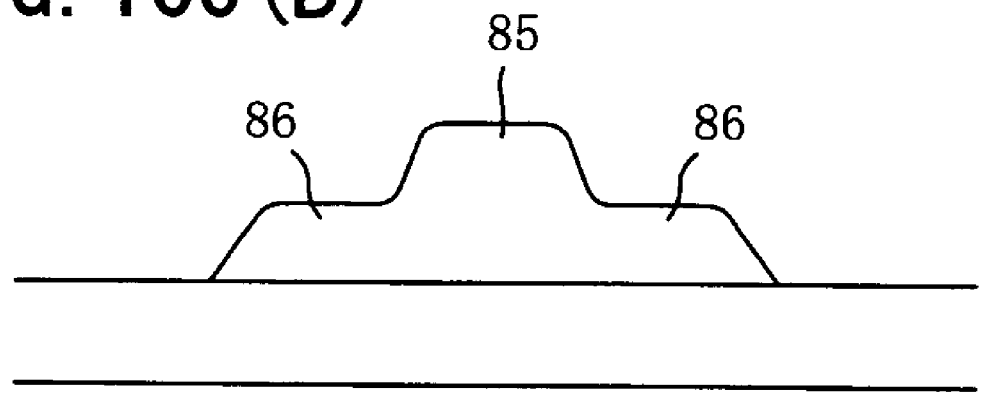
Figure 101:
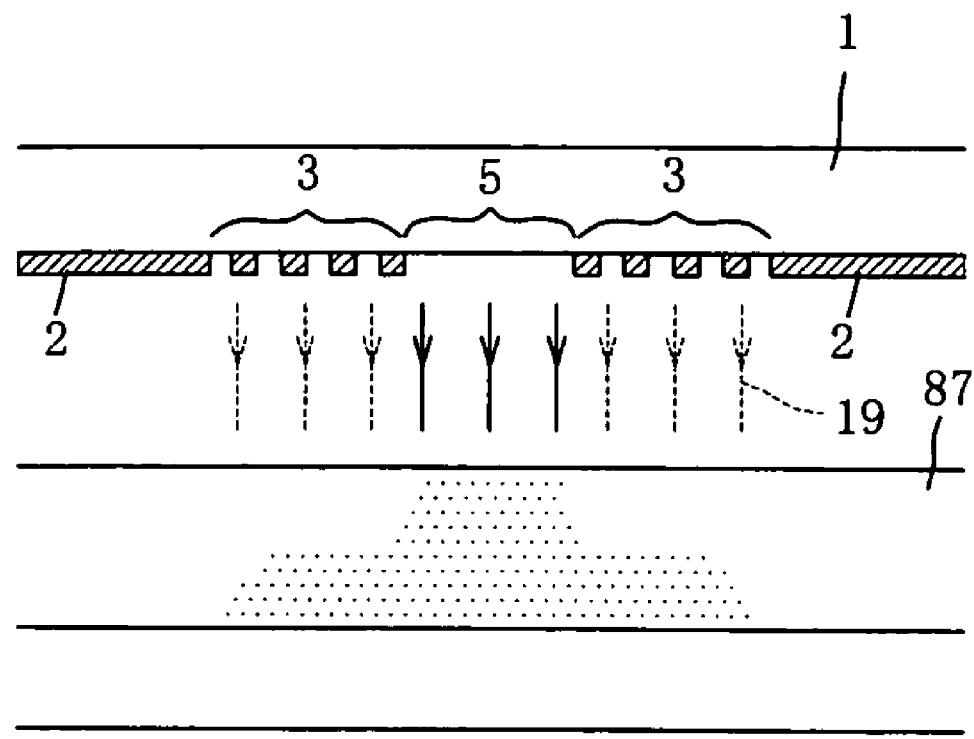
FIGS. 101A-101B are cross sectional views showing another example of cross sectional structures of the photomask used in the halftone exposure of the present invention and the negative photoresist after the development.
Figure 101:
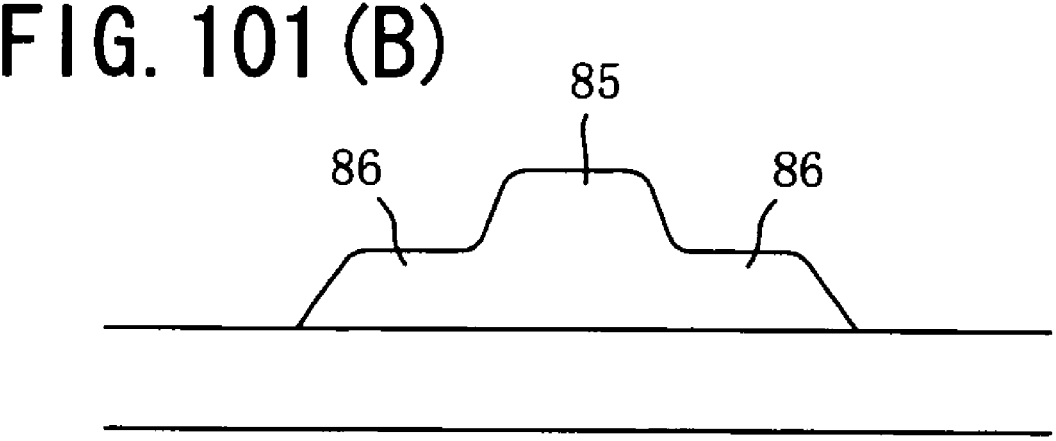

FIGS. 98 and 99 show the characteristics for this type of negative photoresist in terms of film thickness and line width with respect to parameters of the amount of exposure light and the length of the development. Using this type of negative photoresist and a light transmission adjustment photomask (halftone photomask) as shown in FIGS. 100A-100B and 101A-101B, it is possible to achieve the shape of the spacer and bump shown in FIG. 104. The example of FIGS. 100A-100B corresponds to the process shown in FIGS. 2A-2B where the photomask includes the transparent portion 5, translucent portion (halftone) 4, and the opaque portion 2. The example of FIGS. 101A-101B corresponds to the process shown in FIGS. 1A-1B where the photomask includes the slit pattern (halftone photomask) 3 for incompletely exposing the photoresist in addition to the transparent portion and the opaque portion.

Alternatively, it is also possible to utilize a two-step exposure technique using the partial area complete exposure step and the half exposure step as shown in FIGS. 102A-102C and 103A-103C. The example of FIGS. 102A-102C corresponds to the process shown in FIGS. 5A-5C where the two different photomasks are used in the first and second exposure steps. The example of FIGS. 103A-103B corresponds to the process shown in FIGS. 6A-6C where the f$\theta$ lens 25 is used in the second exposure step. In FIGS. 102A-102C and 103A-103C, a numeral 85 denotes an area of the negative photoresist after development where the photoresist is intact by the complete exposure of UV light, a numeral 86 denotes an area on the negative photoresist where the photoresist is removed but still remains by the incomplete exposure of UV light, and a numeral 87 denotes an area on the negative photoresist which is not exposed because of the opaque pattern 2 on the photomask. In this manner, since the expensive light transmission adjustment photomask (halftone photomask) does not need to be used, but an inexpensive ordinary photomask can be used in this example to produce the spacer 78 and bump 77 having the shape of FIG. 104.

Figure 116:
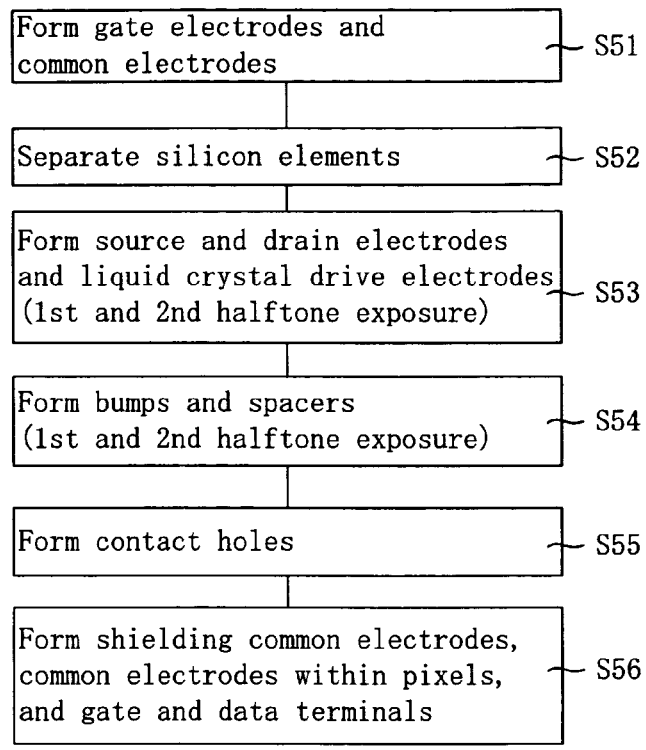
FIG. 116 is a flow chart showing an example of production flow involved in the six-step photomasking process of the present invention.
Figure 117:
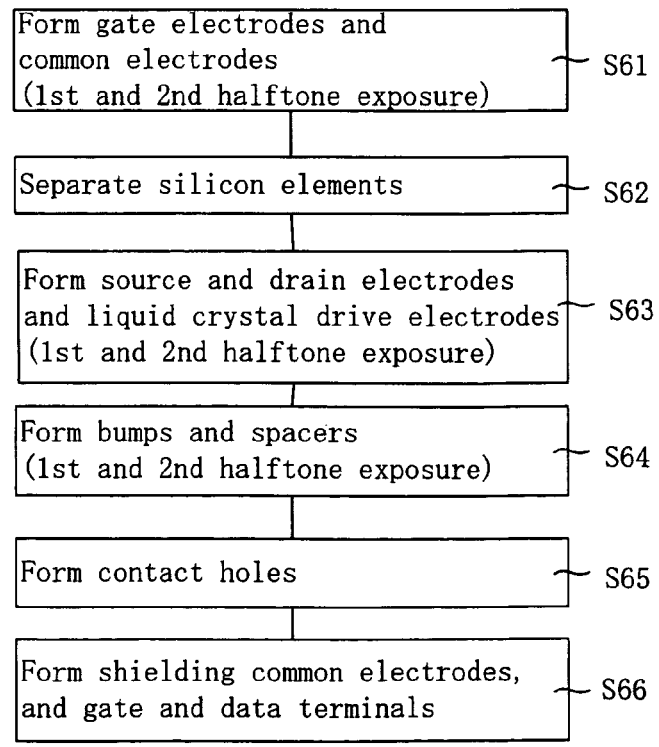
FIG. 117 is a flow chart showing another example of production flow involved in the six-step photomasking process of the present invention.
Figure 118:
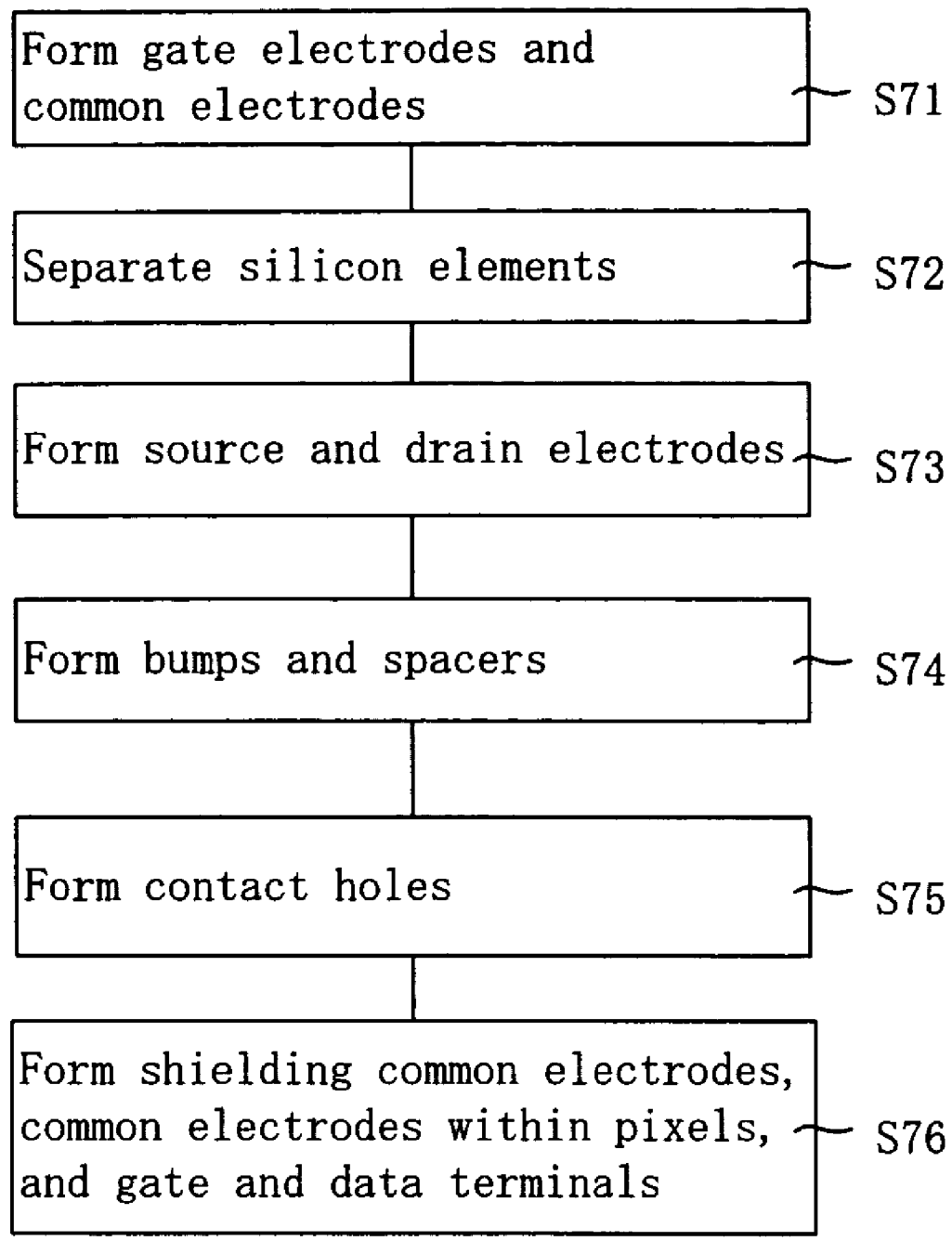
FIG. 118 is a flow chart showing a further example of production flow involved in the six-step photomasking process of the present invention.

FIGS. 116-118 show examples of production flow using the six-step photomasking process for implementing the third embodiment of the present invention. In the example of FIG. 116 which incorporates the halftone exposure technique, at step S51, gate electrodes (scanning line patterns) and common electrodes are formed at the same time. At step S52, the silicon elements are separated from a semiconductor thin film layer for forming the thin film transistors. Then, in step S53, through the first and second halftone exposure processes, source and drain electrodes of the thin film transistors and liquid crystal drive electrodes are formed at the same time.

In the next step S54, the bumps that cover the video signal lines for shielding the electric field and the photolithography spacers that define the liquid crystal cell gap are formed through the first and second halftone exposure processes. At step S55, contact holes for terminal portions and circuits for static electricity protection are formed through an etching process. In the last step S56, the common electrodes for shielding the video signal lines, the transparent common electrodes within the pixel, and the gate and data electrodes at the same time.

In the example of FIG. 117 which incorporates the halftone exposure technique, at step S61, gate electrodes (scanning line patterns) and common electrodes are formed at the same time through the first and second halftone exposure processes. At step S62, the silicon elements are separated from the semiconductor thin film layer for forming the thin film transistors. Then, in step S63, through the first and second halftone exposure processes, source electrodes and drain electrodes of the thin film transistors, and liquid crystal drive electrodes are formed at the same time.

In the next step S64, the bumps that cover the video signal lines for shielding the electrical field and the photolithography spacers are formed through the first and second halftone exposure processes. At step S65, contact holes for terminal portions and circuits for static electricity protection are formed through an etching process. In the last step S66, the common electrodes for shielding the video signal lines, gate electrodes and data electrodes are formed at the same time.

In the example of FIG. 118, at step S71, gate electrodes (scanning line patterns) and common electrodes are formed at the same-time. At step S72, the silicon elements are separated from the semiconductor thin film layer for forming the thin film transistors. Then, in step S73, source electrodes and drain electrodes are formed at the same time. In the next step S74, the bumps that cover the video signal lines and the photolithography spacers are formed. At step S75, contact holes for terminal portions and circuits for static electricity protection are formed. In the last step S76, the common electrodes for shielding the video signal lines, common electrodes within the pixels, gate electrodes and data electrodes are formed at the same time.

Still referring to FIG. 104, preferably, the thickness h1 of the bump 77 that covers the video signal line 51 is preferably in the range between 1.5 micrometers and 3.5 micrometers, and the spacer 78 projecting from the bump 77 has a height h2 of about 0.2-2.0 micrometers. As to the density of the spacers 78, about one (1) to seventy five (75) of them will be formed in an area of one square millimeter. The size of the area for the spacer is within a range between 200 square micrometers and 2,000 square micrometers within one square millimeter. It is important the upper layer shielding common electrodes will not be positioned at the area where the spacer is projected. The height h2 of the spacers 78 constructed on the bump 77 must be able to deform in the range of 0.2-0.5 micrometers when a pressure is applied from the atmosphere during a liquid crystal injection vacuum attachment alignment process. If the spacer 78 is covered by the upper layer shielding common electrode 79, a problem may arise where the deformation of the spacer 78 by the atmospheric pressure causes the upper layer shielding common electrodes to peel off.

Examples of material used for forming the upper layer shielding common electrodes 79 include conductive material with visible light transmission of 20 percent or more such as titanium metal compound including titanium nitride (TiNx), titanium oxide nitride (TiOxNy), titanium silicide (TiSix), titanium silicide nitride (TiSixNy), or metal oxide transparent conductive material mainly composed of indium oxide (In2O3) or zinc oxide (ZnO).

As shown in FIG. 104, similar to the first embodiment described above, it is important to have the taper angle $\theta$ at an edge portion of the bump 77 to be as small as possible ordinarily this taper angle $\theta$ should be set to less than 30 degrees. By keeping the taper angle small, movements of the tips of the rubbing cloth hair can be performed smoothly during the rubbing alignment treatment process, which eliminates alignment defects. When the taper angle $\theta$ is larger than 45 degrees, instances occur where the tips of rubbing cloth hairs cannot make contact with the surface around the tapered area and may result in areas of alignment defects. If such alignment defects occur, such an area causes light to leak during the black display, which seriously lowers the contrast of the display. Structures disclosed by Japanese patent laid-open publication numbers 2002-258321 and 2002-323706 do not allow for smooth movements of the tips of the rubbing cloth hairs, therefore, instances occur where the tips of the rubbing cloth hairs cannot reach around the tapered area and cannot completely prevent the occurrence of alignment defects.

Figure 77:
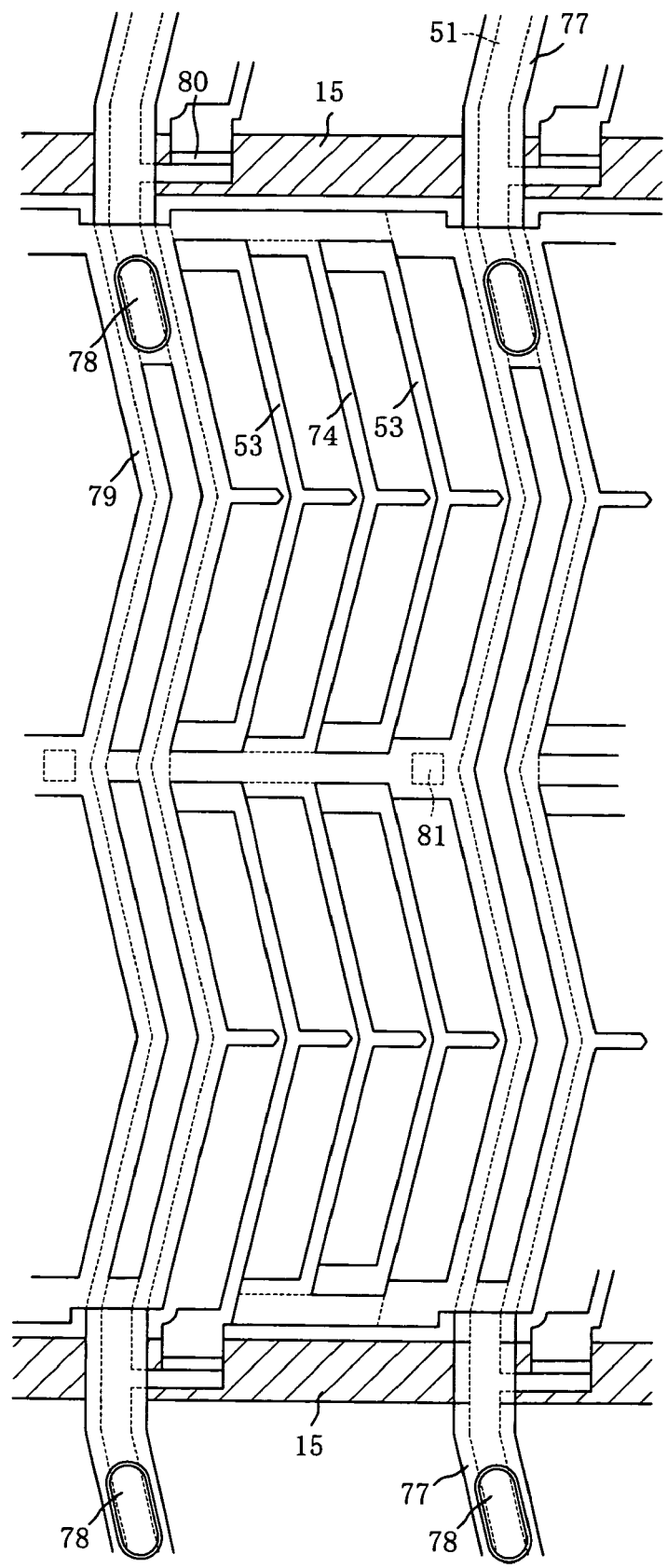
FIG. 77 is a plan view showing a further example of structure in the transverse electric field type liquid crystal display device according to the present invention.
Figure 79:
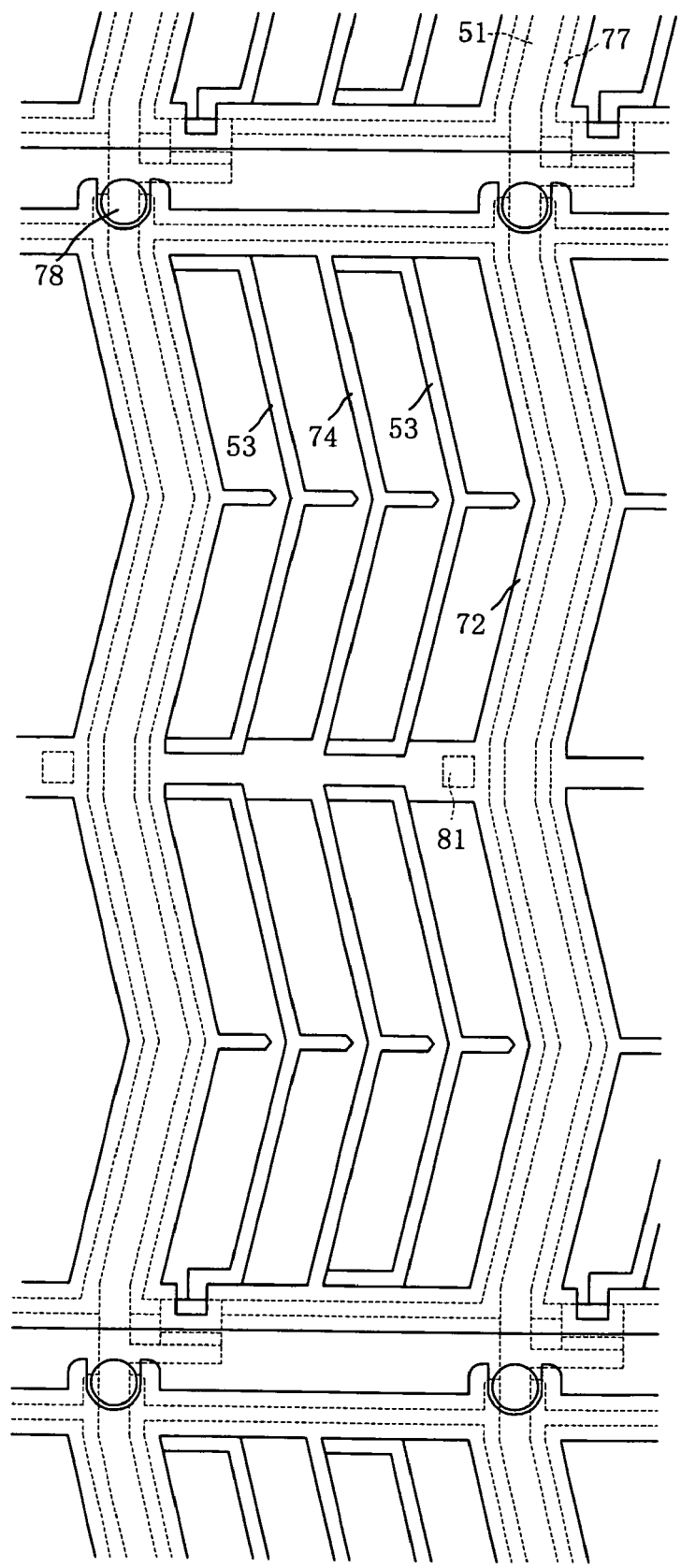
FIG. 79 is a plan view showing a further example of structure in the transverse electric field type liquid crystal display device according to the present invention.
Figure 81:
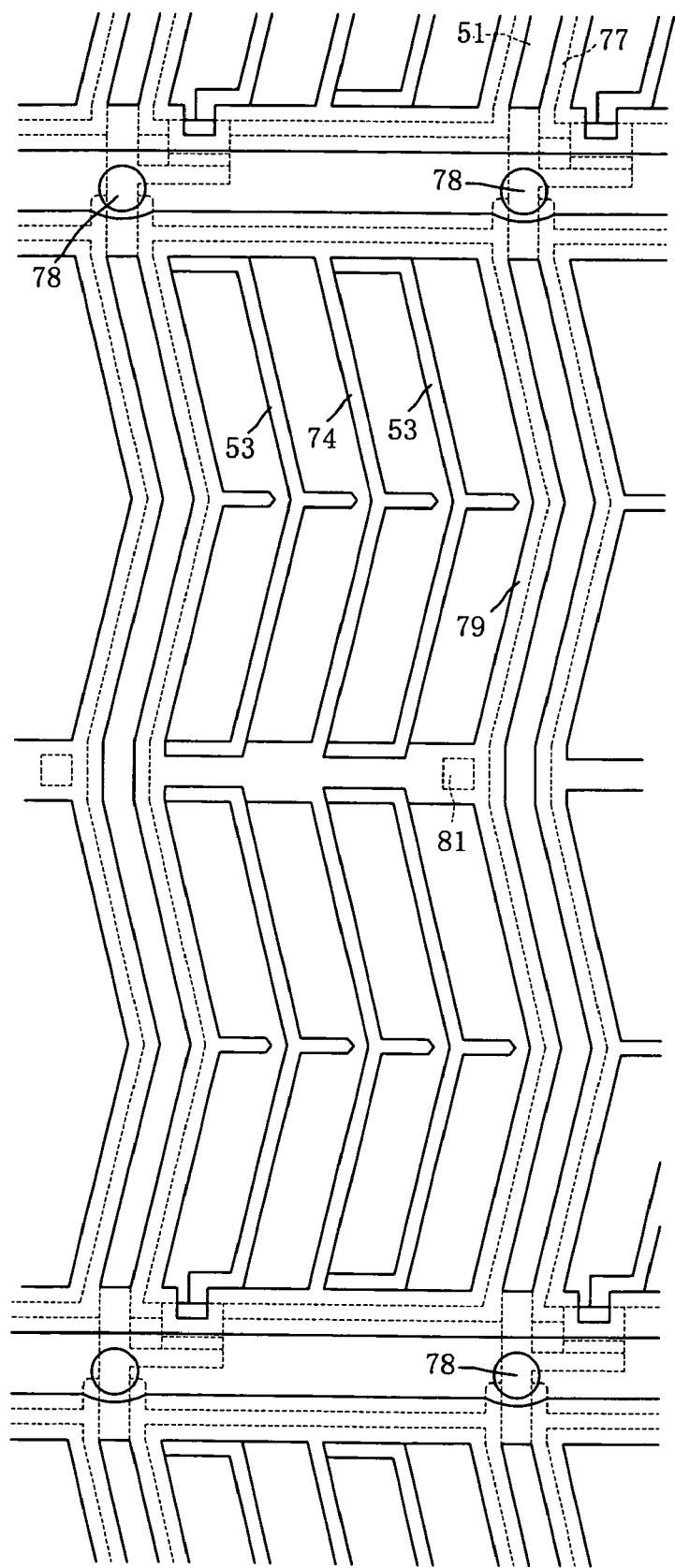
FIG. 81 is a plan view showing a further example of structure in the transverse electric field type liquid crystal display device according to the present invention.

As shown in FIG. 77 the shape of the spacer does not have to be circular but can be an oval shape. In the example of FIGS. 79 and 81, the shape of the spacer is circular. When the spacer 78 is provided over the bump 77 that covers the video signal line as in the present invention, it is possible to construct the bump 77 at the intersecting points of the scanning lines 15 and the video signal line 51 since there is nothing to obstruct the diffusion of the liquid crystal during the liquid crystal injection vacuum attachment and alignment process. It is also possible to construct the bumps 77 on top of the scanning lines as shown in FIGS. 79 and 81 so that the bumps are arranged in a mesh like fashion throughout the substrate. When the upper layer shielding common electrode 72 completely covers or overlaps the video signal line 51 and scanning line 15 through the bump 77, the light shielding film on the color filter substrate side becomes unnecessary, which can increase the aperture ratio to the maximum level.

As shown in the example of FIG. 81, the structure in which the upper layer shielding common electrodes 79 are constructed on both side walls of the bump 77 that covers the scanning line 15 and on both side walls of the bump 77 that covers the video signal line 51 is best suited for an ultra large screen liquid crystal display device. This is because this structure can minimize the distortion in the video signal line waveforms and the scanning line waveforms.

Preferred Embodiment 4

Figure 54:
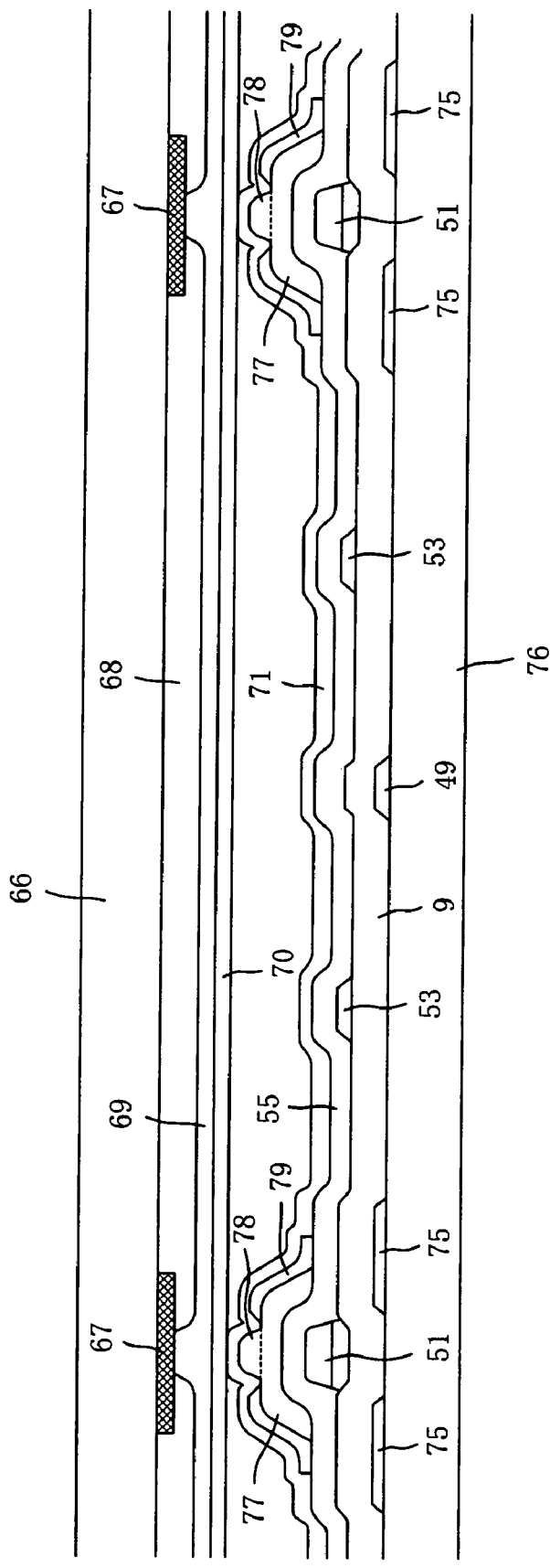
FIG. 54 is a cross sectional view showing a further example of structure in the transverse electric field type liquid crystal panel in the present invention.
Figure 55:
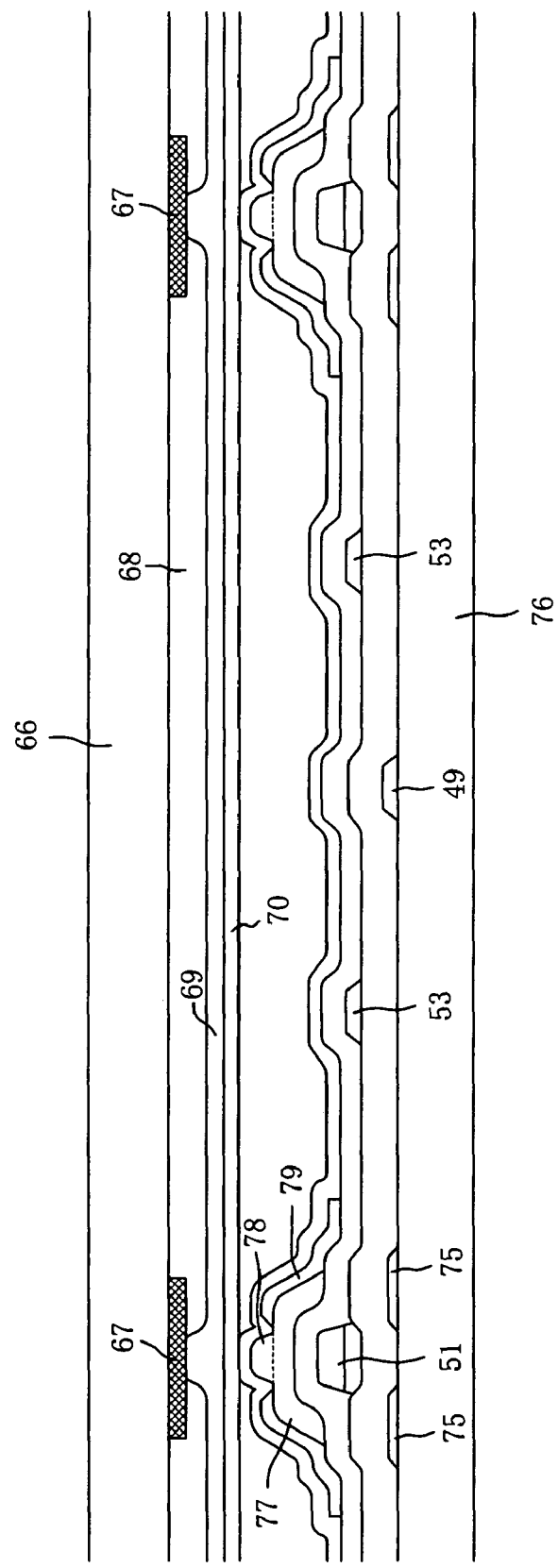
FIG. 55 is a cross sectional view showing a further example of structure in the transverse electric field type liquid crystal panel in the present invention.
Figure 56:
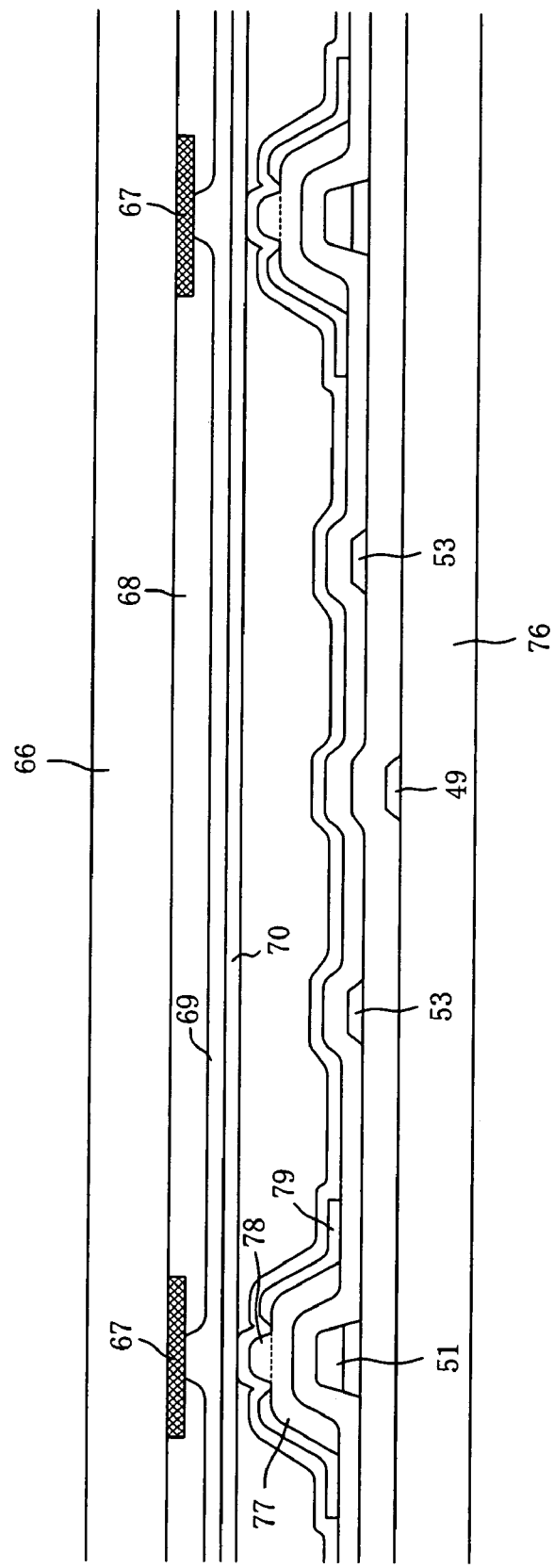
FIG. 56 is a cross sectional view showing a further example of structure in the transverse electric field type liquid crystal panel in the present invention.

FIGS. 54, 55 and 56 are the cross sectional views showing the structures of the transverse electric field type liquid crystal panel in the fourth embodiment of the present invention. This structure is basically the same as that of the second embodiment described above except that the spacer bump 73 of the second embodiment is separated into an insulation bump 77 that covers the video signal line and a spacer 78 that determines the liquid crystal cell gap.

In the second embodiment noted above, the dielectric (insulation) bump 73 that covers the video signal line 51 also functions as a spacer to determine the cell gaps. In the fourth embodiment, however, as in the third embodiment, the functions of the dielectric (insulation) bump 77 that covers the video signal line and the spacer 78 that determines the liquid cell gap are completely separated. The dielectric bump 77 of the third embodiment and fourth embodiment can completely cover the scanning line 15 and the video signal line 51. Therefore, by constructing an upper layer shielding common electrode 79 on both side walls of the insulation bump 77, it is possible to keep the distortion of signal waveform by the video signal line 51 and the scanning lines to the minimum level, and thus, achieve the maximum aperture ratio.

The spacer 78 shown in FIGS. 54, 55, and 56 are not covered by the upper layer shielding common electrodes 79 so that the dielectric material is projected by itself. This structure is advantageous in that the common electrode layer does not peel off when the pressure from the atmosphere is applied during liquid crystal injection vacuum attachment alignment process.

As has been described in the foregoing, in the structures of the first through fourth embodiments, the video signal line 51 and the liquid crystal drive electrode 53 are completely covered by the gate insulation layer 9 and the passivation layer 55 in the up and down directions. Further, the video signal line and the liquid crystal drive electrode are provided on the layer different from that of the shielding common electrodes and the common electrodes within the pixel. Therefore, even when a pattern fault occurs, the possibility of shorting each other becomes unlikely, thereby minimizing the possibility of pixel defect.

Preferred Embodiment 5

Figure 57:
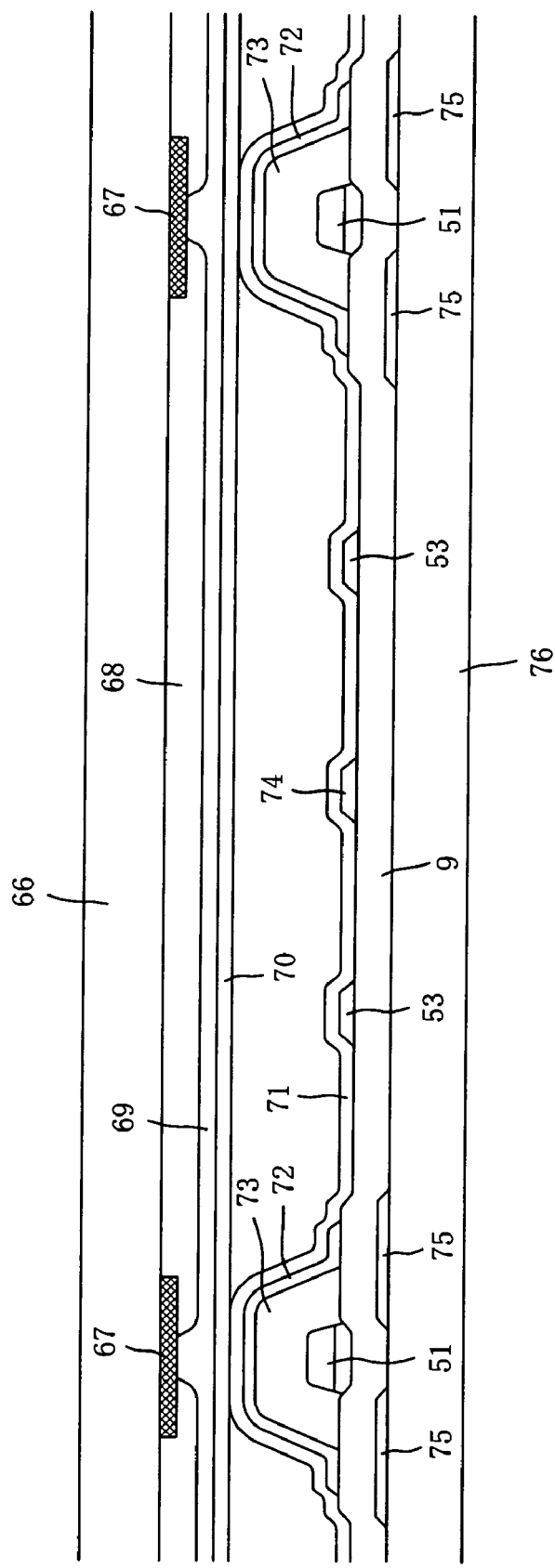
FIG. 57 is a cross sectional view showing a further example of structure in the transverse electric field type liquid crystal panel in the present invention.
Figure 58:
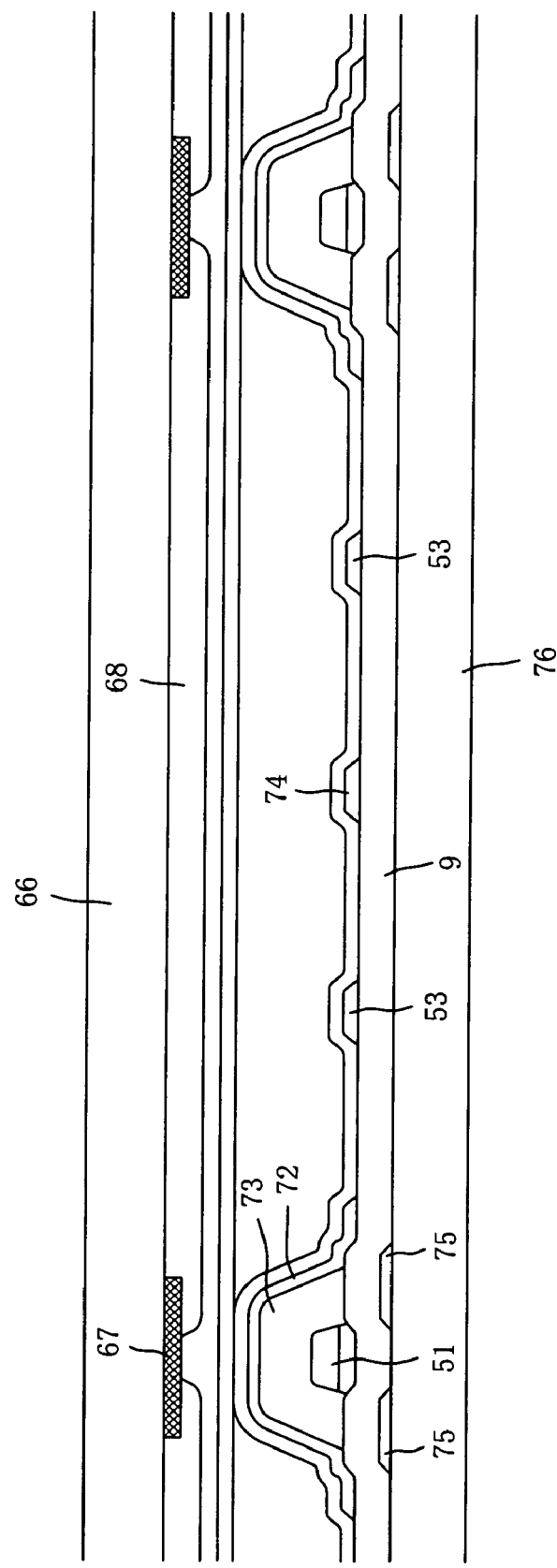
FIG. 58 is a cross sectional view showing a further example of structure in the transverse electric field type liquid crystal panel in the present invention.
Figure 59:
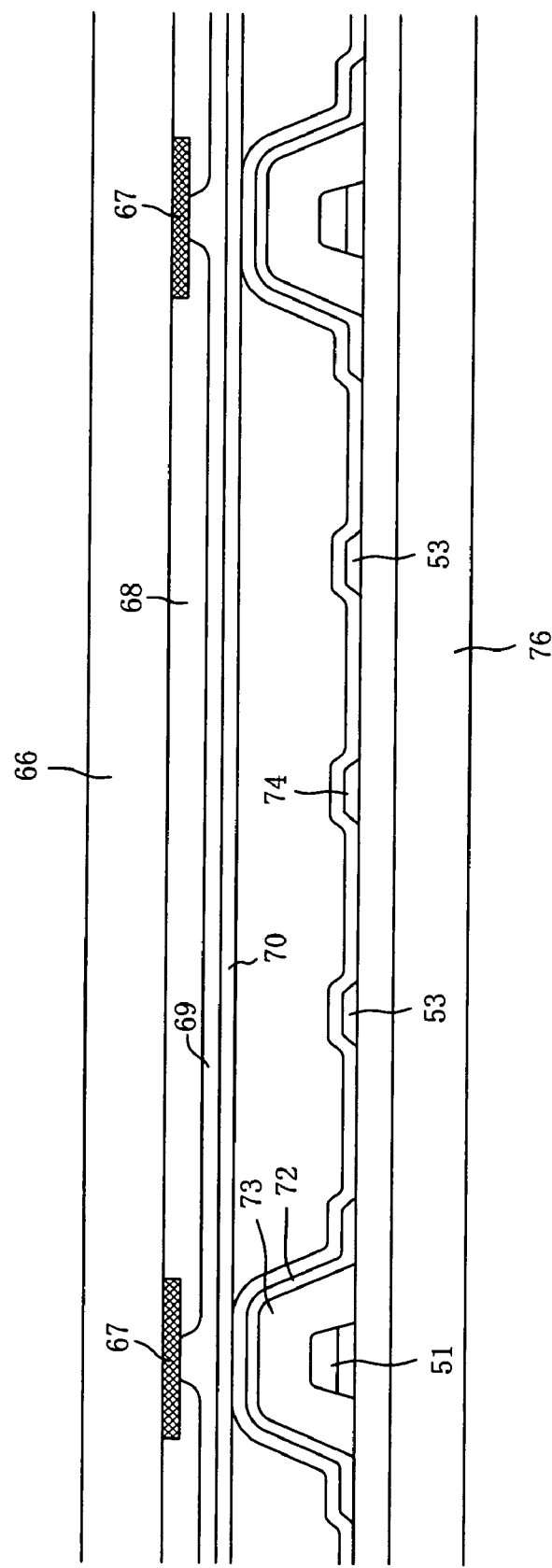
FIG. 59 is a cross sectional view showing a further example of structure in the transverse electric field type liquid crystal panel in the present invention.

FIGS. 57, 58 and 59 are cross sectional views showing the structures of the transverse electric field type liquid crystal panel in the fifth embodiment of the present invention. In this embodiment, the video signal line 51 and the liquid crystal drive electrode 53 are not covered by the passivation layer 55 unlike the first to fourth embodiments. Only the video signal line 51 is covered by the dielectric spacer bump 73. According to the present invention, the video signal line 51 and the liquid crystal drive electrode 53 can be constructed at the same time. Alternatively, the drain electrode of the thin film transistor can be constructed with the video signal line 51 at the same time and then the liquid crystal drive electrode 53 can be constructed simultaneously with the upper layer shielding electrode 72 and the common electrode 74 within the pixel at the same time after the construction of the spacer bump 73. Either construction method is applicable to the fifth embodiment. With the structure of the present invention, there is no need for opening a contact hole to connect the drain electrode of the thin film transistor with the liquid crystal drive electrode.

Preferred Embodiment 6

Figure 60:
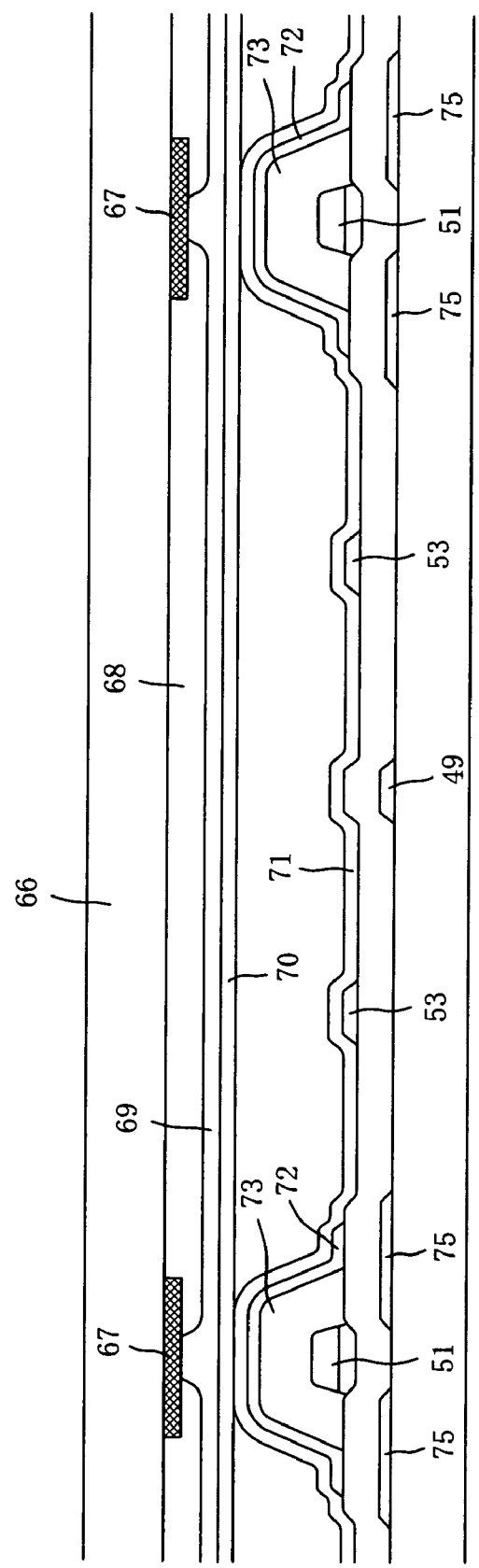
FIG. 60 is a cross sectional view showing a further example of structure in the transverse electric field type liquid crystal panel in the present invention.
Figure 61:
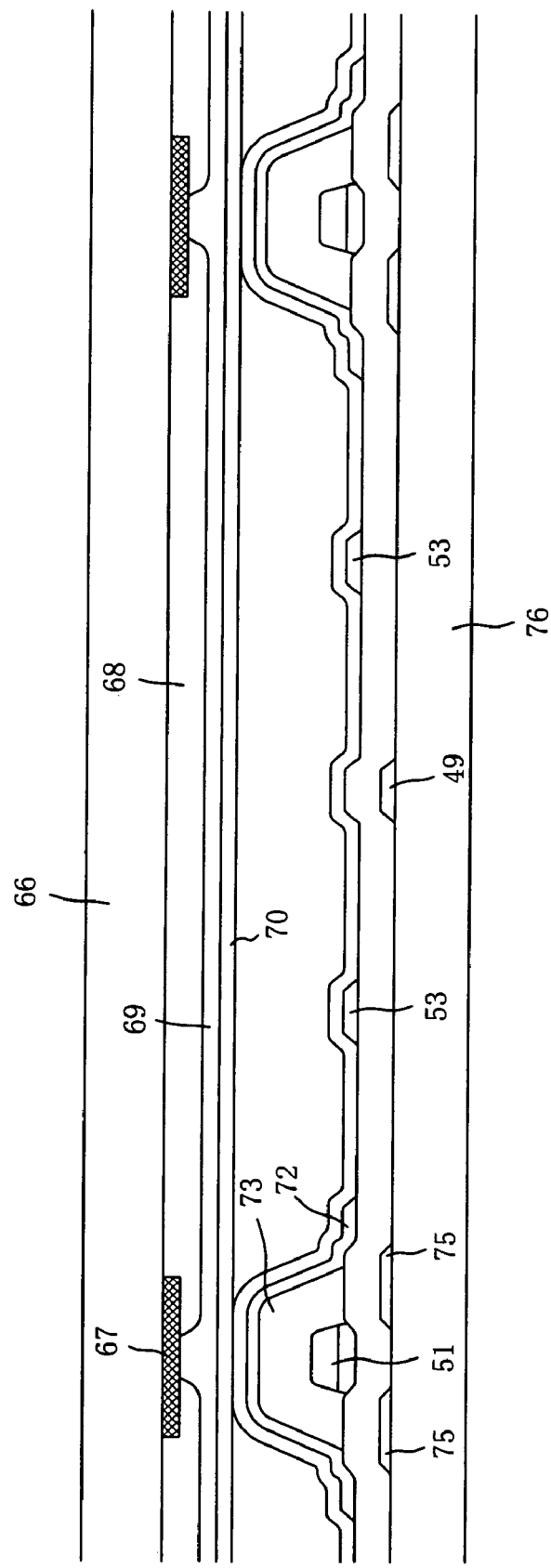
FIG. 61 is a cross sectional view showing a further example of structure in the transverse electric field type liquid crystal panel in the present invention.
Figure 62:
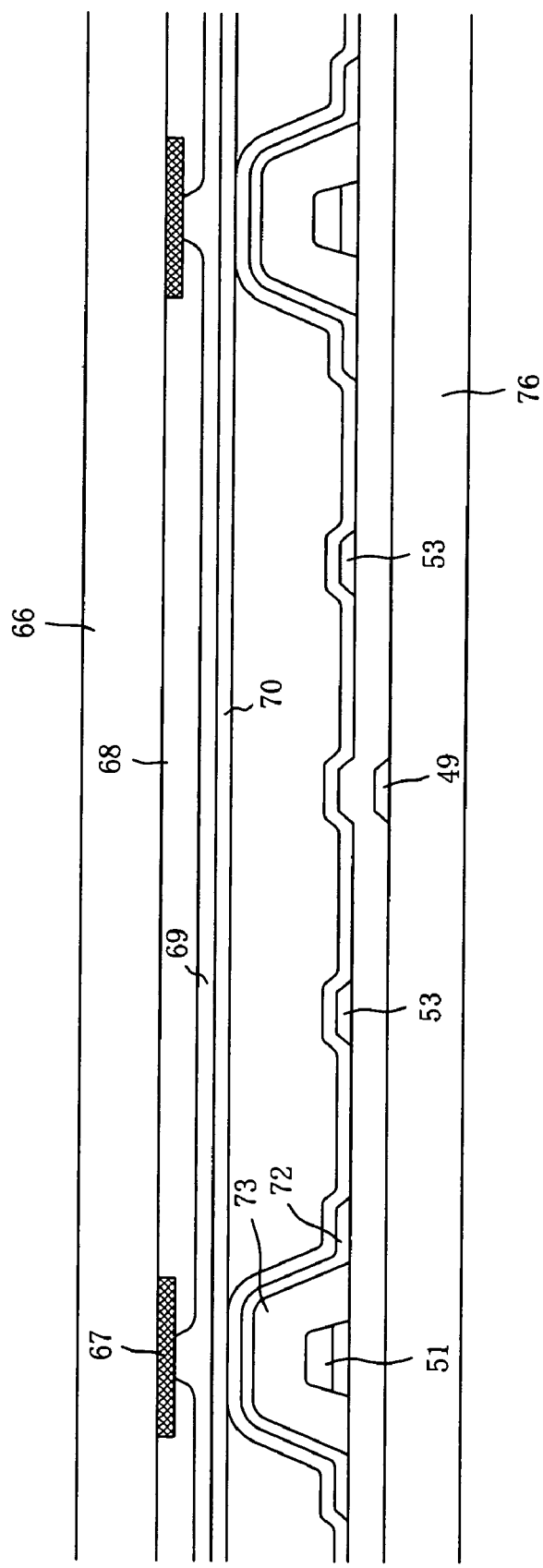
FIG. 62 is a cross sectional view showing a further example of structure in the transverse electric field type liquid crystal panel in the present invention.

FIGS. 60, 61 and 62 are cross sectional views showing the structures of the transverse electric field type liquid crystal panel in the sixth embodiment of the present invention. As with the fifth embodiment, the video signal line 51 and the liquid crystal drive electrode 53 are not covered by the passivation layer 55 unlike the first to fourth embodiments. Only the video signal line 51 is covered by the dielectric spacer bump 73. The sixth embodiment is different from the fifth embodiment only in that the common electrode 49 within the pixel is constructed simultaneously with the scanning line and the lower layer shielding common electrode 75 on the same layer.

Preferred Embodiment 7

Figure 63:
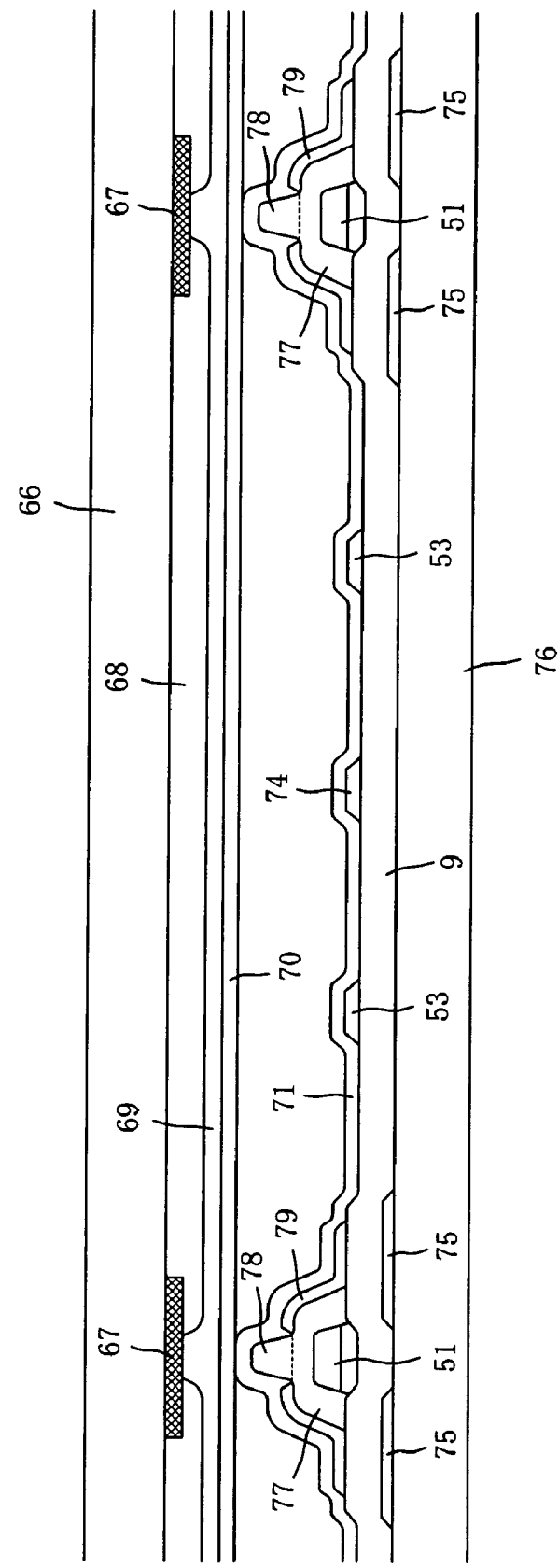
FIG. 63 is a cross sectional view showing a further example of structure in the transverse electric field type liquid crystal panel in the present invention.
Figure 64:
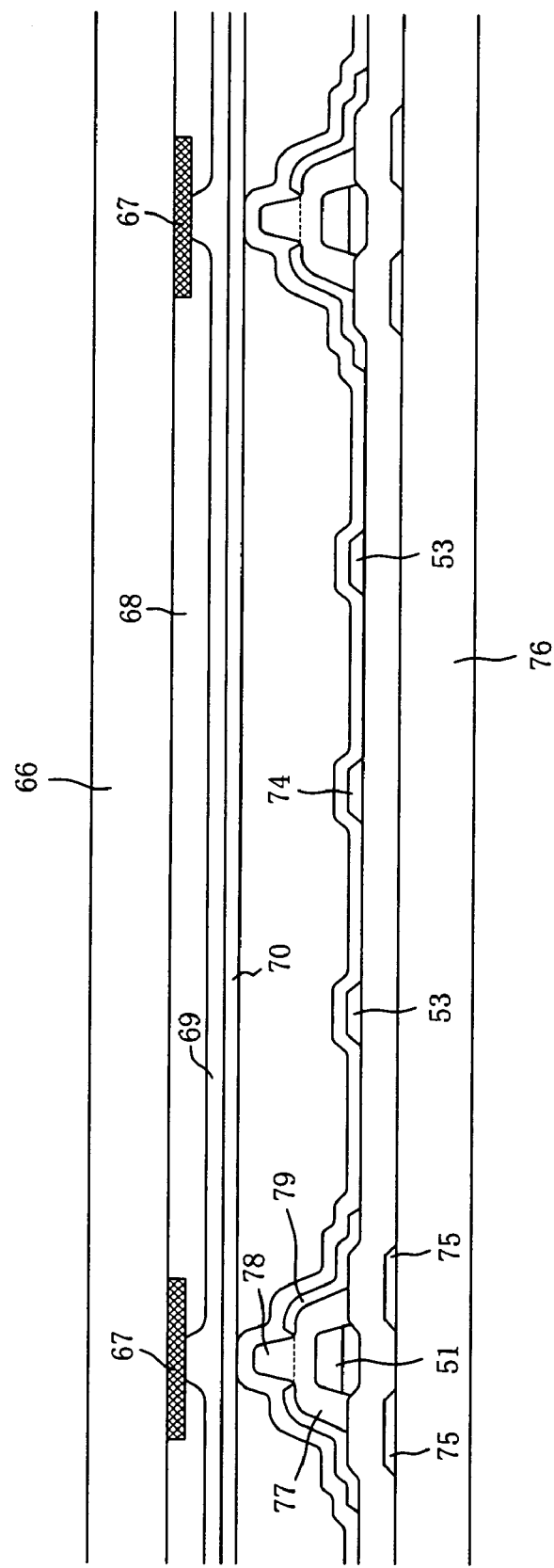
FIG. 64 is a cross sectional view showing a further example of structure in the transverse electric field type liquid crystal panel in the present invention.
Figure 65:
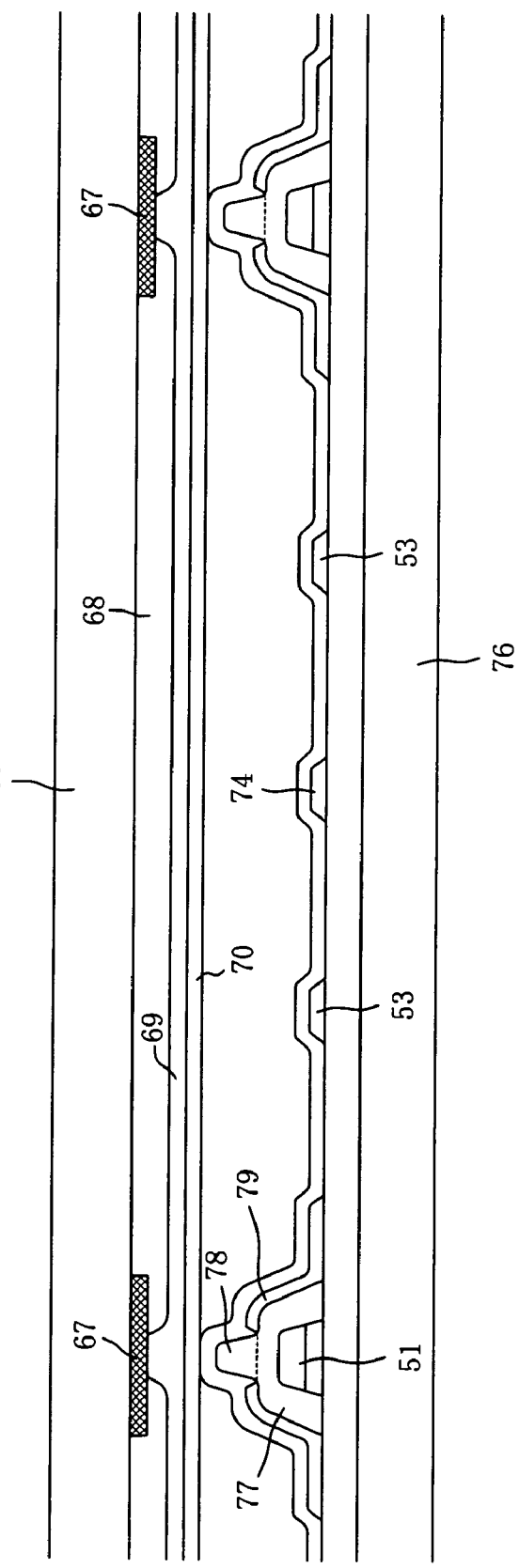
FIG. 65 is a cross sectional view showing a further example of structure in the transverse electric field type liquid crystal panel in the present invention.

FIGS. 63, 64 and 65 are cross sectional views showing the structures of the transverse electric field type liquid crystal panel in the seventh embodiment of the present invention. This structure is basically the same as that of the fifth embodiment except that the spacer bump 73 is separated into the dielectric (insulation) bump 77 that covers the video signal line and the spacer 78 that determines the liquid crystal cell gap.

Preferred Embodiment 8

Figure 66:
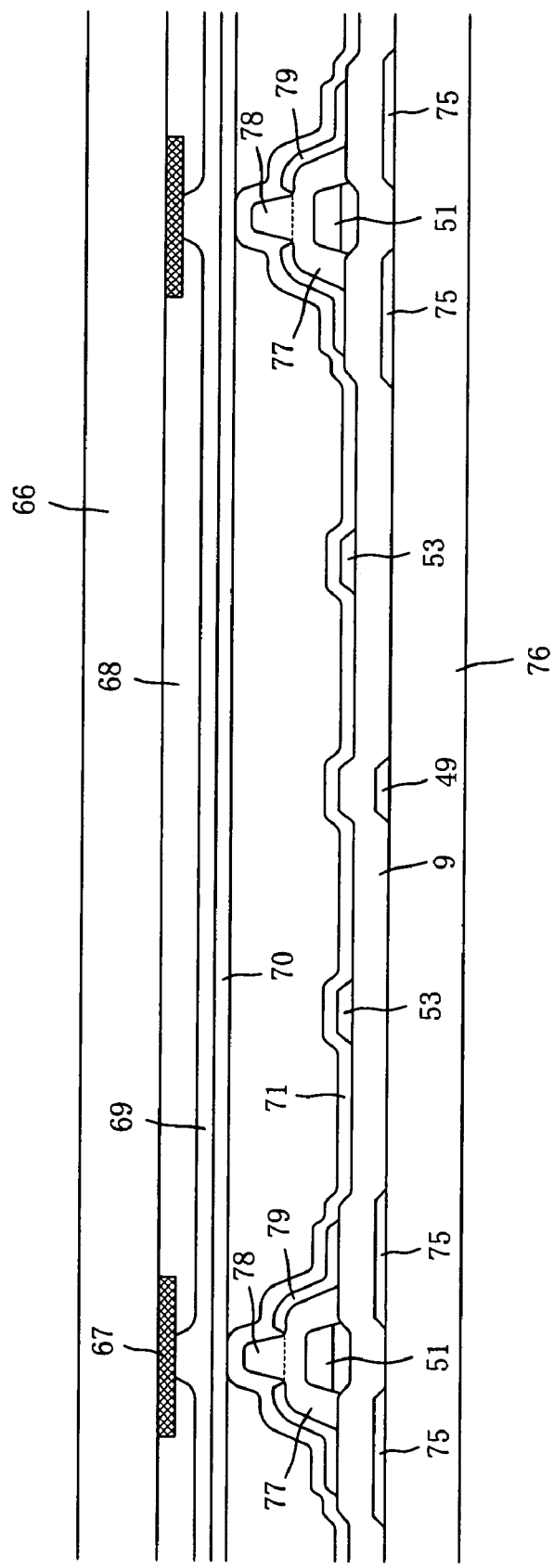
FIG. 66 is a cross sectional view showing a further example of structure in the transverse electric field type liquid crystal panel in the present invention.
Figure 67:
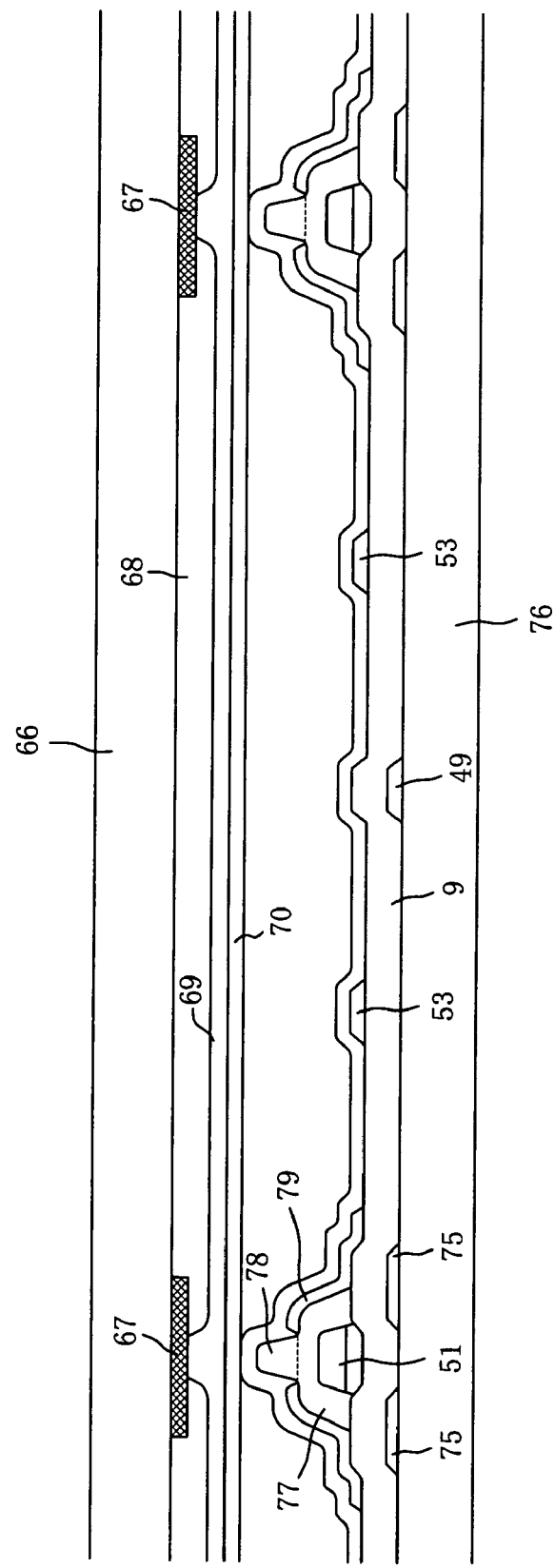
FIG. 67 is a cross sectional view showing a further example of structure in the transverse electric field type liquid crystal panel in the present invention.
Figure 68:
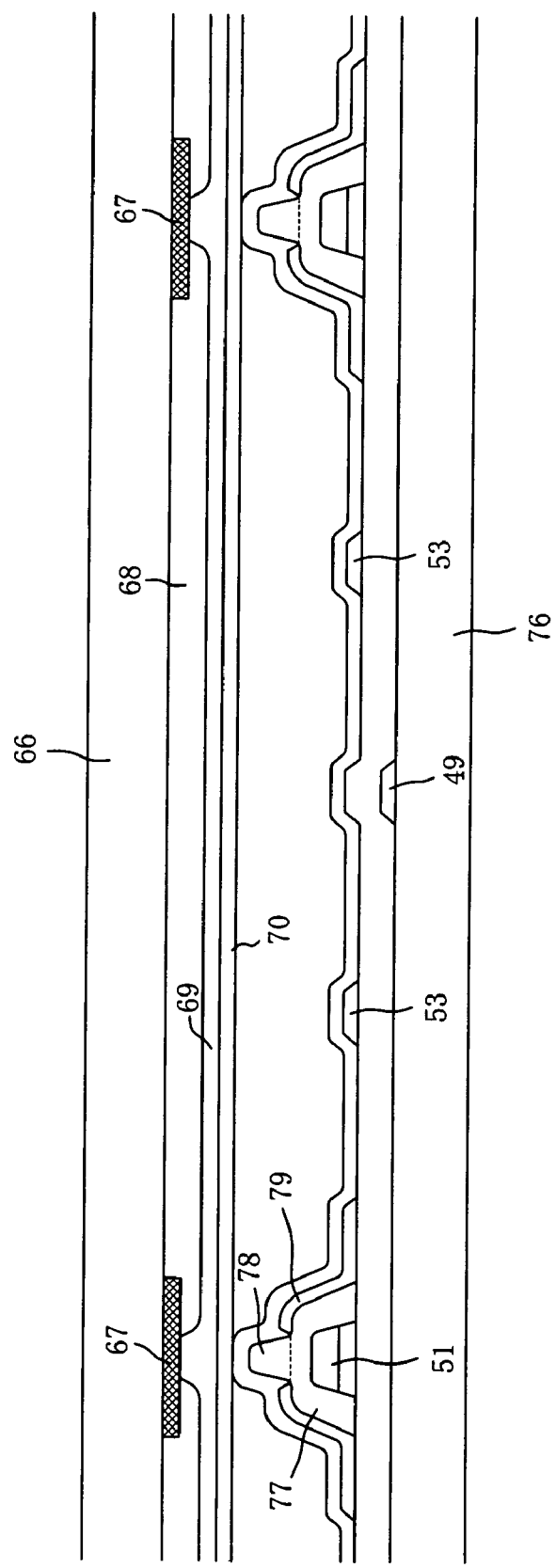
FIG. 68 is a cross sectional view showing a further example of structure in the transverse electric field type liquid crystal panel in the present invention.
Figure 69:
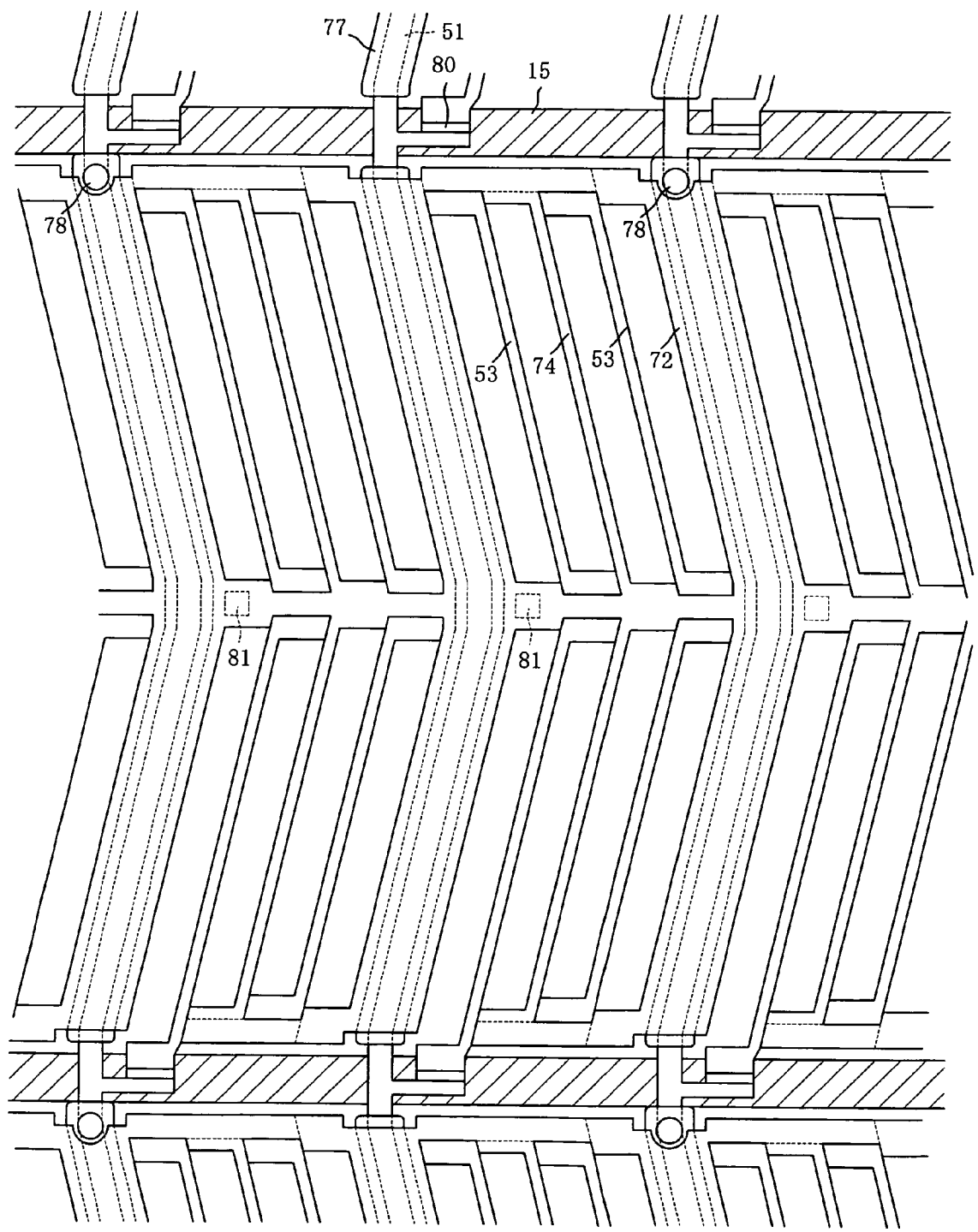
FIG. 69 is a plan view showing an example of structure in the transverse electric field type liquid crystal display device according to the present invention.

FIGS. 66, 67 and 68 are cross sectional views showing the structures of the transverse electric field type liquid crystal panel in the eighth embodiment of the present invention. This structure is basically the same as that of the sixth embodiment except that the spacer bump 73 is separated into the dielectric (insulation) bump 77 that covers the video signal line and the spacer 78 that determines the liquid crystal cell gap.

Preferred Embodiment 9

Figure 108:
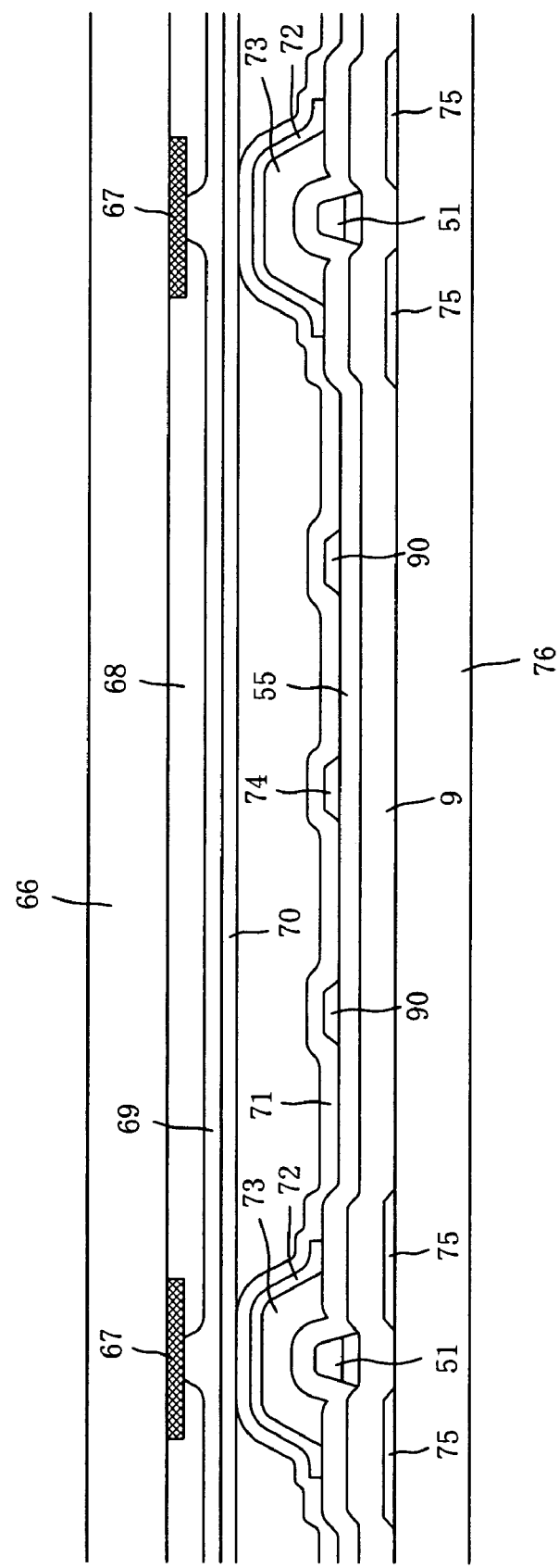
FIG. 108 is a cross sectional view showing an example of structure in the transverse electric field type liquid crystal panel of the present invention.
Figure 109:
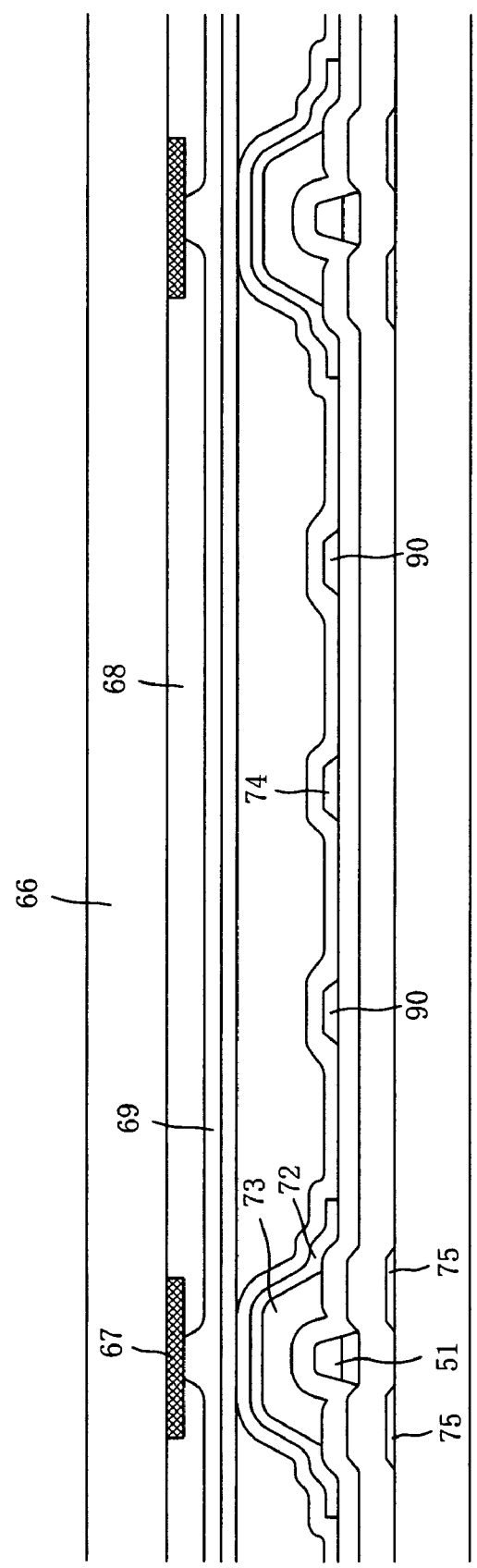
FIG. 109 is a cross sectional view showing another example of structure in the transverse electric field type liquid crystal panel of the present invention.
Figure 110:
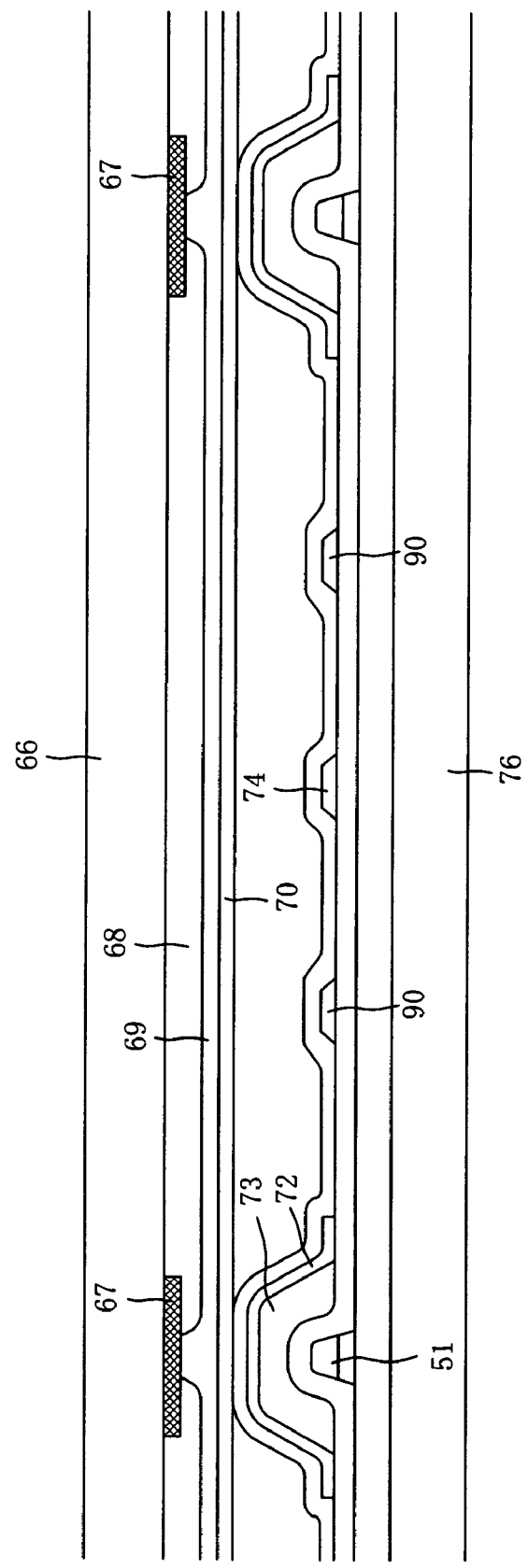
FIG. 110 is a cross sectional view showing a further example of structure in the transverse electric field type liquid crystal panel of the present invention.

FIGS. 108, 109, 110 show the sectional view and plan view of the transverse electric field type liquid crystal panel of the eighth embodiment of the present invention. In the example of FIGS. 108, 109 and 110, a numeral 90 denotes a liquid crystal drive electrode. As noted above with reference to FIGS. 45-47, a numeral 9 denotes a gate insulation film, a numeral 51 denotes a video signal line, a numeral 53 denotes a liquid crystal drive electrode, a numeral 55 denotes a passivation film, a numeral 66 denotes a glass substrate in the side of color filter, a numeral 67 denotes a black mask (light shielding film), a numeral 68 denotes a color filter layer, a numeral 69 denotes a leveling layer in the side of color filter, a numeral 70 denotes an alignment film in the side of color filter, a numeral 71 denotes an alignment film in the side of TFT array substrate, a numeral 72 denotes an upper layer common electrode, a numeral 73 denotes a spacer bump covering the video signal line, a numeral 74 denotes a common electrode within the pixel, a numeral 75 denotes a lower layer common electrode, and a numeral 76 denotes a glass substrate in the side of TFT array.

In the embodiment of FIGS. 108-110, the video signal line 51 and the liquid crystal drive electrodes 90 are constructed on a different layer relative to the passivation layer 55. The upper layer shielding common electrodes 72 and the common electrode 74 within the pixel and the liquid crystal drive electrode 90 are constructed on the same layer at the same time. The liquid crystal drive electrode 90 is connected to the drain electrode of the thin film transistor through the contact hole.

The ninth embodiment of the present invention is most effective in leveling (flattening) the irregularity in the areas around the display pixels. By forming the upper layer shielding common electrodes 72, the common electrode 74 within the pixel, and the liquid crystal drive electrode 90 at the same time with use of the transparent electrode material (ITO or IZO) with a thickness of 300-500 angstroms, it is possible to dramatically increase the effective aperture ratio. In the transverse electric field mode, when the width of the electrode is small such as about 3-5 micrometers, it is possible for a majority of the liquid crystal molecules above the electrode to rotate because of a fringe field effect so that the light can transmit from the areas around the electrode. Because of this fringe field effect, the structure shown in FIG. 109 is most effective in improving the aperture ratio, thereby achieving the display with high contrast.

With the structures shown in FIGS. 109 and 110, the fringe field effect is also effective around the edge areas of the upper layer shielding common electrode 72, which promotes the light transmission around the edge areas of the upper layer shielding common electrode 72, thereby improving the aperture ratio. The black mask 67 provided on the side of the color filter substrate is not essential to the structure of this embodiment. It is preferable that the width of the black mask 67 is the same as that of the dielectric spacer bump 73 or slightly smaller. It is important to keep the taper angle θ of the spacer bump 73 to be less than 30 degrees to prevent occurrences of alignment defects in the rubbing alignment treatment.

It is preferable that the spacer bump is not formed at the intersection area of the scanning line and the video signal line so that the liquid crystal can smoothly diffuse during the liquid crystal injection vacuum attachment alignment process. A problem of residual air bubble can occur if the spacer bump 73 is not fabricated by material that allows the spacer bump to deform 0.1-0.5 micrometers when a pressure from the atmosphere is applied thereto.

Preferred Embodiment 10

Figure 111:
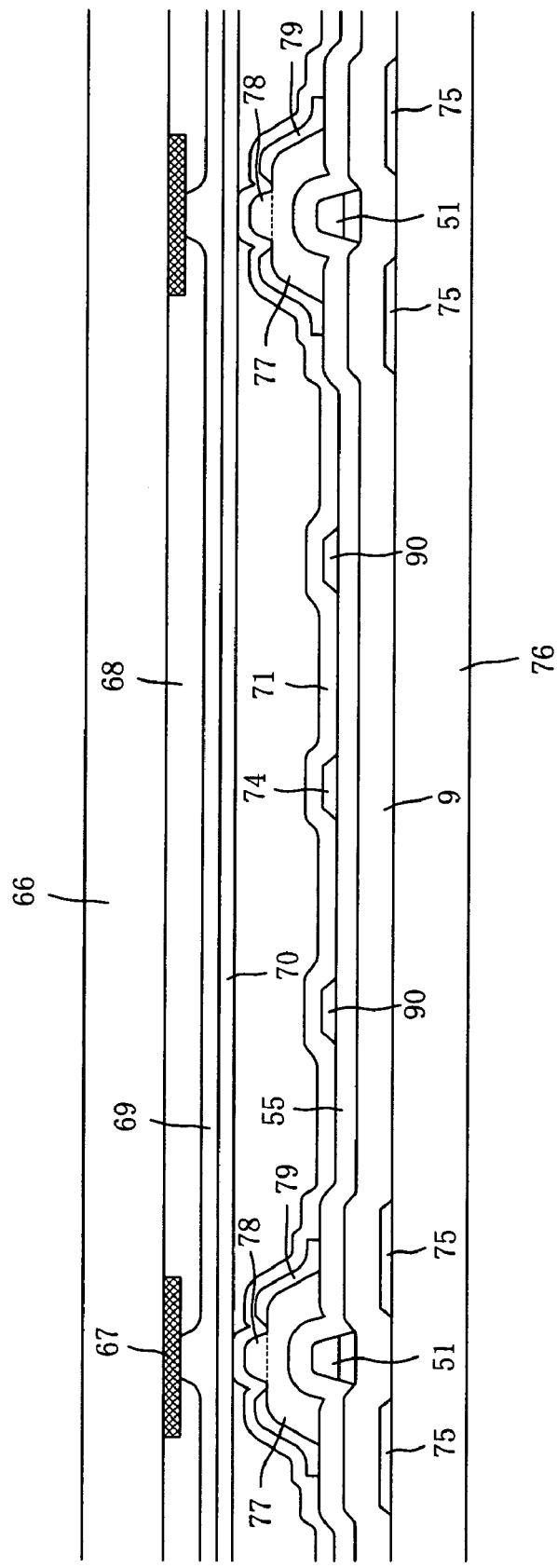
FIG. 111 is a cross sectional view showing a further example of structure in the transverse electric field type liquid crystal panel of the present invention.
Figure 112:
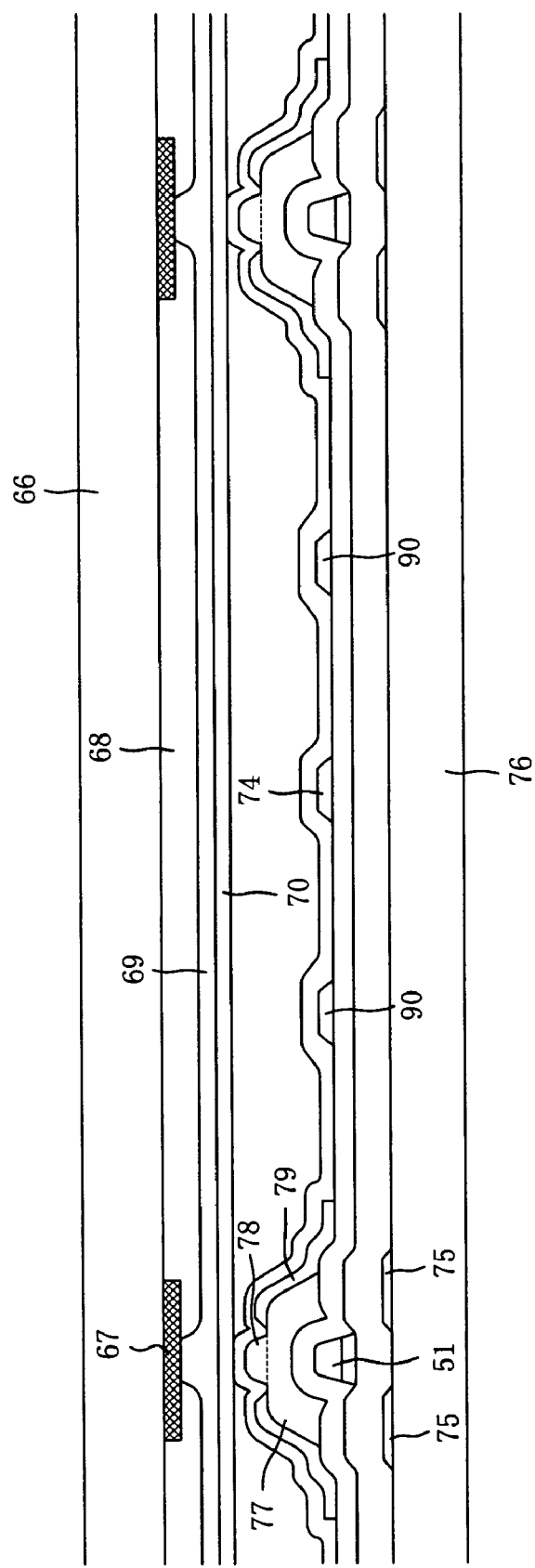
FIG. 112 is a cross sectional view showing a further example of structure in the transverse electric field type liquid crystal panel of the present invention.
Figure 113:
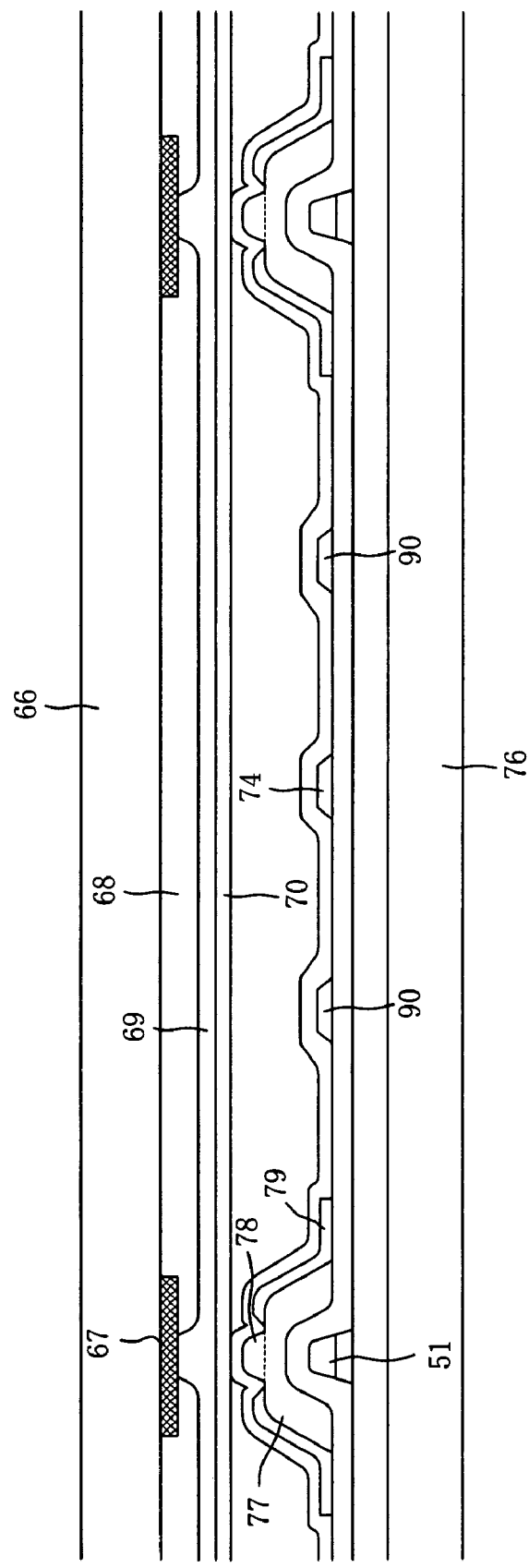
FIG. 113 is a cross sectional view showing a further example of structure in the transverse electric field type liquid crystal panel of the present invention.
Figure 115:
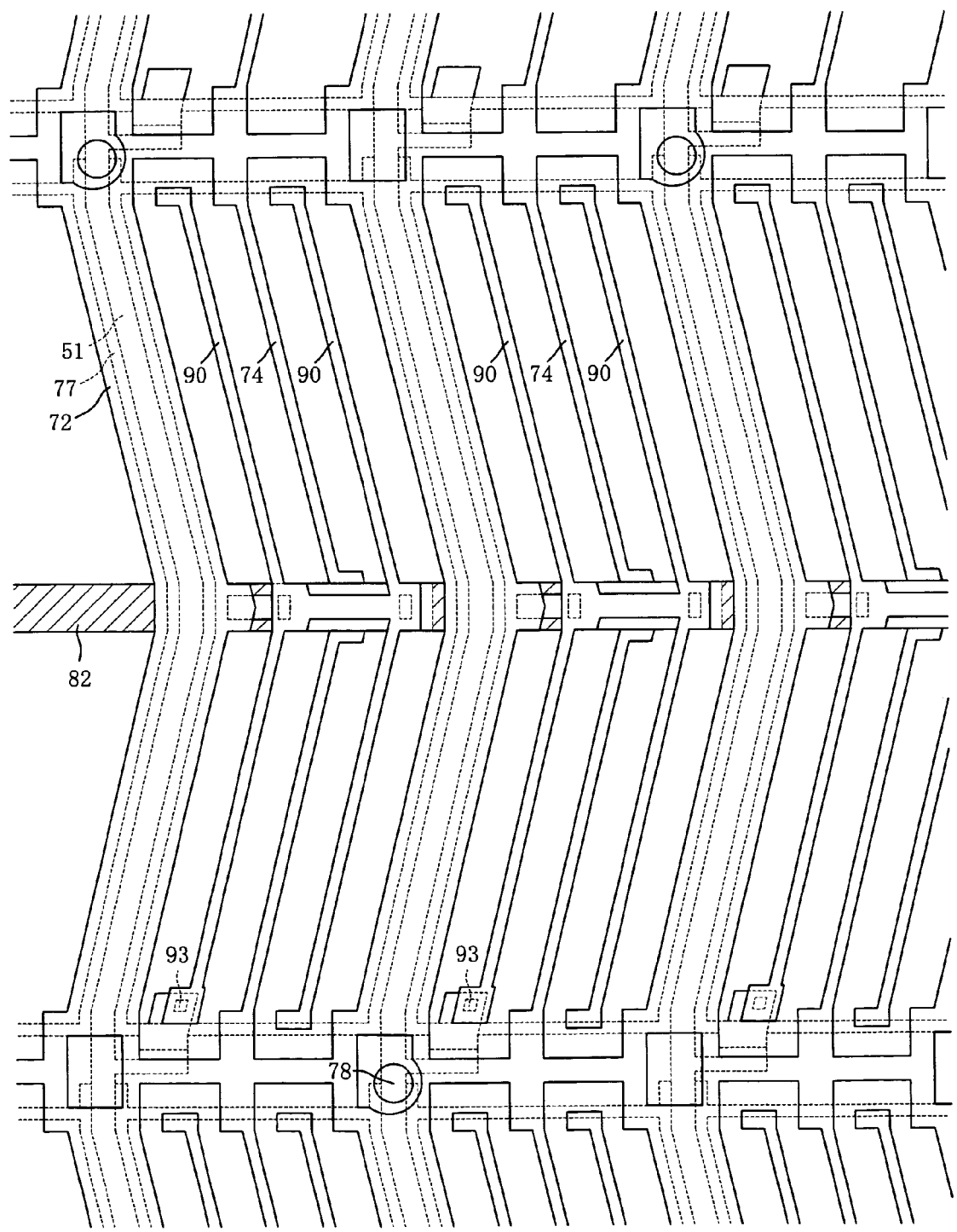
FIG. 115 is a plan view showing an example of structure in the transverse electric field type liquid crystal display device of the present invention.

FIGS. 111, 112 and 113 are cross sectional views and FIG. 115 is a plan view, respectively, showing the structures of the transverse electric field type liquid crystal panel in the tenth embodiment of the present invention. This structure is basically the same as that of the ninth embodiment except that the spacer bump 73 of the ninth embodiment is separated into an insulation (dielectric) bump 77 that covers the video signal line and a spacer 78 that determines the liquid crystal cell gap.

As shown in FIG. 115, the upper layer shielding common electrodes 72, the common electrode 74 within the pixel, and the liquid crystal drive electrode 90 are produced on the same layer at the same time. The liquid crystal drive electrode 90 is connected to the drain electrode of the thin film transistor though a contact hole 93. The upper layer shielding common electrode is not provided above the spacer 78. The upper layer shielding common electrodes 72 are connected to each other on the scanning lines in up/down and right/left directions in a mesh like fashion. In FIG. 115, the upper layer shielding common electrode 72 covers the video signal line 51 almost completely. It is also possible to form the upper layer shielding common electrode on the side walls of the dielectric bump 77 such as the one shown in FIG. 81. In an application of a large screen liquid crystal display panel of 30 inches or larger, the construction in which the upper layer shielding common electrodes are placed at the side walls are preferred because this structure is able to decrease the distortion in the video signal line waveforms.

Preferred Embodiment 11

FIGS. 69-81 and FIG. 115 are plan views showing the structure of the transverse electric field type liquid crystal display panel in the eleventh embodiment of the present invention. In this structure, the video signal line 51, the upper layer shielding common electrode 72, the common electrode 74 within the pixel and the liquid crystal drive electrode 90 are bent within a pixel at least once at an angle within 0-30 degrees except 0 degree with respect to the alignment direction of the liquid crystal molecules. In the eleventh embodiment, positive dielectric constant anisotropic liquid crystals are used in which the alignment direction of the liquid crystal molecules is almost perpendicular to the direction of the scanning lines.

Figure 120:
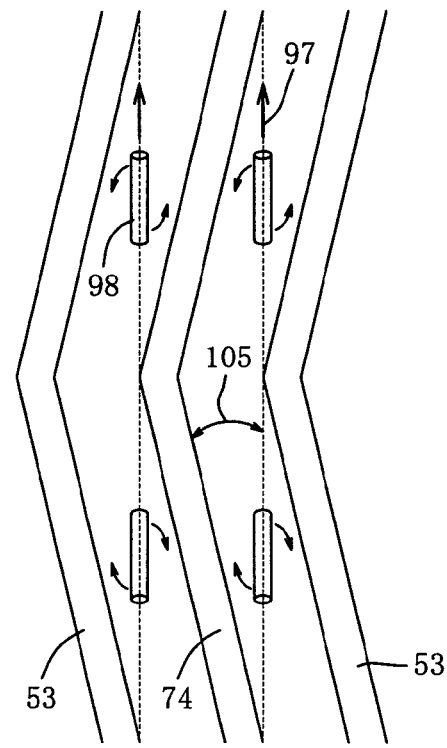

FIG. 120 is a schematic diagram showing the relationship between the alignment direction and the rotation direction of the liquid crystal molecules of positive anisotropic dielectric material used in the transverse electric field type liquid crystal panel of the present invention. In FIG. 120, a numeral 97 denotes an alignment direction of the liquid crystal molecule, a numeral 98 denotes a positive dielectric constant anisotropic liquid crystal molecule, and a numeral 105 denotes an angle between the pixel electrode (liquid crystal drive electrode 53) and the alignment direction of the crystal molecule 98. As shown in FIG. 120, the liquid crystal molecules are able to rotate in the right and left directions, which contributes to increase the viewing angle while decreases the color shift at the same time.

Figure 121:
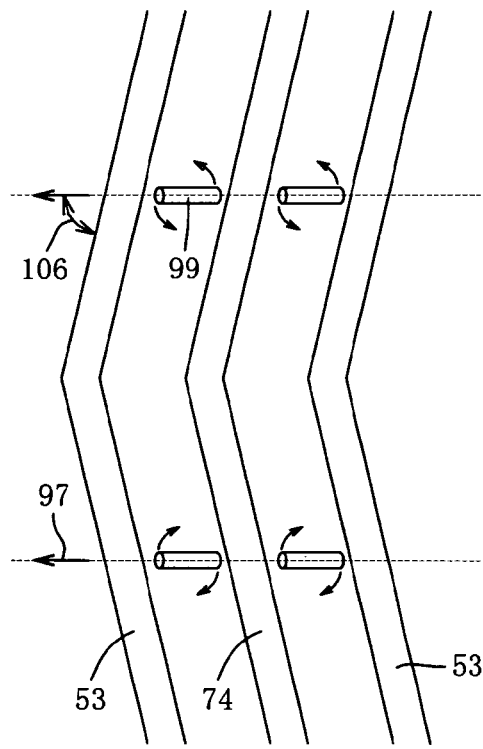

FIG. 121 is a schematic diagram showing the relationship between the alignment direction and the rotation direction of the liquid crystal molecules of negative anisotropic dielectric material used in the transverse electric field type liquid crystal panel of the present invention. In FIG. 121, a numeral 97 denotes an alignment direction of the liquid crystal molecule, a numeral 99 denotes a negative dielectric constant anisotropic liquid crystal molecule, and a numeral 106 denotes an angle between the pixel electrode (liquid crystal drive electrode 53) and the alignment direction of the crystal molecule 99.

As shown in FIG. 121, by using the negative dielectric constant anisotropic liquid crystal with the alignment direction of the liquid crystal molecules in parallel with the direction of the scanning lines, the liquid crystal molecules are able to rotate in the right and left directions, which contributes to increase the viewing angle while decreases the color shift at the same time. In the arrangement of FIG. 121, the video signal line, the liquid crystal drive electrode, the common electrodes within the pixel, and the upper layer common electrode are bent at least once at an angle between 60 degrees and 120 degrees except 90 degrees, with respect to the alignment direction of the liquid crystal molecule in a given pixel.

Preferred Embodiment 12

Figure 82:
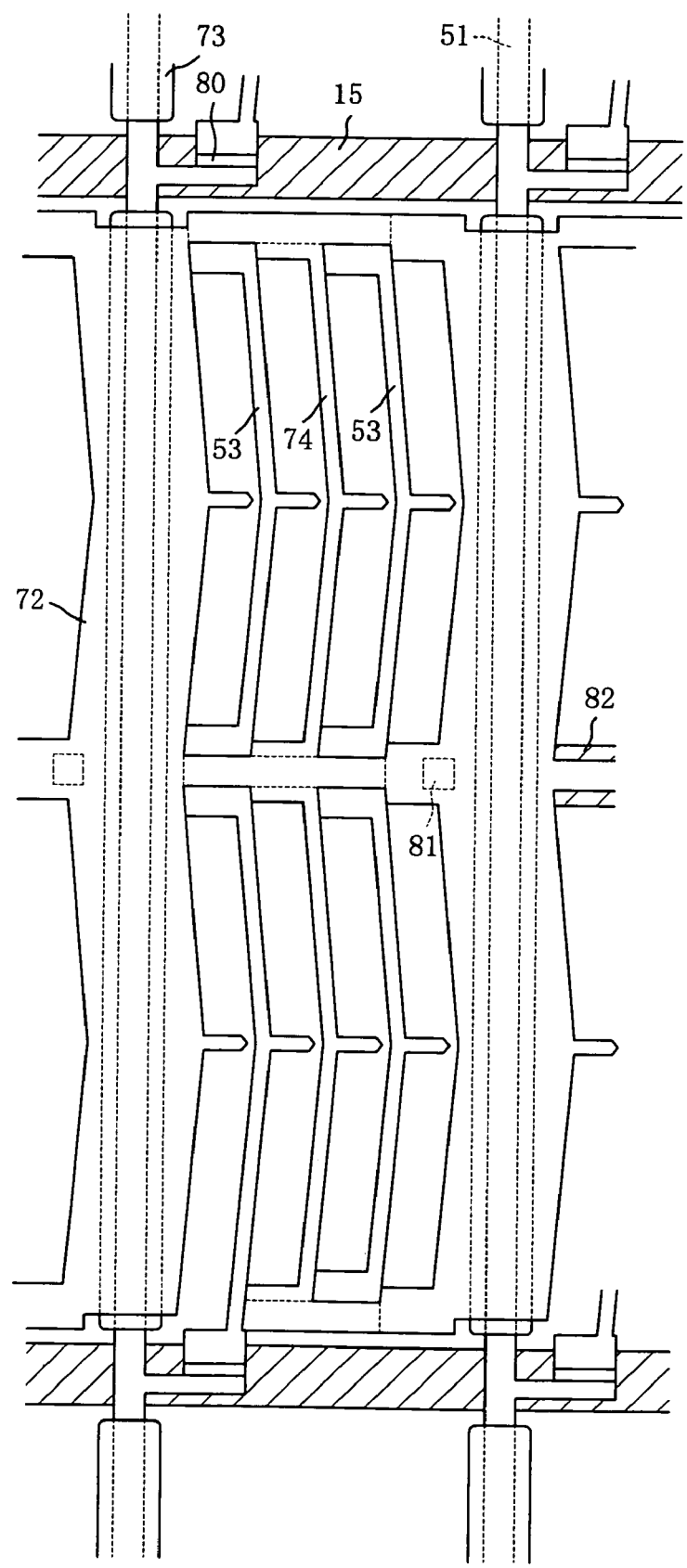
FIG. 82 is a plan view showing a further example of structure in the transverse electric field type liquid crystal display device according to the present invention.
Figure 83:
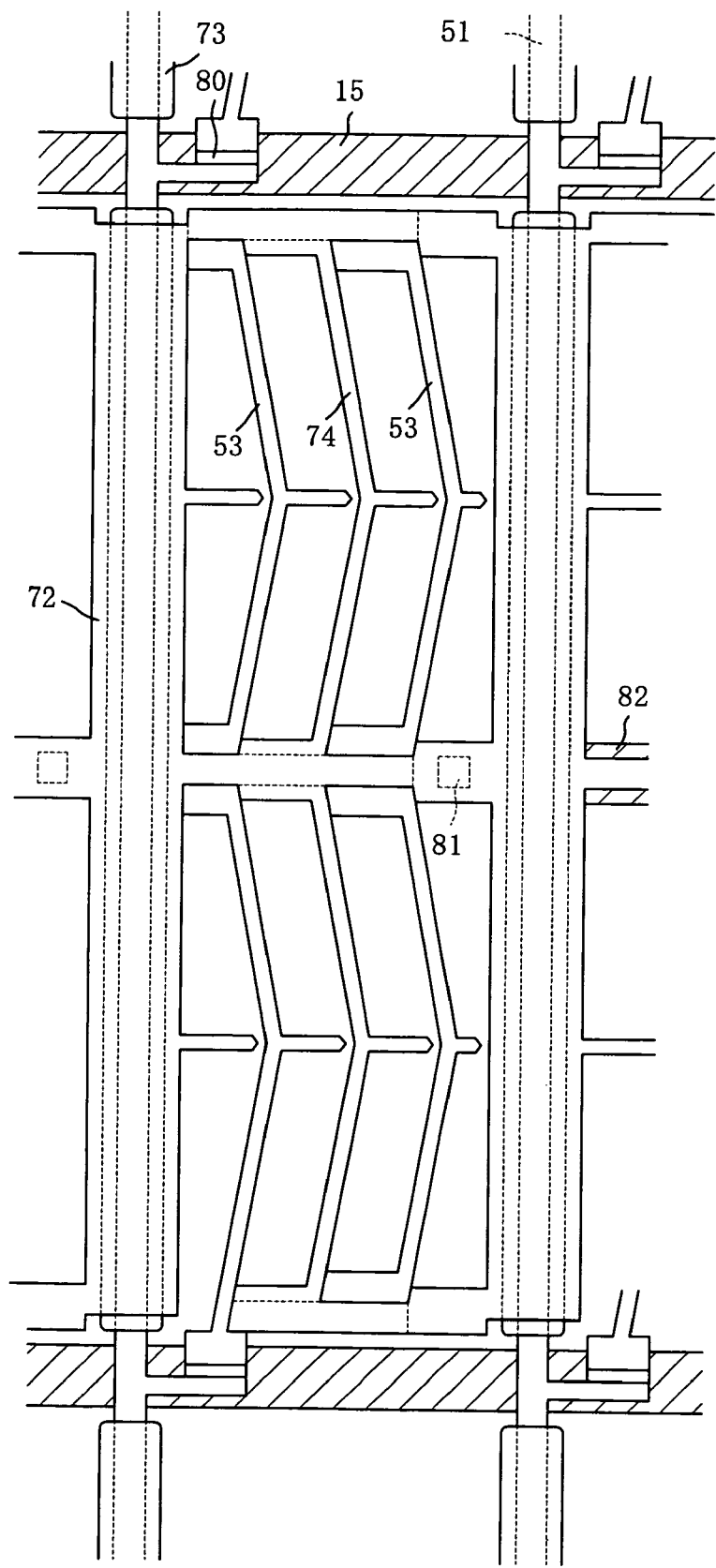
FIG. 83 is a plan view showing a further example of structure in the transverse electric field type liquid crystal display device according to the present invention.
Figure 84:
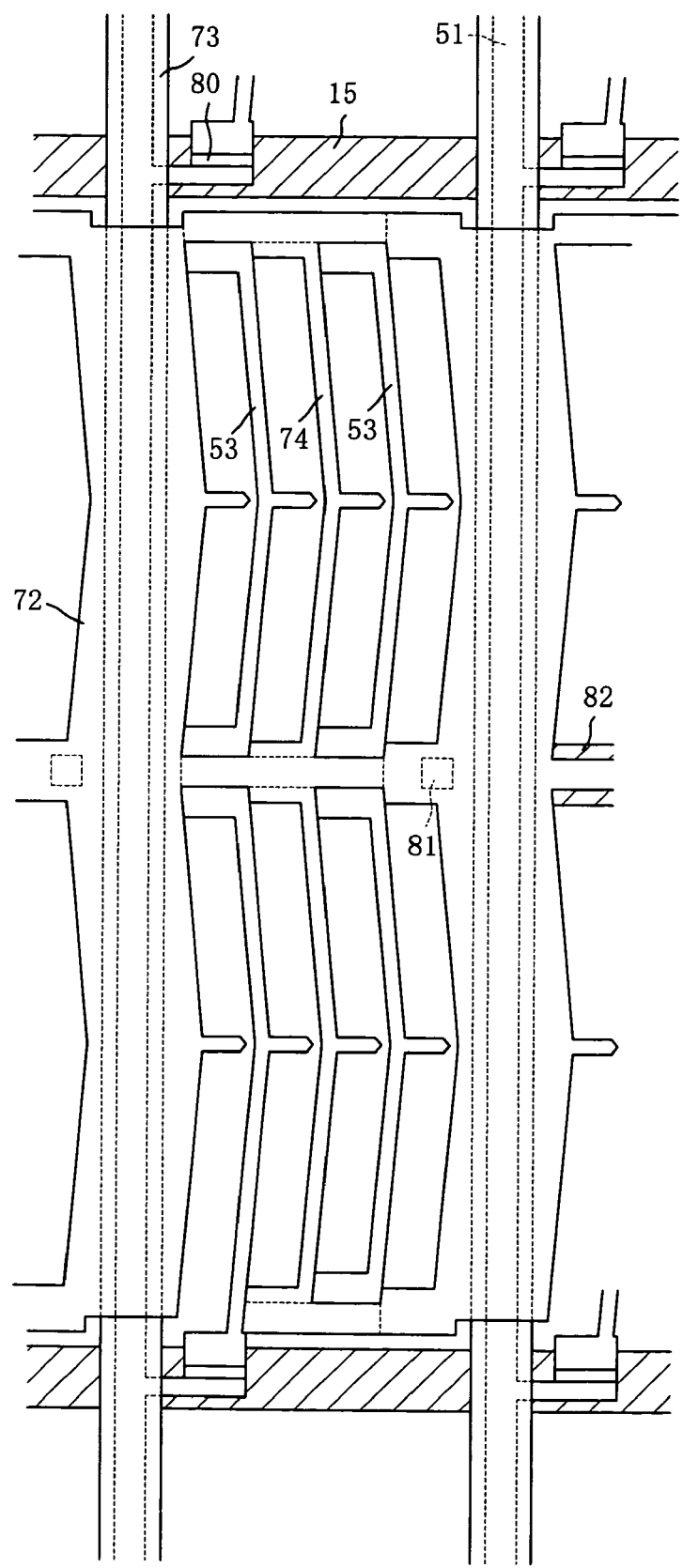
FIG. 84 is a plan view showing a further example of structure in the transverse electric field type liquid crystal display device according to the present invention.
Figure 85:
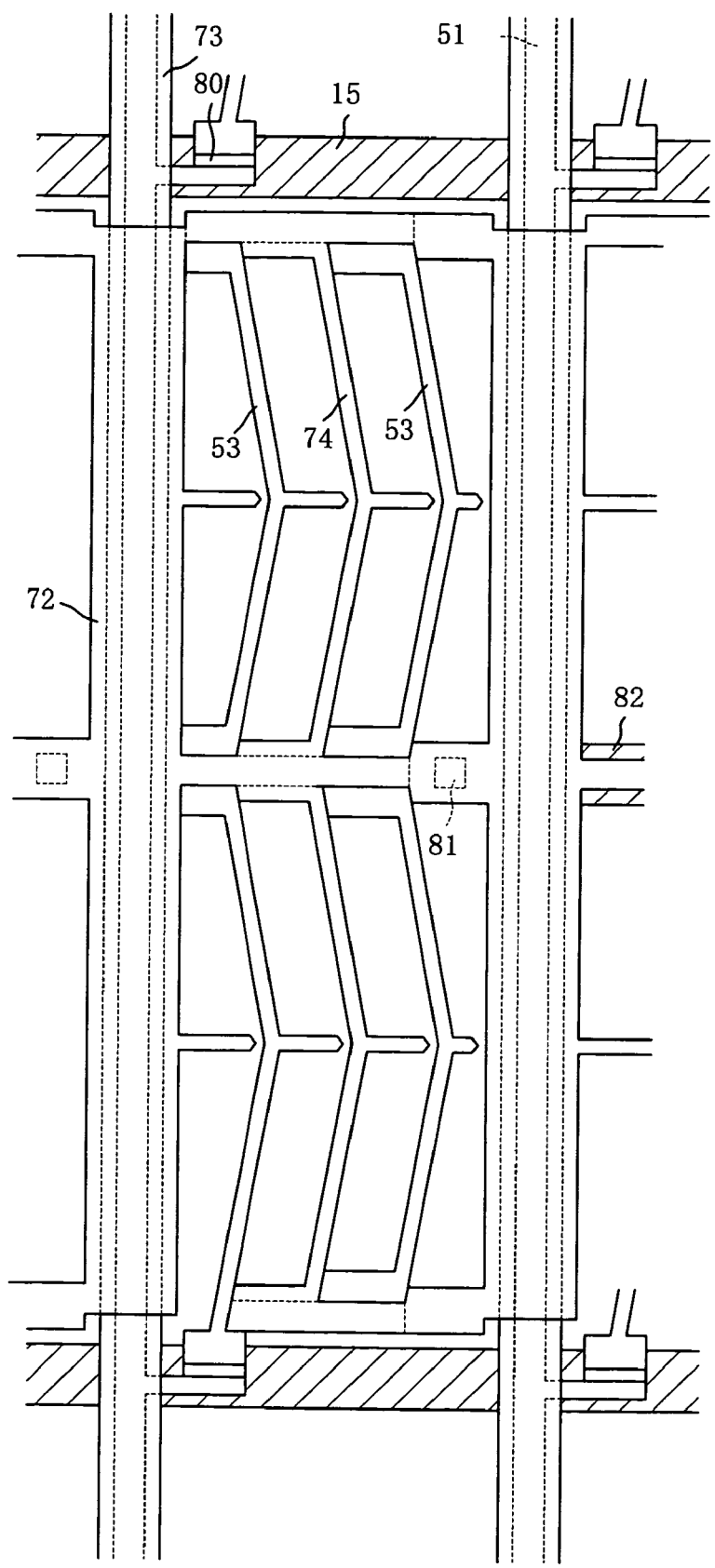
FIG. 85 is a plan view showing a further example of structure in the transverse electric field type liquid crystal display device according to the present invention.
Figure 92:
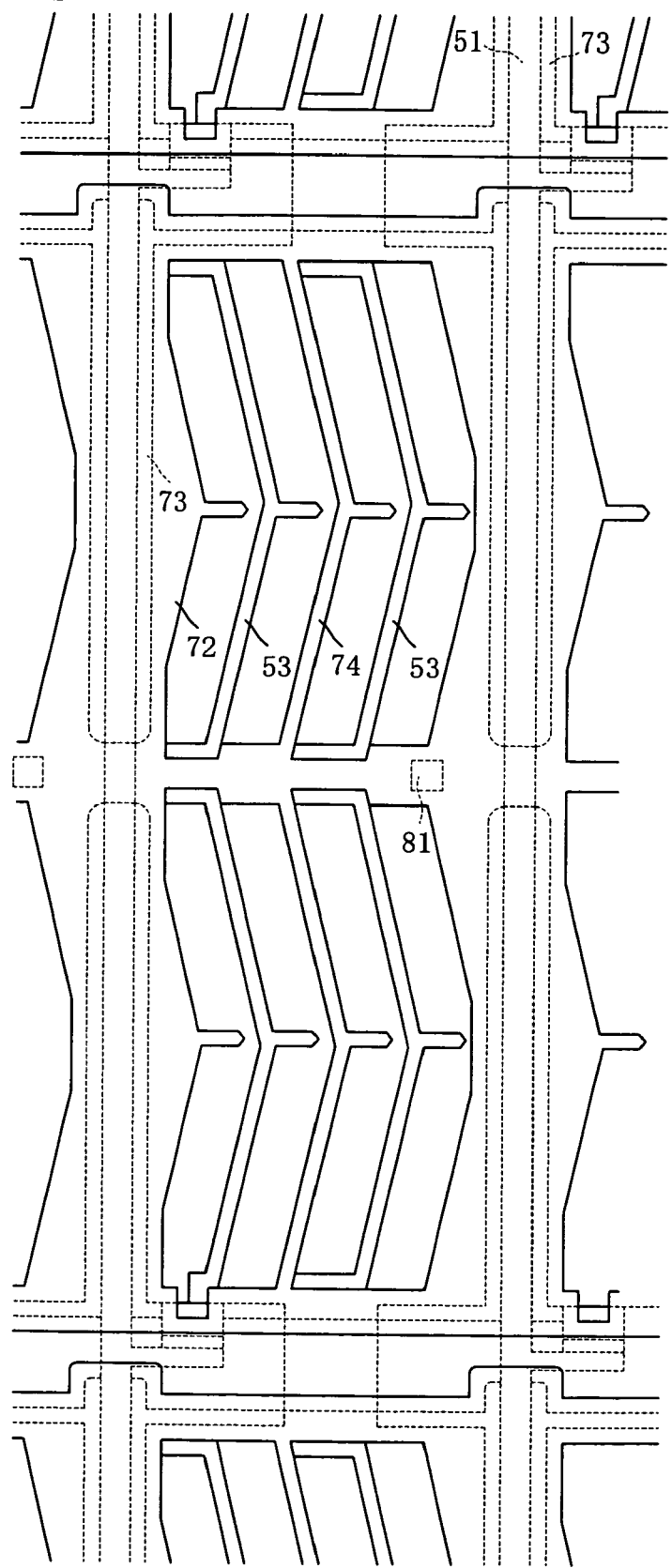
FIG. 92 is a plan view showing a further example of structure in the transverse electric field type liquid crystal display device according to the present invention.
Figure 93:
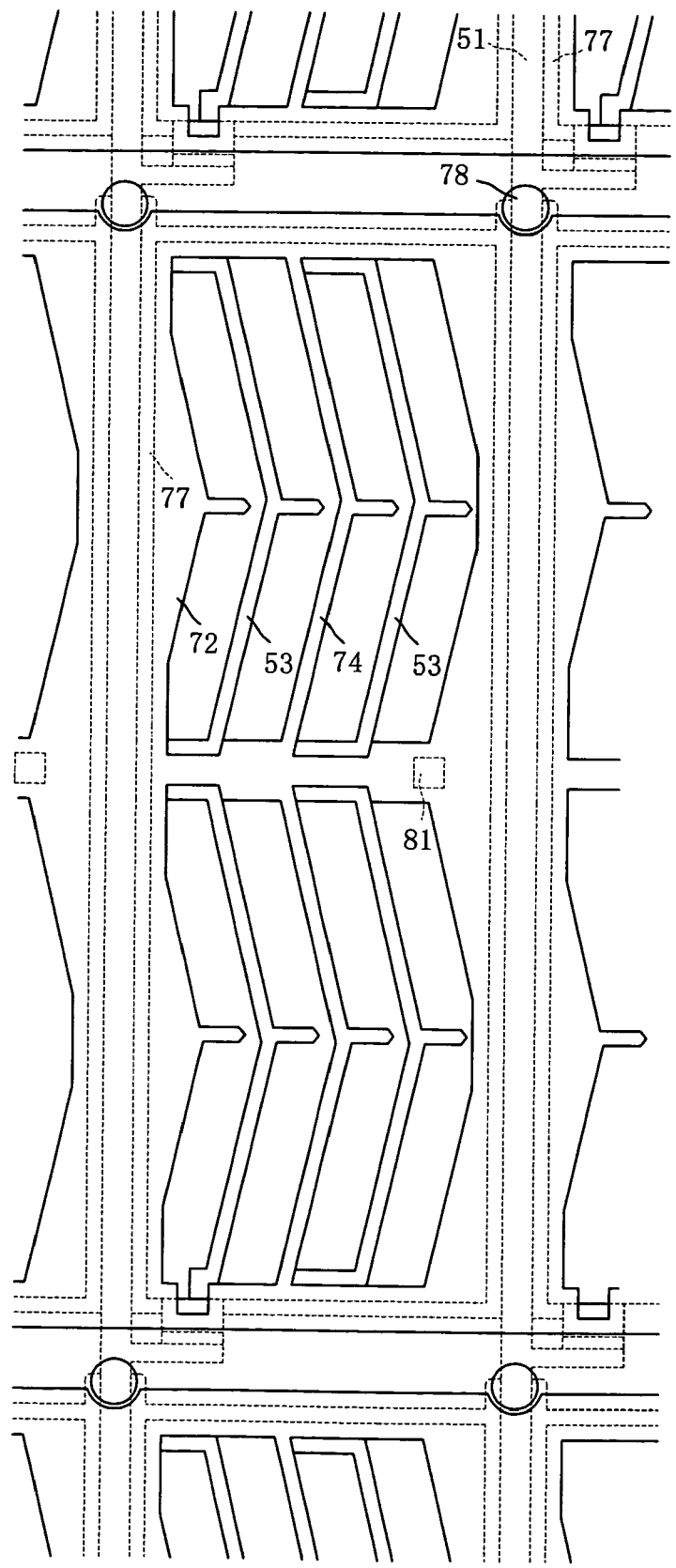
FIG. 93 is a plan view showing a further example of structure in the transverse electric field type liquid crystal display device according to the present invention.
Figure 94:
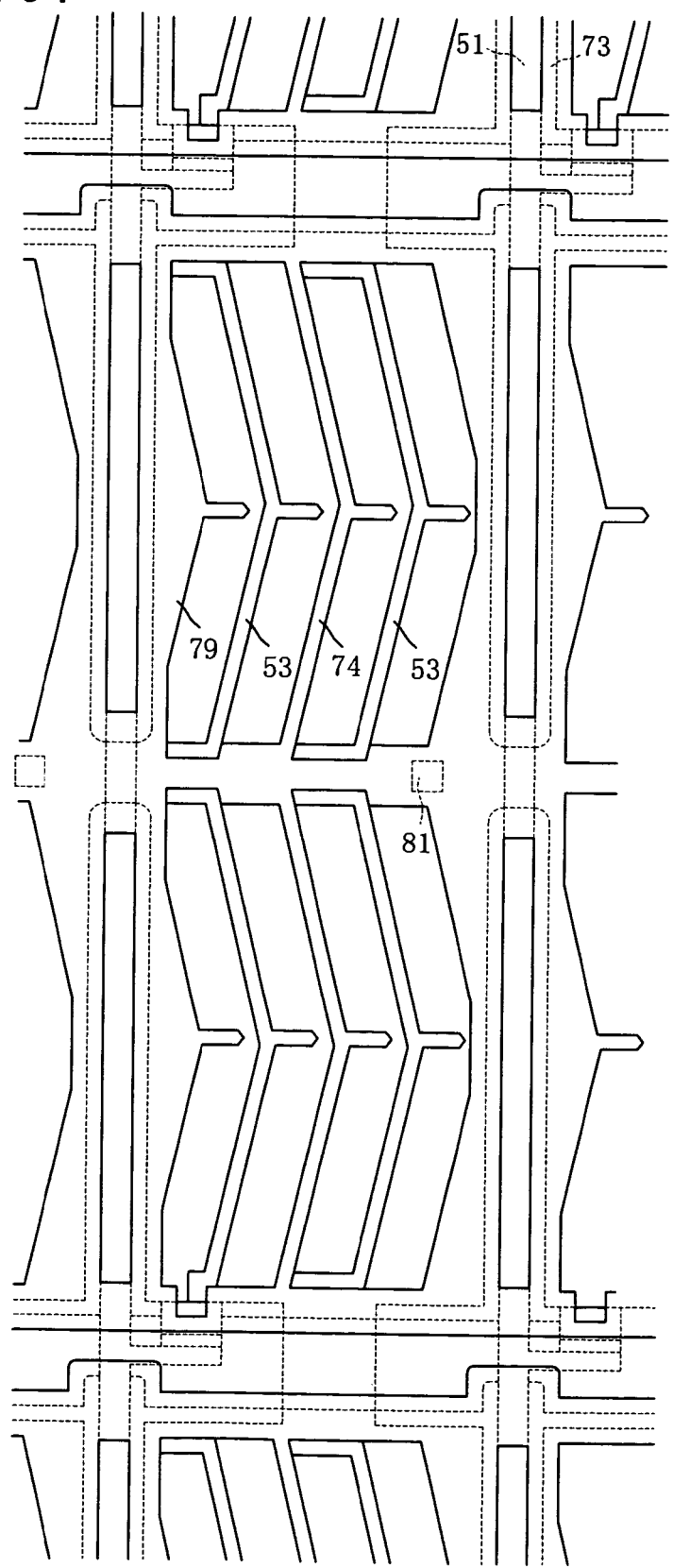
FIG. 94 is a plan view showing a further example of structure in the transverse electric field type liquid crystal display device according to the present invention.
Figure 95:
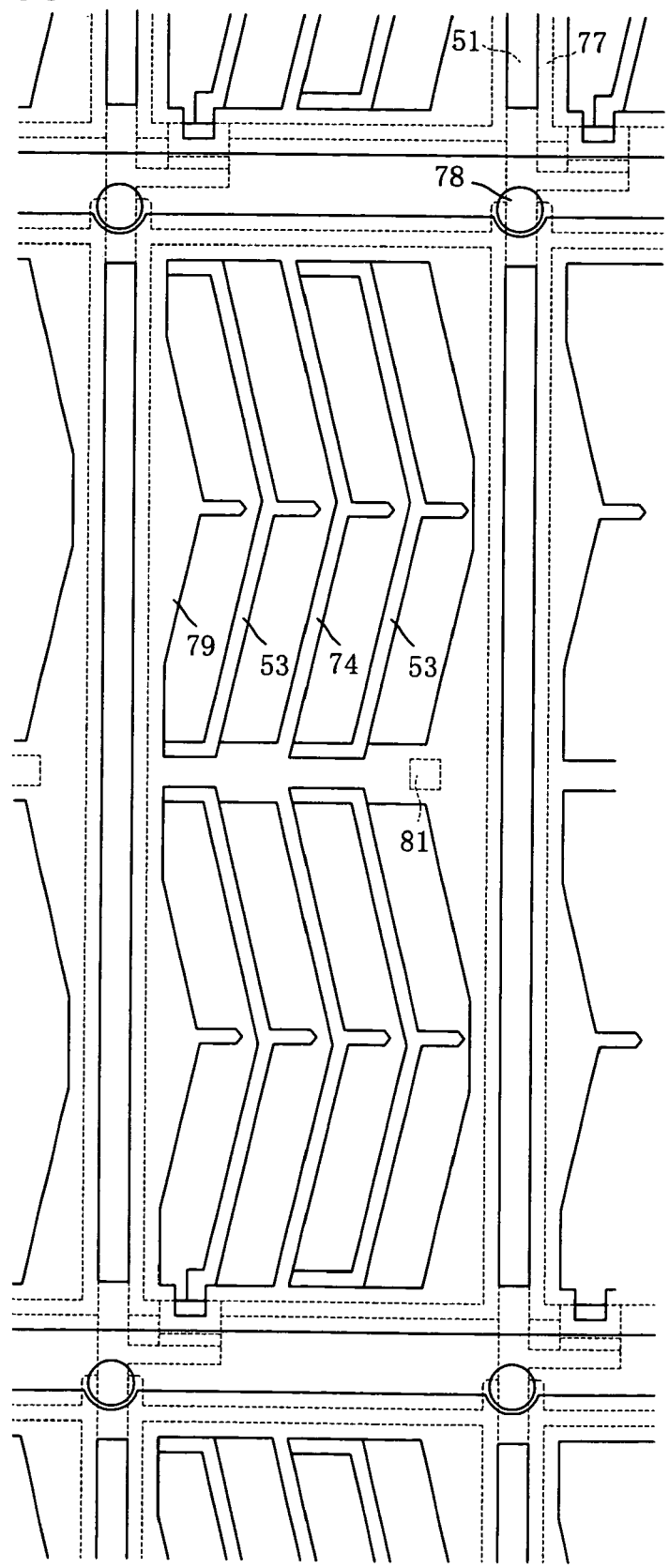
FIG. 95 is a plan view showing a further example of structure in the transverse electric field type liquid crystal display device according to the present invention.
Figure 96:
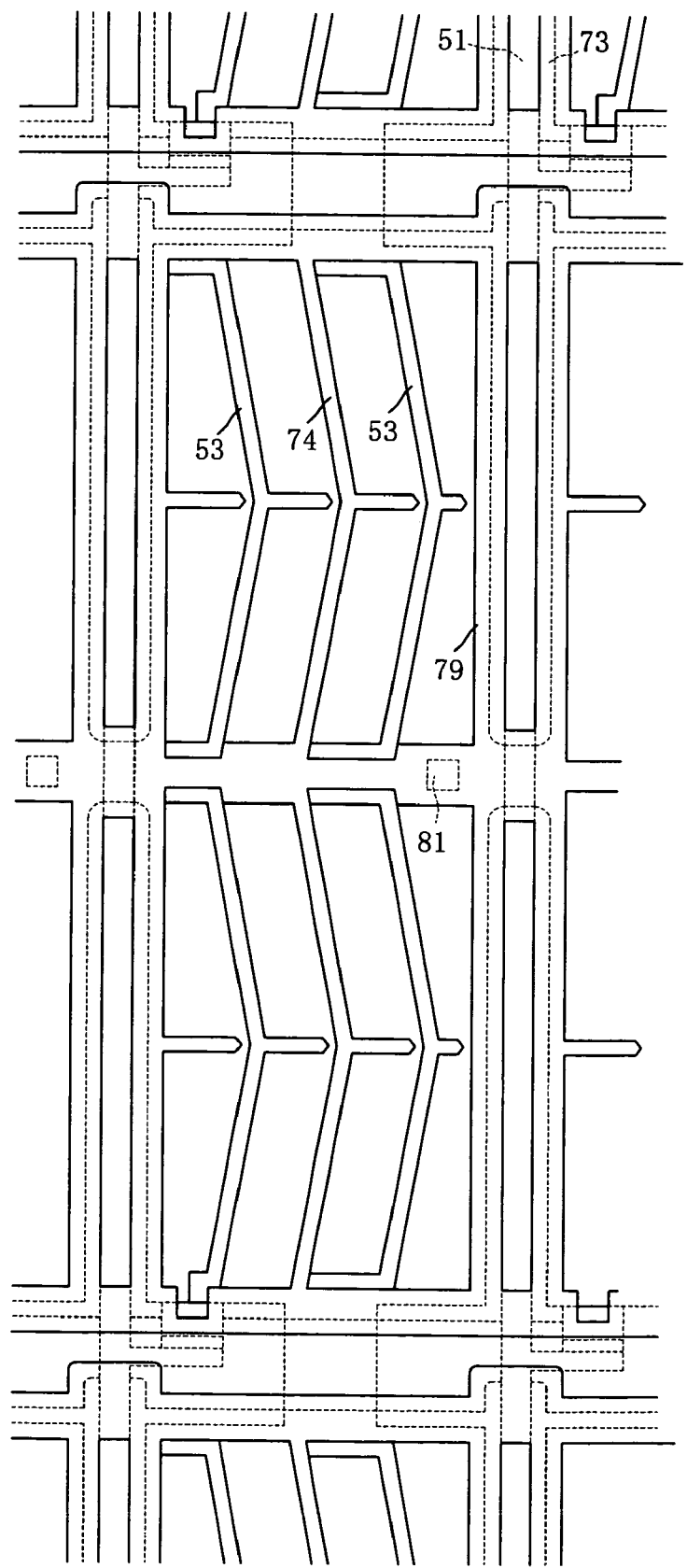
FIG. 96 is a plan view showing a further example of structure in the transverse electric field type liquid crystal display device-according to the present invention.
Figure 97:
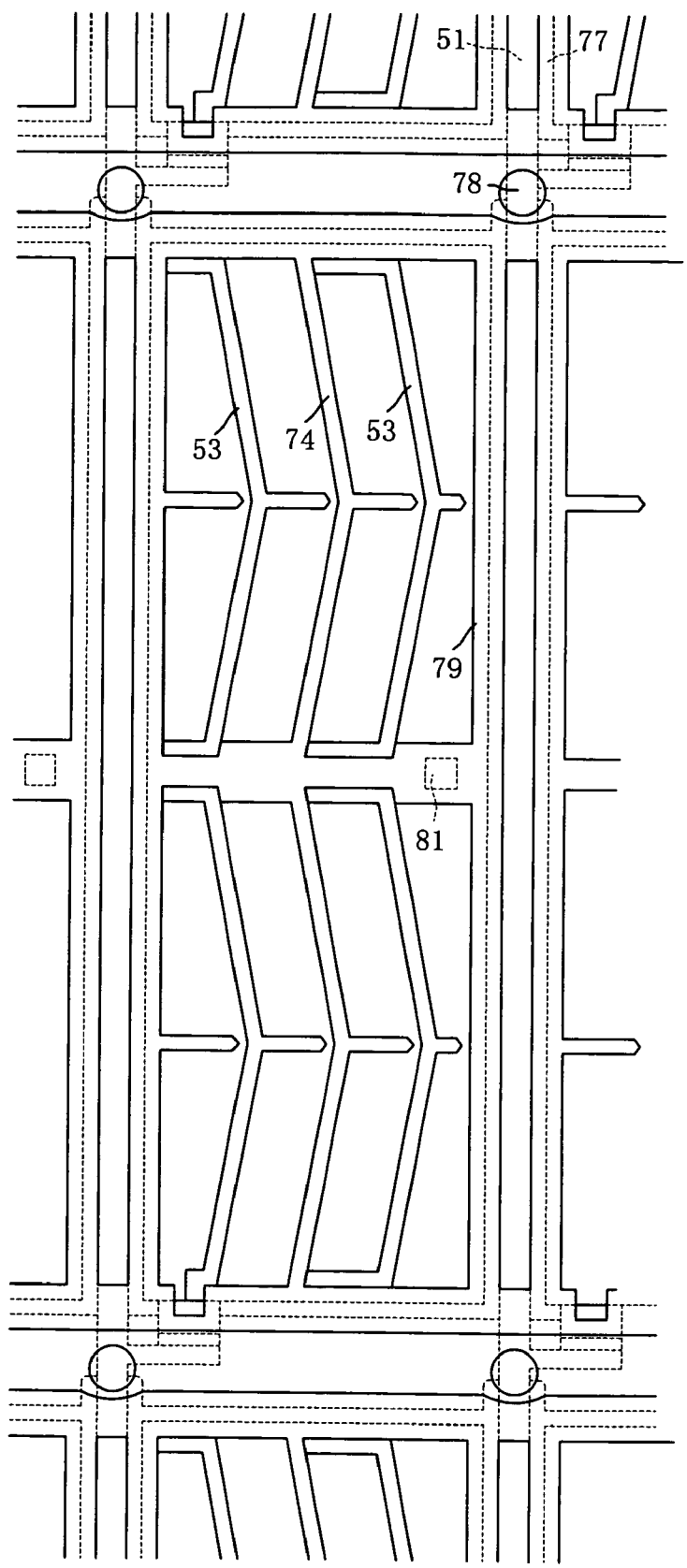
FIG. 97 is a plan view showing a further example of structure in the transverse electric field type liquid crystal display device according to the present invention.

FIGS. 82, 84, 92., 93, 94 and 95 are plan views showing the structure of the transverse electric field type liquid crystal panel in the twelfth embodiment of the present invention. In this structure, the video signal line is straight while the upper layer shielding common electrode, common electrode within the pixel, and the liquid crystal drive electrode are bent within a pixel at least once at an angle within a range between 0-30 degrees except 0 degree with respect to the alignment direction of the liquid crystal molecules. In the twelfth embodiment, positive dielectric constant anisotropic liquid crystals are used in which the alignment direction of the liquid crystal molecules is substantially perpendicular to the direction of the scanning line. As shown in FIG. 120, the liquid crystal molecules are able to rotate in the right and left directions, which contributes to increase the viewing angle while decreases the color shift at the same time.

In the twelfth embodiment, as shown in FIG. 121, by using the negative dielectric constant anisotropic liquid crystals with the alignment direction of the liquid crystal molecules in parallel with the direction of the scanning lines, the liquid crystal molecules are able to rotate in the right and left directions, which contributes to increase the viewing angle while decreases the color shift at the same time. In the arrangement of this embodiment, the liquid crystal drive electrode, the common electrodes within the pixel, and the upper layer common electrode are bent at least once at an angle between 60 degrees and 120 degrees except 90 degrees, with respect to the alignment direction of the liquid crystal molecule in a given pixel.

Preferred Embodiment 13

FIGS. 83, 85, 88, 89, 90, 91, 96 and 97 are plan views showing the structure of the transverse electric field type liquid crystal panel in the thirteenth embodiment of the present invention. In this structure, as to one pixel, the video signal line and the upper layer shielding common electrode are straight while the common electrode within the pixel and the liquid crystal drive electrode are bent at least once at an angle within a range between 0-30 degrees except 0 degree with respect to the alignment direction of the liquid crystal molecules. In the thirteenth embodiment, positive dielectric constant anisotropic liquid crystals are used in which the alignment direction of the liquid crystal molecules is substantially perpendicular to the direction of the scanning line. As shown in FIG. 120, the liquid crystal molecules are able to rotate in the right and left directions, which contributes to increase the viewing angle while decreases the color shift at the same time.

In the thirteenth embodiment, as shown in FIG. 121, by using the negative dielectric constant anisotropic liquid crystal with the alignment direction of the liquid crystal molecules in parallel with the direction of the scanning lines, the liquid crystal molecules are able to rotate in the right and left directions, which contributes to increase the viewing angle while decreases the color shift at the same time. In the arrangement of this embodiment, the liquid crystal drive electrode and the common electrode within the pixel are bent at least once at an angle between 60 degrees and 120 degrees except 90 degrees, with respect to the alignment direction of the liquid crystal molecule in a given pixel.

Preferred Embodiment 14

It is also possible that the video signal line, the upper layer shielding common electrode, and the common electrode within the pixel are straight while only the liquid crystal drive electrode is bent at least once at an angle within a range 0-30 degrees except 0 degree with respect to the alignment direction of the liquid crystal molecules. In this arrangement, positive dielectric constant anisotropic liquid crystals are used in which the alignment direction of the liquid crystal molecules is substantially perpendicular to the direction of the scanning line. As shown in FIG. 120, the liquid crystal molecules are able to rotate in the right and left directions, which contributes to increase the viewing angle while decreases the color shift at the same time.

In the fourteenth embodiment, as shown in FIG. 121, by using the negative dielectric constant anisotropic liquid crystal with the alignment direction of the liquid crystal molecules in parallel with the direction of the scanning lines, the liquid crystal molecules are able to rotate in the right and left directions, which contributes to increase the viewing angle while decreases the color shift at the same time. In this arrangement, only the liquid crystal drive electrode is bent at least once at an angle between 60 degrees and 120 degrees except 90 degrees, with respect to the alignment direction of the liquid crystal molecule in a given pixel.

Preferred Embodiment 15

With respect to the structure described in the above regarding the eleventh embodiment, it is also possible that the common electrode within the pixel is obviated and only one line of liquid crystal drive electrode exists within a pixel, and further, the video signal line, the upper layer shielding common electrode, and the liquid crystal drive electrode are bent at least once at an angle within a range 0-30 degrees except 0 degree with respect to the alignment direction of the liquid crystal molecules. As shown in FIG. 120, the liquid crystal molecules are able to rotate in the right and left directions, which contributes to increase the viewing angle while decreases the color shift at the same time. In this arrangement, positive dielectric constant anisotropic liquid crystals are used in which the alignment direction of the liquid crystal molecules is substantially perpendicular to the direction of the scanning line. The fifteenth embodiment is suited for the production of super high resolution display device with a pixel pitch of 50 micrometers or smaller.

In the fifteenth embodiment, as shown in FIG. 121, by using the negative dielectric constant anisotropic liquid crystal with the alignment direction of the liquid crystal molecules in parallel with the direction of the scanning lines, the liquid crystal molecules are able to rotate in the right and left directions, which contributes to increase the viewing angle while decreases the color shift at the same time. In this arrangement, the video signal line, the upper layer shielding common electrode, and the single line of the liquid crystal drive electrode are bent at least once at an angle between 60 degrees and 120 degrees except 90 degrees, with respect to the alignment direction of the liquid crystal molecule in a given pixel.

Figure 122:
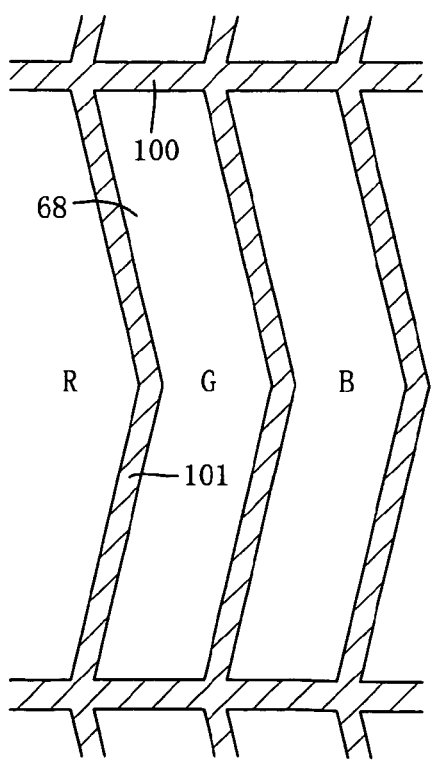
Figure 123:
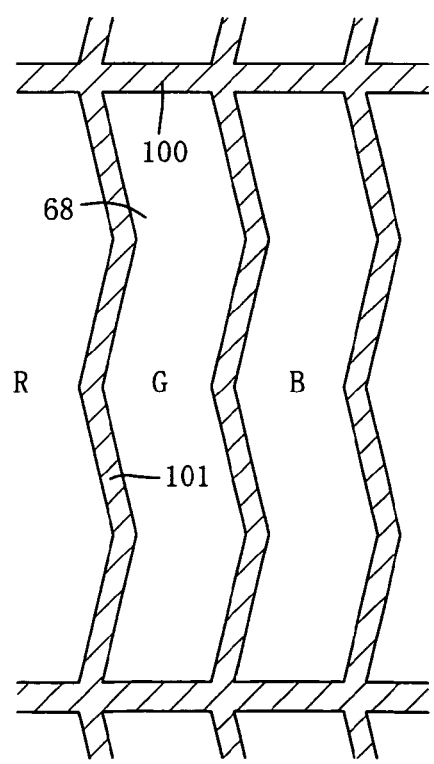

In the structure of the color filter substrate used in the eleventh and fifteenth embodiments, as shown in FIGS. 122 and 123, the light shielding film (black mask) 101 and the color filter layer 68 are bent in a similar manner to the video signal line. More particularly, the black mask 100 that covers the scanning line is straight and the black mask 101 covers the video signal line is bent as noted above. According to the present invention, the spacer bump and the bump covering the video signal line are also bent similarly to the vide signal line. In the case where the upper layer shielding common electrode covers the video signal line completely, the light leakage will not occur even when the black mask corresponding to the video signal line is not used, thus it is possible to eliminate the black mask. When the upper layer shielding common electrodes covers both the video signal line and the scanning lines completely, the light leakage will not occur even when the black mask is not used, thus, it is sufficient that only the color filter is bent similarly to the video signal line.

Preferred Embodiment 16

Figure 119:
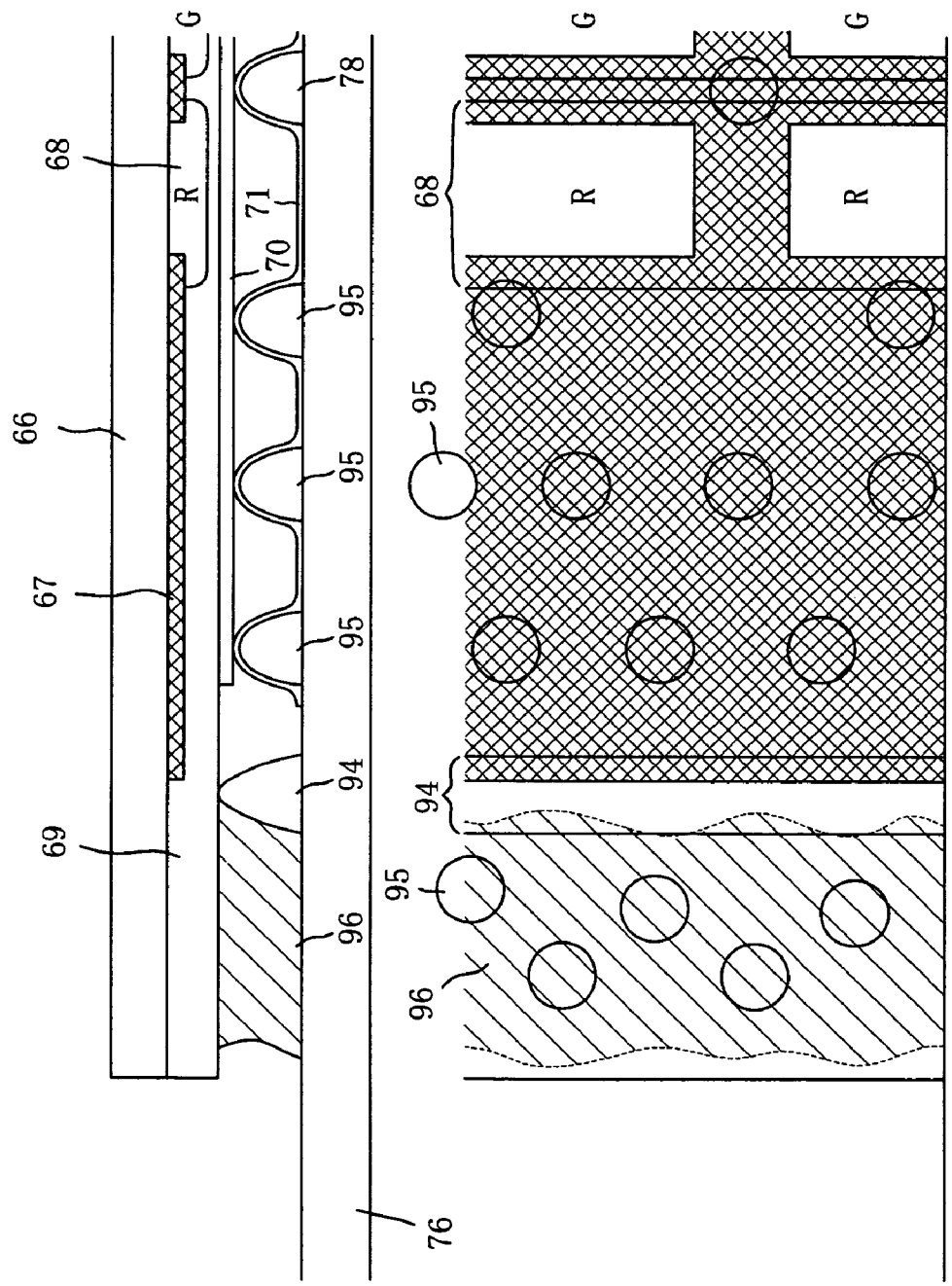
FIG. 119 includes a cross sectional view and a plan view showing the structure of the transverse electric field type liquid crystal panel of the present invention in the vicinity of the main seal.

FIG. 119 shows a cross sectional view and a plan view of the transverse electric field type liquid crystal panel in the sixteenth embodiment of the present invention. In FIG. 119, a numeral 66 denotes a glass substrate in the side of color filter, a numeral 67 denotes a black mask (light shield film), a numeral 68 denotes a color filter layer, a numeral 69 denotes a leveling layer in the side of the color filter, a numeral 70 denotes an alignment film in the side of the color filter, a numeral 71 denotes an alignment film in the side of TFT array substrate, a numeral 76 denotes a glass substrate in the side of TFT array, a numeral 78 denotes a spacer formed on the bump covering the video signal line, a numeral 94 denotes a photolithography spacer having a ring shape, a numeral 95 denotes a photolithography spacer having a circular shape, a numeral 96 denotes a main seal for forming the liquid crystal cell.

The spacer bump 94 having a closed loop shape is formed at the position that overlaps the boarder of the black mask (light shielding film) that surrounds the outer most display area. The width of 100-500 micrometers will be sufficient for the spacer bump 94, although the width of the spacer bump should not be too small. FIG. 119 only shows one closed looped spacer bump 94, however, two or more of them can also be incorporated. In the area of the main seal 96, many spacer bumps 95 having a circular shape are provided. By utilizing the structure of the present invention, glass fibers that determine the cell gap does not need to be introduced. Because the glass fibers are not mixed therein, this structure can prevent the occurrence of line breakage even when the video signal line and the scan lines are fabricated by soft material such as aluminum alloy. Further, by utilizing the structure of the present invention, the main seal does not invade the areas of the black mask, thus, the main seal can be completely hardened by ultraviolet rays. In this structure, since the spread of impurities from the main seal can be effectively suppressed, it is able to improve the reliability.

Preferred Embodiment 17

FIGS. 32, 33, 34, 35 and 106 show the transverse electric field type liquid crystal panel in the seventeenth embodiment of the present invention. FIGS. 32A-32E and 35A-35E are plan views and cross sectional views showing the principle of the halftone shift exposure method of the present invention and the structure of the photoresist after the development. FIGS. 33A-33B and 34A-34B are plan views showing other examples of the halftone shift exposure method of the present invention. FIGS. 106A-106F are cross sectional views showing the production flow involved in the four-step photomasking process using the halftone shift exposure method of the present invention.

In FIGS. 32A-32E and 35A-35E, a numeral 1 denotes a silica glass substrate forming a photomask, a numeral 2 denotes a metal layer (opaque mask pattern) on the glass substrate 1, a numeral 19 denotes a UV light, a numeral 20 denotes an area on the positive photoresist layer after development where the UV light exposure is completely blocked, a numeral 21 denotes an area where the photoresist is completely removed, a numeral 22 denotes an area on the positive photoresist layer after development where the UV light exposure is made through the under exposure (incomplete exposure) step, and a numeral 62 denotes an area on the photoresist which has been exposed in the first under exposure step, and a numeral 63 denotes an area on the photoresist which has been completely exposed through both the first and second under exposure steps.

Figure 32A:
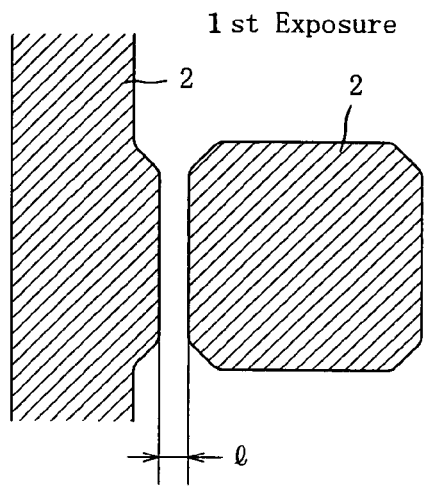
FIGS. 32A-32E are schematic diagrams showing the principle of the halftone shift exposure method of the present invention and a cross sectional structure of the photoresist after the development.
Figure 32C:
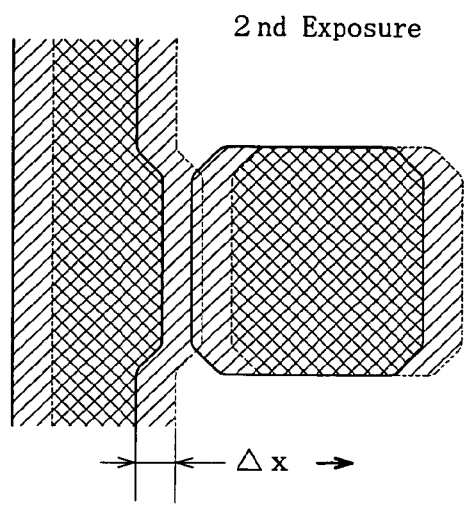
Figure 32B:
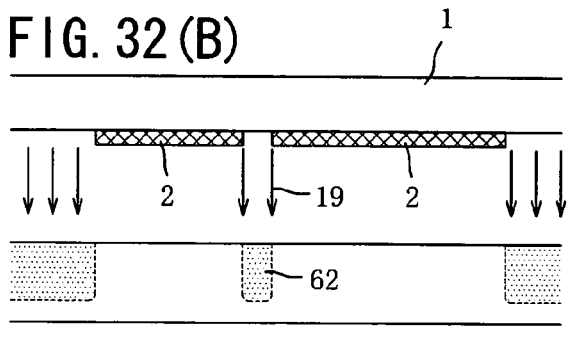
Figure 32D:
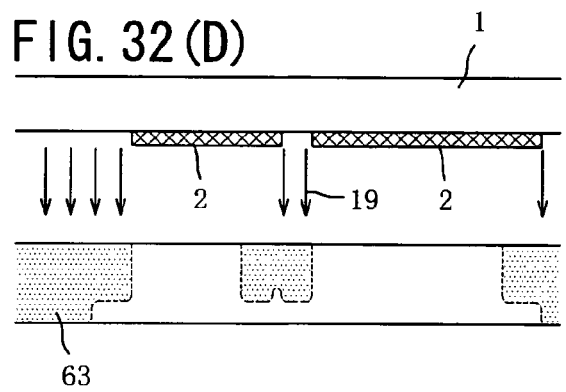

In the present invention, as shown in FIG. 32A, the mask pattern 2 is designed to have a gap l between a source electrode and a drain electrode where a gap distance l is equal to a half of the channel length of the thin film transistor. That is, if the channel length of the thin film transistor is desired to be 6 micrometers, the gap distance 1 of 3 micrometers is used to create the source electrode and the drain electrode. By using an ordinary photomask, a first exposure step is conducted for the positive resist by an under exposure (incomplete exposure) process as shown in FIG. 32B. Then, in FIG. 32C, either the photomask or the glass substrate is shifted horizontally (X direction) by a distance equal to or slightly larger than the gap distance l between the source electrode and the drain electrode. Then, a second exposure step is conducted as shown in FIG. 32D by the same degree of under exposure as that of the first exposure step.

Because the positive photoresist is not completely exposed by the UV light in the first exposure since it is the under exposure process, the photoresist layer underneath the area 62 shown in FIG. 32B remains after the development. Further, because the under exposure step is repeated two times as noted above, the area 63 of the photoresist shown in FIG. 32D which has experienced the under exposure by two times is completely exposed and removed after the development. Thus, when the development is done, the positive photoresist with the cross sectional shape shown in FIG. 32E can be achieved.

FIGS. 33A-33B and FIGS. 34A-34B show similar concepts. In the example of FIGS. 33A-33B, either the photomask or the glass substrate is shifted horizontally (Y direction) by a distance equal to the gap distance l between the source electrode and the drain electrode. In the example of FIGS. 34A-34B, either the photomask or the glass substrate is shifted in two horizontal directions (both X and Y directions) by a distance Δx and Δy, each being equal to the gap distance l or slightly larger than the gap distance l between the source electrode and the drain electrode.

In the example of FIGS. 35A-35E, a thin pattern is provided in the gap between the source electrode and the drain electrode of the photomask. The pattern width L of the thin pattern and a gap distance l between the thin pattern and either the source electrode or drain electrode have a relationship of L<l. It is preferable that the gap distance l is slightly larger than the pattern width L for the under exposure process. Similar to the example of FIGS. 32A-32E, after the first under exposure process, either the photomask or the glass substrate is shifted by a distance equal to or slightly larger than the gap distance l, the second under exposure process is conducted.

When the development is done, the positive photoresist with the cross sectional shape shown in FIG. 35E can be achieved. Preferably, the amount of shift distance and the amount of exposure are adjusted so that the channel area of the thin film transistor becomes as flat as possible. Further, it is preferable that the shift distance and the exposure amount are adjusted so that, in FIGS. 32E and 35E, the thickness of the area 20 of the positive photoresist that has not been exposed is 1.5-2.5 micrometers and the thickness of the half exposed area (under exposed area) 22 on the positive photoresist is 0.2-0.5 micrometers.

FIGS. 106A-106F are cross sectional views showing the process for producing the thin film transistor elements using the halftone shift exposure method of the present invention. In FIGS. 106A-106F, a numeral 6 denotes an area on a positive photoresist layer after development where UV exposure is blocked, a numeral 7 denotes an area on the positive photoresist layer after development where the UV exposure is made through the halftone shift exposure (under exposure), a numeral 9 denotes a gate insulation film, a numeral 10 denotes a thin film semiconductor layer (non-doped layer), a numeral 11 denotes a thin film semiconductor layer (doped layer, i.e., ohmic contact layer), a numeral 15 denotes a scanning line, a numeral 50 denotes a scanning line terminal, a numeral 51 denotes a video signal line, a numeral 54 denotes a scanning line terminal drive circuit contact electrode, a numeral 64 denotes a drain electrode, and a numeral 65 denotes a transparent pixel electrode.

In this example, the production process utilizes four photomasking steps. The processes for producing a thin film resistor using the light transmission adjustment photomask with the halftone exposure is shown in FIGS. 36A-36F. The process of FIGS. 106A-106F involves a process of shifting the exposure position by moving either the photomask or glass substrate. Although the overall process is similar to that of FIGS. 36A-36F, the process of FIGS. 106A-106F achieves the halftone exposure without using the light transmission adjustment photomask (halftone photomask).

Prior to the start of the process of FIGS. 106A-106F, the scanning lines 15 and the scanning terminals 50 are formed on a TFT array glass substrate (not shown), which can be done by a process shown in FIGS. 7A-7E or FIGS. 8A-8E as will be explained later. In FIG. 106A, the gate insulation film 9, the thin film semiconductor layer (non-doped layer) 10 and the thin film semiconductor layer (ohmic contact layer) 11 are respectively deposited by, for example, a CVD plasma device. The positive photoresist 6 is coated and the halftone shift exposure (under exposure) using the ordinary photomask is conducted in the manner described with reference to FIGS. 32A-32E, 33A-33B, 34A-34B and 35A-35E so that the thicker positive photoresist 6 and the thinner positive photoresist 7 are created.

In FIGS. 106B and 106C, through a dry etching process and plasma ashing process, the silicon elements for the thin film transistors are separated from the semiconductor layer. In FIG. 106D, the drain electrode 64 of the thin film transistor and the video signal line 51 are formed by further conducting the etching process. In FIG. 106E, through the dry etching, contact holes are created over the scanning line terminals 50. In FIG. 106F, the scanning line drive circuit electrodes 54 and the transparent pixel electrodes 65 are formed.

In this embodiment, the passivation coverage is improved because the edge portions of the thin film semiconductor layer are formed in a step like shape. The conventional light transmission adjustment photomask is expensive and is not practical for an ultra large screen liquid crystal television. However, as noted above, the halftone shift exposure method of the present invention can be conducted with use of inexpensive ordinary photomasks.

The seventeenth embodiment of the present invention noted above can be applied not only to the liquid crystal display device. For example, the present invention is also applicable to the production processes of organic EL (electroluminescence) display devices or active matrix substrates for X ray detectors, which can dramatically decrease the production cost.

Figure 17:
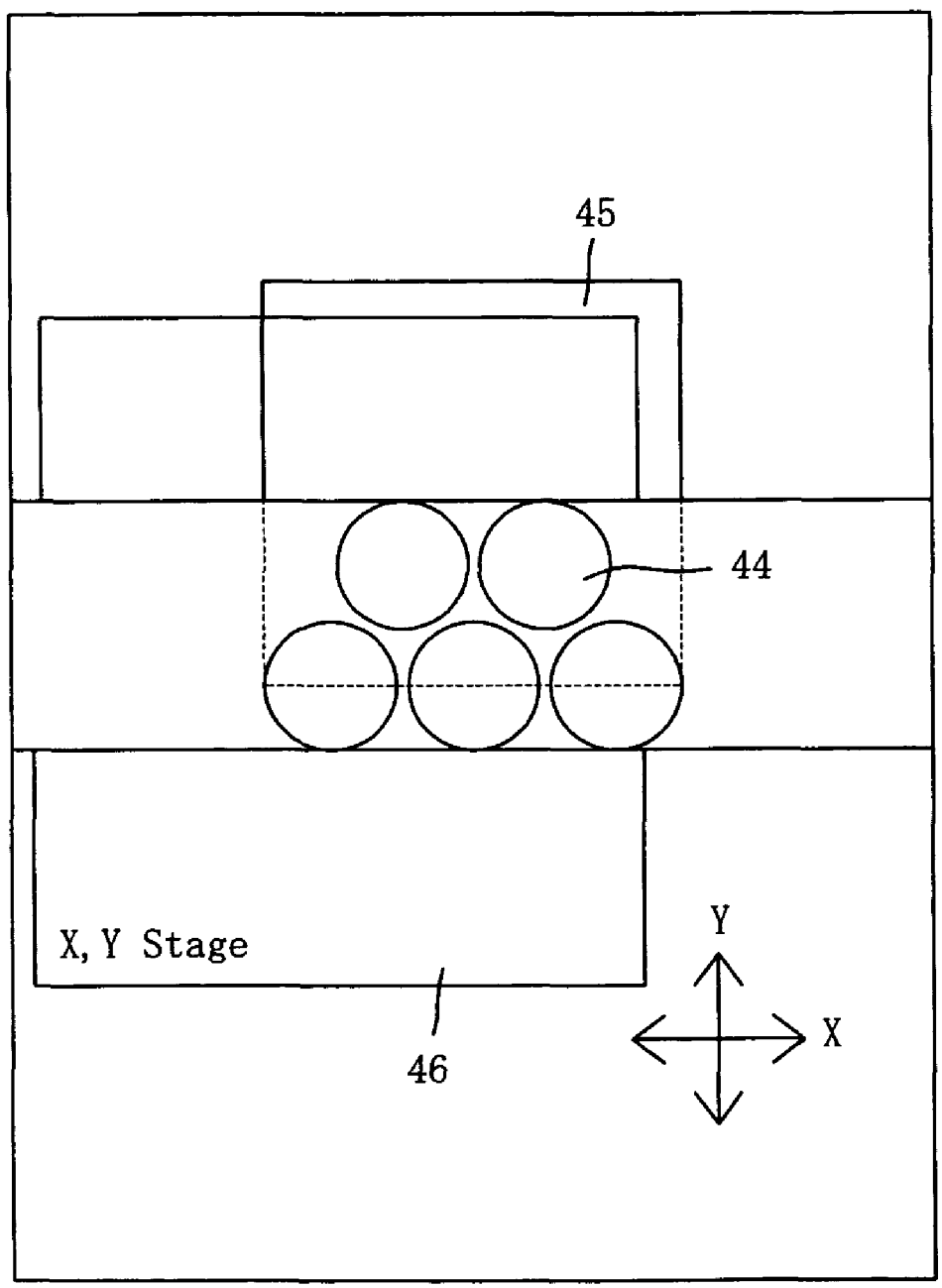
FIG. 17 is a plan view showing an example of structure of the scanning exposure device used in the multi-lens scanning exposure system in the present invention.
Figure 19:
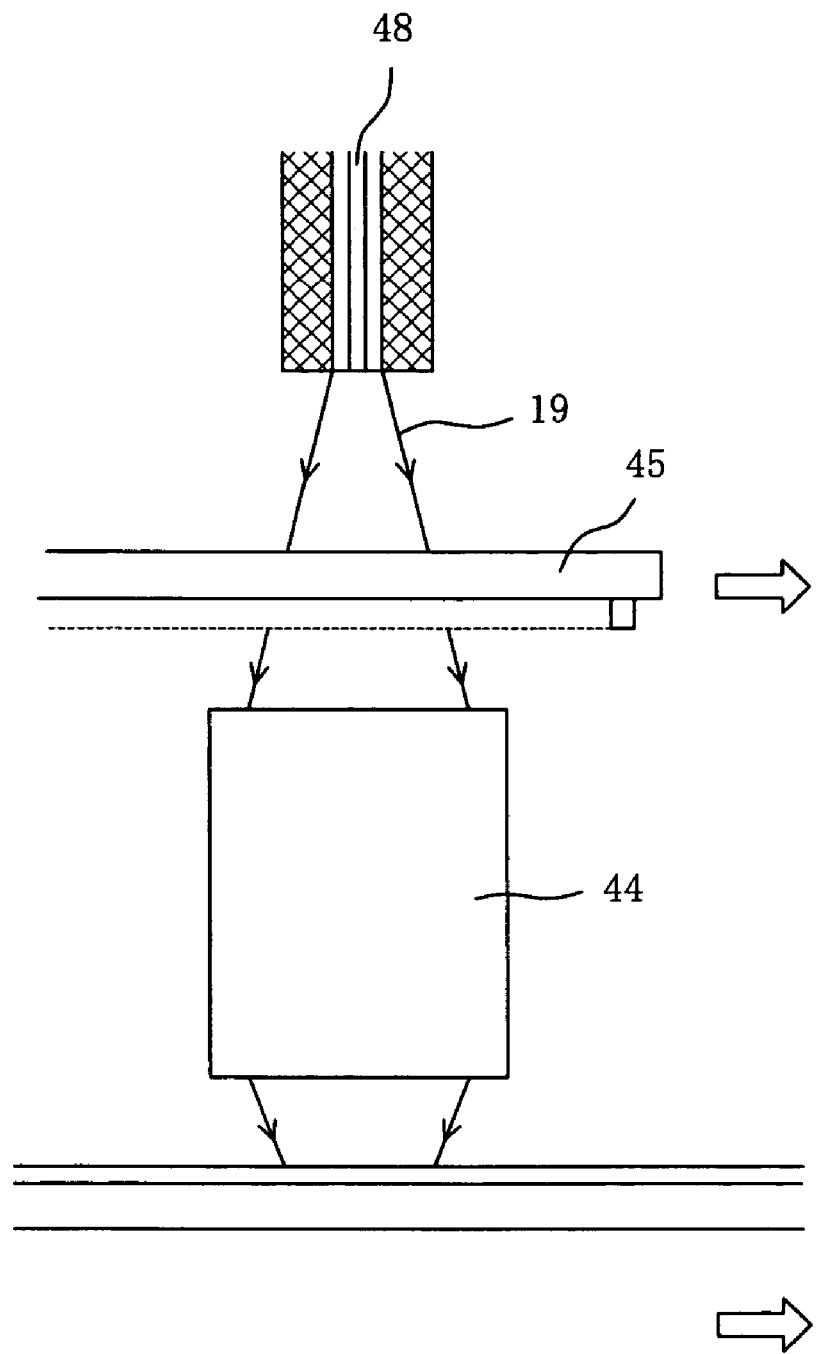
FIG. 19 is a cross sectional view showing the scanning exposure device used in the separate two-step exposure method of the present invention.

FIGS. 17 and 19 show an example of a scan exposure device that can be used in the halftone shift exposure process of the seventeenth embodiment. FIG. 17 is a plan view showing the structure of the scanning exposure device used in the multi-lens scanning exposure system for implementing the seventeenth embodiment of the present invention, and FIG. 19 is a cross sectional view showing the scanning exposure device of FIG. 17. In FIGS. 17 and 19, a numeral 19 denotes a UV light, a numeral 44 denotes a multi-lens exposure module, a numeral 45 denotes an ordinary photomask, a numeral 46 denotes an X-Y stage, and a numeral 48 denotes an optical fiber cable.

When the glass substrate is large, if the photomask of the same size as that of glass substrate is used, the overall cost becomes too high. Thus, in such a case, the photomask 45 which is smaller than the glass plate is used which is shifted in X and Y directions by driving the X-Y stage 46. Since the scanning exposure device of FIGS. 17 and 19 has a plurality of exposure lens arranged in a row, by scanning the exposure lens, it is possible to expose the glass substrate of any size.

The ordinary photomask 45 is a photomask which has no function of adjusting the light transmission unlike the photomask (halftone photomask) 1 of FIGS. 1A and 2A. In the halftone shift exposure method of the present invention, the photomask 45 can be shifted or the substrate on the X-Y stage 46 can be shifted. The halftone shift exposure method can also be implemented by using a mirror projection scan exposure device. The multi-lens scan exposure device shown in FIGS. 17 and 19 is suitable for the halftone shift exposure method of the present invention because the resolution of the positive photoresist can be improved. With the conventional technology using the light transmission adjustment photomask, the halftone exposure method using the mirror projection scan exposure device with lower resolution is more suited.

Preferred Embodiment 18

Figure 13:
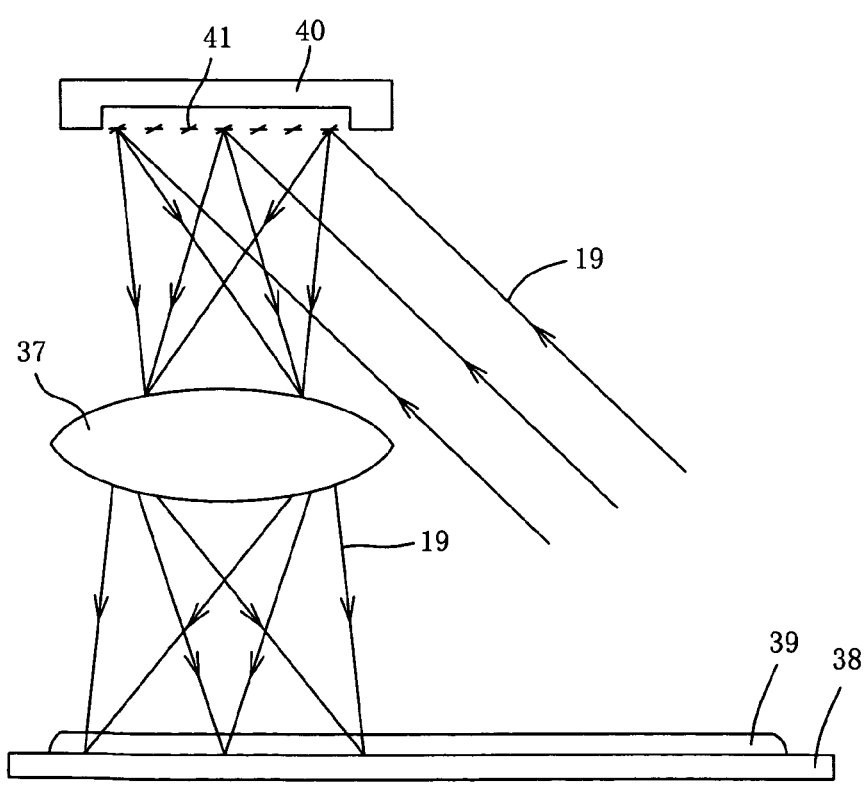
FIG. 13 is a schematic diagram showing the structure of the titler optical system (inverted real image) for the ultraviolet ray exposure method using a micro mirror array according to the present invention.
Figure 14:
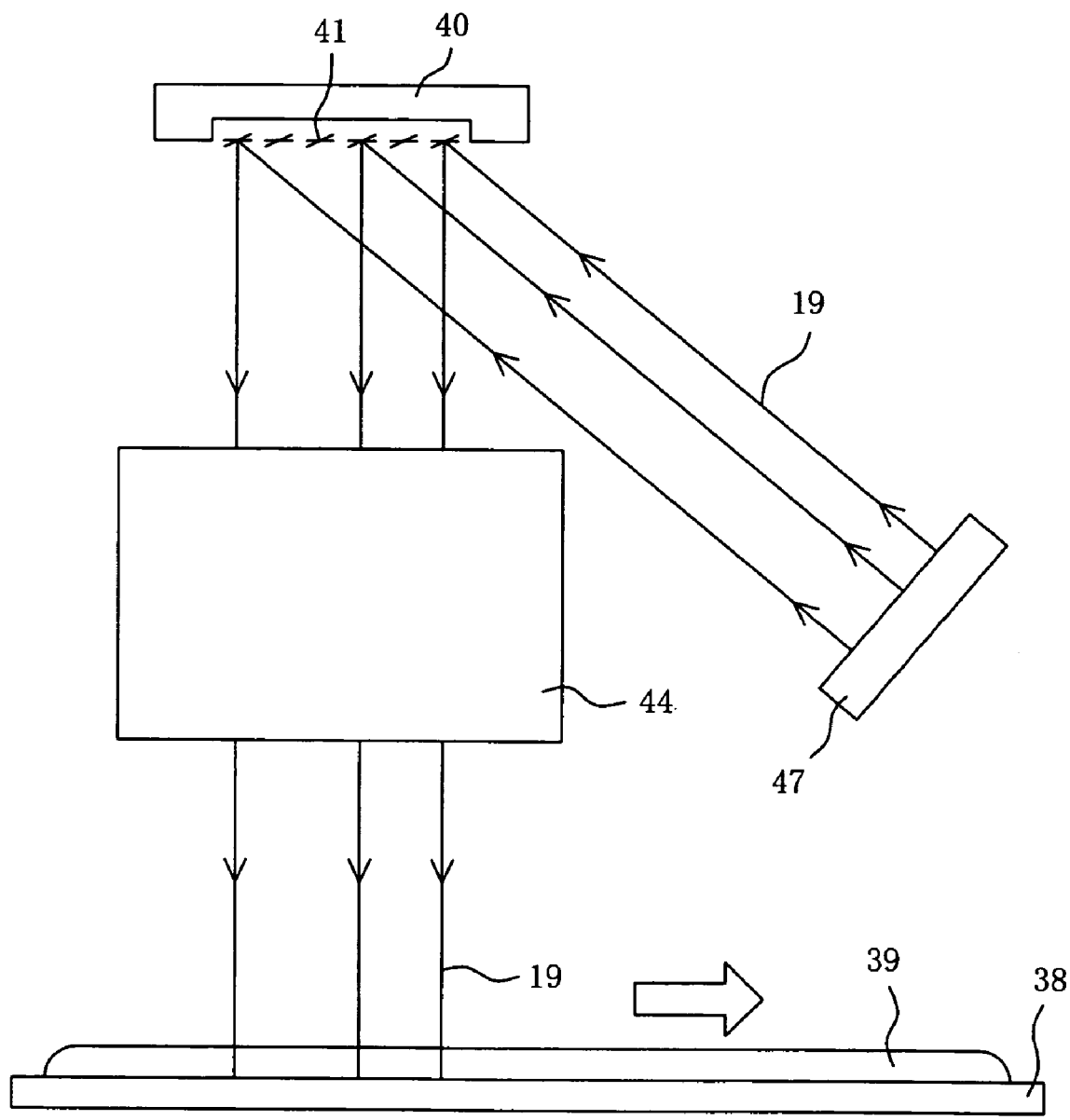
FIG. 14 is a schematic diagram showing the structure of the multi-lens optical system (noninverted real image) for the ultraviolet ray exposure method using a micro mirror array according to the present invention.
Figure 15:
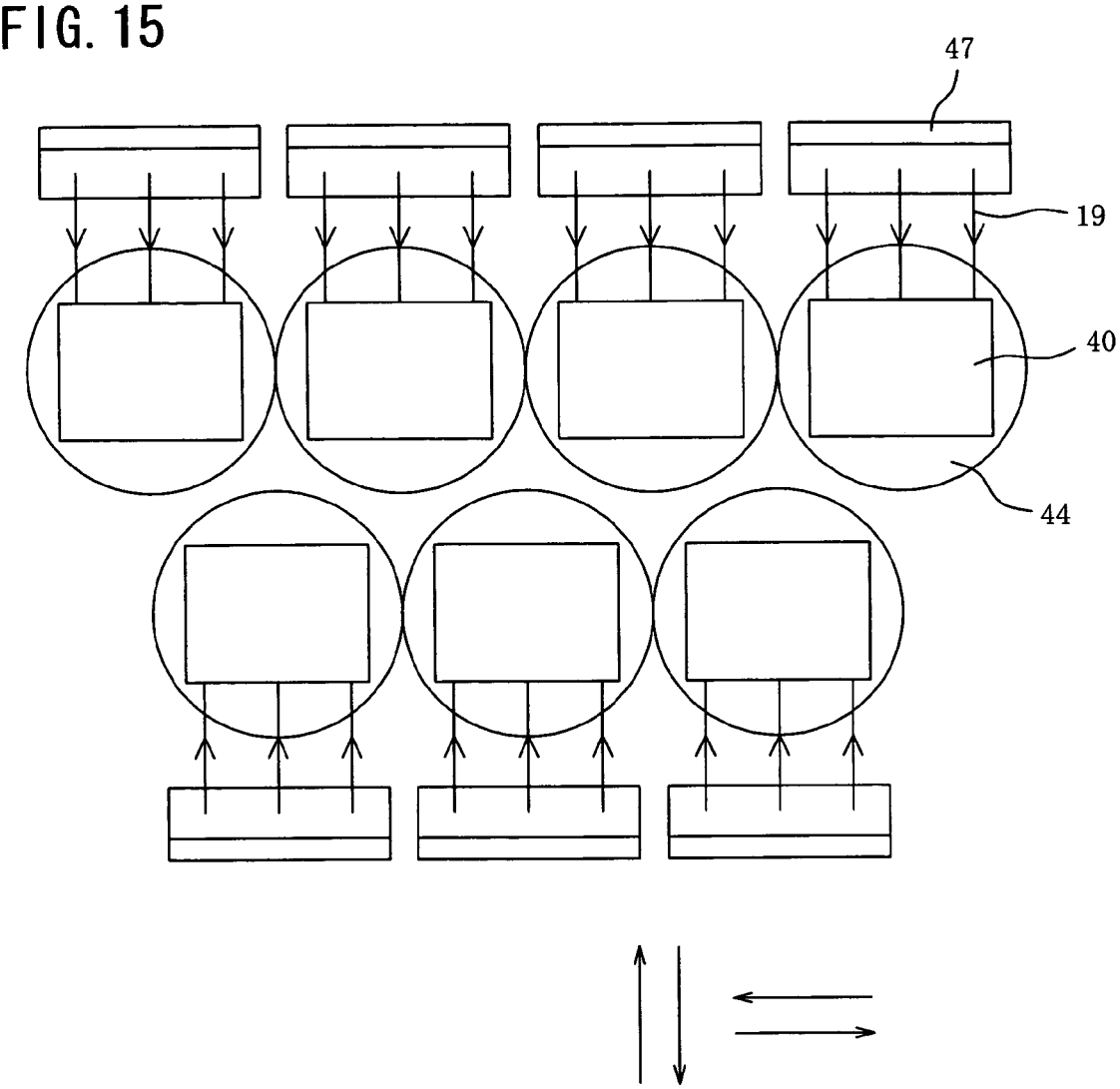
FIG. 15 is a plan view showing an example of structure of the multi-lens scanning exposure system used in the present invention.
Figure 16:
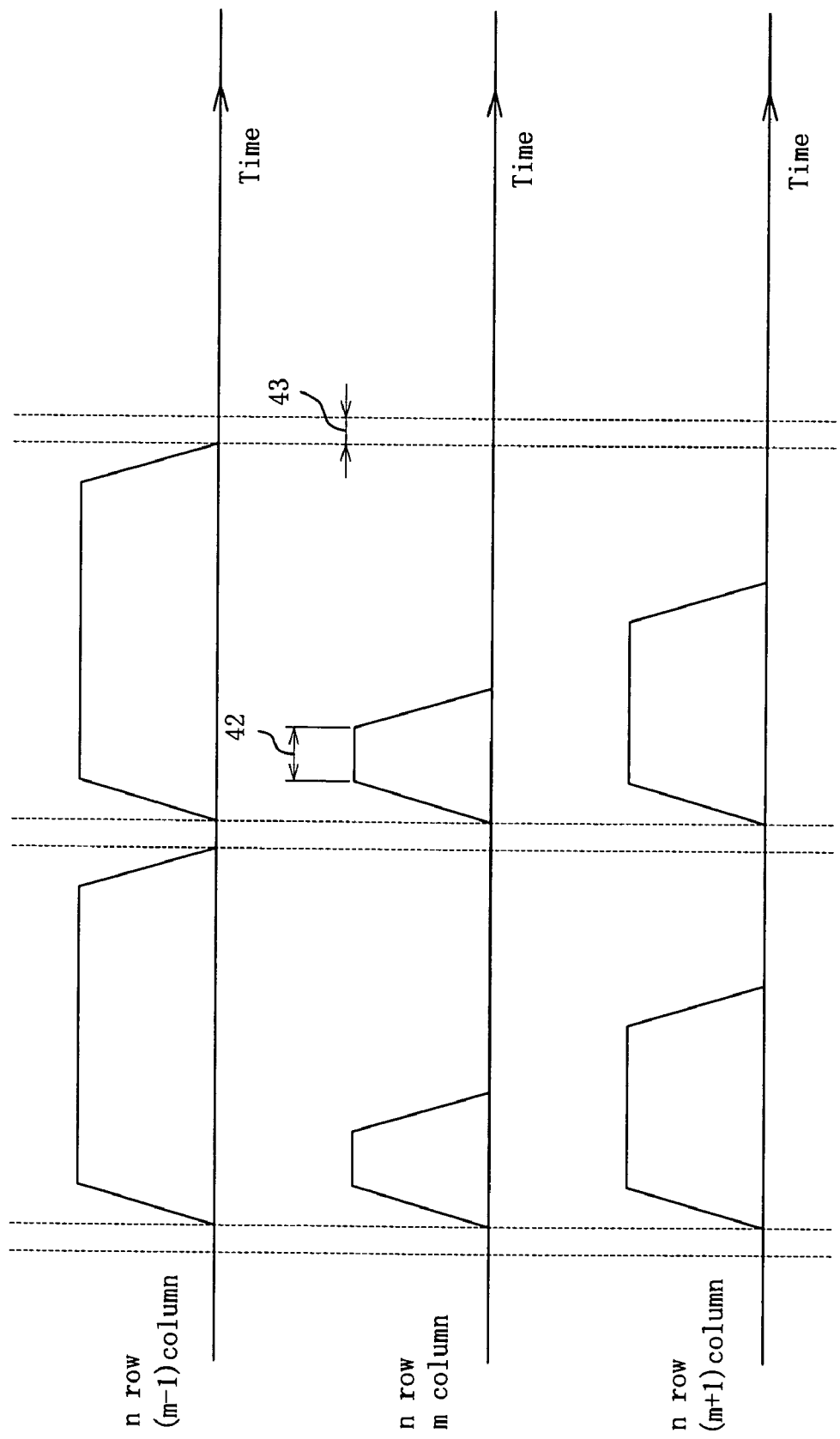
FIG. 16 is a timing chart for explaining the operation of the micro mirror array for the ultraviolet light transmission adjustment by controlling the time widths in accordance with the present invention.
Figure 18:
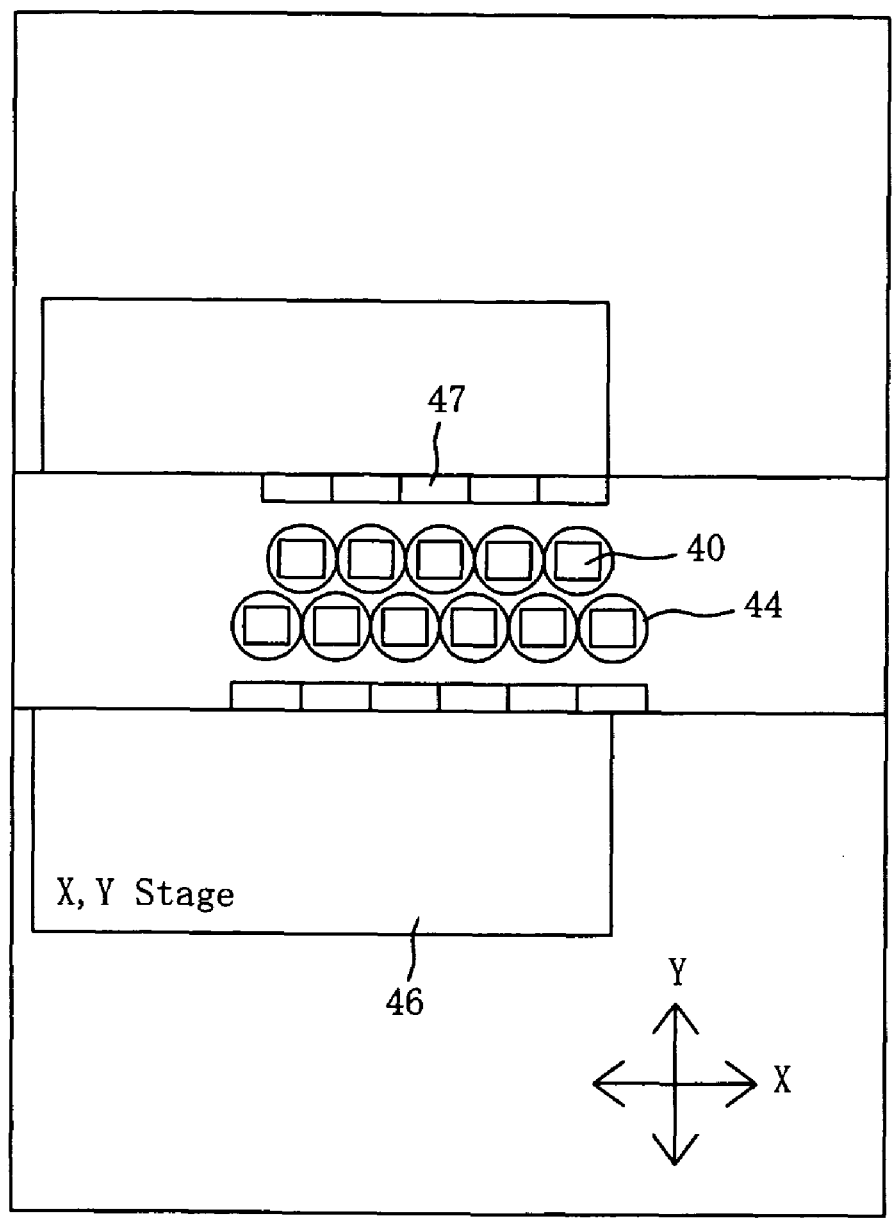
FIG. 18 is a plan view showing an example of structure in scanning exposure device used in the direct halftone exposure method of the present invention in which a photomask is not used.

FIGS. 13-16, 18 and 20 show examples of scanning exposure device without using a photomask in accordance with the eighteenth embodiment of the present invention. FIG. 13 shows a structure of the titler optical system (inverted real image) for the ultraviolet ray exposure method using a micro mirror array, FIG. 14 shows a structure of the multi-lens optical system (noninverted real image) for the ultraviolet ray exposure method using a micro mirror array, FIG. 15 is a plan view showing the structure of the multi-lens scanning exposure system, FIG. 16 is a timing chart for explaining the operation of the micro mirror array for the ultraviolet light transmission adjustment by time width control, FIG. 18 is a plan view showing the scanning exposure device used in the direct halftone exposure method without using a photomask, and FIGS. 20A and 20B show the principle of the direct halftone exposure of the present invention using the exposure device of FIG. 18.

In FIGS. 13-16, 18 and 20, a numeral 19 denotes a UV light, a numeral 20 denotes an area on the positive photoresist layer after development where the UV light exposure is completely blocked, a numeral 21 denotes an area where the photoresist is completely exposed, a numeral 22 denotes an area on the positive photoresist layer after development where the UV light exposure is made through the halftone exposure process, a numeral 37 denotes a projection lens, a numeral 38 denotes a glass substrate for TFT array, a numeral 39 denotes a positive photoresist layer., a numeral 40 denotes a micro mirror array device (DMD module), a numeral 41 denotes a micro mirror, a numeral 42 denotes a time length during which the micro mirror 41 is in operation, a numeral 43 denotes a time length for rewriting the data during which the micro mirror 41 is not in operation, a numeral 44 denotes a multi-lens projection exposure module (non-inverted real image), a numeral 46 denotes an X-Y stage, and a numeral 47 denotes a UV light source.

In the eighteenth embodiment, the scanning exposure device includes a plurality of reflective mirror devices 40 which are arranged in a checker board manner where each mirror device has micro-mirrors formed in a two dimensional manner. As noted above, the scanning exposure device of the present invention does not require the photomask for producing the pattern on the glass substrate. The UV light 19 from the light source 47 is reflected by the micro-mirrors 41 on the micro-mirror array device 40 in the exposure system of FIG. 14. In the exposure system of FIG. 15, the UV light 19 passes through the multi-lens projection exposure module 44 which produces a non-inverted real image and projects the image on the positive photoresist 39 on the glass substrate 38. Thus, the photoresist 39 is exposed by the UV light 19 for the image produced by the projection exposure module 44. In the exposure systems of FIGS. 14, 15 and 18, the degree of UV light applied to the photoresist 39 is regulated by the time lengths as shown by the timing chart of FIG. 16.

Figure 20A:
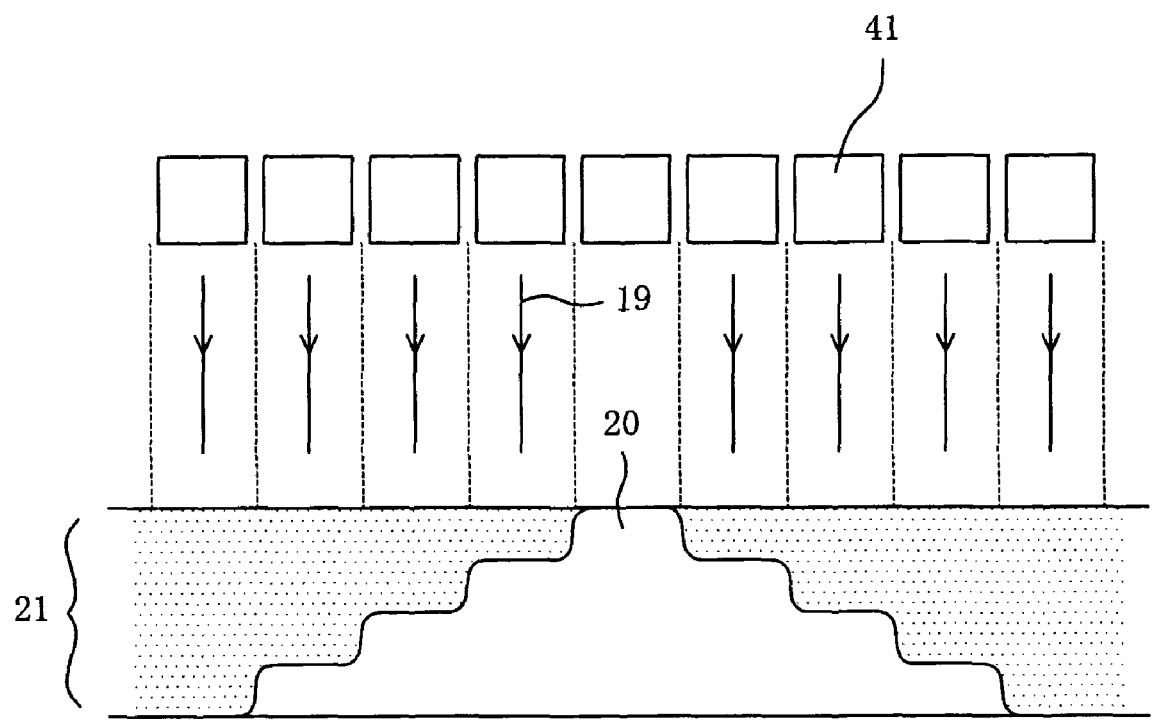
FIGS. 20A-20B are schematic diagrams showing the principle of the exposure in the direct halftone exposure of the present invention and a cross sectional structure of the photoresist after the development.
Figure 20B:
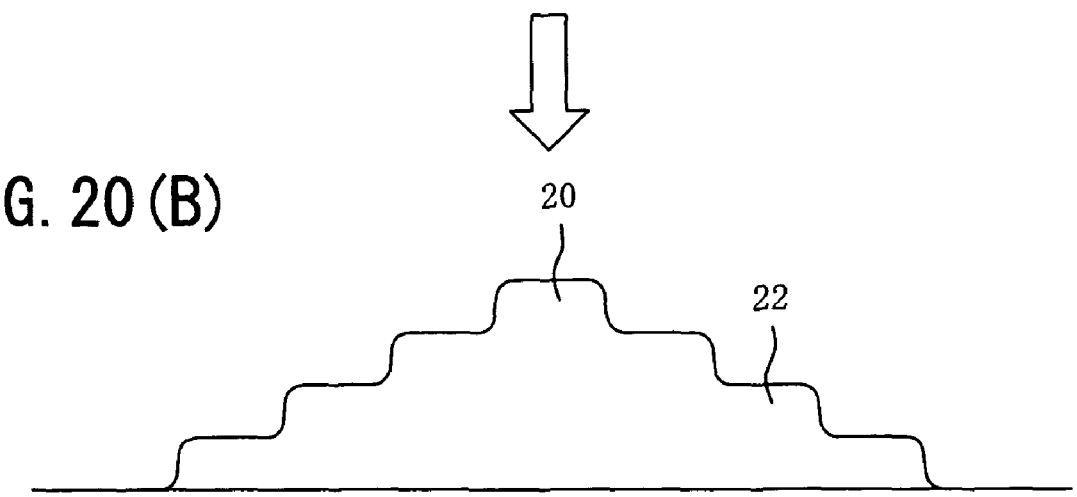

As shown in the time chart of FIG. 16, the movement of the micro mirrors 41 can be controlled one by one. By using this reflective mirror device to alter the exposure timing of the UV ray to the positive photoresist, a multi-level halftone exposure method such as shown in FIGS. 20A-20B can be performed. As described above, in the eighteenth embodiment, it is possible to easily conduct the multi-level halftone exposure method for a large area without using the expensive light transmission adjustment (halftone) photomask.

The major difference between the optical system of FIG. 13 and the optical system of FIG. 14 resides in that the optical system of FIG. 13 involves the inverted real image while the optical system of FIG. 14 involves the non-inverted real image. The optical system of FIG. 13 may be sufficient for use as a titler for locally exposing a simple image such as text data. However, for a scanning exposure system to expose the complicated patterns on the substrate, the optical system of non-inverted real image such as the one shown in FIG. 14 must be used for producing fine and accurate patterns on the substrate.

Preferred Embodiment 19

FIGS. 37A-37B and FIGS. 43A-43B show nineteenth embodiment of the present invention. FIGS. 37A-37B are plan views showing an example of principle of the halftone shift exposure method of the present invention. FIGS. 43A-43B are plan view showing a further example of principle of the two-step exposure method of the present invention. More particularly, FIGS. 37A-37B and FIGS. 43A-43B show the structure of an ordinary photomask for producing the scanning line, the lower layer shielding common electrode and the common electrode within the pixel by the halftone shift exposure method in the seventeenth embodiment described above. FIGS. 37A-37B and FIGS. 43A-43B also show the distribution of the amount of light exposed during the half shift exposure process.

In this exposure process, a first under exposure step is conducted with use of an ordinary photomask. After the first under exposure, the photomask is shifted in parallel with the scanning line by the distance equal to the width of the common electrode. Then, the second under exposure step is conducted preferably with the same amount of light as that of the first exposure step. After the development, there remains an area having a thick positive photoresist, an area having a thin positive photoresist, and an area having no positive photoresist.

Figure 32E:
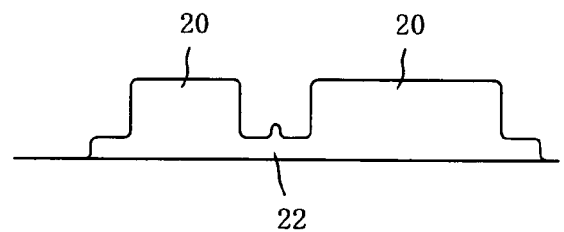
Figure 42:
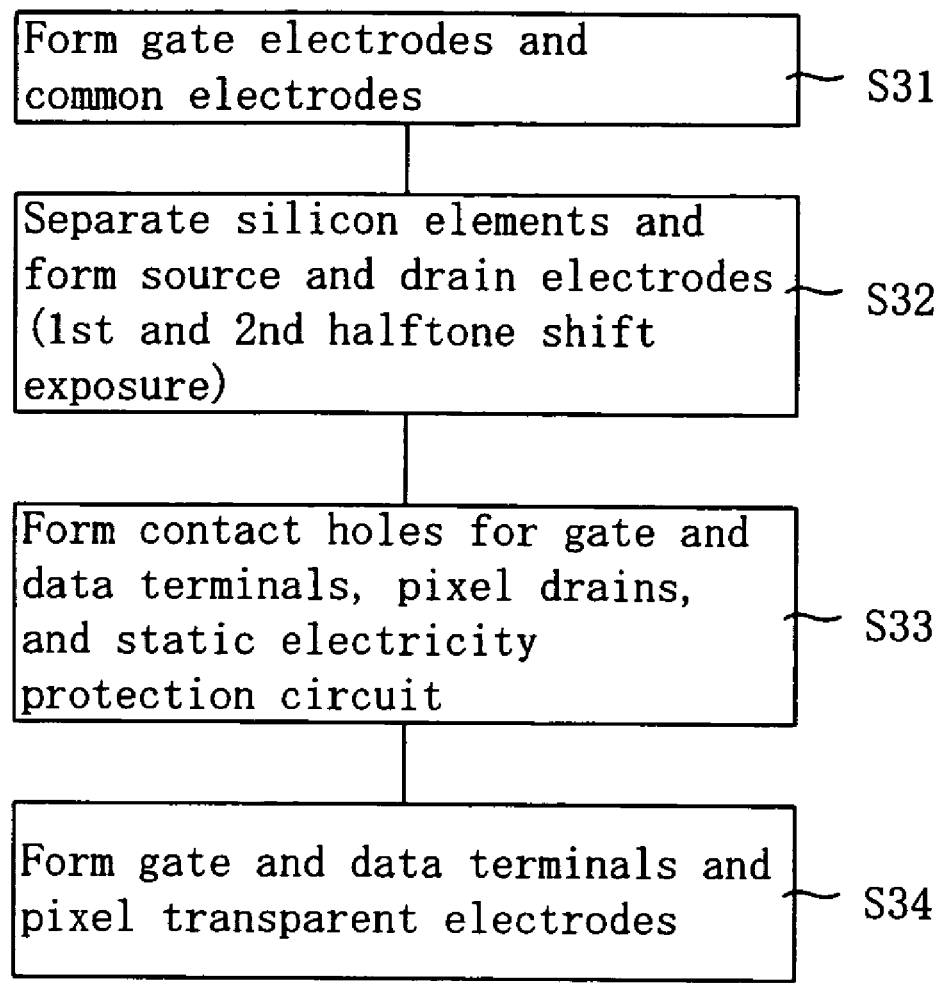
FIG. 42 is a flow chart showing an example of the production flow involved in the four-step photomasking process of the present invention.

FIGS. 7A-7E and FIGS. 8A-8E are cross section views showing the processes to create electrodes of two different thicknesses using the halftone shift exposure method. Metals or alloys that can be selectively etched are constructed in two or three layers and two different thickness of positive photoresist are constructed using the halftone shift exposure of the present invention to construct a non-exposed area 20 and an incompletely exposed area 22 (FIGS. 32E and 35E). With use of the etching and ashing process for the positive photoresist and selective etching technology, the electrodes having two different thickness are produced.

The process shown in FIGS. 7A-7E and 8A-8E will be repeated for forming electrodes on different layers on the TFT array glass substrate. For example, the process of FIGS. 7A-7E or 8A-8E precedes the process of FIGS. 106A-106F described above so that the process of FIGS. 106A-106F starts after creating the scanning line 15 and scanning line terminal 50. In FIGS. 7A-7E and FIGS. 8A-8E, a numeral 26 denotes lower electrode material, a numeral 27 denotes low resistance electrode material, a numeral 28 denotes an upper electrode material. As noted above, a numeral 20 denotes an area of the photoresist which is not exposed by the UV light, and a numeral 22 denotes an area of the photoresist which is incompletely exposed (halftone exposure).

In the process of FIGS. 7A-7E and FIGS. 8A-8E, the lower electrode material (barrier metal) 26 is incorporated because it is not possible to directly connect the doped semiconductor n+a-Si layer to pure aluminum or aluminum alloy. An example of material for the barrier metal is titanium (Ti). An alloy of titanium and molybdenum or an alloy of molybdenum and tungsten is also possible for the barrier metal. In the case of using an aluminum alloy for the electrode material 27, the structure of FIG. 7A will be sufficient since there arise no problem in direct connection with ITO (indium tin oxide).

However, when the low resistance electrode material 27 is configured by pure aluminum, there arises a problem of contact defect because aluminum oxide is formed at the contact surface. To overcome this problem, the upper electrode material 28 is formed as shown in FIG. 8A. An example of material for the upper electrode 28 is molybdenum. Therefore, the basic difference between the examples of FIGS. 7A-7E and FIGS. 8A-8E is that the example of FIGS. 8A-8E includes the upper electrode material 28 additionally, although the remaining production process is the same.

Figure 7A:
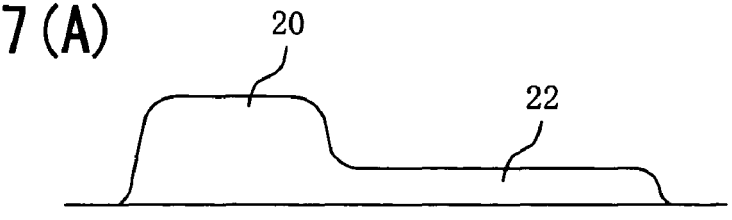
FIGS. 7A-7E are cross sectional views showing an example of production process for forming the video signal lines and the common electrodes in the present invention.

In the example of FIGS. 7A-7E, two metal layers are formed on the substrate, one is the lower electrode layer 26 and the other is the low resistance electrode layer 27. For example, the lower electrode layer 26 is made of titanium (Ti) and the low resistance electrode layer 27 is made of aluminum neodymium nickel (Al—Nd—Ni) or aluminum carbon nickel (Al—C—Ni). In FIG. 7A, through the halftone shift exposure method, for example, the positive photoresist of two different thickness areas 20 and 22 are created.

Figure 7B:
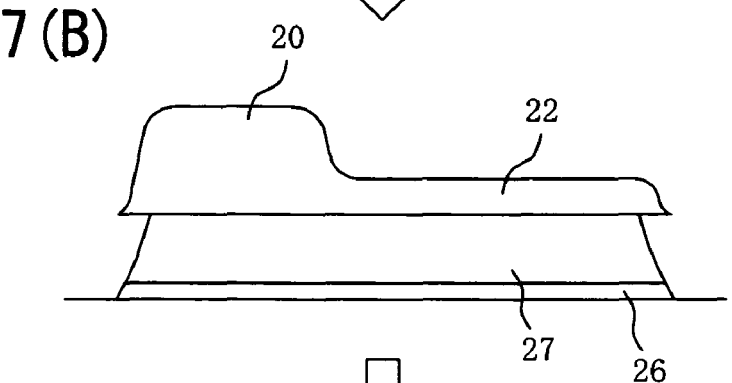
Figure 7C:
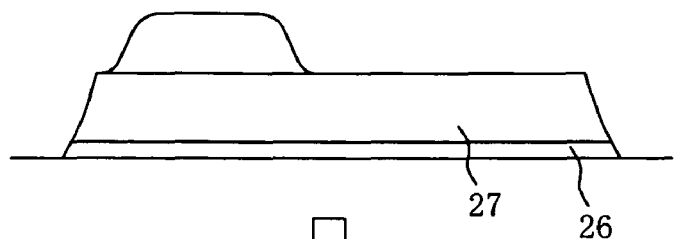
Figure 7D:
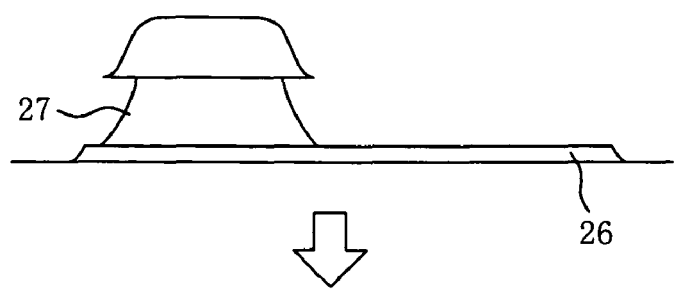
Figure 7E:
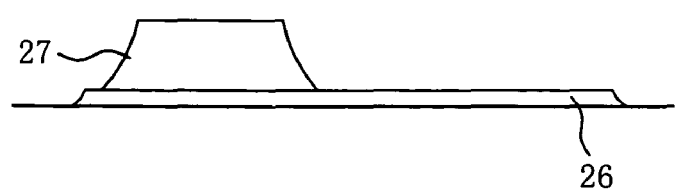
Figure 8A:
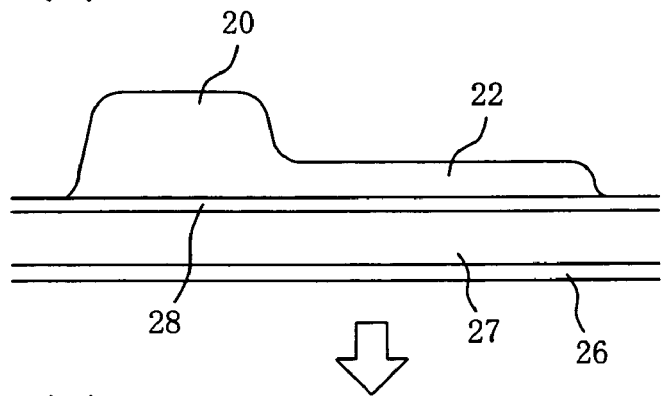
FIGS. 8A-8E are cross sectional views showing another example of production process for forming the video signal lines and the common electrodes in the present invention.
Figure 8B:
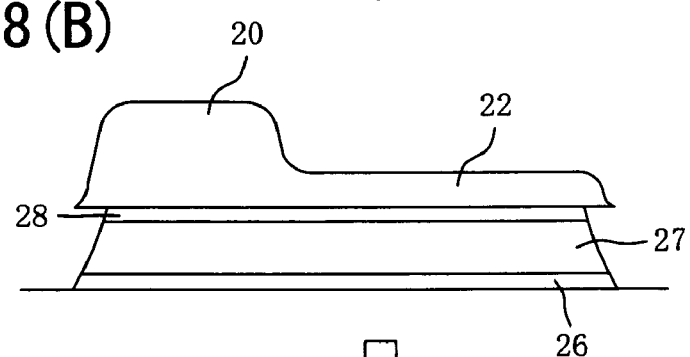
Figure 8C:
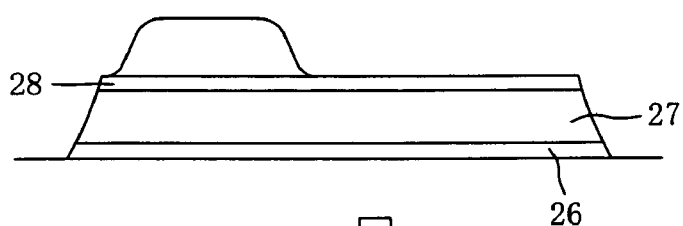
Figure 8D:
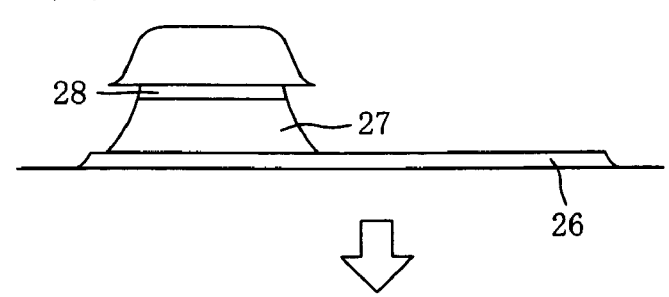
Figure 8E:
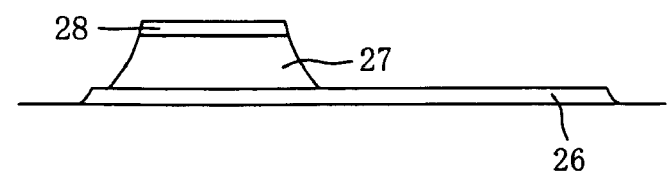

Then, as shown in FIG. 7B, the low resistance electrode layer 27 is etched through a wet etching process and the lower electrode layer 26 is etched through a dry etching process. Then, in FIG. 7C, the thinner photoresist area 22 is removed through, for example, a dioxide plasma ashing process while leaving the thicker photoresist area 20. The wet etching process is performed again for the low resistance electrode layer 27 as shown in FIG. 7D. Lastly, the positive photoresist is completely removed through the ashing process as shown in FIG. 7E.

In the example of FIGS. 8A-8E, three metal layers are formed on the substrate, the first one is the lower electrode layer 26, the second one is the low resistance electrode layer 27, and the third one is the upper electrode layer 28. For example, the lower electrode layer 26 is made of titanium (Ti), the low resistance electrode layer 27 is made of pure aluminum (Al), and the upper electrode layer 28 is made of molybdenum (Mo). In FIG. 8A, through for example, the halftone shift exposure method, the positive photoresist of two different thickness areas 20 and 22 are created. The process of FIGS. 8B-8E are the same as that of FIGS. 7B-7E, thus the explanation thereof is omitted here.

In performing the halftone shift exposure method of the present invention, the first exposure and the second exposure use the same photomask for producing the scanning line, shielding common electrode, and common electrode within the pixel. Thus, in determining the positions of the first exposure and the second exposure, it is only necessary to shift the photomask by a small horizontal movement in one direction. In other words, there is no need to construct an alignment mark on the glass substrate for positioning two different photomasks since only one photomask has to be used. Therefore, it is possible to reduce the time and cost in the production process.

Preferred Embodiment 20

FIGS. 38A-38B, 39A-39B, 40A-40B, 41A-41B and 44A-44B show example of distribution of light exposure when the halftone shift exposure method in the twentieth embodiment of the present invention is conducted with use of two or more ordinary photomasks, i.e, without using the light transmission adjustable photomask (halftone photomask) such as shown in FIGS. 1A and 2A. This example shows the case where the halftone shift exposure method of the present invention is applied to the production process of the scanning lines and the shielding common electrodes. In implementing this method, one or more alignment marks need to be provided inside the glass substrate since the first exposure and the second exposure use photomasks different from one another.

Figure 9:
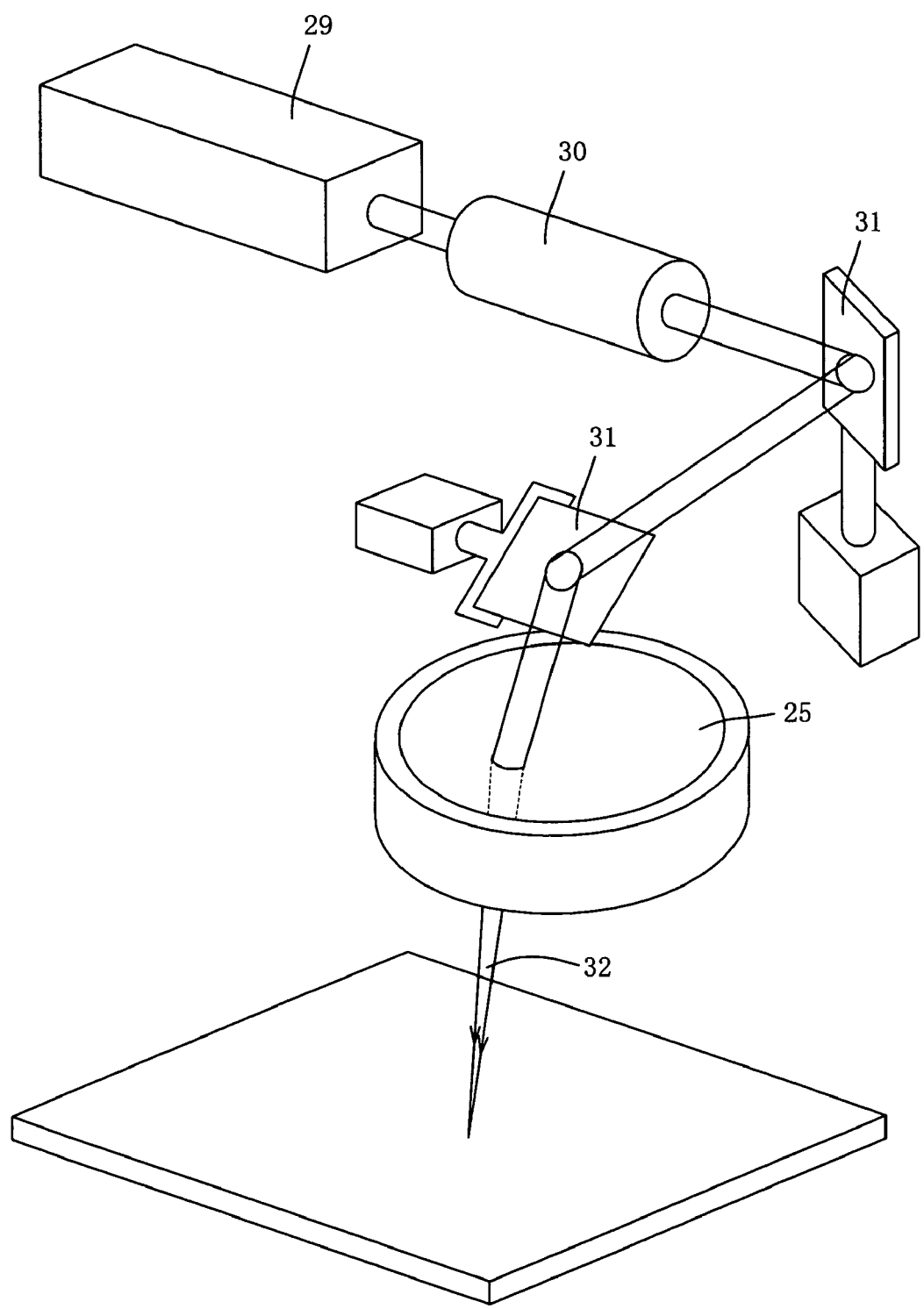
FIG. 9 is a perspective view showing the structure of a laser optical system used in the laser alignment marking process of the present invention.
Figure 10:
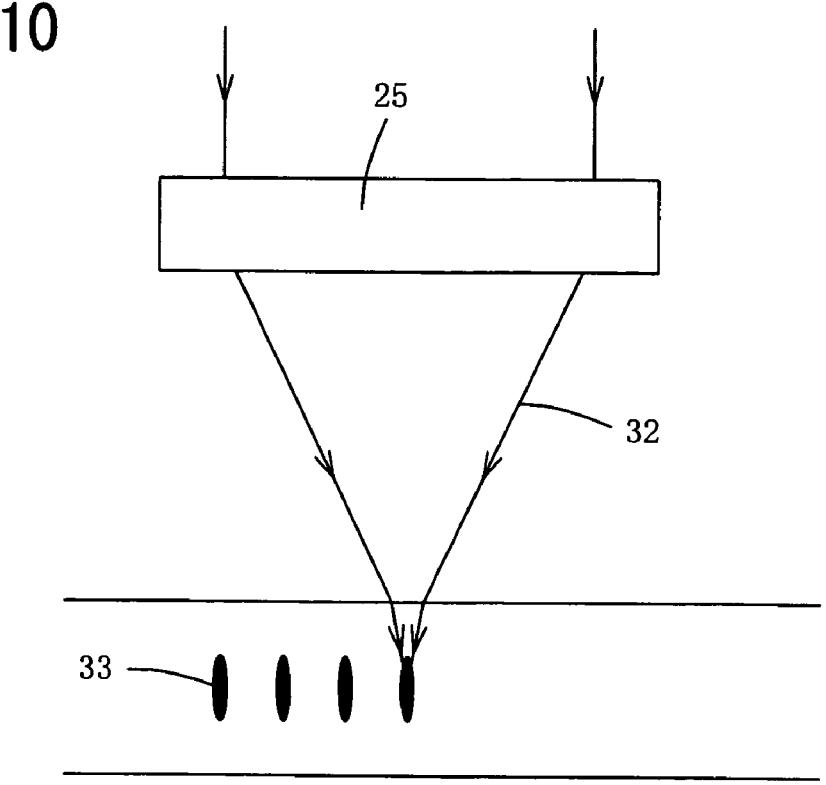
FIG. 10 is a schematic diagram showing the laser optical system employing a fθ lens used in the laser alignment marking process of the present invention.
Figure 11:
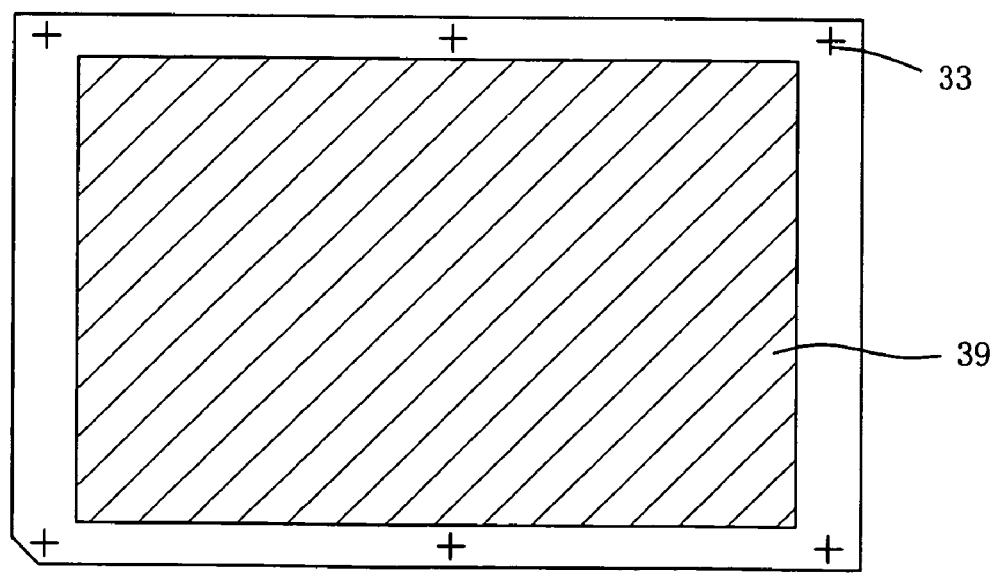
FIG. 11 is a schematic diagram showing the positions of the laser alignment markers in the present invention formed by the laser optical system.

FIG. 9 shows a device that directly writes alignment marks in the glass substrate. FIG. 10 shows the principle underlining the device of FIG. 9 for writing the alignment marks inside the glass substrate. In FIG. 11, the alignment marks are formed on the areas outside the metal deposition for construction of the scanning lines and the shielding common electrodes. In FIGS. 9, 10 and 11, a numeral 25 denotes an fθ lens, a numeral 29 denotes a laser light source, a numeral 30 denotes a beam formatter, a numeral 31 denotes a galvanomirror, a numeral 32 denotes a laser beam, a numeral 33 denotes a mark pattern formed within the glass substrate, and a numeral 38 denotes the glass substrate for TFT array. The laser marking utilized in the present invention is disclosed in more detail in Japanese patent laid-open publication No. 11-267861. It is important to form the alignment marks inside the glass substrate rather than the surface of the glass substrate for improving the production efficiency.

In this embodiment, with use of the different photomasks for the first and second under exposure steps, the positive photoresist pattern of two different thickness will be created after the development. Through the processes shown in FIGS. 7A-7E and FIGS. 8A-8E as noted above, the metal electrodes with two levels of thickness will be produced by etching, ashing and selective etching of the positive photoresist.

Preferred Embodiment 21

FIGS. 27A-27F and FIGS. 28A-28F show examples of process for constructing thin film transistors on the glass substrate with use of the two step halftone exposure method in the twenty first embodiment of the present invention. In this example, the two step halftone exposure method of the present invention is used in constructing the scanning line 15 and the common electrodes 49 within the pixel 49 at the same time, and the video signal line 51 and the liquid crystal drive electrode 53 at the same time.

In the example of FIGS. 27A-27F, a three-layer metal structure is utilized for the scanning line 15 which is created through the process of FIGS. 8A-8E. In the example of FIGS. 28A-28F, a two-layer metal structure is utilized for the scanning line 15 which is created through the process of FIGS. 7A-7E. Both examples of FIGS. 27A-27F and 28A-28F utilize the two-step halftone exposure method in which the common electrode 49 within the pixel is structured with a single-layer of thin film.

When using the two-step halftone exposure method for forming the scanning line, alignment marks must be formed in the glass substrate in advance as shown in FIG. 11 by the laser beam device such as shown in FIGS. 9 and 10. Both examples of FIGS. 27A-27F and 28A-28F utilize the halftone exposure to perform the processes of separating the silicon elements (silicon island forming process) from the semiconductor layer and constructing the terminal portion of contact holes at the same time.

In FIGS. 27A-27F and 28A-28F, a numeral 8 denotes an area where the photoresist is completely removed after development, a numeral 9 denotes a gate insulation film, a numeral 10 denotes a thin film semiconductor layer (non-doped layer), a numeral 11 denotes a thin film semiconductor layer (doped layer, i.e., ohmic contact layer), a numeral 15 denotes a scanning line, a numeral 20 denotes an area of the photoresist which is not exposed by the UV light, and a numeral 22 denotes an area of the photoresist which is incompletely exposed (halftone exposure), a numeral 49 denotes a common electrode within the pixel, a numeral 50 denotes a scanning line terminal, a numeral 51 denotes a video signal line, a numeral 52 denotes a barrier metal, a numeral 53 denotes a liquid crystal drive electrode, a numeral 54 denotes a scanning line terminal drive circuit contact electrode, and a numeral 55 denotes a passivation film.

Figure 27:
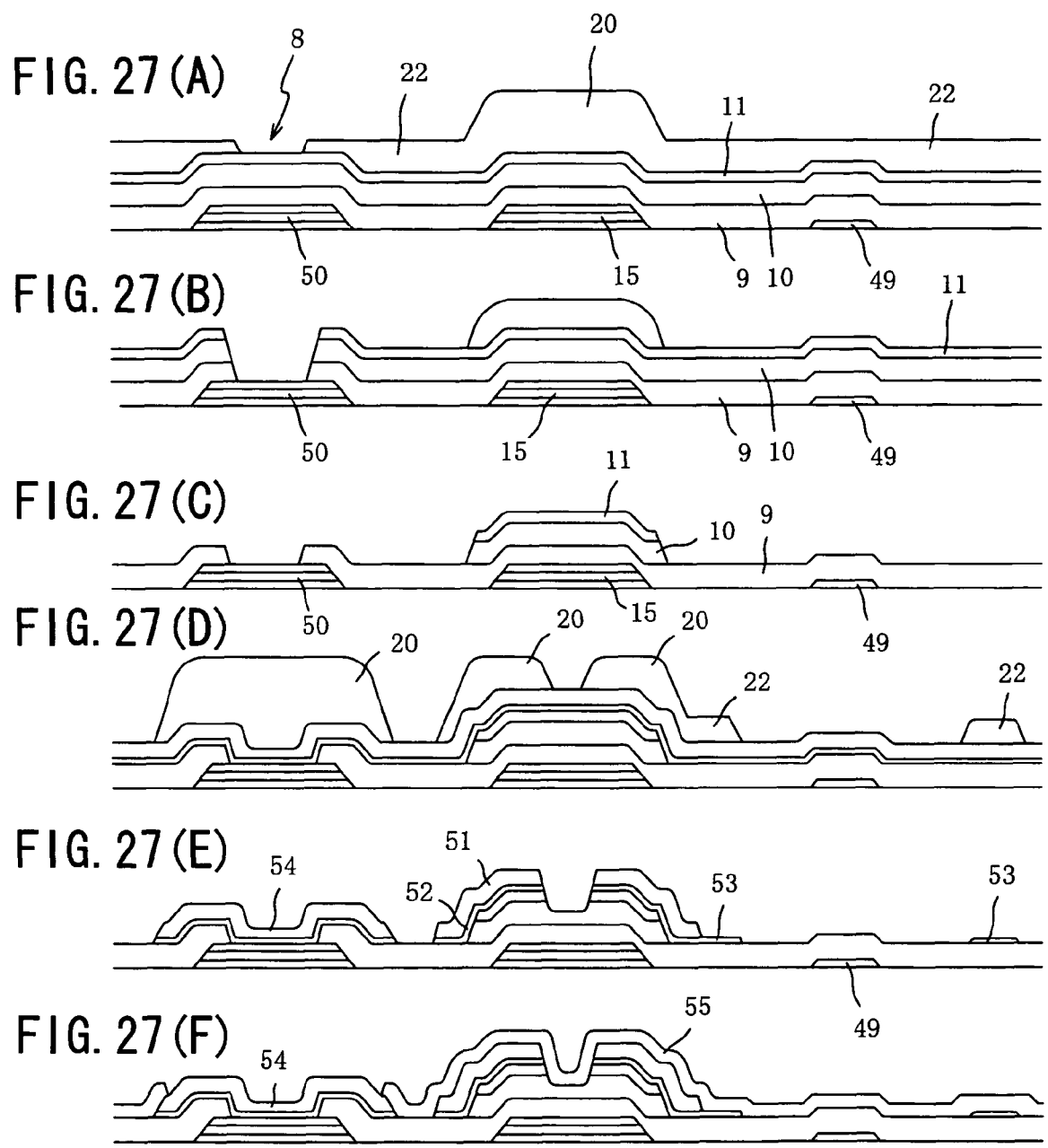
FIGS. 27A-27F are cross sectional views showing an example of the active matrix substrate production flow involved in the four-step photomasking process of the present invention.
Figure 28:
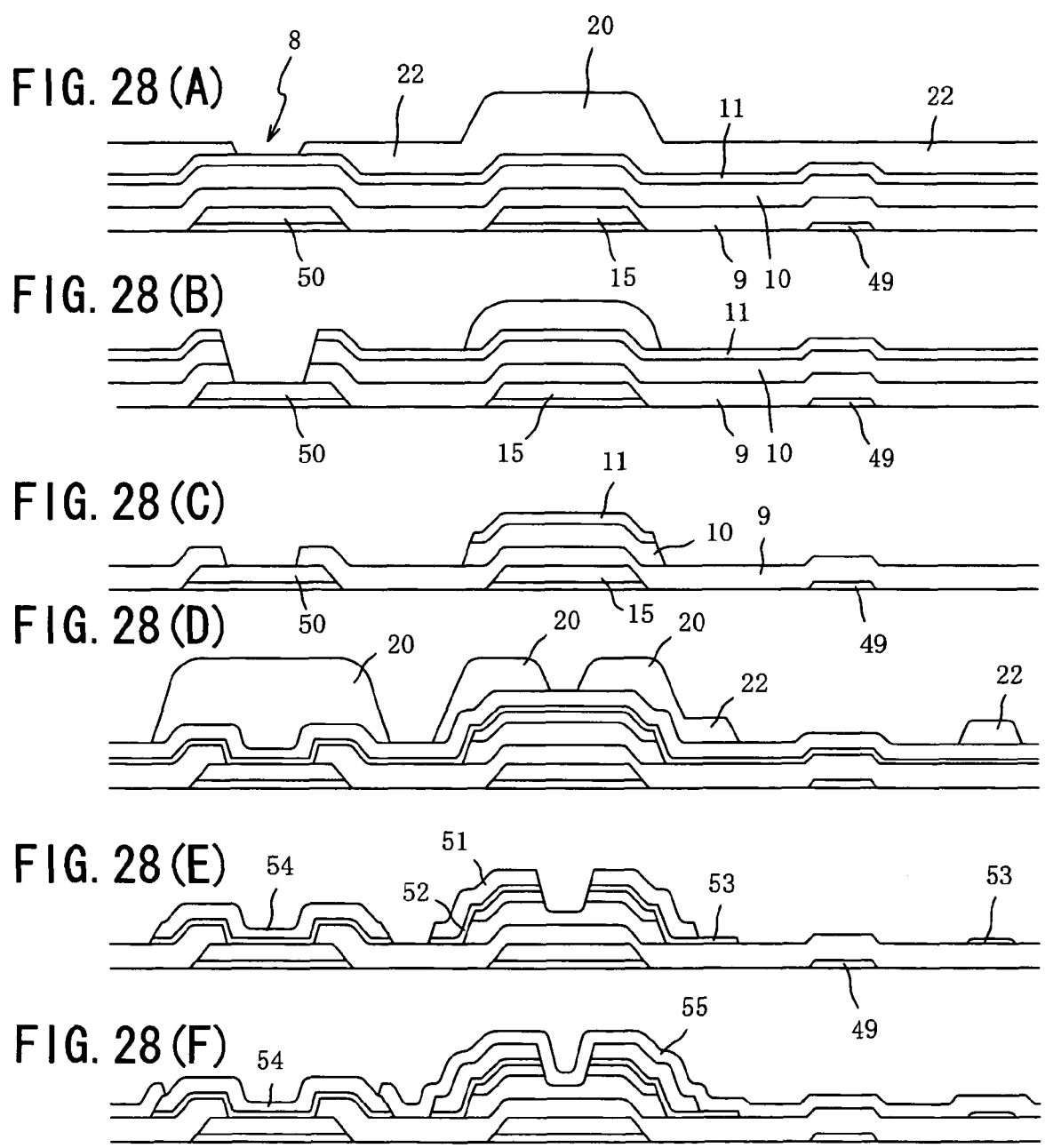
FIGS. 28A-28F are cross sectional views showing an example of the active matrix substrate production flow involved in the three-step photomasking process of the present invention.

In the example of FIGS. 27A-27F, the scanning line 15, the scanning line terminal 50 and the common electrode 49 within the pixel have been formed through the process shown in FIGS. 8A-8E. In the example of FIGS. 28A-28F, the scanning line 15, the scanning line terminal 50 and the common electrode 49 within the pixel have been formed through the process shown in FIGS. 7A-7E. Then, in the both examples of FIGS. 27A-27F and 28A-28F, by the same procedures, the silicon elements are separated and the contact holes are created as follows:

First, as shown in FIGS. 27A and 28A, the gate insulation film 9, the thin film semiconductor layer (non-doped layer) 10, and thin film semiconductor layer (ohmic contact layer) 11 are consecutively deposited with use of a plasma CVD device. After coating the positive photoresist with a thickness of 2-3 micrometers, the halftone exposure process is conducted on the positive photoresist. Thus, the thicker area 20 and the thinner area 22 of the positive photoresist are created, while the photoresist is removed at an area over the scanning line terminal 50.

In FIGS. 27B and 28B, contact holes for the scanning line terminals 50 are created through, for example, a dry etching process. Then, the thinner area 22 of the photoresist formed through the halftone exposure is removed by the ashing process so that the positive photoresist remains at an area where the thin film transistor will be formed. In FIGS. 27C and 28C, through the dry etching process, the semiconductor layers are removed except for the areas where the thin film transistors will be formed. In FIGS. 27D-27F and 28D-28F, the video signal lines 51, the scanning line drive circuit connection electrode 54 and the liquid crystal drive electrode 53 are created by using the process shown in FIGS. 7A-7E or FIGS. 8A-8E.

As has been described above, in the process shown in FIGS. 27A-27F and 28A-28F, with use of the two-step exposure method of the present invention, the liquid crystal drive electrode 53 is made of a single layer of thin film. As in the present invention, since each of the common electrode 49 within the pixel and the liquid crystal drive electrode 53 is made of a thin film using the two-step halftone exposure method in the production process of the scanning line and the video signal line, smooth movement of the tips of the hairs of the rubbing cloth can be achieved in the alignment treatment, which is able to prevent occurrence of alignment defects.

Figure 21:
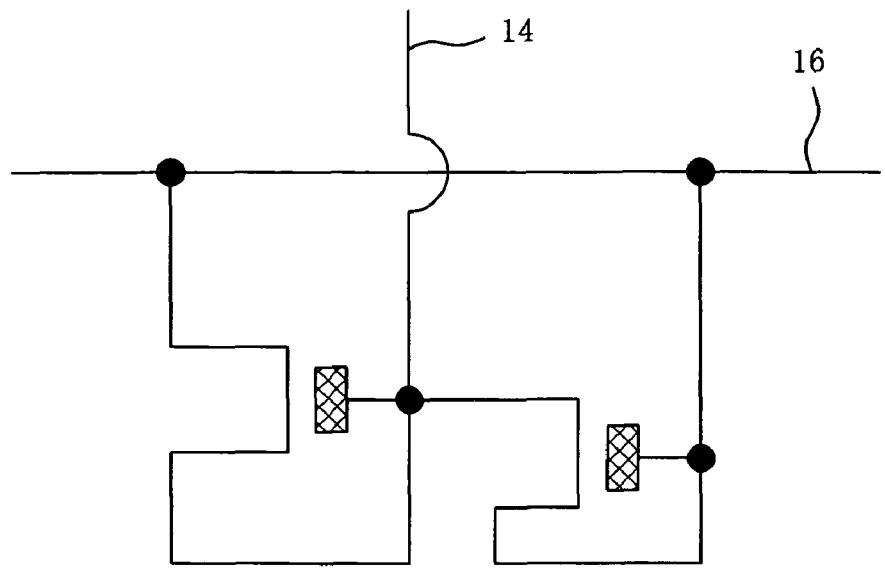
FIG. 21 is a circuit diagram showing an example of configuration in the static electricity protection circuit formed by thin film transistors.
Figure 22:
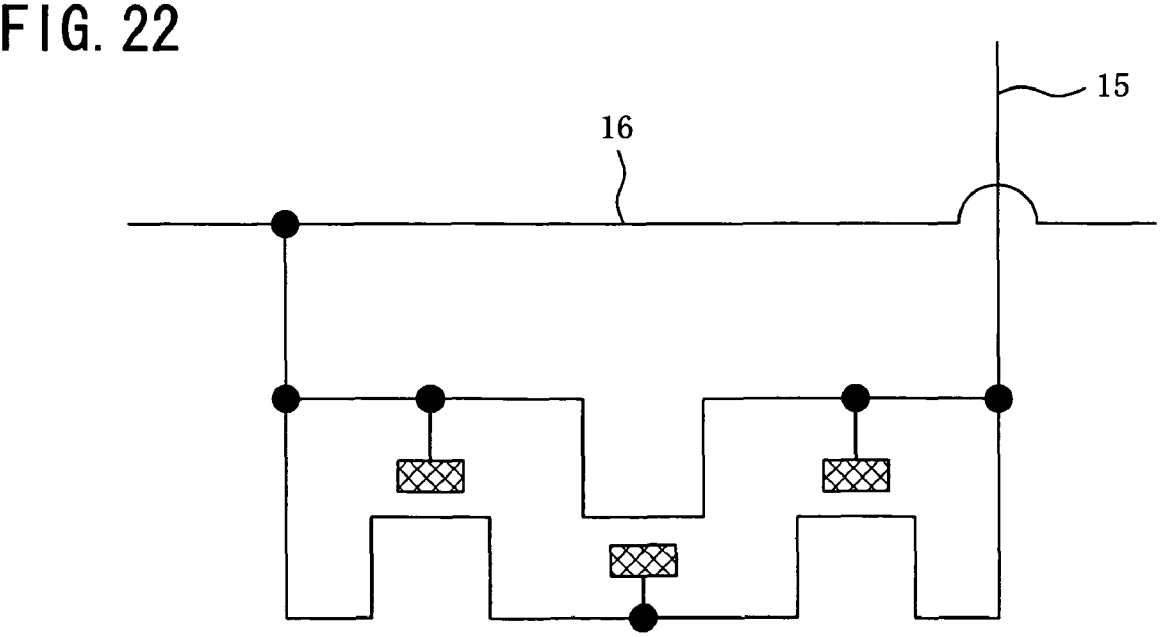
FIG. 22 is a circuit diagram showing another example configuration in the static electricity protection circuit formed by thin film transistors.
Figure 23:
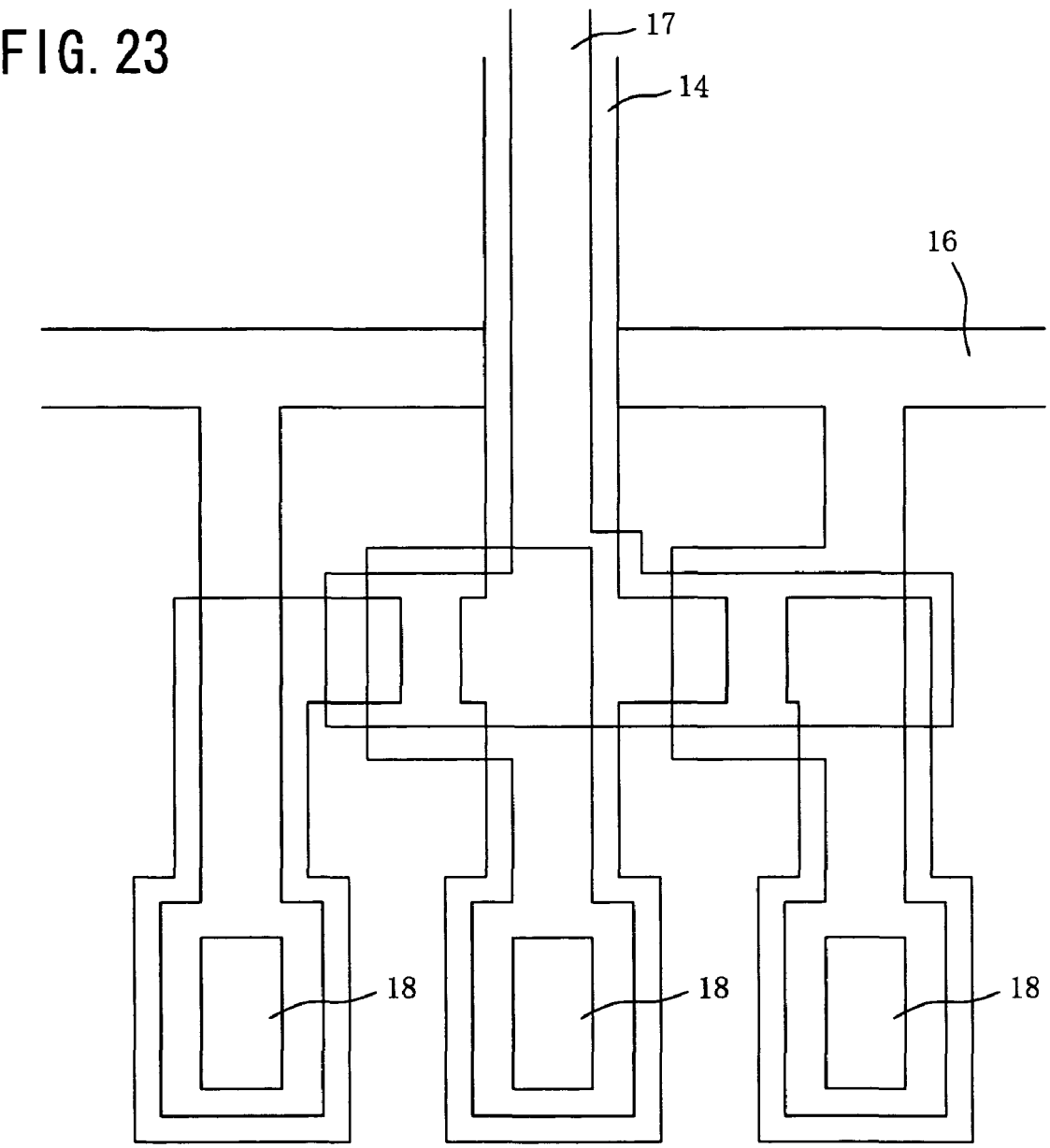
FIG. 23 is a plan view showing an example of the structure of the static electricity protection circuit formed by the thin film transistors according to the present invention.
Figure 24:
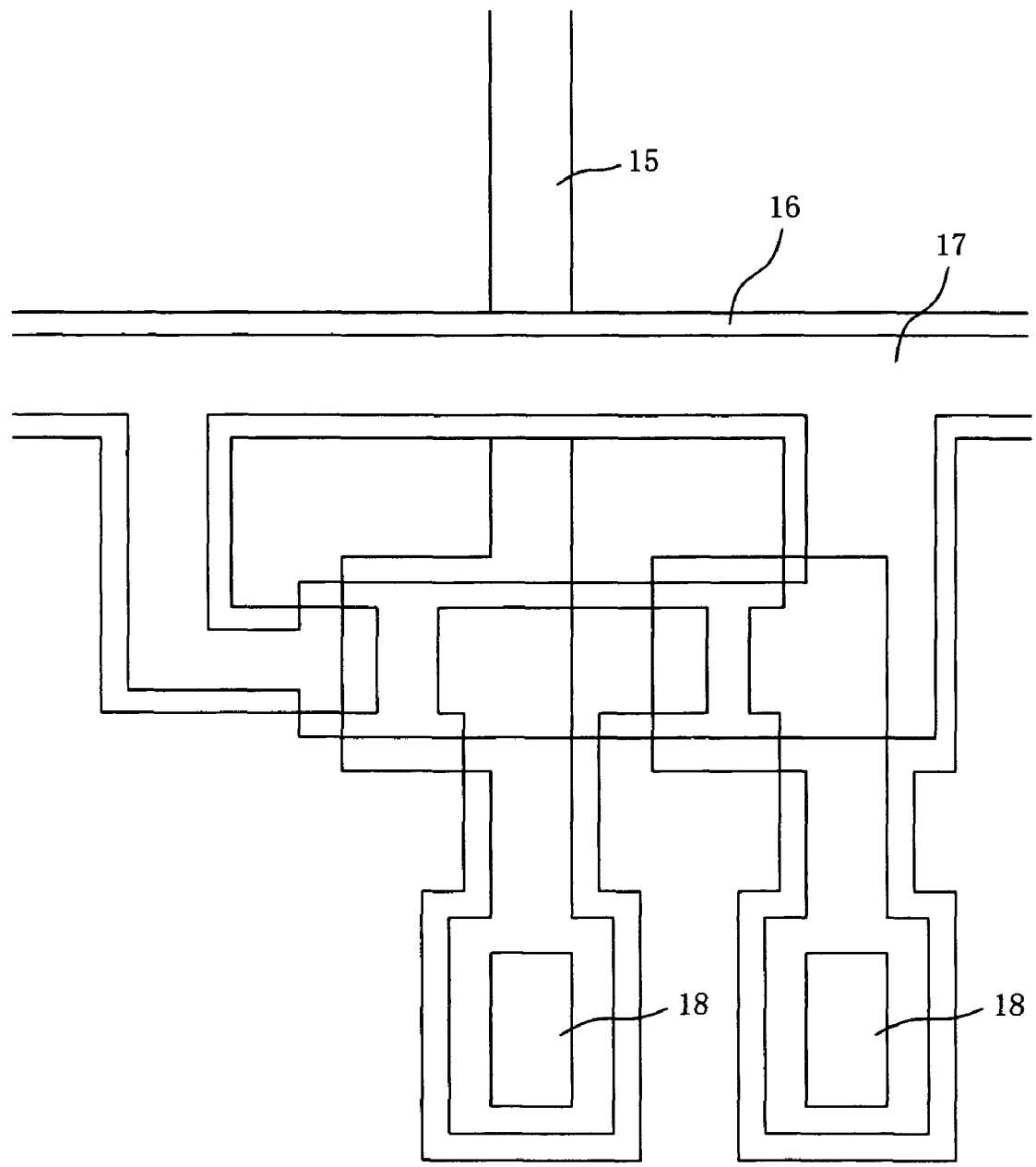
FIG. 24 is a plan view showing another example of the structure of the static electricity protection circuit formed by the thin film transistors according to the present invention.
Figure 25:
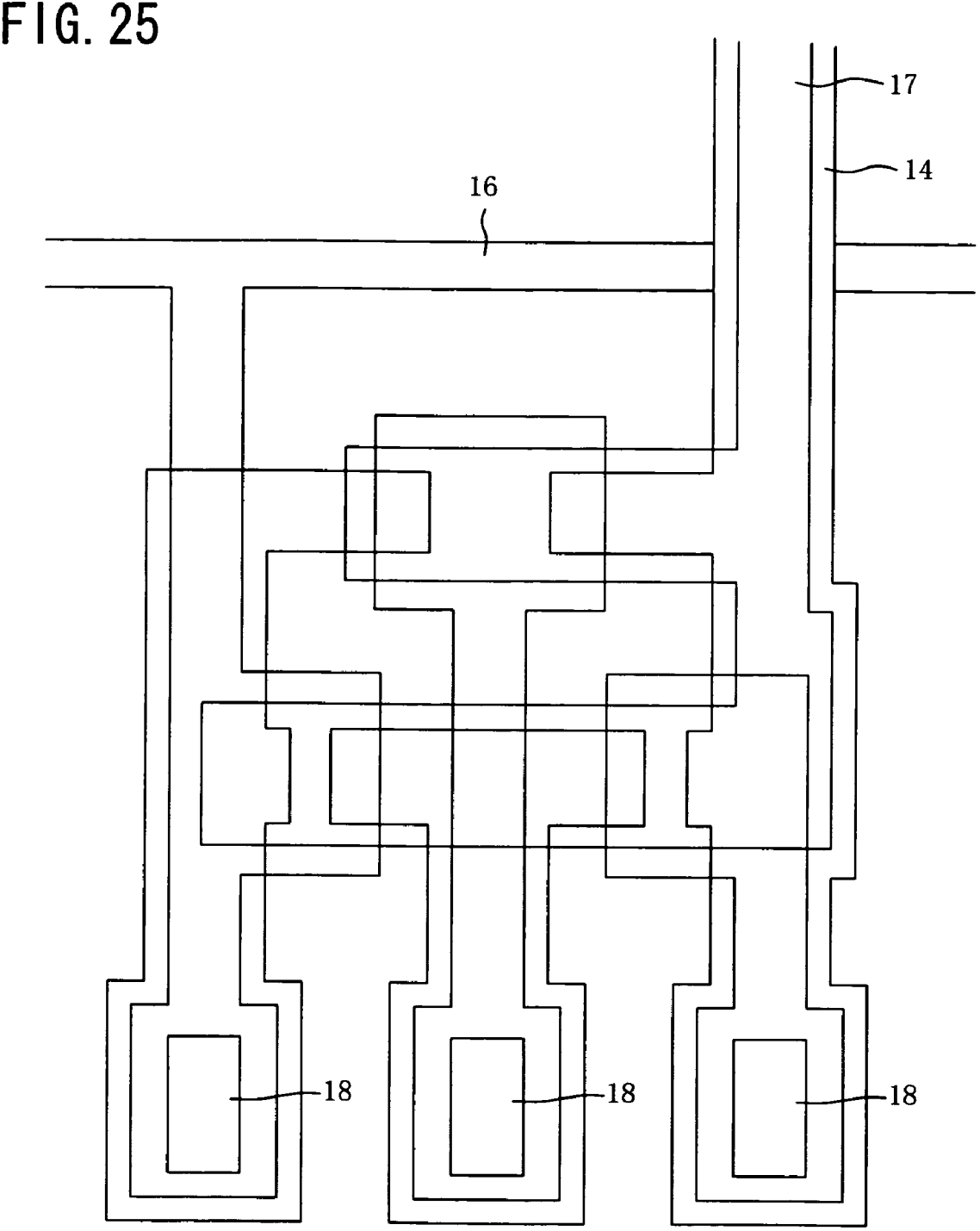
FIG. 25 is a plan view showing a further example of the structure of the static electricity protection circuit formed by the thin film transistors according to the present invention.
Figure 26:
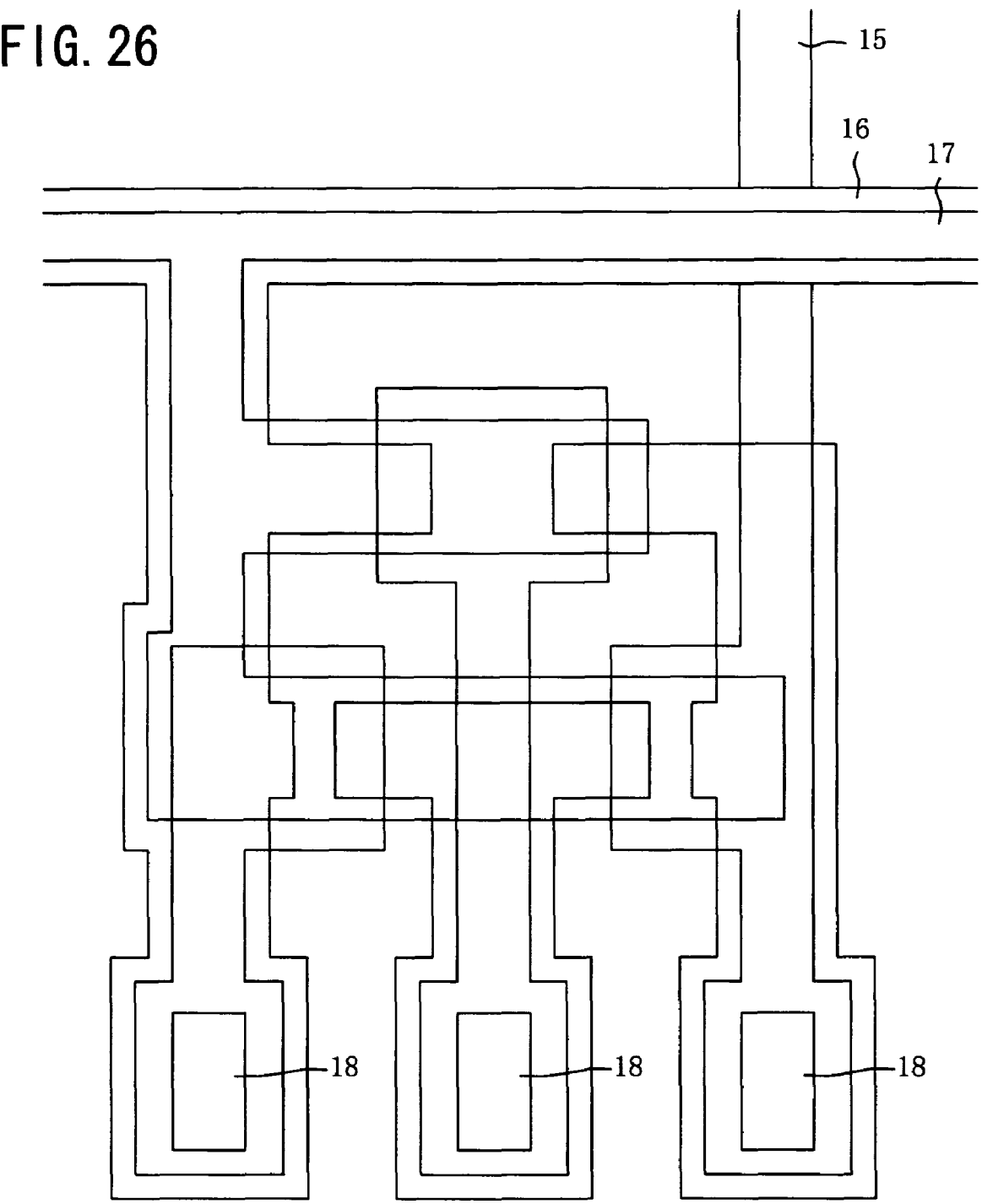
FIG. 26 is a plan view showing a further example of the structure of the static electricity protection circuit formed by the thin film transistors according to the present invention.

When the separation of the silicon elements of the thin film transistors and the construction of the terminal portion of the contact holes are performed using the halftone exposure method as noted above, electrostatic protection circuits such as shown in FIGS. 21-26 must be created at the same time. FIGS. 21 and 22 show examples of circuit structure in the static electricity protection circuit, and FIGS. 23-26 show examples of pattern structure for establishing the static electricity protection circuits of FIGS. 21 and 22 on the substrate. In FIGS. 21-26, a numeral 14 denotes a video signal line, a numeral 15 denotes a scanning line, a numeral 16 denotes a common electrode for electrostatic protection, a numeral 17 denotes a thin film semiconductor layer, a numeral 18 denotes a contact hole for creating a thin film transistor circuit static electricity protection.

Figure 12:
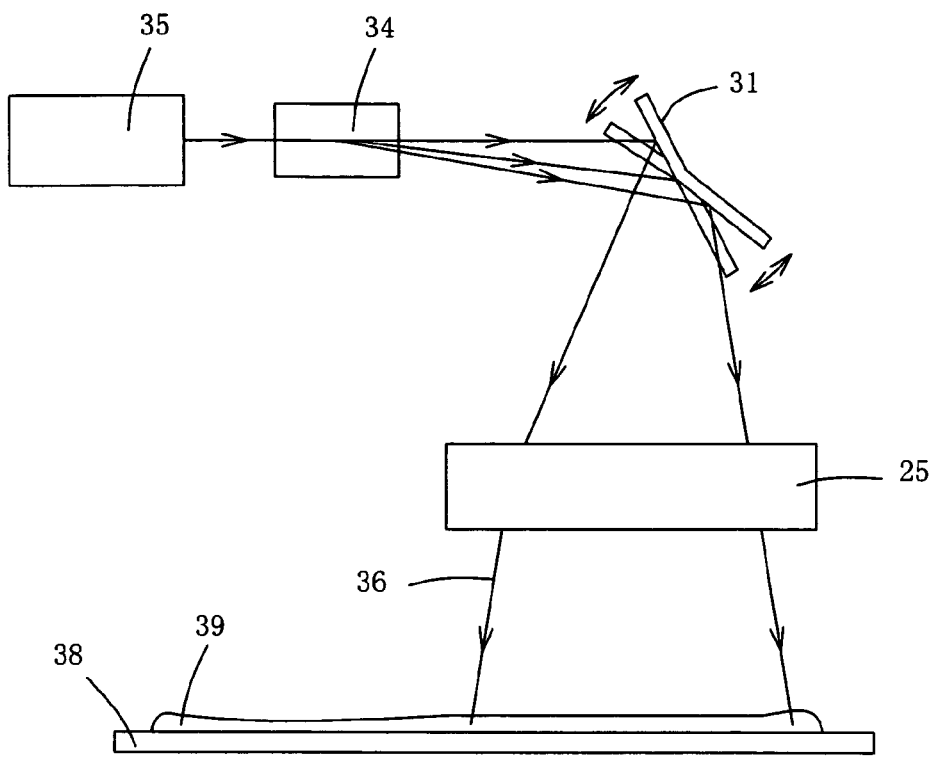
FIG. 12 is a schematic diagram showing the structure of the optical system used for the laser beam scanning exposure in the present invention.

As shown in FIGS. 23, 24, 25 and 26, it is possible to maximize the size of the contact holes 18 by positioning them together. In this case, a local exposure device such as shown in FIGS. 12 and 13 using either an ultraviolet laser beam or an ultraviolet LED can be used to locally expose the portions of the contact holes. In FIG. 12, a numeral 25 denotes an fθ lens, a numeral 29 denotes a laser light source, a numeral 30 denotes a beam formatter, a numeral 31 denotes a galvanomirror, a numeral 32 denotes a laser beam, a numeral 33 denotes a mark pattern formed within the glass substrate, a numeral 34 denotes an ultrasonic polarizer, a numeral 35 denotes a UV laser source, a numeral 36 denotes a UV laser light, a numeral 38 denotes the glass substrate for TFT array, and a numeral 39 denotes a positive photoresist layer.

FIGS. 6A-6C show the first and second exposure steps using the local exposure device. In the example of FIGS. 6A-6C, the second exposure step is performed without using a photomask but using the fθ lens for locally exposing a part of the glass substrate. As noted above, the fθ lens is able to focus on a relatively large area on the same flat surface of the substrate.

Figure 29:
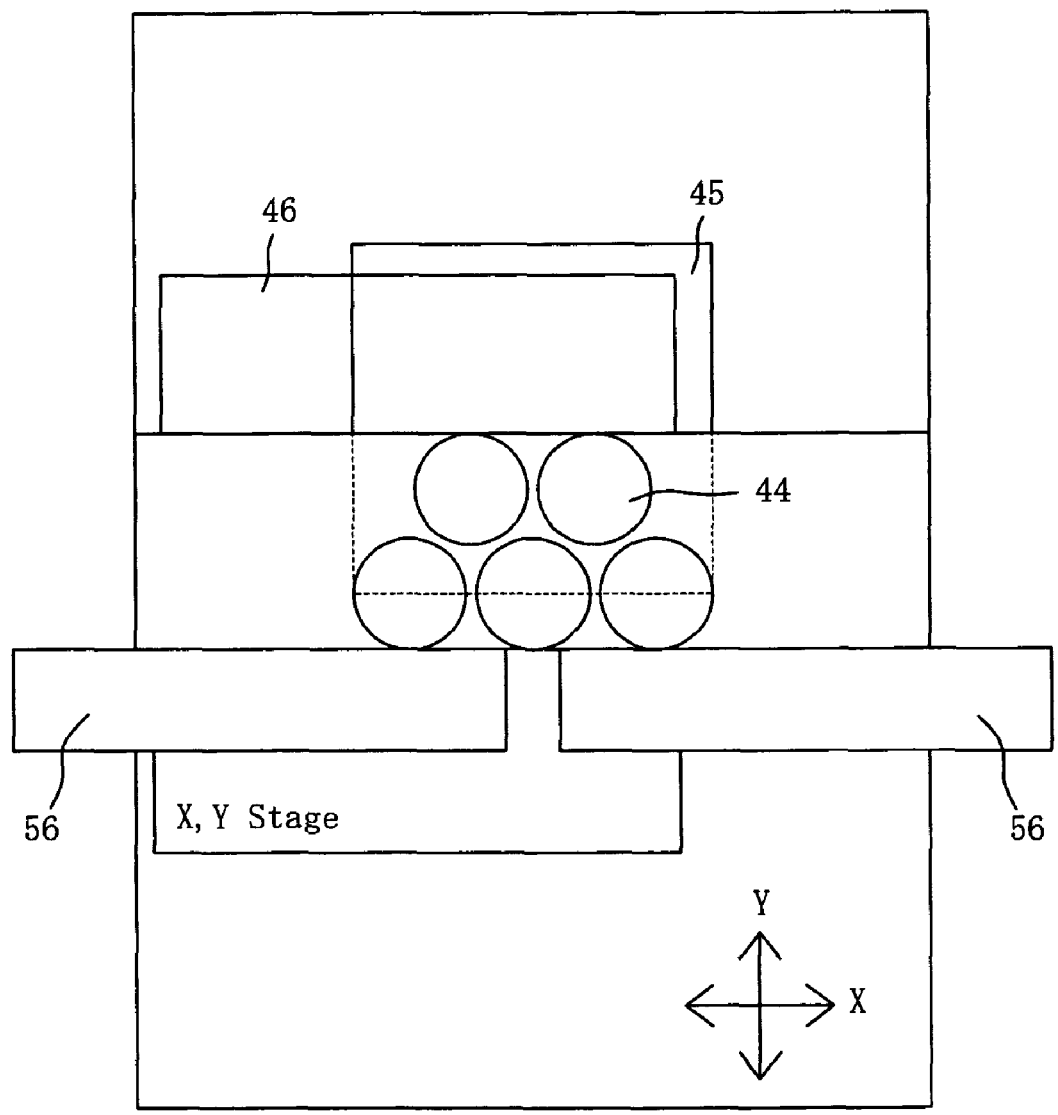
FIG. 29 is a plan view showing an example of structure in the scanning exposure device used in the mixed exposure method of the present invention.
Figure 30:
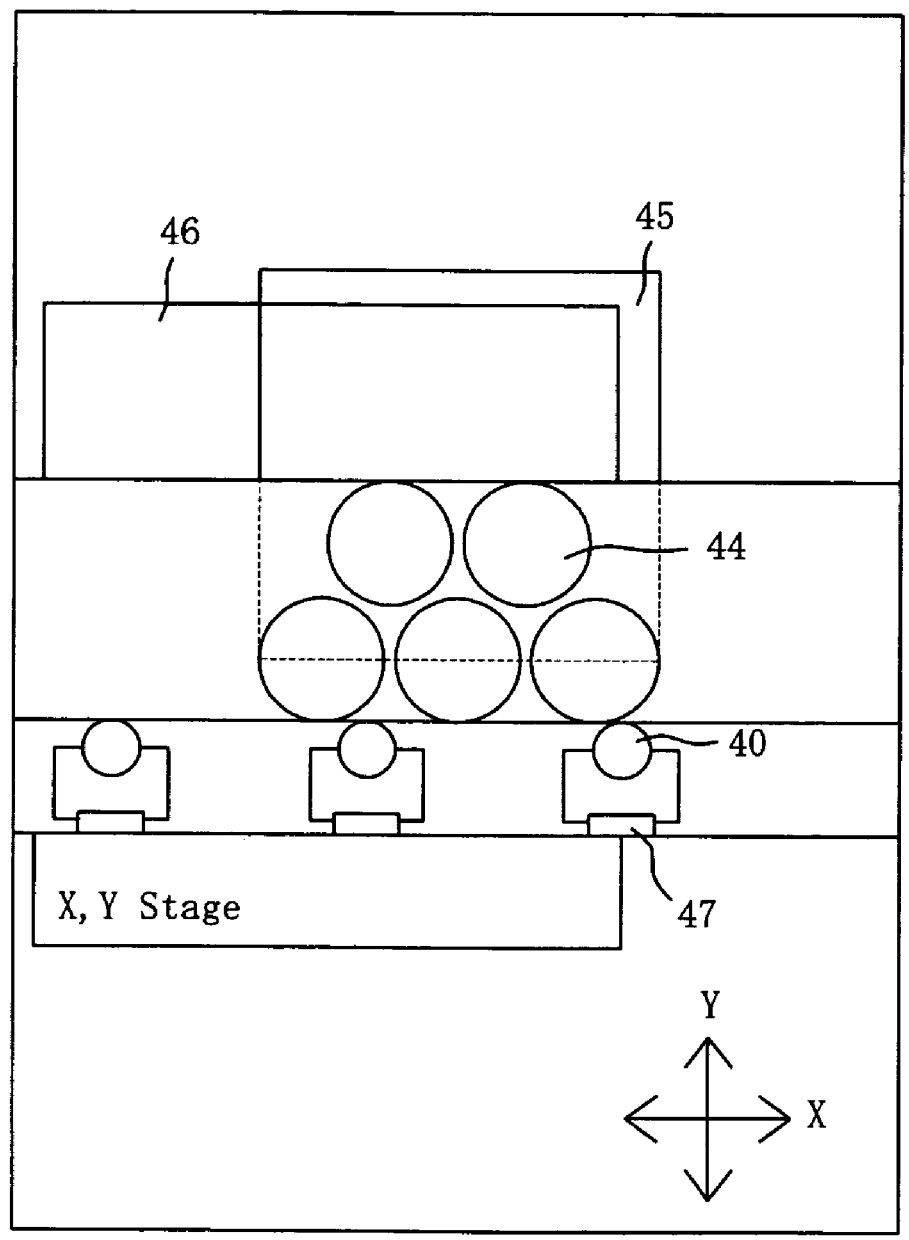
FIG. 30 is a plan view showing another example of structure in the scanning exposure device used in the mixed exposure method of the present invention.

FIGS. 29 and 30 show the plan views of the halftone scan exposure device having a built-in local exposure device of the present invention. In FIGS. 29 and 30, a numeral 40 denotes a micro-mirror array device, a numeral 44 denotes a multi-lens projection module, a numeral 45 denotes a photomask, a numeral 46 denotes an X-Y stage, a numeral 47 denotes a UV source, and a numeral 56 denotes an ultraviolet laser scan exposure device. The halftone exposure process and the local exposure process can be conducted at the same time with use of only one device of either FIG. 29 or FIG. 30 and the ordinary photomask. Thus, the production efficiency can be improved significantly.

Figure 31:
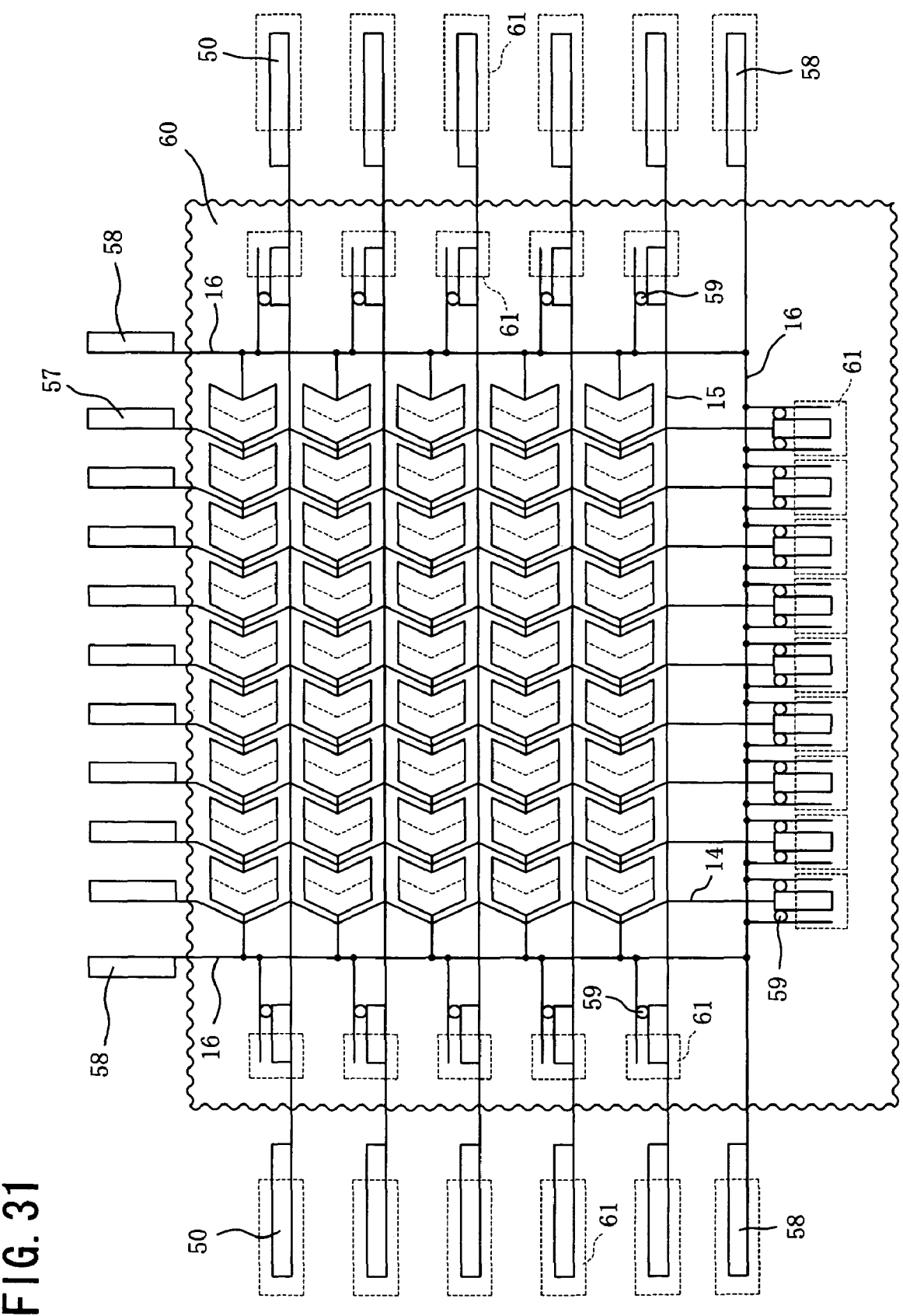
FIG. 31 is a plan view showing an example of structure of the transverse electric field type active matrix array substrate produced using the mixed exposure method of the present invention.

FIG. 31 shows the plan view of the transverse electric field type active matrix substrate created with use of the halftone exposure method of the present invention. In FIG. 31, a numeral 57 denotes a terminal of the video signal line, a numeral 58 denotes a terminal of the common electrode surrounding the pixel, a numeral 59 denotes a static electricity protection circuit, a numeral 60 denotes a passivation film, and a numeral 61 denotes a contact hole created through the local UV exposure noted above. The contact holes 61 constructed through the local ultraviolet ray exposure are positioned together in a line.

Figure 4:
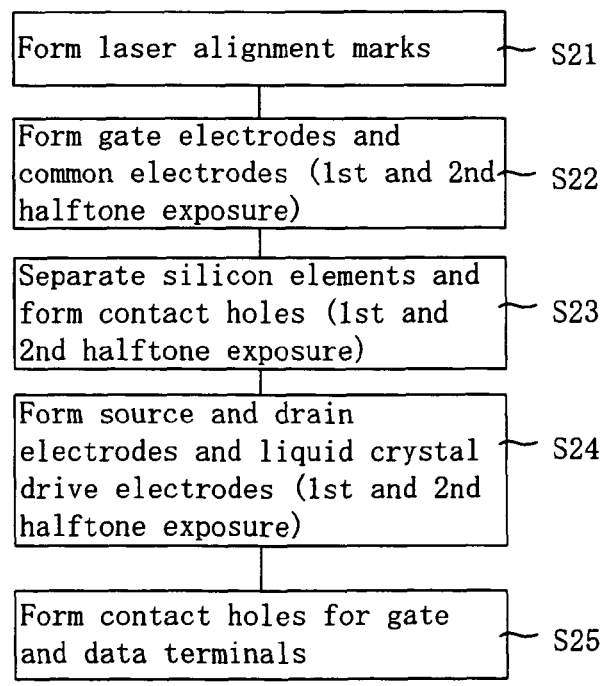
FIG. 4 is a flow chart showing the four operational steps involved in the photomasking processes in the present invention.

FIG. 4 is a flow chart summarizing the process for producing the TFT array on the substrate using the ordinary photomasks through the two-step halftone exposure method of the present invention. The basic process of the two-step halftone exposure is shown in FIGS. 5 and 6 which uses two or more ordinary photomasks. In the process of FIG. 4, the photomasking process is repeated four times each including the first and second halftone exposure. First, alignment marks are formed in the glass substrate by a laser beam at step S21. In the first and second halftone exposure in step S22, the gate electrodes for thin film transistors and the common electrodes are formed at the same time. Then, at step S23, through the first and second halftone exposure, the thin film transistors are separated from the semiconductor layer and the contact holes are created. In step S24, the source and drain electrodes and the liquid crystal drive electrodes are formed at the same time through the first and second halftone exposure. Lastly, at step S25, gate terminals and data terminals are formed.

Figure 124:
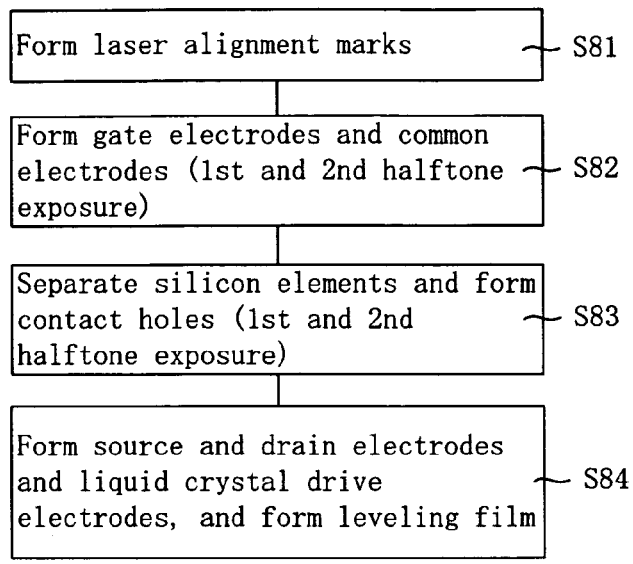

FIG. 124 is a flow chart summarizing the process for producing the TFT array on the substrate using the ordinary photomasks through the two-step halftone exposure method of the present invention. The basic process of the two-step halftone exposure is shown in FIGS. 5 and 6 which uses two or more ordinary photomasks. In the process of FIG. 124, the photomasking process is repeated three times each including the first and second halftone exposure. First, alignment marks are formed in the glass substrate by a laser beam at step S81. Through the first and second halftone exposure, in step S82, the gate electrodes for thin film transistors and the common electrodes are formed at the same time. Then, at step S83, through the first and second halftone exposure, the thin film transistors are separated from the semiconductor layer and the contact holes are created. In step S84, the source and drain electrodes of the thin film transistors and the liquid crystal drive electrodes are formed at the same time through the first and second halftone exposure. During this process, a leveling film is applied to the surface of the substrate for flattening the surface. For example, after a back channel B2H6 plasma doping treatment, the leveling film is formed by an ink jet printing method or a partial P—SiNx protection film is formed through a masking method using a shadow frame.

Preferred Embodiment 22

FIGS. 114A-114C and FIGS. 130A-130C are cross sectional views showing examples of processes in which the steps of flattening (leveling or planarizing) the substrate and forming the photolithography spacers are conducted with use of both the ordinary photomask exposure and the halftone back surface exposure in the twenty second embodiment of the present invention. In this example, negative photoresist is used. In the example of FIGS. 114A-114C and FIGS. 130A-130C, a numeral 55 denotes a passivation film, a numeral 71 denotes a TFT array alignment film, a numeral 87 denotes a negative photoresist layer for halftone exposure, a numeral 89 denotes a photolithography spacer, a numeral 91 denotes a UV light from the back surface of the substrate, a numeral 92 denotes the negative photoresist remained after the back surface exposure and the development.

Figure 114:
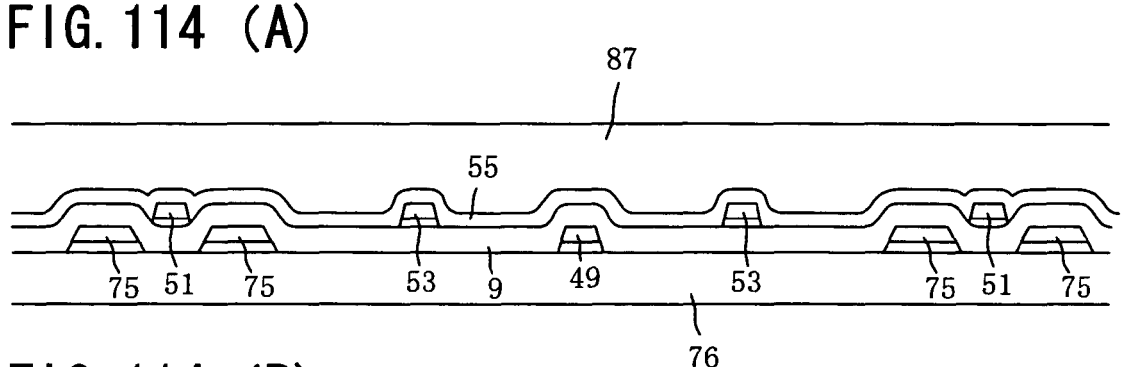
FIGS. 114A-114C are cross sectional views showing the process for planarizing the active matrix substrate and forming the photolithography spacers at the same time with use of the halftone back surface exposure method of the present invention.
Figure 114:
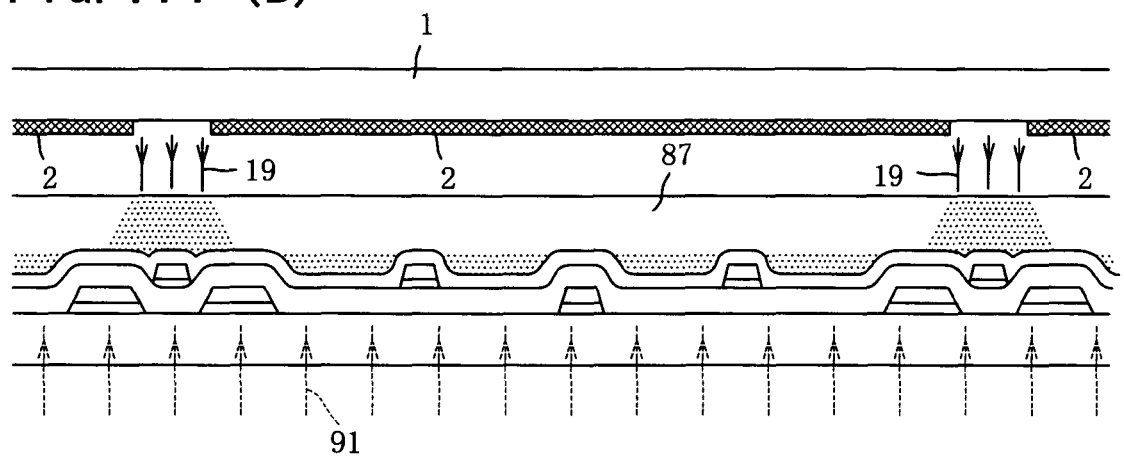
Figure 114:
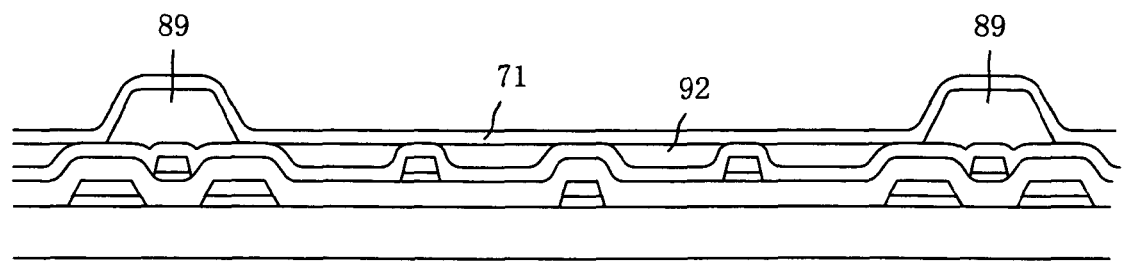
Figure 130:
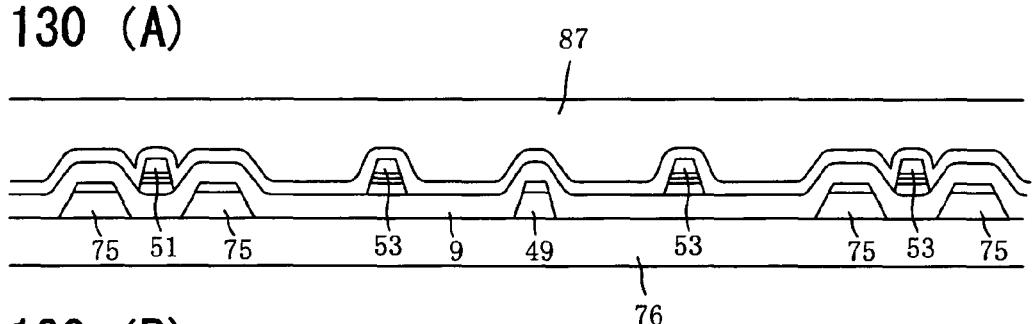
Figure 130:
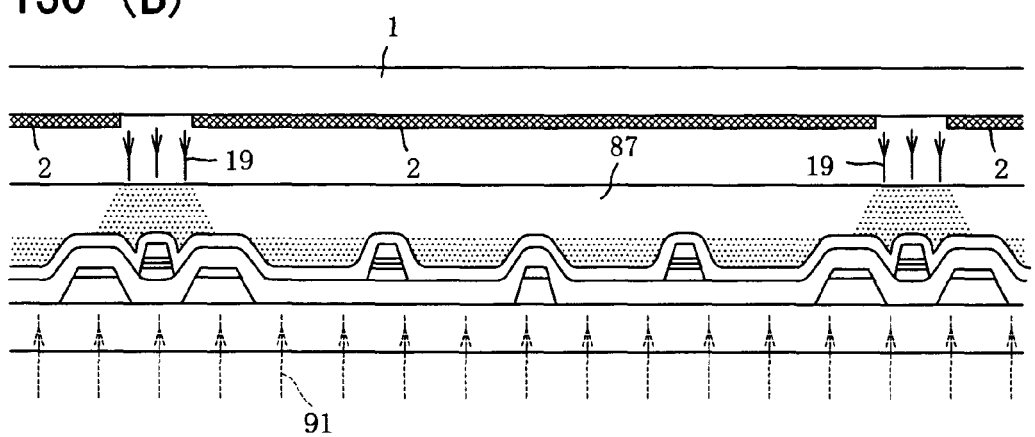
Figure 130:
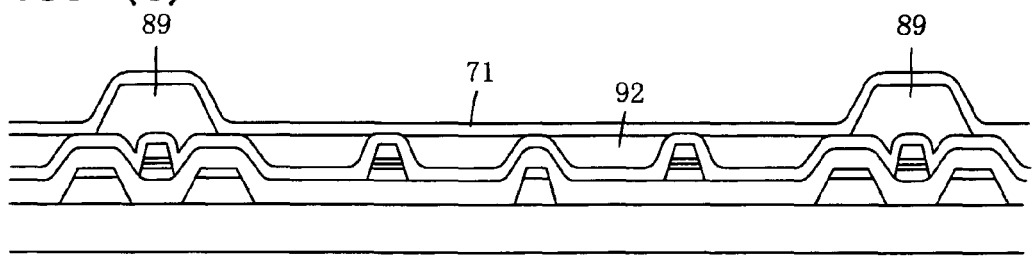

First, the negative photoresist 87 is applied on the passivation film 55 for the thickness of the liquid crystal cell gap as shown in FIGS. 114A and 130A. Next, as shown in the upper part of FIGS. 114B and 130B, the complete exposure is done with an ordinary photomask at the areas where the photolithography spacers are to be constructed. Then, as shown in the lower part of FIGS. 114B and 130B, with use of the scanning type back surface exposure device such as shown in FIGS. 131, 132, 133 and 134, the negative photoresist 87 is exposed by the ultraviolet rays 91 from the back surface of the active matrix substrate to expose enough light for a thickness sufficient to flatten the irregularity of the substrate. After the back surface exposure, flattening of the substrate (TFT alignment film 71) and construction of the photo spacer 89 are effectively done at the same time as shown in FIGS. 114C and 130C.

Figure 129:
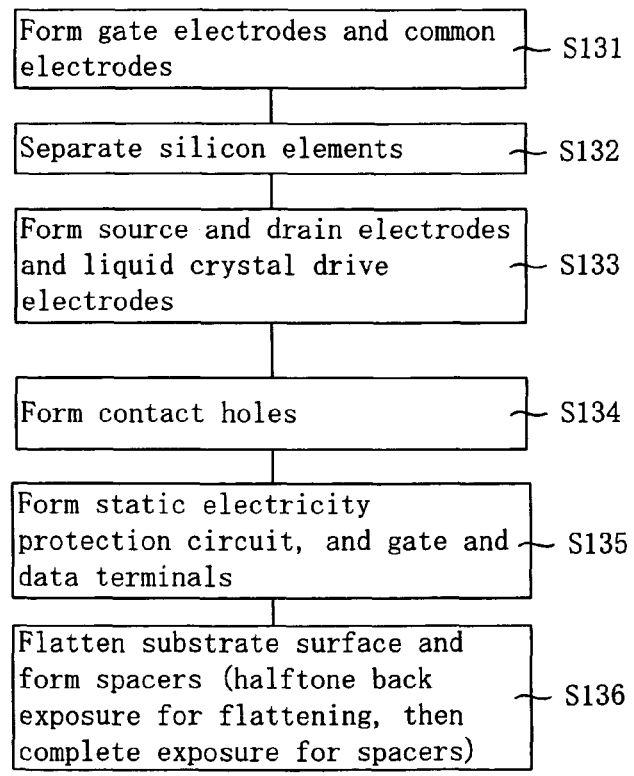

FIG. 129 is a flow chart summarizing the process of producing the active matrix substrate including the steps for flattening (leveling) the substrate and forming the photolithography spacers by using the ordinary photomask exposure and the halftone back surface exposure in the twenty second embodiment. In step S131, the gate electrodes for thin film transistors and the common electrodes are formed at the same time. Then, at step S132, silicon elements for the thin film transistors are separated from the semiconductor layer. At step S133, the source and drain electrodes of the thin film transistors and the liquid crystal drive electrodes are formed at the same time. Then, the contact holes are formed at step S134. Next, the static electricity protection circuit, gate terminal and data terminal are formed in step S135. Lastly, at step S136, the creation of photolithography spacers and the leveling of the substrate surface are conducted by first conducting the halftone back exposure for flattening the substrate surface and then conducting the complete exposure for forming the photolithography spacers.

Figure 131:
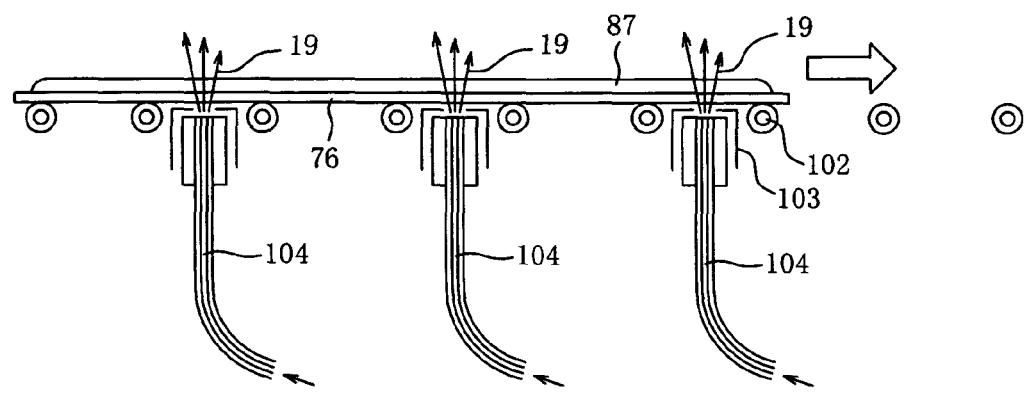

FIGS. 131 and 132 shows a scanning type back surface exposure device utilized in the twenty second embodiment of the present invention. In the example of FIGS. 131 and 132, a numeral 19 denotes a UV light, a numeral 76 denotes a glass substrate for the TFT array, a numeral 87 denotes a negative photoresist for halftone exposure, a numeral 102 denotes a conveyer roller, a numeral 103 denotes a UV cut cover, and a numeral 104 a silica glass fiber. The glass substrate 76 is moved horizontally on the roller 102 so that the large substrate can be exposed by a relatively small exposure device. The silica glass fibers 104 are bundled together and positioned next to each other to produce a constant strength of ultraviolet ray. In the example of FIGS. 133 and 134, the back surface exposure device includes a plurality of ultraviolet ray LEDs 107 positioned next to each other to produce a uniform power level of the ultraviolet rays 19.

FIGS. 135-137 show examples of optical system including a white light interferometer and a process using the optical system for precisely measuring the height of the photolithography spacers constructed on the active matrix substrate. FIG. 135 shows an overall system configuration for producing the active matrix substrate including the halftone back surface exposure device of the present invention, FIG. 136 is a flow chart showing an overall process of the halftone back surface exposure method of the present invention, and FIG. 137 shows an example of optical system structure in the white light interferometer used in the present invention.

In the flow chart of FIG. 136, at step 141, the negative photoresist is coated on the glass substrate where the thickness of the negative photoresist is adjusted based on the measured data regarding the height of the photolithography spacer and photoresist on the substrate. At step 142, the halftone back surface exposure is performed in which the amount of light exposure is adjusted based on the measured data. After the halftone back surface exposure, the negative photoresist for the photolithography spacers is completely exposed in step 143. After the development in step S144, the height of the photolithography spacers are measured by, for example, the white light interferometer, the result of which is feedbacked to the photoresist coating and the halftone back surface exposure through a step S146 for adjusting the photoresist coating thickness and amount of light for exposure. The above process may repeated two or more times. The resultant substrate is evaluated at step 147, and if the result is acceptable, the process moves to a post bake process in step S148.

In the example of FIG. 137, the white light interferometer includes a CCD camera, a white light source, a mirror, and an interferometric objective lens. The vertical position of the interferometric objective lens is controlled by a mechanism using, for example, a piezo-electric device (PZT) for focusing the white light on the top and bottom of the photolithography spacer and/or negative photoresist. The voltage used for driving the piezo-electric device can be used as the measured data indicating the height of the photolithography spacer.

As shown in FIGS. 135, 136 and 137, the white light interferometer accurately measures the thickness of the negative resist layer and the height of the spacer on the glass substrate. This measurement data from the white light interferometer is feedbacked to the coater (slit coater and spin coater) and the halftone back exposure system to adjust the coating thickness of the negative photoresist and the amount of light for the halftone back surface exposure. Accordingly, the surface irregularity of the substrate and the height irregularity of the photolithography spacers can be minimized.

FIGS. 107A-107D show the processes for performing the flattening (leveling) the substrate surface first then constructing the photolithography spacers using the scanning type back surface exposure device of the present invention. In the example of FIGS. 107A-107D, a numeral 9 denotes a gate insulation film, a numeral 49 denotes a common electrode within the pixel, a numeral 51 denotes a video signal line, a numeral 53 denotes a liquid crystal drive electrode, a numeral 55 denotes a passivation film, a numeral 71 denotes a TFT array alignment film, a numeral 75 denotes a common electrode for shielding the video signal line, a numeral 76 denotes a glass substrate for TFT array, a numeral 88 denotes a negative photoresist layer for leveling (flattening) the substrate surface, a numeral 89 denotes a photolithography spacer, a numeral 91 denotes a UV light, and a numeral 92 denotes negative photoresist remained after back surface exposure.

Figure 107:
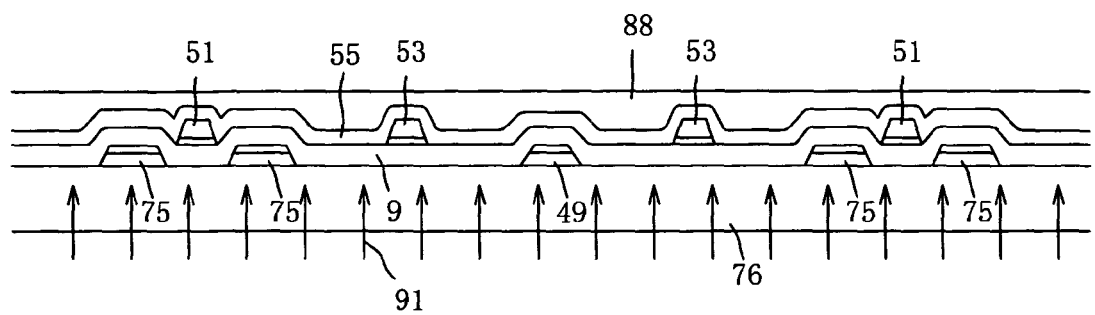
FIGS. 107A-107D are cross sectional views showing the process involved in the transverse electric field type liquid crystal panel which is planarized with use of the back surface exposure method of the present invention.
Figure 107:
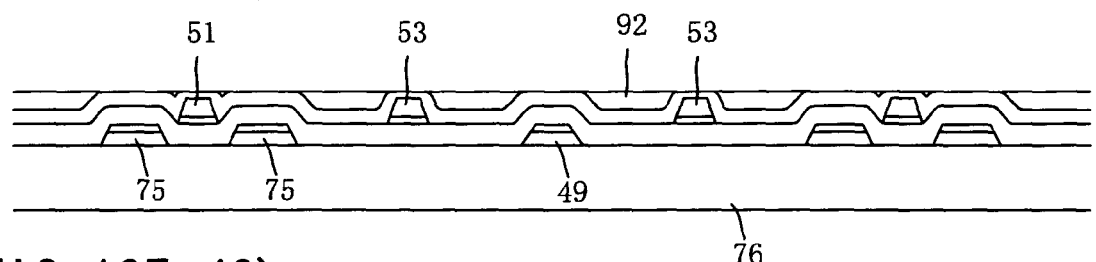
Figure 107:
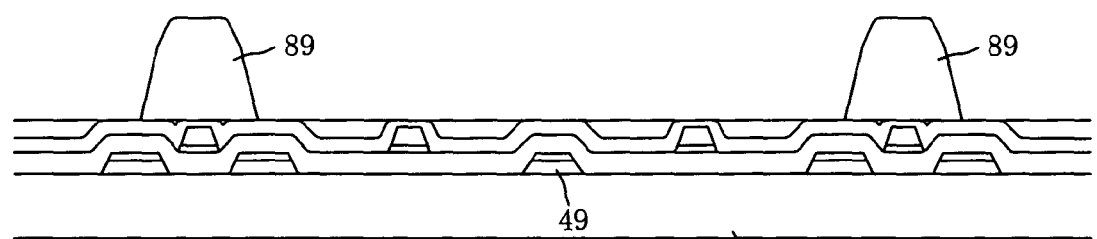
Figure 107:
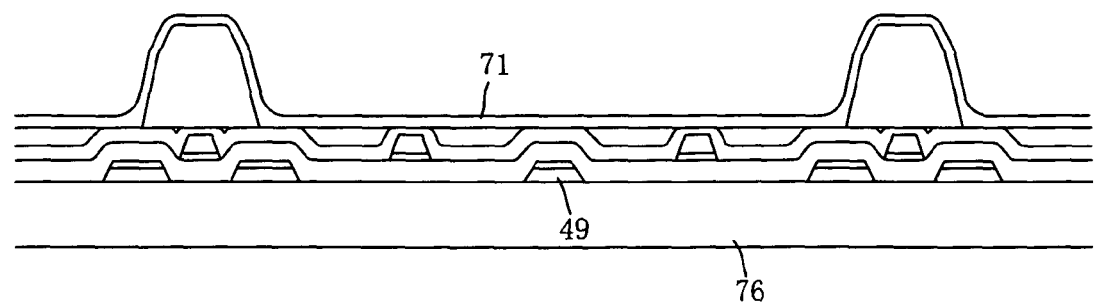

In the example of FIGS. 107A-107D, the negative photoresist 88 is applied on the passivation film 55 for the thickness of the liquid crystal cell gap as shown in FIG. 107A. The UV light 91 is applied from the back surface of the glass substrate 76 to expose the negative photoresist 88 by an enough light for a thickness sufficient to flatten the irregularity of the substrate. After the development, the negative photoresist 92 is remained on the glass substrate in a flat manner to form a flat surface as shown in FIG. 107B. Then, the negative photoresist is coated again and the complete exposure is performed with an ordinary photomask at the areas where the photolithography spacers are to be constructed. Thus, the photolithography spacers 89 are created after development as shown in FIG. 107C. Lastly, the alignment film 71 is formed on the surface of the substrate as shown in FIG. 107D.

Although the photolithography spacers are utilized in the example of FIGS. 107A-107D, 114A-114C and 130A-130C, the spacer bumps 73 described above with respect to the first, second, fifth, sixth and ninth embodiments can also be utilized. When the scanning type back surface exposure method is used to perform the flattening process, metal electrodes that do not allow the light to transmit therethrough must be used for the common electrodes 49 within the pixel and the liquid crystal drive electrodes 53.

Figure 105:
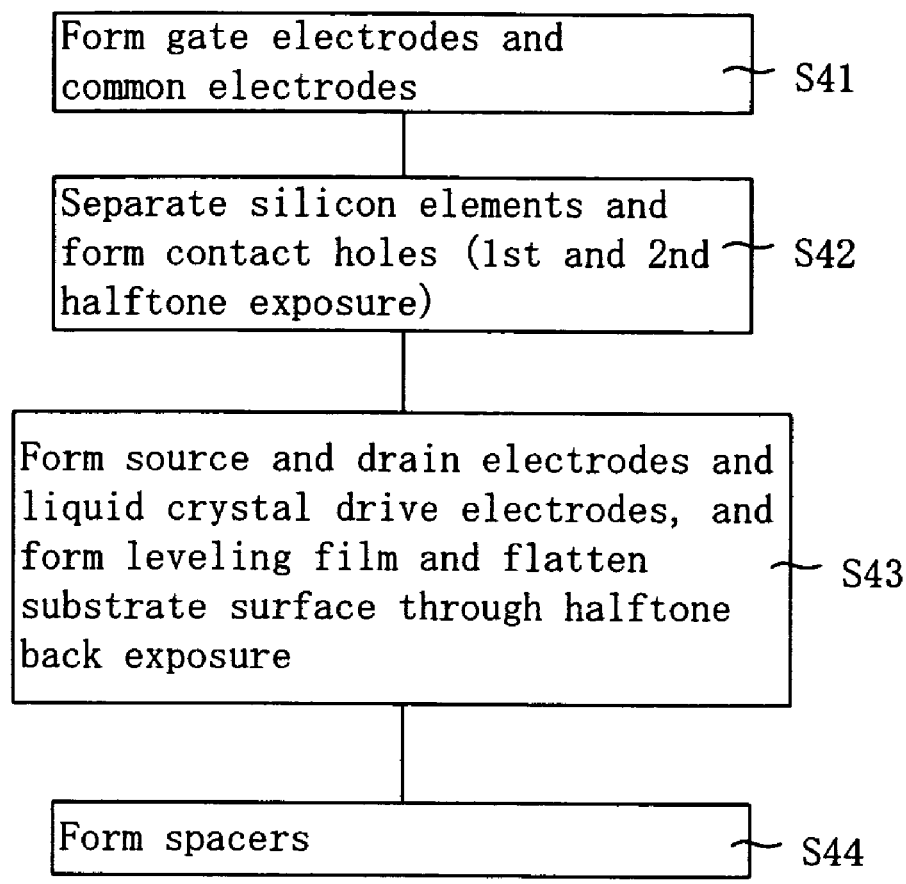
FIG. 105 is a flow chart showing the production flow involved in the four-step photomasking process of the present invention.

FIG. 105 is a flow chart summarizing the process of producing the active matrix substrate including the steps for flattening (leveling) the substrate and forming the photolithography spacers using the ordinary photomask exposure method and the halftone back surface exposure in the twenty second embodiment. In step S41, the gate electrodes of the thin film transistors and the common electrodes are formed at the same time. Then, at step S42, the silicon elements for the thin film transistors are separated from the semiconductor layer, and the contact holes are formed at the same time using the first and second halftone exposure. Then in step S43, the source and drain electrodes of the thin film transistors and the liquid crystal drive electrodes are formed at the same time. During this step, after creating the source and drain electrodes and the liquid crystal drive electrodes, a leveling film is applied on the substrate and the surface flattening (leveling) is performed by the halftone back surface exposure. Lastly, at step S44, the photolithography spacers are created through the complete exposure.

Preferred Embodiment 23

Figure 125:
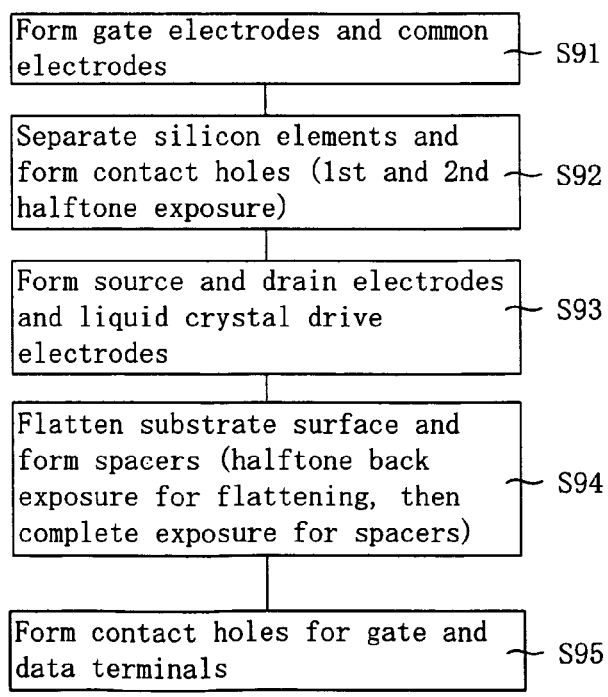

FIG. 125 is a flow chart showing an example of production processes involved in the transverse electric field type active matrix substrate according to the twenty third embodiment of the present invention. There are five photolithography processes. In step S91, the gate electrodes of the for thin film transistors and the common electrodes are formed at the same time. Then, at step S92, silicon elements for the thin film transistors are separated from the semiconductor layer, and the contact holes are formed at the same time through the first and second halftone exposure. In step S93, the source and drain electrodes of the thin film transistors and the liquid crystal drive electrodes are formed at the same. Then, at step S94, the photolithography spacer is formed through the complete exposure after the surface flattening (leveling) is conducted through the halftone back surface exposure method. Lastly, at step S95, contact holes for the gate terminals and data terminals are formed.

In the twenty third embodiment described above, the production process is already significantly shortened by utilizing the processes implemented in the twenty first embodiment and the twenty second embodiment. The flattening (leveling) process is performed on the surface of the substrate, thus, alignment defects will not arise during the rubbing alignment treatment. As a result, light leakage during the black display is minimized, thereby achieving a display with high contrast.

Figure 128:
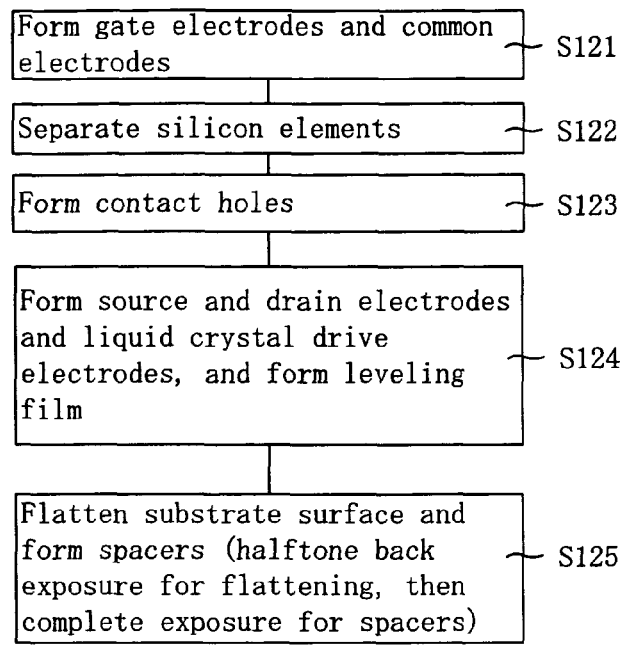

FIG. 128 is a flow chart summarizing a further example of process for producing the active matrix substrate including the steps for flattening (leveling) the substrate and forming the photolithography spacers using the ordinary photomask exposure and the halftone back surface exposure in the twenty third embodiment. In step S121, the gate electrodes of the thin film transistors and the common electrodes are formed at the same time. Then, at step S122, silicon elements for the thin film transistors are separated from the semiconductor layer. At step S123, the contact holes are formed. In step S124, the source and drain electrodes of the thin film transistors and the liquid crystal drive electrodes are formed at the same time. During this process, a leveling film is applied to the surface of the substrate. For example, after a back channel B2H6 plasma doping treatment, the leveling film is formed by an ink jet printing method or a partial P—SiNx protection film is formed through a masking method using a shadow frame. Lastly, at step S125, the leveling of the substrate surface are conducted through the halftone back surface exposure, and then, the photolithography spacers are formed through the complete exposure.

Preferred Embodiment 24

Figure 126:
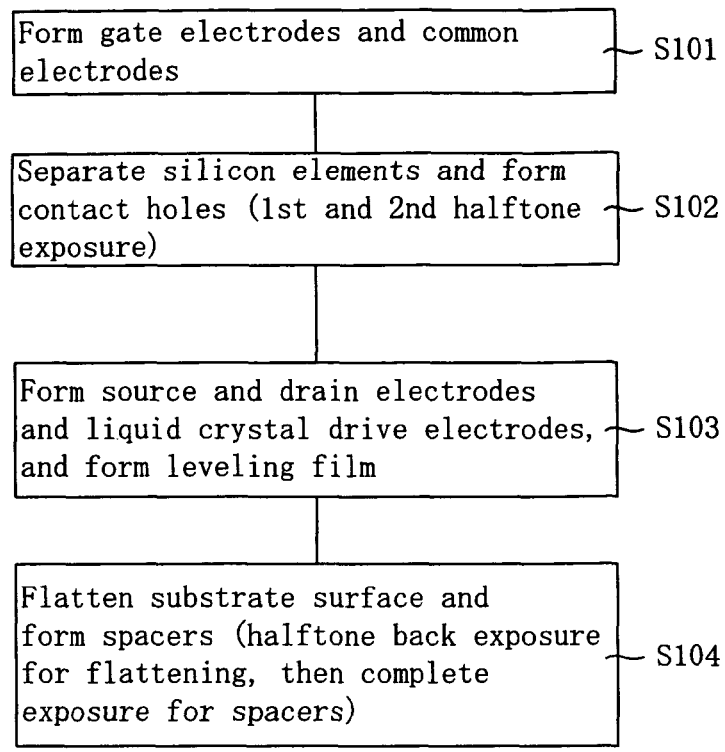

FIG. 126 is a flow chart showing an example of process involved in the production of the transverse electric field type active matrix substrate according to the twenty fourth embodiment of the present invention. There are four photolithography steps in this process. In step S101, the gate electrodes of the thin film transistors and the common electrodes are formed at the same time. Then, at step S102, the silicon elements for the thin film transistors are separated from the semiconductor layer and the contact holes are formed at the same time through the first and second halftone exposure. In step S103, the source and drain electrodes and liquid crystal drive electrodes are formed at the same time. During this process, a leveling film is applied to the surface of the substrate. For example, after a back channel B2H6 plasma doping treatment, the leveling film is formed by an ink jet printing method or a partial P—SiNx protection film is formed through a masking method using a shadow frame. Lastly, at step S104, the flattening process for the substrate surface are conducted through the halftone back surface exposure, and then, the photolithography spacers are formed through the complete exposure. The overall production process is significantly shortened by utilizing the processes in the twenty first embodiment and the twenty second embodiment described above.

In the twenty fourth embodiment, although the P—SiNx passivation layer is applied using the P-CVD device on the entire surface of the substrate in the twenty third embodiment, the process for opening the contact holes for terminals of the scanning lines (gate electrodes) and the video signal line (data electrodes) is eliminated by partially applying the P—SiNx passivation layer using a partial layer construction method using a shadow frame or by partially applying an organic passivation layer (BCB for example) using an application device such as an ink jet printer. Similar to the foregoing embodiments, since the substrate surface undergoes a leveling process, alignment defects will not occur during the rubbing treatment.

Preferred Embodiment 25

Figure 127:
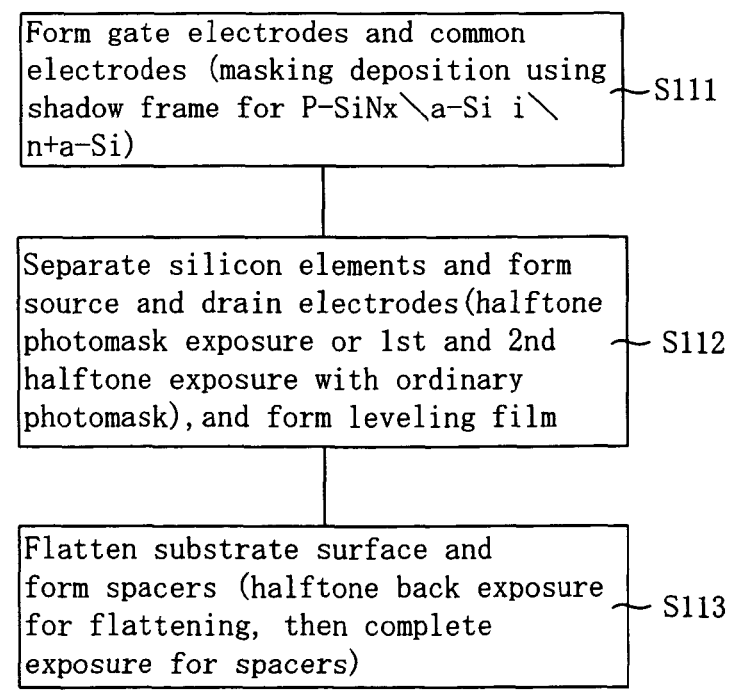

FIG. 127 is a flow chart showing an example of process involved in the production of transverse electric field type active matrix substrate according to the twenty fifth embodiment of the present invention. There are three photolithography processes. In step S111, the gate electrodes of the thin film transistors and the common electrodes are formed at the same time through, for example, a masking deposition process using a shadow frame for a structure of P—SiNx\a-Si i\n+a-Si. Then, at step S112, the silicon elements for the thin film transistors are separated from the semiconductor layer and the source and drain electrodes of the thin film transistors are formed at the same time through the first and second halftone exposure. During this process, a leveling film is applied to the surface of the substrate. For example, after a back channel B2H6 plasma doping treatment, the leveling film is formed by an ink jet printing method or a partial P—SiNx protection film is formed through a masking method using a shadow frame. Lastly, at step S113, the leveling of the substrate surface are conducted through the halftone back surface exposure, and then, the photolithography spacers are formed through the complete exposure.

By utilizing the processes in the seventeenth embodiment and the twenty second embodiment, the time required for the overall production process is significantly shortened. This embodiment can eliminate the process for opening the contact holes for terminals of the scanning lines (gate electrodes) and the video signal line (data electrodes) by partially applying the P—SiNx passivation layer using a partial layer construction method utilizing a shadow frame or by partially applying an organic passivation layer (BCB for example) using an application device such as an ink jet printer. Similar to the foregoing embodiments, since the substrate surface undergoes a flattening process, alignment defects will not occur during the rubbing treatment.

[Effect of the Present Invention]

As has been described above, according to the present invention, by utilizing the halftone shift exposure method using an ordinary photomask, or by utilizing the halftone mixed exposure method which is a combination of the halftone exposure using the ordinary photomask and the local additional exposure, the transverse electric field type liquid crystal display device can be produced with low cost and high production yield.

By utilizing the halftone back surface scanning exposure method of the present invention and by constructing the photolithography spacers in one negative photoresist process, low production cost, high display quality without alignment defects, and high contrast can be achieved.

By adapting the spacer bump structure of the present invention, the transverse electric field type liquid crystal display system with high aperture ratio and low production cost can be realized. By constructing the upper layer shielding common electrodes, the common electrodes within the pixel, and the liquid crystal drive electrodes by the same conductive material on the same layer, it is possible to produce a high quality display device with minimized residual image, high aperture ratio, and with uniform and deep black level display. By implementing the present invention, an ultra large screen transverse electric field type liquid crystal display television with low cost and high contrast can be realized.

Although the invention is described herein with reference to the preferred embodiments, one skilled in the art will readily appreciate that various modifications and variations may be made without departing from the spirit and scope of the present invention. Such modifications and variations are considered to be within the purview and scope of the appended claims and their equivalents.

What is claimed is:

1. A liquid crystal display device having a transverse electric field type active matrix substrate, comprising:
    a thin and long bump made of insulation material placed on a video signal line formed on the active matrix substrate in a manner to cover the video signal line, the bump having a taper angle of less than 30 degrees relative to a horizontal surface of the active matrix substrate at each edge thereof formed through a halftone process; and
    a common electrode formed along the video signal line in a manner to cover the thin and long insulation bump and the video signal line;
    thereby shielding an electric field generated by the video signal line by the common electrode; and
    wherein the thin and long insulation bump formed in the manner to cover the video signal line has a cross sectional shape of a circular, semi-circular, hyperbolic, or parabolic to form a rounded curve thereon.

2. A liquid crystal display device as defined in claim 1, wherein the thin and long insulation bump formed in the manner to cover the video signal line functions as a spacer to define a liquid crystal cell gap when assembling the liquid crystal cells.

3. A liquid crystal display device as defined in claim 1, wherein the common electrode for shielding the video signal line is made of a thin-film transparent conductive material that allows light to transmit in a degree greater than 20% such as titanium metal compound including titanium nitride (TiNx), titanium oxide nitride (TiOxNy), titanium silicide nitride (TiSixNy), and titanium silicide (TiSix), or a metal oxide transparent conductive material such as indium oxide (In2O3) or zinc oxide (ZnO).

4. A liquid crystal display device as defined in claim 1, wherein the thin and long insulation bump formed in the manner to cover the video signal line is discontinued around an area at which a video signal line and a scanning line intersect with one another.

5. A liquid crystal display device as defined in claim 1, wherein the common electrodes are provided in an upper layer and a lower layer on the active matrix substrate through a gate insulating film and a passivation film therebetween in a manner to sandwich the video signal line in up/down directions and right/left directions, wherein the common electrode on the lower layer is made of a metal electrode which prohibits the light to pass there through whereas the common electrode in the upper layer is a transparent electrode that allows the light to pass there through, and wherein the common electrode at the upper layer has an electrode width wider than that of the common electrode in the lower layer and is projected towards a side of a liquid crystal drive electrode.

6. A liquid crystal display device as defined in claim 1, wherein the video signal line, the thin and long insulation bump formed in the manner to cover the video signal line, and the common electrode formed along the video signal line for shielding the video signal line are aligned in a manner of straight line, wherein a liquid crystal drive electrode within a pixel and a common electrode within the pixel are bent within the pixel at least once at an angle within a range between 0-30 degrees (except 0 degree) relative to an alignment direction of a liquid crystal molecule.

7. A liquid crystal display device as defined in claim 1, wherein the video signal line and the thin and long insulation bump formed in the manner to cover the video signal line are aligned in a manner of straight line, wherein the common electrode formed along the video signal line for shielding the video signal line, a liquid crystal drive electrode within a pixel, and a common electrode within the pixel are bent within the pixel at least once at an angle within a range between 0-30 degrees (except 0 degree) relative to an alignment direction of a liquid crystal molecule.

8. A liquid crystal display device as defined in claim 1, wherein the video signal line, the thin and long insulation bump formed in the manner to cover the video signal line, the common electrode formed along the video signal line for shielding the video signal line, and a common electrode within a pixel are aligned in a manner of straight line, wherein a liquid crystal drive electrode within the pixel is bent within the pixel at least once at an angle within a range between 0-30 degrees (except 0 degree) relative to an alignment direction of a liquid crystal molecule.

9. A liquid crystal display device as defined in claim 1, wherein the video signal line, the thin and long insulation bump formed in the manner to cover the video signal line, the common electrode formed along the video signal line for shielding the video signal line, a common electrode within a pixel, and a liquid crystal drive electrode within the pixel are bent within the pixel at least once at an angle within a range between 0-30 degrees (except 0 degree) relative to an alignment direction of the liquid crystal molecule.

10. A liquid crystal display device as defined in claim 1, wherein the video signal line, the thin and long insulation bump formed in the manner to cover the video signal line, the common electrode formed along the video signal line for shielding the video signal line, a common electrode within a pixel, and a liquid crystal drive electrode within the pixel are bent within the pixel at least once at an angle within a range between 0-30 degrees (except 0 degree) relative to an alignment direction of the liquid crystal molecule, and wherein a color filter layer and a light shielding film (black mask) are bent within the pixel at least once, in a manner similar to the video signal line, at an angle within a range between 0-30 degrees (except 0 degree) relative to an alignment direction of a liquid crystal molecule.

11. A liquid crystal display device as defined in claim 1, wherein the video signal line, the thin and long insulation bump formed in the manner to cover the video signal line, and the common electrode formed along the video signal line for shielding the video signal line are aligned in a manner of straight line, wherein a liquid crystal drive electrode within a pixel and a common electrode within the pixel are bent within the pixel at least once at an angle within a range between 60-120 degrees (except 90 degrees) relative to an alignment direction of a liquid crystal molecule.

12. A liquid crystal display device as defined in claim 1, wherein the video signal line and the thin and long insulation bump formed in the manner to cover the video signal line are aligned in a manner of straight line, wherein the common electrode formed along the video signal line for shielding the video signal line, a liquid crystal drive electrode within a pixel, and a common electrode within the pixel are bent within the pixel at least once at an angle within a range between 60-120 degrees (except 90 degrees) relative to an alignment direction of a liquid crystal molecule.

13. A liquid crystal display device as defined in claim 1, wherein the video signal line, the thin and long insulation bump formed in the manner to cover the video signal line, the common electrode formed along the video signal line for shielding the video signal line, and a common electrode within a pixel are aligned in a manner of straight line, wherein only a liquid crystal drive electrode within the pixel is bent within the pixel at least once at an angle within a range between 60-120 degrees (except 90 degrees) relative to an alignment direction of a liquid crystal molecule.

14. A liquid crystal display device as defined in claim 1, wherein the video signal line, the thin and long insulation bump formed in the manner to cover the video signal line, the common electrode formed along the video signal line for shielding the video signal line, a common electrode within a pixel, and a liquid crystal drive electrode within the pixel are bent within the pixel at least once at an angle within a range between 60-120 degrees (except 90 degrees) relative to an alignment direction of the liquid crystal molecule.

15. A liquid crystal display device as defined in claim 1, wherein the video signal line, the thin and long insulation bump formed in the manner to cover the video signal line, the common electrode formed along the video signal line for shielding the video signal line, a common electrode within a pixel, and a liquid crystal drive electrode within the pixel are bent within the pixel at least once at an angle within a range between 60-120 degrees (except 90 degrees) relative to an alignment direction of a liquid crystal molecule, and wherein a color filter layer and a light shielding film (black mask) are bent within the pixel at least once, in a manner similar to the video signal line, at an angle within a range between 60-120 degrees (except 90 degrees) relative to an alignment direction of the liquid crystal molecule.

16. A liquid crystal display device as defined in claim 1, wherein the thin and long insulation bump formed along the video signal line to cover the video signal line has a dielectric constant of less than 3.3, and a height h1 is in a range between 1.5 micrometers and 5.0 micrometers, and wherein a distance L1 between an edge of the video signal line and an edge of the insulation bump is in a range between 3.0 micrometers and 6.0 micrometers.

17. A liquid crystal display device as defined in claim 1, wherein a distance L2 between an edge of the insulation bump covering the video signal line and an edge of the shielding common electrode covering the insulation bump is in a range between 0.5 micrometers and 10.0 micrometers.

18. A liquid crystal display device as defined in claim 1, wherein monomer or oligomer used as a material for fabricating the insulation bump covering the video signal line has at least one benzo-cyclobutene structure or its dielectric form or has at least one fluorene skeleton or its dielectric form.

19. A liquid crystal display device as defined in claim 1, wherein, when forming the thin and long insulation bump covering the video signal line, at least one barrier bump spacer in a closed loop structure is formed at the same time for preventing breakage of a main seal due to an atmospheric pressure or a pressure from liquid crystals at a location identical to an area on which the main seal of the liquid crystal cell that surrounds an entire effective pixel area is formed.

20. A liquid crystal display device as defined in claim 1, wherein the common electrodes formed along the thin and long insulation bumps in the manner to cover the video signal lines for shielding are connected with each other throughout an entire effective pixel display area and are set to an electric potential close to a center voltage of a video signal voltage.

21. A liquid crystal display device as defined in claim 1, wherein the spacer bumps have a characteristic of elastically and the spacer bumps evenly deform in a range between 0.1 micrometers and 0.5 micrometers in response to an atmospheric pressure during a process of constructing a liquid crystal cell by superposing an active matrix substrate and a color filter substrate with one another under a vacuum atmosphere.

* * * * *